US012562632B2

(12) United States Patent
Zhu et al.

(10) Patent No.: US 12,562,632 B2
(45) Date of Patent: Feb. 24, 2026

(54) CONVERSION CIRCUIT INCLUDING ISOLATION AND CONVERSION UNITS, AND SWITCH-MODE POWER SUPPLY INCLUDING THE CONVERSION CIRCUIT

(71) Applicant: HUAWEI TECHNOLOGIES CO., LTD., Shenzhen (CN)

(72) Inventors: Yongfa Zhu, Dongguan (CN); Zhiqiang Zeng, Dongguan (CN); Jinsen Cai, Dongguan (CN); Heqian Yang, Dongguan (CN); Xiaowei Chen, Dongguan (CN); Tao Ding, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 268 days.

(21) Appl. No.: 18/325,289

(22) Filed: May 30, 2023

(65) Prior Publication Data

US 2023/0344343 A1 Oct. 26, 2023

Related U.S. Application Data

(63) Continuation of application No. PCT/CN2021/107097, filed on Jul. 19, 2021.

(30) Foreign Application Priority Data

Nov. 30, 2020 (CN) .......................... 202011383113.6

(51) Int. Cl.
*H02M 1/00* (2007.01)
*H02M 3/00* (2006.01)
(Continued)

(52) U.S. Cl.
CPC ........... *H02M 1/0074* (2021.05); *H02M 3/07* (2013.01); *H02M 3/158* (2013.01); *H02M 3/01* (2021.05)

(58) Field of Classification Search
CPC ............. H02M 1/0074; H02M 7/4833; H02M 7/4835; H02M 1/0095; H02M 3/07; H02M 1/007; H02M 3/077
See application file for complete search history.

(56) References Cited

U.S. PATENT DOCUMENTS 9,831,776 B1 11/2017 Jiang et al.
10,033,276 B2 7/2018 Shenoy
(Continued)

FOREIGN PATENT DOCUMENTS

CN 105556820 A 5/2016
CN 107834844 A 3/2018
(Continued)

OTHER PUBLICATIONS

Extended European Search Report for Application No. 21896345.2 dated Apr. 3, 2024, 9 pages.
(Continued)

*Primary Examiner* — Gustavo A Rosario-Benitez

(57) ABSTRACT

This application provides a conversion circuit, a switch-mode power supply, and an electronic device. The conversion circuit mainly includes a first branch circuit and a second branch circuit. Input sides of the first branch circuit and the second branch circuit are connected in series, and output sides of the first branch circuit and the second branch circuit are connected in parallel; or input sides of the first branch circuit and the second branch circuit are connected in parallel, and output sides of the first branch circuit and the second branch circuit are connected in series. This implementation helps improve efficiency of the conversion circuit. When an inductor is disposed in the conversion circuit, a size of the inductor is further reduced, to improve integration.

7 Claims, 92 Drawing Sheets

Conversion circuit 111

(51) Int. Cl.
    *H02M 3/07*         (2006.01)
    *H02M 3/158*      (2006.01)

(56)           References Cited

U.S. PATENT DOCUMENTS

| | | | | |
|---|---|---|---|---|
| 10,381,924 | B2 * | 8/2019 | Giuliano | H02M 3/07 |
| 10,523,121 | B2 * | 12/2019 | Zhao | H02M 3/07 |
| 10,985,654 | B2 * | 4/2021 | Nomiyama | H02M 3/073 |
| 2005/0213267 | A1 | 9/2005 | Azrai et al. | |
| 2006/0097776 | A1 * | 5/2006 | Wada | H02M 3/07 |
| | | | | 327/544 |
| 2016/0197552 | A1 * | 7/2016 | Giuliano | H02M 3/07 |
| | | | | 363/60 |
| 2019/0372457 | A1 | 12/2019 | Zhang et al. | |
| 2019/0393776 | A1 * | 12/2019 | Low | H02M 3/07 |
| 2020/0153331 | A1 * | 5/2020 | Li | H02M 3/07 |
| 2020/0218300 | A1 | 7/2020 | Zhang et al. | |
| 2020/0244161 | A1 * | 7/2020 | Hou | H02J 7/00712 |
| 2020/0366120 | A1 * | 11/2020 | Yuan | H02J 50/12 |

FOREIGN PATENT DOCUMENTS

| | | | |
|---|---|---|---|
| CN | 108092513 | A | 5/2018 |
| CN | 108539981 | A | 9/2018 |
| CN | 209170229 | U | 7/2019 |
| CN | 110391744 | A | 10/2019 |
| CN | 110504836 | A | 11/2019 |
| CN | 111030446 | A | 4/2020 |
| CN | 111510007 | A | 8/2020 |
| CN | 111711347 | A | 9/2020 |
| JP | H06141537 | A | 5/1994 |
| JP | 2006136163 | A | 5/2006 |
| JP | 2006280160 | A | 10/2006 |
| JP | 2015226356 | A | 12/2015 |
| JP | 2019050665 | A | 3/2019 |
| WO | 2017156638 | A1 | 9/2017 |
| WO | 2017220019 | A1 | 12/2017 |

OTHER PUBLICATIONS

Mohamed Ahmed et al: "High-efficiency high-power-density 48/1V sigma converter voltage regulator module", 2017 IEEE Applied Power Electronics Conference and Exposition (APEC), Nov. 15, 2016, total 6 pages.

PCT International Search Report for Application No. PCT/CN2021/107097 dated Nov. 30, 2020, 52 pages.

Extended European Search Report for U.S. Appl. No. 21/896,345 dated Apr. 3, 2024, 10 pages.

Notice of Reasons for Rejection for Application No. 2023-532622 dated Aug. 6, 2024, 13 pages.

\* cited by examiner

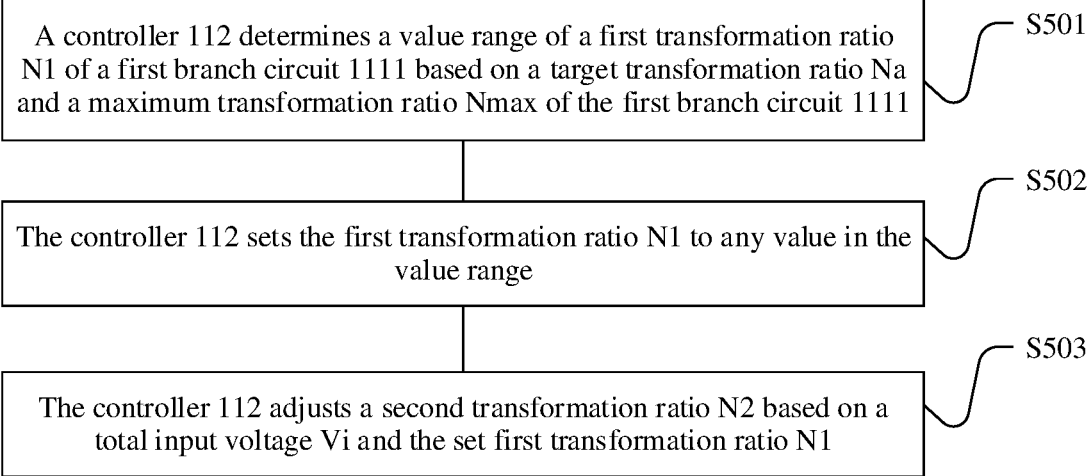

A controller 112 determines a value range of a first transformation ratio N1 of a first branch circuit 1111 based on a target transformation ratio Na and a maximum transformation ratio Nmax of the first branch circuit 1111 — S501

The controller 112 sets the first transformation ratio N1 to any value in the value range — S502

The controller 112 adjusts a second transformation ratio N2 based on a total input voltage Vi and the set first transformation ratio N1 — S503

FIG. 5

Conversion circuit 111

Conversion circuit 111

CONVERSION CIRCUIT INCLUDING ISOLATION AND CONVERSION UNITS, AND SWITCH-MODE POWER SUPPLY INCLUDING THE CONVERSION CIRCUIT

CROSS-REFERENCE TO RELATED APPLICATIONS

This application is a continuation of International Application No. PCT/CN2021/107097, filed in Jul. 19, 2021, which claims priority to Chinese Patent Application No. 202011383113.6, filed on Nov. 30, 2020. The disclosures of the aforementioned applications are hereby incorporated by reference in their entireties.

TECHNICAL FIELD

This application relates to the field of electronic science and technology, and in particular, to a conversion circuit, a switch-mode power supply, and an electronic device.

BACKGROUND

In recent years, electronic devices such as consumer electronics have been greatly developed and popularized, and hardware specifications and performance of the electronic devices have been gradually improved. Therefore, optimizing power consumption of the electronic devices has become one of the priorities of the electronic device research field.

Specifically, a terminal battery, a plurality of power management units (PMU), and a plurality of loads (such as a chip, a camera, and a display) are usually disposed in the electronic device. The plurality of PMUs are respectively connected to the plurality of loads in a one-to-one correspondence, an input end of each PMU is connected to the terminal battery, and an output end of each PMU is connected to a load corresponding to the PMU. Each PMU may receive a battery voltage output by the terminal battery, and convert the battery voltage into an operating voltage required by the load corresponding to the PMU, to supply power to the load corresponding to the PMU.

As the hardware specifications and performance of the electronic device are gradually improved, the battery voltage in the electronic device gradually increases, but the operating voltage required by the load gradually decreases. Therefore, the PMU needs to implement a larger transformation ratio. However, when the transformation ratio of the PMU increases, a loss of the PMU increases. In addition, because there are a large quantity of PMUs in most electronic devices, the loss problem of the PMU greatly affects overall power consumption of the electronic device. Therefore, the current PMU needs to be further studied.

SUMMARY

This application provides a conversion circuit, a switch-mode power supply, and an electronic device, to reduce power consumption of the electronic device and improve integration of the electronic device.

According to a first aspect, an embodiment of this application provides a conversion circuit, mainly including a first branch circuit and a second branch circuit. The first branch circuit includes a first connection end, a first input end, a first output end, and a second output end, the second branch circuit includes a second connection end, a second input end, a third output end, and a fourth output end, and the first connection end of the first branch circuit is connected to the second connection end of the second branch circuit. Specifically, the first branch circuit may convert a first input voltage received through the first input end and the first connection end into an output voltage of the conversion circuit, and output the output voltage of the conversion circuit through the first output end and the second output end; and the second branch circuit may convert a second input voltage received through the second input end and the second connection end into an output voltage of the conversion circuit, and output the output voltage of the conversion circuit through the third output end and the fourth output end, and a total input voltage of the conversion circuit includes the first input voltage and the second input voltage.

In the conversion circuit, input sides of the first branch circuit and the second branch circuit are connected in series, and output sides of the first branch circuit and the second branch circuit are connected in parallel. It is assumed that efficiency of the first branch circuit is a %, and efficiency of the second branch circuit is b %. The efficiency of the first branch circuit is a ratio of output power of the first branch circuit to input power of the first branch circuit, and the efficiency of the second branch circuit is a ratio of output power of the second branch circuit to input power of the second branch circuit. Efficiency of the conversion circuit provided in this embodiment of this application may be expressed as $$(a\% - b\%) * \frac{N1 * Vo}{Vi} + b\%,$$

or may be expressed as $$(b\% - a\%) * \frac{Vi - N1 * Vo}{Vi} + a\%.$$

The efficiency of the conversion circuit may be understood as a ratio of output power of the conversion circuit to input power of the conversion circuit. It can be learned from the foregoing two representations that, when the efficiency of the first branch circuit is greater than the efficiency of the second branch circuit, the efficiency of the conversion circuit is greater than the efficiency of the second branch circuit; or when the efficiency of the second branch circuit is greater than the efficiency of the first branch circuit, the efficiency of the conversion circuit is greater than the efficiency of the first branch circuit. Compared with an implementation in which two branch circuits are connected in series (efficiency is a %+b %, and a value of the efficiency is definitely less than a % and b %), this embodiment of this application helps improve the efficiency of the conversion circuit. When the conversion circuit is applied to a PMU, efficiency of the PMU is also improved.

In addition, in this embodiment of this application, the output sides of the first branch circuit and the second branch circuit are connected in parallel, and an input of the second branch circuit is not interfered by an output of the first branch circuit, and vice versa. Therefore, the first branch circuit and the second branch circuit may use different operating frequencies. It is assumed that the second branch circuit has an inductor, and the second branch circuit may use a higher operating frequency, to reduce a size requirement for the inductor. The inductor is a major factor that restricts PMU integration. Therefore, the conversion circuit provided in this embodiment of this application further helps improve the PMU integration.

Because the input sides of the first branch circuit and the second branch circuit are connected in series, input currents of the first branch circuit and the second branch circuit are equal. and power transmitted by the first branch circuit and the second branch circuit is mainly determined by the first input voltage of the first branch circuit and the second input voltage of the second branch circuit. In a possible implementation, when efficiency of the first branch circuit is greater than efficiency of the second branch circuit, the first input voltage is greater than the second input voltage: or when efficiency of the first branch circuit is less than efficiency of the second branch circuit, the first input voltage is less than the second input voltage.

In this implementation, a large amount of power may be transmitted by a branch circuit with high efficiency, to help reduce a loss of the conversion circuit as a whole, and further improve efficiency of the conversion circuit.

To adapt to changes of an input voltage and a target output voltage, a first transformation ratio of the first branch circuit in this embodiment of this application may be adjustable. For example, the first branch circuit has at least the following possible implementations:

Implementation 1 of the first branch circuit

The first branch circuit includes n+1 input switching transistors, n isolation capacitors, and n output combinations, each output combination includes two output switching transistors, and n is an integer greater than or equal to 1. The n+1 input switching transistors are sequentially connected in series, a first electrode of a first input switching transistor is connected to the first input end, a second electrode of an $i^{th}$ input switching transistor is connected to a first electrode of an $(i+1)^{th}$ input switching transistor through a first series connection node, a first electrode of the $i^{th}$ input switching transistor is connected to a second electrode of an $(i-1)^{th}$ input switching transistor through another first series connection node, i is an integer greater than 1 and less than or equal to n, and a second electrode of an $(n+1)^{th}$ input switching transistor is connected to the second connection end as the first connection end. The n output combinations are connected in parallel, in each output combination, a first electrode of one output switching transistor is connected to the first output end, a second electrode of the output switching transistor is connected to a first electrode of the other output switching transistor through a second series connection node, and a second electrode of the other output switching transistor is connected to the second output end. n first series connection nodes of the n+1 input switching transistors, the n isolation capacitors, and n second series connection nodes in the n output combinations are respectively connected in a one-to-one correspondence, one end of each isolation capacitor is connected to a first series connection node corresponding to each isolation capacitor, and the other end of each isolation capacitor is connected to a second series connection node corresponding to each isolation capacitor.

The first branch circuit provided in the implementation I can implement n integer transformation ratios, and a maximum transformation ratio is n. That is, the first transformation ratio of the first branch circuit may be set to any one of n, n−1 . . . , and 1. n is a quantity of isolation capacitors in the first branch circuit. If the first branch circuit includes three isolation capacitors, the first transformation ratio of the first branch circuit may be set to any one of 3, 2, and 1.

To further improve efficiency of the conversion circuit, the first branch circuit further includes n resonant inductors, the n resonant inductors are respectively connected in series to the n isolation capacitors in a one-to-one correspondence, and each resonant inductor and an isolation capacitor corresponding to each resonant inductor are connected in series between a first series connection node corresponding to each resonant inductor and a second series connection node corresponding to each resonant inductor. Disposing of the n resonant inductors helps implement zero-voltage switch-on of the n+1 input switching transistors and the 2n output switching transistors in the first branch circuit, reduce a switching loss of each switching transistor, and further improve the efficiency of the conversion circuit.

Implementation 2 of the first branch circuit

The first branch circuit includes an isolation unit and a conversion unit, a high potential input end of the conversion unit is connected to a high potential output end of the isolation unit, a low potential input end of the conversion unit and a low potential output end of the isolation unit are grounded, a high potential input end of the isolation unit is connected to the first input end, and a low potential input end of the isolation unit is connected to the second connection end as the first connection end. The isolation unit may receive the first input voltage, and provide the first input voltage for the conversion unit. The conversion unit may convert the first input voltage into the output voltage of the conversion circuit.

For example, the isolation unit includes a first isolation switching transistor, a second isolation switching transistor, a third isolation switching transistor, a fourth isolation switching transistor, and an isolation capacitor. A first electrode of the first isolation switching transistor is connected to the first input end, and a second electrode of the first isolation switching transistor is separately connected to a first electrode of the second isolation switching transistor and one end of the isolation capacitor. A second electrode of the second isolation switching transistor is connected to the high potential input end of the conversion unit. The other end of the isolation capacitor is separately connected to a second electrode of the third isolation switching transistor and a first electrode of the fourth isolation switching transistor. A first electrode of the third isolation switching transistor is connected to the second connection end as the first connection end. A second electrode of the fourth isolation switching transistor is grounded.

In this embodiment of this application, because the input side of the first branch circuit and the input side of the second branch circuit are connected in series, the low potential input end of the first branch circuit cannot be grounded. Therefore, the conversion unit whose low potential input end is grounded cannot be directly used. In view of this, the isolation unit is disposed in the first branch circuit. Because the low potential input end of the isolation unit may not be grounded, and the low potential output end of the isolation unit may be grounded, the isolation unit may supply power to the conversion unit whose low potential input end is grounded, so that the first branch circuit may perform voltage conversion by using the conversion unit whose low potential input end is grounded.

The conversion unit in this embodiment of this application has a plurality of possible implementations. Examples are provided as follows:

Example 1 of the Conversion Unit

The conversion unit may include K conversion capacitors, K first conversion switching transistors, K−1 second conversion switching transistors, and K−1 third conversion switching transistors, and K is an integer greater than 1. First to $(K-1)^{th}$ conversion capacitors are sequentially alternately connected to the K first conversion switching transistors, a first electrode of a $1^{st}$ first conversion switching transistor is connected to the high potential output end of the isolation unit, one end of a $j^{th}$ conversion capacitor is connected to a second electrode of a $j^{th}$ first conversion switching transistor, the other end of the $j^{th}$ conversion capacitor is connected to a first electrode of a $(j+1)^{th}$ first conversion switching transistor, and j is an integer greater than or equal to 1 and less than K: the first to $(K-1)^{th}$ conversion capacitors are further respectively connected to the K−1 second conversion switching transistors and the K−1 third conversion switching transistors in a one-to-one correspondence, the one end of the $j^{th}$ conversion capacitor is connected to a second electrode of a second conversion switching transistor corresponding to the $j^{th}$ conversion capacitor, and the other end of the $j^{th}$ conversion capacitor is connected to a first electrode of a third conversion switching transistor corresponding to the $j^{th}$ conversion capacitor; and first electrodes of the K−1 second conversion switching transistors are connected to the first output end, and second electrodes of the K−1 third conversion switching transistors are grounded.

A transformation ratio of the conversion unit may be equivalent to the first transformation ratio of the first branch circuit. Based on the conversion unit, K integer transformation ratios may be implemented, and a maximum transformation ratio is K. That is, the first transformation ratio of the first branch circuit may be set to any one of K, K−1 . . . , and 1. K is a quantity of conversion capacitors in the first branch circuit. If the first branch circuit includes five conversion capacitors, the first transformation ratio of the first branch circuit may be set to any one of 5, 4, 3, 2, and 1.

Example 2 of the Conversion Unit

The conversion unit includes K first conversion capacitors, K second conversion capacitors, K−1 first conversion switching transistors, K second conversion switching transistors, K third conversion switching transistors, and K fourth conversion switching transistors, and K is an integer greater than 1. One ends of the K first conversion capacitors are respectively connected to second electrodes of the K first conversion switching transistors and first electrodes of the K second conversion switching transistors in a one-to-one correspondence, and the other ends of the K first conversion capacitors are respectively connected to second electrodes of the K third conversion switching transistors and first electrodes of the K fourth conversion switching transistors in a one-to-one correspondence. One ends of the K second conversion capacitors are respectively connected to second electrodes of the K second conversion switching transistors and first electrodes of the K third conversion switching transistors in a one-to-one correspondence, and the other ends of the K second conversion capacitors are respectively connected to second electrodes of the K fourth conversion switching transistors in a one-to-one correspondence. Second electrodes of first to $(K-1)^{th}$ fourth conversion switching transistors are respectively connected to first electrodes of second to $K^{th}$ first conversion switching transistors in a one-to-one correspondence, a second electrode of a $K^{th}$ fourth conversion switching transistor is grounded, and a first electrode of a $1^{st}$ first conversion switching transistor is connected to the high potential output end of the isolation unit.

Based on the conversion unit, a maximum first transformation ratio of the first branch circuit may be 2K. That is, the transformation ratio of the first branch circuit may be set to any one of 2K, 2 (K−1), . . . , 2, and 1. K is a quantity of first conversion capacitors. If the conversion unit includes two first conversion capacitors, the transformation ratio of the first branch circuit may be set to any one of 4, 2, and 1.

Example 3 of the Conversion Unit

The conversion unit includes K first conversion capacitors, K second conversion capacitors, K−1 first conversion switching transistors, K second conversion switching transistors, K third conversion switching transistors, and K fourth conversion switching transistors, and K is an integer greater than 1. One ends of the K first conversion capacitors are respectively connected to second electrodes of the K first conversion switching transistors and first electrodes of the K second conversion switching transistors in a one-to-one correspondence, and the other ends of the K first conversion capacitors are respectively connected to second electrodes of the K third conversion switching transistors and first electrodes of the K fourth conversion switching transistors in a one-to-one correspondence. One ends of the K second conversion capacitors are respectively connected to second electrodes of the K second conversion switching transistors and first electrodes of the K third conversion switching transistors in a one-to-one correspondence, and the other ends of the K second conversion capacitors are respectively connected to second electrodes of the K fourth conversion switching transistors in a one-to-one correspondence. The second electrodes of the K fourth conversion switching transistors are grounded, second electrodes of first to $(K-1)^{th}$ second conversion switching transistors are respectively connected to first electrodes of second to $K^{th}$ first conversion switching transistors in a one-to-one correspondence, a second electrode of a $K^{th}$ second conversion switching transistor is connected to the first output end, and a first electrode of a $1^{st}$ first conversion switching transistor is connected to the high potential output end of the isolation unit.

Based on the conversion unit, a transformation ratio that is the same as that in Example 2 may be implemented. Details are not described again.

Example 4 of the Conversion Unit

The conversion unit includes K first conversion capacitors, a first conversion switching transistor, K second conversion switching transistors, K third conversion switching transistors, K fourth conversion switching transistors, and a second conversion capacitor, and K is an integer greater than 1: one ends of the K first conversion capacitors are respectively connected to first electrodes of the K second conversion switching transistors in a one-to-one correspondence, and the other ends of the K first conversion capacitors are respectively connected to second electrodes of the K third conversion switching transistors and first electrodes of the K fourth conversion switching transistors in a one-to-one correspondence: second electrodes of the K fourth conversion switching transistors are sequentially connected to the K second conversion switching transistors, a first electrode of a first second conversion switching transistor is connected to a second electrode of the first conversion switching transistor, a second electrode of a $K^{th}$ second conversion switching transistor is connected to the first output end, and a first electrode of the first conversion switching transistor is connected to the high potential output end of the isolation unit; and one end of the second conversion capacitor is connected to the first output end, and the other end of the second conversion capacitor is grounded.

Based on the conversion unit, a maximum first transformation ratio of the first branch circuit may be K+1. The transformation ratio of the first branch circuit may be set to any one of K+1. K . . . , and 1. K is a quantity of first conversion capacitors. If the conversion unit includes two first conversion capacitors, the transformation ratio of the first branch circuit may be set to any one of 3, 2, and 1.

In the foregoing examples, the first branch circuit may mainly implement the integer transformation ratio. In a possible implementation, the first branch circuit further includes a first adjustable inductor, and the first adjustable inductor is connected to the first output end, and is configured to output the output voltage of the conversion circuit that is obtained through the conversion by the first branch circuit. The first adjustable inductor is disposed, so that the first branch circuit can perform finer adjustment on the output voltage by using the first adjustable inductor. That is, the first transformation ratio may change continuously in a specific range, and a value of the first transformation ratio may be a non-integer.

As described above, a second adjustable inductor may be disposed in the second branch circuit. In this case, the second adjustable inductor may be electromagnetically coupled to the first adjustable inductor. Compared with two separate inductors, the first adjustable inductor and the second adjustable inductor are coupled inductors, which helps reduce volumes of the first adjustable inductor and the second adjustable inductor. In addition, ripples of output currents in the first adjustable inductor and the second adjustable inductor are further reduced, to further improve efficiency of the conversion circuit.

For example, the second branch circuit in this embodiment of this application has at least the following possible implementations:

Implementation 1 of the second branch circuit

The second branch circuit includes a first switching transistor, a second switching transistor, and the second adjustable inductor: a first electrode of the first switching transistor is connected to the first connection end as the second connection end: a second electrode of the first switching transistor is separately connected to one end of the second adjustable inductor and a first electrode of the second switching transistor; and a second electrode of the second switching transistor is grounded, and the other end of the second adjustable inductor is connected to the third output end.

Implementation 2 of the second branch circuit

The second branch circuit includes a first switching transistor, a second switching transistor, the second adjustable inductor, and an adjustable capacitor: one end of the second adjustable inductor is connected to the first connection end as the second connection end, and the other end of the second adjustable inductor is separately connected to a first electrode of the first switching transistor and a first electrode of the second switching transistor: a second electrode of the first switching transistor is separately connected to one end of the adjustable capacitor and the third output end; and a second electrode of the second switching transistor and the other end of the adjustable capacitor are grounded.

Implementation 3 of the second branch circuit

The second branch circuit includes a first switching transistor, a second switching transistor, a third switching transistor, a fourth switching transistor, and the second adjustable inductor: a first electrode of the first switching transistor is connected to the first connection end as the second connection end, and a second electrode of the first switching transistor is separately connected to a first electrode of the second switching transistor and one end of the second adjustable inductor: the other end of the second adjustable inductor is separately connected to a second electrode of the third switching transistor and a first electrode of the fourth switching transistor: a first electrode of the third switching transistor is connected to the third output end; and a second electrode of the second switching transistor and a second electrode of the fourth switching transistor are grounded.

Implementation 4 of the second branch circuit

The second branch circuit includes a first switching transistor, a second switching transistor, a first adjustable capacitor, a second adjustable capacitor, the second adjustable inductor, and a third adjustable inductor: one end of the third adjustable inductor is connected to the first connection end as the second connection end, and the other end of the third adjustable inductor is separately connected to a first electrode of the first switching transistor and one end of the second adjustable capacitor: the other end of the second adjustable capacitor is separately connected to one end of the second adjustable inductor and a first electrode of the second switching transistor: the other end of the second adjustable inductor is separately connected to one end of the first adjustable capacitor and the third output end; and a second electrode of the first switching transistor, a second electrode of the second switching transistor, and the other end of the first adjustable capacitor are grounded.

Implementation 5 of the second branch circuit

The second branch circuit includes a first switching transistor, a second switching transistor, a first adjustable capacitor, a second adjustable capacitor, the second adjustable inductor, and a third adjustable inductor: one end of the third adjustable inductor is connected to the first connection end as the second connection end, and the other end of the third adjustable inductor is separately connected to one end of the second adjustable capacitor and a first electrode of first switching transistor: the other end of the second adjustable capacitor is separately connected to a first electrode of the second switching transistor and one end of the second adjustable inductor: a second electrode of the second switching transistor is separately connected to one end of the first adjustable capacitor and the third output end; and a second electrode of the first switching transistor, the other end of the second adjustable inductor, and the other end of the first adjustable capacitor are grounded.

Implementation 6 of the second branch circuit

The second branch circuit includes a first switching transistor, a second switching transistor, a first adjustable capacitor, a second adjustable capacitor, the second adjustable inductor, and a third adjustable inductor: a first electrode of the first switching transistor is connected to the first connection end as the second connection end, and a second electrode of the first switching transistor is separately connected to one end of the second adjustable capacitor and one end of the third adjustable inductor: the other end of the second adjustable capacitor is separately connected to one end of the second adjustable inductor and a first electrode of the second switching transistor: the other end of the second adjustable inductor is separately connected to one end of the first adjustable capacitor and the third output end; and the other end of the third adjustable inductor, a second electrode of the second switching transistor, and a second end of the first adjustable inductor are connected.

In this embodiment of this application, the conversion circuit further includes a first input capacitor and a second input capacitor. One end of the first input capacitor is connected to the first input end, and the other end of the first input capacitor is connected to the first connection end. One end of the second input capacitor is connected to the second connection end, and the other end of the second input capacitor is connected to the second input end. The first input capacitor may filter the first input voltage, and the second input capacitor may filter the second input voltage.

The conversion circuit may further include an output capacitor, one end of the output capacitor is connected to the first output end, and the other end of the output capacitor is connected to the second output end. The output capacitor may filter the output voltage of the conversion circuit.

According to a second aspect, an embodiment of this application provides a switch-mode power supply, and the switch-mode power supply mainly includes a conversion circuit and a controller. The conversion circuit may be the conversion circuit according to any one of the first aspect. For technical effect of a corresponding solution in the second aspect, refer to technical effect that may be obtained according to a corresponding solution in the first aspect. Repeated parts are not described in detail.

The conversion circuit mainly includes a first branch circuit and a second branch circuit, the first branch circuit includes a first connection end, a first input end, a first output end, and a second output end, the second branch circuit includes a second connection end, a second input end, a third output end, and a fourth output end, and the first connection end of the first branch circuit is connected to the second connection end of the second branch circuit.

The controller is separately connected to the first branch circuit and the second branch circuit. The controller may control the first branch circuit to convert a first input voltage received through the first input end and the first connection end into an output voltage of the conversion circuit, and output the output voltage of the conversion circuit through the first output end and the second output end; and control the second branch circuit to convert a second input voltage received through the second input end and the second connection end into an output voltage of the conversion circuit, and output the output voltage of the conversion circuit through the third output end and the fourth output end, and a total input voltage of the conversion circuit includes the first input voltage and the second input voltage.

To further improve efficiency of the switch-mode power supply, the controller may further control, when efficiency of the first branch circuit is greater than efficiency of the second branch circuit, the first input voltage to be greater than the second input voltage: or when efficiency of the first branch circuit is less than efficiency of the second branch circuit, the first input voltage to be less than the second input voltage.

In this embodiment of this application, both a first transformation ratio of the first branch circuit and a second transformation ratio of the second branch circuit are adjustable. The controller may further separately adjust, when the output voltage of the conversion circuit is not equal to a target output voltage, a first transformation ratio of the first branch circuit and a second transformation ratio of the second branch circuit based on the total input voltage of the conversion circuit and the target output voltage, so that the output voltage of the conversion circuit reaches the target output voltage.

The switch-mode power supply can flexibly adapt to changes of the total input voltage and the target output voltage by dynamically adjusting the first transformation ratio of the first branch circuit and the second transformation ratio of the second branch circuit.

For example, when adjusting the first transformation ratio of the first branch circuit and the second transformation ratio of the second branch circuit, the controller may determine a value range of the first transformation ratio based on a target transformation ratio and a maximum transformation ratio of the first branch circuit, where the first transformation ratio is less than the target transformation ratio and less than or equal to the maximum transformation ratio of the first branch circuit, and the target transformation ratio may be a ratio of the total input voltage to the target output voltage. The controller sets the first transformation ratio within the value range of the first transformation ratio. The controller may further adjust the second transformation ratio based on the total input voltage and the set first transformation ratio, so that the second branch circuit converts an adjusted second input voltage into the target output voltage, where the adjusted second input voltage is a difference obtained by subtracting an adjusted first input voltage from the total input voltage, and the adjusted first input voltage is a product of the set first transformation ratio and the target output voltage.

In a possible implementation, the first branch circuit has a plurality of adjustable transformation ratios, efficiency of the first branch circuit is greater than efficiency of the second branch circuit, and the controller may set the first transformation ratio to an adjustable transformation ratio that is in the plurality of adjustable transformation ratios and that is less than the target transformation ratio and closest to the target transformation ratio. In this implementation, the first transformation ratio of the first branch circuit may be increased as much as possible when the total input voltage and the target output voltage are satisfied, that is, power transmitted by the first branch circuit may be increased as much as possible. Because the efficiency of the first branch circuit is high, increasing the power transmitted by the first branch circuit as much as possible helps further improve efficiency of the switch-mode power supply.

In another possible implementation, the controller may calculate a reference transformation ratio of a first voltage difference to the target output voltage, where the first voltage difference is a voltage difference obtained by subtracting a reference voltage from the total input voltage, and the reference voltage is less than the total input voltage and is greater than or equal to the target output voltage; and set the first transformation ratio to the reference transformation ratio when the reference transformation ratio is less than or equal to the maximum transformation ratio of the first branch circuit: or set the first transformation ratio to the maximum transformation ratio of the first branch circuit when the reference transformation ratio is greater than the maximum transformation ratio of the first branch circuit.

For example, the reference voltage may be less than or equal to a voltage obtained after the total input voltage is divided by 2. Because the value of the reference voltage is less than or equal to $V_i/2$, when the reference voltage is used as the second input voltage, the second input voltage is less than or equal to the first input voltage. Therefore, in most cases, the first branch circuit can transmit large power, which helps further improve efficiency of the conversion circuit.

According to a third aspect, an embodiment of this application further provides a conversion circuit, mainly including a first branch circuit and a second branch circuit. The first branch circuit includes a first connection end, a first output end, a first input end, and a second input end, the second branch circuit includes a second connection end, a second output end, a third input end, and a fourth input end, and the first connection end of the first branch circuit is connected to the second connection end of the second branch circuit. The first branch circuit may convert an input voltage of the conversion circuit received through the first input end and the second input end into a first output voltage, and output the first output voltage through the first output end and the first connection end; and the second branch circuit may convert an input voltage of the conversion circuit received through the third input end and the fourth input end into a second output voltage, and output the second output voltage through the second output end and the second connection end, and a total output voltage of the conversion circuit includes the first output voltage and the second output voltage.

In the conversion circuit, input sides of the first branch circuit and the second branch circuit are connected in parallel, output sides of the first branch circuit and the second branch circuit are connected in series, and technical effect similar to that of the first aspect is obtained. For technical effect of a corresponding solution in the third aspect, refer to technical effect that may be obtained according to a corresponding solution in the first aspect. Repeated parts are not described in detail.

To further improve efficiency of the conversion circuit, in a possible implementation, when efficiency of the first branch circuit is greater than efficiency of the second branch circuit. the first output voltage is greater than the second output voltage: or when efficiency of the first branch circuit is less than efficiency of the second branch circuit, the first output voltage is less than the second output voltage.

The first branch circuit further includes a first adjustable inductor, and the first adjustable inductor is connected to the first input end, and is configured to receive the input voltage. The first adjustable inductor is disposed, so that the first branch circuit can implement a continuous transformation ratio. When the second branch circuit includes a second adjustable inductor, the second adjustable inductor may be electromagnetically coupled to the first adjustable inductor.

In this embodiment of this application, the conversion circuit may further include a first output capacitor and a second output capacitor. One end of the first output capacitor is connected to the first output end, and the other end of the first output capacitor is connected to the first connection end; and one end of the second output capacitor is connected to the second connection end, and the other end of the second output capacitor is connected to the second output end. The first output capacitor may filter the first output voltage, and the second output capacitor may filter the second output voltage.

The conversion circuit may further include an input capacitor, one end of the input capacitor is connected to the first input end, and the other end of the input capacitor is connected to the second input end. The input capacitor may filter the input voltage of the conversion circuit.

According to a fourth aspect, an embodiment of this application provides a switch-mode power supply, mainly including a conversion circuit and a controller. The conversion circuit may be the conversion circuit according to any one of the third aspect. For technical effect of a corresponding solution in the fourth aspect, refer to technical effect that may be obtained according to a corresponding solution in the third aspect. Repeated parts are not described in detail. For example, the conversion circuit includes a first branch circuit and a second branch circuit. The first branch circuit includes a first connection end, a first output end, a first input end, and a second input end, the second branch circuit includes a second connection end, a second output end, a third input end, and a fourth input end, and the first connection end of the first branch circuit is connected to the second connection end of the second branch circuit.

The controller may control the first branch circuit to convert an input voltage of the conversion circuit received through the first input end and the second input end into a first output voltage, and output the first output voltage through the first output end and the first connection end; and control the second branch circuit to convert an input voltage of the conversion circuit received through the third input end and the fourth input end into a second output voltage, and output the second output voltage through the second output end and the second connection end, and a total output voltage of the conversion circuit includes the first output voltage and the second output voltage.

To further improve efficiency of the switch-mode power supply, in a possible implementation, the controller may control, when efficiency of the first branch circuit is greater than efficiency of the second branch circuit, the first output voltage to be greater than the second output voltage: or control, when efficiency of the first branch circuit is less than efficiency of the second branch circuit, the first output voltage to be less than the second output voltage.

For example, the controller may separately adjust, when the total output voltage of the conversion circuit is not equal to a target output voltage, a first transformation ratio of the first branch circuit and a second transformation ratio of the second branch circuit based on the input voltage of the conversion circuit and the target output voltage, so that the total output voltage of the conversion circuit reaches the target output voltage.

Specifically, the controller may determine a value range of the first transformation ratio based on a target transformation ratio and a maximum transformation ratio of the first branch circuit, where the first transformation ratio is less than the target transformation ratio and less than or equal to the maximum transformation ratio of the first branch circuit, and the target transformation ratio is a ratio of the target output voltage to the input voltage: set the first transformation ratio within the value range of the first transformation ratio; and adjust the second transformation ratio based on the target output voltage and the set first transformation ratio, so that the second branch circuit converts the input voltage of the conversion circuit into an adjusted second output voltage, where the adjusted second output voltage is a difference obtained by subtracting an adjusted first output voltage from the target output voltage, and the adjusted first output voltage is a product of the set first transformation ratio and the input voltage.

In a possible implementation, the first branch circuit has a plurality of adjustable transformation ratios, efficiency of the first branch circuit is greater than efficiency of the second branch circuit, and the controller may set the first transformation ratio to an adjustable transformation ratio that is in the plurality of adjustable transformation ratios and that is less than the target transformation ratio and closest to the target transformation ratio.

In another possible implementation, the controller may calculate a reference transformation ratio of a first voltage difference to the input voltage, where the first voltage difference is a voltage difference obtained by subtracting a reference voltage from the target output voltage, and the reference voltage is less than the target output voltage and is greater than or equal to the input voltage; and set, when the reference transformation ratio is less than or equal to the maximum transformation ratio of the first branch circuit, the first transformation ratio to the reference transformation ratio: or set, when the reference transformation ratio is greater than the maximum transformation ratio of the first branch circuit, the first transformation ratio to the maximum transformation ratio of the first branch circuit.

For example, the reference voltage may be less than or equal to a voltage obtained after the target output voltage is divided by 2.

According to a fifth aspect, an embodiment of this application provides an electronic device, mainly including a battery, a load, and the switch-mode power supply according to either the second aspect or the fourth aspect, and the switch-mode power supply is separately connected to the battery and the load. The switch-mode power supply may receive a battery voltage provided by the battery, convert the battery voltage into an operating voltage of the load, and output the operating voltage to the load.

These aspects or other aspects of this application are more concise and easier to understand in descriptions of the following embodiments.

BRIEF DESCRIPTION OF DRAWINGS

FIG. 12a-1 is a schematic diagram of an equivalent circuit of a first branch circuit according to an embodiment of this application:

FIG. 12b-1 is a schematic diagram of an equivalent circuit of a first branch circuit according to an embodiment of this application;

FIG. 14a-1 is a schematic diagram of an equivalent circuit of a first branch circuit according to an embodiment of this application:

FIG. 14b-1 is a schematic diagram of an equivalent circuit of a first branch circuit according to an embodiment of this application:

FIG. 16a-1 is a schematic diagram of an equivalent circuit of a first branch circuit according to an embodiment of this application:

FIG. 16b-1 is a schematic diagram of an equivalent circuit of a first branch circuit according to an embodiment of this application:

FIG. 18-1 and FIG. 18-2 each are a schematic diagram of an equivalent circuit of an isolation unit according to an embodiment of this application;

FIG. 18-3 to FIG. 18-11 each are a schematic diagram of an equivalent circuit of a conversion unit according to an embodiment of this application:

FIG. 19-1 to FIG. 19-5 each are a schematic diagram of an equivalent circuit of a conversion unit according to an embodiment of this application:

FIG. 20-1 to FIG. 20-3 each are a schematic diagram of an equivalent circuit of a conversion unit according to an embodiment of this application;

FIG. 21-1 to FIG. 21-5 each are a schematic diagram of an equivalent circuit of a conversion unit according to an embodiment of this application:

DESCRIPTION OF EMBODIMENTS

Figure 1:
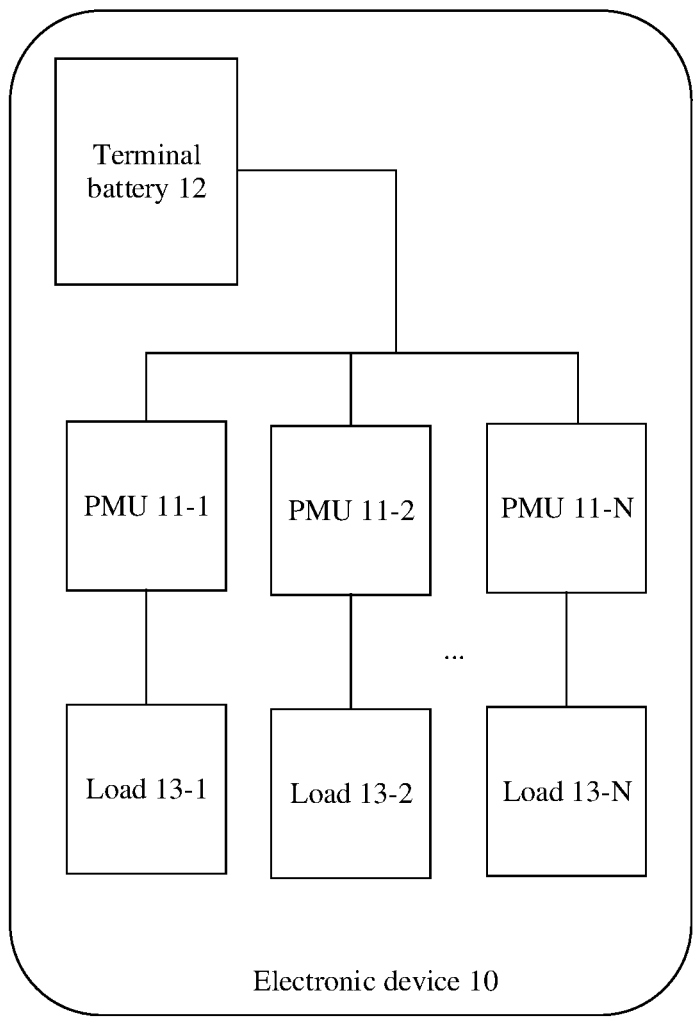
FIG. 1 is a schematic diagram of a structure of an electronic device.

To make objectives, technical solutions, and advantages of this application clearer, the following further describes this application in detail with reference to accompanying drawings. A specific operation method in a method embodiment may also be applied to an apparatus embodiment or a system embodiment. It should be noted that in description of this application, "at least one" means one or more, and "a plurality of" means two or more. In view of this, in embodiments of the present invention, "a plurality of" may also be understood as "at least two". A term "and/or" describes an association relationship between associated objects and indicates that three relationships may exist. For example, A and/or B may indicate the following three cases: Only A exists, both A and B exist, and only B exists. In addition, a character "/" generally indicates an "or" relationship between the associated objects unless otherwise specified. In addition, it should be understood that in the description of this application, terms such as "first" and "second" are merely used for distinguishing and description, but should not be understood as indicating or implying relative importance, or should not be understood as indicating or implying a sequence.

It should be noted that, in embodiments of this application, a "connection" is an electrical connection, and the connection between two electrical elements may be a direct or indirect connection between the two electrical elements. For example, a connection between A and B may represent that A and B are directly connected to each other, or A and B are indirectly connected to each other by using one or more other electrical elements. For example, the connection between A and B may also represent that A is directly connected to C. C is directly connected to B, and A and B are connected to each other through C.

It should be noted that a "transformation ratio" of a conversion circuit in embodiments of this application refers to a ratio of a larger voltage in an input voltage and an output voltage to a smaller voltage in the input voltage and the output voltage of the conversion circuit. If the conversion circuit performs buck conversion, the output voltage of the conversion circuit is less than the input voltage of the conversion circuit, and the transformation ratio of the conversion circuit is the input voltage/output voltage. If the conversion circuit performs boost conversion, the output voltage of the conversion circuit is greater than the input voltage of the conversion circuit, and the transformation ratio of the conversion circuit is the output voltage/input voltage.

As hardware specifications and performance of an electronic device gradually improve, the electronic device faces serious power consumption and integration problems. The power consumption of the electronic device may be understood as electric energy consumed by the electronic device per unit of time. The power consumption includes not only effective electric energy that supplies power to the electronic device, but also invalid electric energy that is lost in the electronic device, and may also be referred to as a loss, such as a heat loss or a transmission loss. The integration of the electronic device may be understood as a quantity of components that may be disposed per unit of space of the electronic device.

FIG. 1 is an example of a schematic diagram of a structure of an electronic device. As shown in FIG. 1, an electronic device 10 mainly includes N PMUs 11 (PMU 11-1 to PMU 11-N), a terminal battery 12, and a load 13 (load 13-1 to load 13-N), where N is an integer greater than or equal to 1. For example, the electronic device 10 may be an electronic device such as a smartphone, a tablet computer, or a smartwatch, and may support cutting-edge technologies such as 5G and a foldable screen.

The terminal battery 12 is separately connected to input ends of the N PMUs 11, and may provide input voltages for the N PMUs 11. When an error factor such as internal resistance of the terminal battery 12 is ignored, the input voltage of each PMU 11 is a battery voltage of the terminal battery 12.

The terminal battery 12 is usually a storage battery, and has at least two operating states: charging and discharging. When the terminal battery 12 is in a charging state, the terminal battery 12 may receive and store externally input electric energy. Usually, the terminal battery 12 does not discharge during the charging state, or discharging power is less than charging power, so that the battery voltage of the terminal battery 12 gradually increases.

When the terminal battery 12 is in a discharging state, the terminal battery 12 may output battery voltages to the N PMUs 11. During this process, the battery voltage of the terminal battery 12 gradually decreases. For example, the electronic device 10 is the smartphone. When the terminal battery 12 is in the discharging state, the battery voltage may change in a range of 4.4 V to 3 V.

As shown in FIG. 1, output ends of the N PMUs 11 are respectively connected to the N loads 13 in a one-to-one correspondence. There may be a plurality of types of loads 13, and types of different loads 13 may be the same or different. For example, the load 13 may be a chip in the electronic device 10 (for example, a baseband chip, a graphics processing unit GPU), a memory chip, and the like), a camera, a display, or the like. It may be understood that, there may also be other types of implementations of the load 13 corresponding to different specific implementations of the electronic device 10. This is not described one by one in this embodiment of this application.

In the electronic device 10, different types of loads 13 may require different operating voltages. For example, the GPU typically requires an operating voltage of 1.05 V, while the memory chip typically requires an operating voltage of 1.2 V or 1.1 V. In view of this, each PMU 11 in the electronic device 10 may convert the battery voltage provided by the terminal battery 12, to obtain an operating voltage that is adapted to the load 13 corresponding to the PMU 11.

For example, in FIG. 1, the load 13-1 is the GPU, and the PMU 11-1 may convert the battery voltage into 1.05 V and output the converted battery voltage to the load 13-1. For another example, in FIG. 1, the load 13-2 is the memory chip, and the PMU 11-2 may convert the battery voltage into 1.2 V or 1.1 V and output the converted battery voltage to the load 13-2.

For ease of description, in embodiments of this application, the PMU 11 and the load 13 are used as an example for description below: It may be understood that the PMU 11 may be any one of the PMU 11-1 to the PMU 11-N, and the load 13 is a load correspondingly connected to the PMU 11, and details are not described subsequently.

As hardware specifications and performance of the electronic device 10 gradually improve, an input voltage of the PMU 11 gradually increases, but an output voltage gradually decreases.

For example, in a current foldable-screen mobile phone, the terminal battery 12 usually uses a dual-battery structure connected in series, so that battery voltage of the terminal battery 12 is twice that of the terminal battery 12 in a conventional single-battery structure, to increase the input voltage of the PMU 11. For another example, with continuous optimization of load performance, operating voltages of most loads 13 tend to gradually decrease, so that the PMU 11 needs to reduce the output voltage accordingly.

Because the input voltage of the PMU 11 gradually increases and the output voltage gradually decreases, a ratio of the input voltage to the output voltage of the PMU 11 gradually increases. The ratio of the input voltage to the output voltage of the PMU 11 may also be referred to as a transformation ratio of the PMU 11, that is, the transformation ratio=the input voltage/the output voltage.

The increase in the transformation ratio of the PMU 11 further causes a loss of the PMU 11 to increase, and efficiency of the PMU 11 to decrease. The efficiency of the PMU 11 may be understood as a ratio of output power of the PMU 11 to input power of the PMU 11. However, most electronic devices 10 include a large quantity of PMUs 11, and loss accumulation of the large quantity of PMUs 11 adversely affects overall power consumption of the electronic device 10. Therefore, reducing the loss of the PMU 11 and improving the efficiency of the PMU 11 help reduce the power consumption of the electronic device 10 as a whole.

In addition, the PMU 11 further occupies large space in the electronic device 10. For example, when the electronic device 10 is the smartphone, the N PMUs 11 occupy approximately 1/4 of an area of a mainboard of the smartphone, and a height of the PMU 11 in a direction perpendicular to the mainboard also limits further reduction of a thickness of the smartphone. Therefore, reducing a volume of the PMU 11 also helps reduce a proportion of the PMU 11 to the area of the mainboard, to improve integration of the electronic device 10.

The PMU 11 is further described below by using an example.

Figure 2:
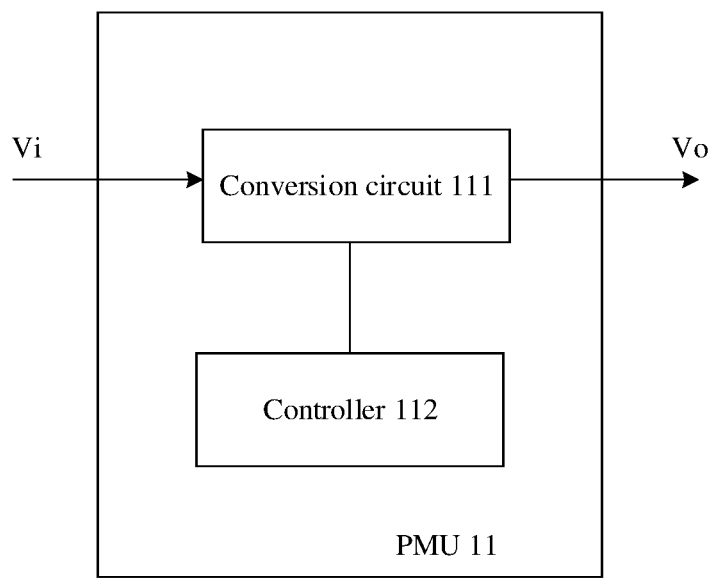
FIG. 2 is a schematic diagram of a structure of a PMU.

As shown in FIG. 2, the PMU 11 mainly includes a conversion circuit 111 and a controller 112. The conversion circuit 111 is separately connected to the terminal battery 12 and the load 13. The conversion circuit 111 may use the battery voltage of the terminal battery 12 as an input voltage, convert the battery voltage into the operating voltage required by the load 13, and output the operating voltage, to supply power to the load 13.

The controller 112 is connected to a control end of the conversion circuit 111, and may control the conversion circuit 111 to perform voltage conversion. Usually, a switching transistor and an energy storage element are usually disposed in the conversion circuit 111. The controller 112 may change an energy storage state of the energy storage element by controlling switch-on and switch-off of the switching transistor, so that the conversion circuit 111 can implement the voltage conversion, to supply power to the load 13.

A common energy storage element is an inductor, a capacitor, or the like. Limited by a current inductor manufacturing process, a size of the inductor is far greater than a size of the capacitor and a size of the switching transistor. Therefore, the size of the inductor is a main factor that determines the volume of the PMU 11.

Usually, the current conversion circuit 111 needs to meet application requirements of a high transformation ratio and fine adjustment of an output voltage. Meeting the application requirement of the high transformation ratio mainly depends on the capacitor, and meeting the application requirement of the fine adjustment of the output voltage mainly depends on the inductor. Therefore, the current conversion circuit 111 may be implemented by using a switched-capacitor circuit and a switched-inductor circuit that are connected in series. The switched-capacitor circuit is a conversion circuit that uses the capacitor as a main energy storage element, and the switched-inductor circuit is a conversion circuit that uses the inductor as a main energy storage element.

Figure 3:
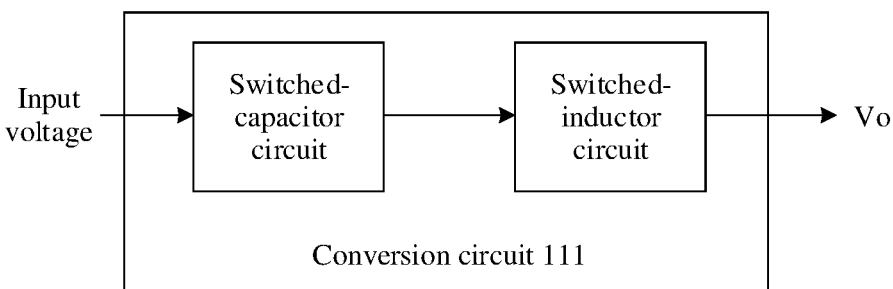
FIG. 3 is a schematic diagram of a structure of a conversion circuit.

As shown in FIG. 3, a switched-capacitor circuit may receive an input voltage, convert the input voltage, and output the converted voltage to a switched-inductor circuit. For example, in FIG. 3, the output voltage of the switched-capacitor circuit is the converted voltage. The switched-inductor circuit may receive the output voltage of the switched-capacitor circuit, and perform finer adjustment on the output voltage, to obtain an output voltage Vo.

The switched-capacitor circuit uses the capacitor as the main energy storage element, and usually has characteristics of a high transformation ratio and high efficiency. The efficiency of the switched-capacitor circuit is high, usually approximately 96% to 99%. The switched-inductor circuit uses the inductor as the main energy storage element, and usually has a characteristic of performing the fine adjustment on the output voltage. However, due to limitations of the inductor manufacturing process and space of the electronic device, inductors in most electronic devices are limited. Consequently, a loss of the inductor is large, and further, efficiency of the switched-inductor circuit is not ideal, usually approximately 85 to 95%.

Although the switched-capacitor circuit and the switched-inductor circuit in FIG. 3 sequentially perform conversion, the application requirements of the high transformation ratio and the fine adjustment of the output voltage Vo can be met. However, because the switched-capacitor circuit and the switched-inductor circuit in the conversion circuit 111 are connected in series, overall efficiency of the conversion circuit is low; and the efficiency of the conversion circuit 111 is approximately a product of the efficiency of the switched-capacitor circuit and the efficiency of the switched-inductor circuit. The efficiency of the conversion circuit 111 may be understood as a ratio of output power of the conversion circuit 111 to input power of the conversion circuit 111.

For example, if the efficiency of the switched-inductor circuit in the conversion circuit 111 is 88%, and the efficiency of the switched-capacitor circuit is 97%, the efficiency of the conversion circuit 111 is approximately 88%× 97%≈85%. Therefore, the structure shown in FIG. 3 is not conducive to improving the efficiency of the PMU 11.

In view of this, an embodiment of this application provides a conversion circuit. The conversion circuit may be applied to a switch-mode power supply, which not only helps meet the application requirements of the high transformation ratio and the fine adjustment of the output voltage Vo, but also helps improve efficiency of the switch-mode power supply and reduce a volume of the switch-mode power supply.

The switch-mode power supply (SMPS) may convert an input voltage, to output an output voltage adapted to a load. For example, the PMU 11 is a specific implementation form of the switch-mode power supply. When the conversion circuit provided in this embodiment of this application is applied to the PMU 11, the application requirements of the high transformation ratio and the fine adjustment of the output voltage Vo are not only met, but also the efficiency of the PMU 11 is improved, and the volume of the PMU 11 is reduced, so that the integration of the electronic device 10 is improved, and the power consumption of the electronic device 10 is optimized.

It should be noted that the conversion circuit provided in this embodiment of this application may not only be used as the conversion circuit 111 in the PMU 11 shown in FIG. 2, but also may be applied to another type of switch-mode power supply. For example, this embodiment of this application may be further applied to a charging chip of the electronic device 10. The charging chip may receive a charging voltage provided by an adapter for the electronic device 10, and convert the charging voltage, to obtain a voltage adapted to the terminal battery 12, so as to charge the terminal battery 12.

For ease of understanding, in this embodiment of this application, the conversion circuit provided in this embodiment of this application is further described below by using the conversion circuit 111 in the PMU 11 as an example.

Figure 4:
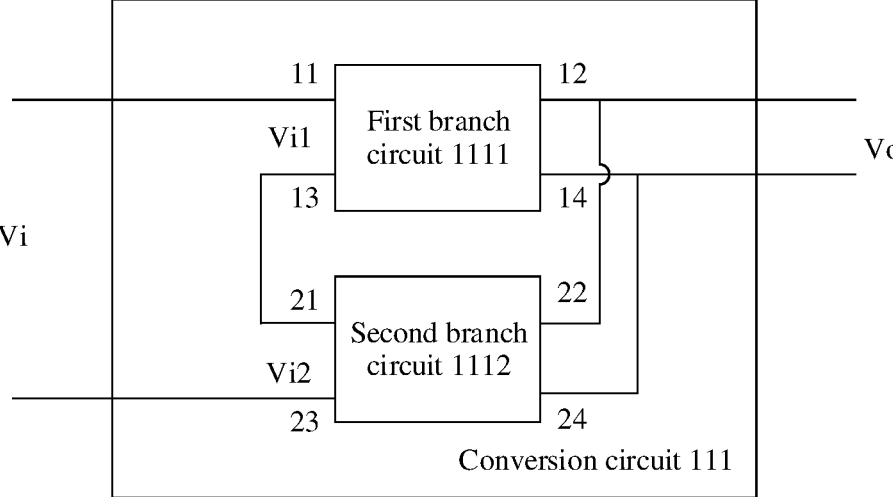
FIG. 4 is a schematic diagram of a structure of a conversion circuit according to an embodiment of this application.

As shown in FIG. 4, the conversion circuit 111 provided in this embodiment of this application mainly includes a first branch circuit 1111 and a second branch circuit 1112. The first branch circuit 1111 includes an input end 11, a connection end 13, an output end 12, and an output end 14. The second branch circuit 1112 includes a connection end 21, an input end 23, an output end 22, and an output end 24.

The input end 11 of the first branch circuit 1111 and the input end 23 of the second branch circuit 1112 are configured to receive a total input voltage Vi of the conversion circuit 111, that is, a voltage between the input end 11 and the input end 23 is the total input voltage Vi. The connection end 13 of the first branch circuit 1111 is connected to the connection end 21 of the second branch circuit 1112, that is, an input side (the input end 11 and the connection end 13) of the first branch circuit 1111 is connected in series to an input side (the connection end 21 and the input end 23) of the second branch circuit 1112.

Because the input side of the first branch circuit 1111 and the input side of the second branch circuit 1112 are connected in series, input currents of the first branch circuit 1111 and the second branch circuit 1112 are the same. In addition, as shown in FIG. 4, a voltage between the input end 11 and the connection end 13 is Vi1, a voltage between the connection end 21 and the input end 23 is Vi2, and a sum of the input voltage Vi1 and the input voltage Vi2 is the total input voltage Vi of the conversion circuit 111.

In this embodiment of this application, both the first branch circuit 1111 and the second branch circuit 1112 may implement a voltage conversion function. The first branch circuit 1111 may convert the input voltage Vi1, and output a converted voltage through the output end 12 and the output end 14. The second branch circuit 1112 may convert the input voltage Vi2, and output a converted voltage through the output end 22 and the output end 24.

As shown in FIG. 4, the output end 12 of the first branch circuit 1111 is connected to the output end 22 of the second branch circuit 1112, and the output end 14 of the first branch circuit 1111 is connected to the output end 24 of the second branch circuit 1112. That is, an output side (the output end 12 and the output end 14) of the first branch circuit 1111 is connected in parallel to an output side (the output end 22 and the output end 24) of the second branch circuit 1112. Therefore, the first branch circuit 1111 and the second branch circuit 1112 have a same output voltage Vo, and the output voltage Vo is an output voltage of the conversion circuit 111.

The conversion circuit 111 provided in this embodiment of this application helps improve efficiency of the PMU 11 and reduce a volume of the PMU 11. For example, it is assumed that an input current of the conversion circuit 111 is Ii, an output current of the conversion circuit 111 is Io, an output current of the first branch circuit 1111 is Io1, and an output current of the second branch circuit 1112 is Io2. Because the output side of the first branch circuit 1111 and the output side of the second branch circuit 1112 are connected in parallel, a sum of the output current Io11 of the first branch circuit 1111 and the output current Io2 of the second branch circuit 1112 is the output current Io of the conversion circuit 111, that is, Io1+Io2=Io.

It is assumed that efficiency of the first branch circuit 1111 is a %, the efficiency a % of the first branch circuit 1111 may be understood as a ratio (mostly expressed in a form of a percentage) of output power of the first branch circuit 1111 to input power of the first branch circuit 1111, and a is any value that is greater than or equal to 0 and that is less than or equal to 100. The efficiency of the first branch circuit 1111 satisfies the following Formula 1:

$$(N1 * Vo) * Ii * a\% = Vo * Io1 \qquad \text{(Formula 1)}$$

N1 is a transformation ratio of the first branch circuit 1111, which is referred to as a first transformation ratio N1 below, and $N1 * Vo = Vi1$.

It is assumed that efficiency of the second branch circuit 1112 is b %, the efficiency b % of the second branch circuit 1112 may be understood as a ratio (mostly expressed in a form of a percentage) of output power of the second branch circuit 1112 to input power of the second branch circuit 1112, and b is any value that is greater than or equal to 0 and that is less than or equal to 100. The efficiency of the second branch circuit 1112 satisfies the following Formula 2:

$$(Vi - N1 * Vo) * Ii * b\% = Vo * Io2 \qquad \text{(Formula 2)}$$

With reference to Formula 1 and Formula 2, it can be learned that efficiency of the conversion circuit 111 satisfies the following Formula 3:

$$\eta = \frac{Vo * Io}{Vi * Ii} = \qquad \text{(Formula 3)}$$
$$\frac{Vo * (Io1 + Io2)}{Vi * Ii} = a\% * \frac{N1 * Vo}{Vi} + b\% * \frac{Vi - N1 * Vo}{Vi}$$

η represents the efficiency of the conversion circuit 111. The following Formula 4 may be further obtained from Formula 3:

$$\eta = (a\% - b\%) * \frac{N1 - vo}{Vi} + b\% \qquad \text{(Formula 4)}$$

and Formula 5:

$$\eta = (b\% - a\%) * \frac{Vi - N1 * Vo}{Vi} + a\% \qquad \text{(Formula 5)}$$

It can be learned from Formula 4 that, when the efficiency a % of the first branch circuit 1111 is greater than the efficiency b % of the second branch circuit 1112, $$(a\% - b\%) * \frac{N1 * Vo}{Vi}$$

is a positive value, and the efficiency n of the conversion circuit 111 is greater than the efficiency b % of the second branch circuit 1112. The efficiency of the conversion circuit

111 shown in FIG. 3 is a %*b %, and the efficiency of the conversion circuit 111 shown in FIG. 3 is less than or equal to b %. It can be learned that, compared with the conversion circuit 111 shown in FIG. 3, the conversion circuit 111 shown in FIG. 4 in this application has higher efficiency.

It can be learned from Formula 5 that, when the efficiency a % of the first branch circuit 1111 is less than the efficiency b % of the second branch circuit 1112, $$(b\% - a\%) * \frac{Vi - N1 * Vo}{Vi}$$

is a positive value, and the efficiency η of the conversion circuit 111 is greater than the efficiency a % of the first branch circuit 1111. The efficiency of the conversion circuit 111 shown in FIG. 3 is a %*b %, and the efficiency of the conversion circuit 111 shown in FIG. 3 is less than or equal to a %. It can be learned that, compared with the conversion circuit 111 shown in FIG. 3, the conversion circuit 111 shown in FIG. 4 in this application has higher efficiency.

In addition, because the first branch circuit 1111 and the second branch circuit 1112 separately perform the voltage conversion in this embodiment of this application, switching frequencies of the first branch circuit 1111 and the second branch circuit 1112 do not need to be consistent. In this case, a branch circuit that has an inductor and that is in the first branch circuit 1111 and the second branch circuit 1112 may use a higher switching frequency. It is assumed that the second branch circuit 1112 has an inductor, and the second branch circuit 1112 may use a higher switching frequency, so that an energy storage requirement of the inductor in the second branch circuit 1112 in a switching cycle is reduced, and the inductor in the second branch circuit 1112 is applicable to a smaller size.

When the conversion circuit 111 provided in this embodiment of this application is applied to the PMU 11, the volume of the PMU 11 is reduced due to the size reduction of the inductor in the conversion circuit 111. Especially when the switching frequency can reach a high frequency of 10 MHz in the future, the inductor in the second branch circuit 1112 is expected to be implemented by using a parasitic inductor in a printed circuit board (PCB), so that the physical inductor element is expected to be omitted from the second branch circuit 1112.

It can be learned from Formula 4 that, when the efficiency a % of the first branch circuit 1111 is greater than the efficiency b % of the second branch circuit 1112, a larger value of N1 indicates higher efficiency of the conversion circuit 111. When the output voltage Vo is fixed, a larger value of N1 indicates a larger input voltage Vi1 (Vi1=N1× Vo) of the first branch circuit 1111. Therefore, when the efficiency a % of the first branch circuit 1111 is greater than the efficiency b % of the second branch circuit 1112, the controller 112 may enable the first branch circuit 1111 to have a larger transformation ratio, so that the first branch circuit 1111 has a larger input voltage Vi1.

In addition, the controller 112 may enable the second branch circuit 1112 to have a smaller transformation ratio, so that the second branch circuit 1112 has a smaller input voltage Vi2. The transformation ratio of the second branch circuit 1112 is referred to as a second transformation ratio N2 below:

Ideally, the second transformation ratio N2 may be 1, and the input voltage Vi2 of the second branch circuit 1112 is equal to the output voltage Vo. That is, the second branch circuit 1112 only performs voltage transmission, and does not perform the voltage conversion. However, a loss of the second branch circuit 1112 is mainly generated in a voltage conversion process. Therefore, when the second transformation ratio N2 is 1, it may be considered that the loss of the second branch circuit 1112 is the smallest.

In addition, an inductor is usually disposed in a branch circuit with low efficiency. Reducing the input voltage Vi2 of the second branch circuit 1112 further helps reduce a requirement on the inductor in the second branch circuit 1112. An inductor with a lower inductance value may be used in the second branch circuit 1112. It can be understood that a lower inductance value of the inductor indicates a smaller volume of the inductor. Therefore, based on the conversion circuit 111 provided in this embodiment of this application, the volume of the PMU 11 is further reduced.

Similarly, it can be learned from Formula 5 that, when the efficiency a % of the first branch circuit 1111 is less than the efficiency b % of the second branch circuit 1112, a smaller value of N1 indicates higher efficiency of the conversion circuit 111. Therefore, the controller 112 may enable the first branch circuit 1111 to have a smaller transformation ratio, so that the first branch circuit 1111 has a smaller input voltage Vi1. In addition, the controller 112 may enable the second branch circuit 1112 to have a larger transformation ratio, so that the second branch circuit 1112 has a larger input voltage Vi2. In this case, the efficiency of the conversion circuit 111 may also be further improved, and the volume of the PMU 11 may be reduced. Specific analysis is not described again.

As described above, when the efficiency a % of the first branch circuit 1111 is greater than the efficiency b % of the second branch circuit 1112, configuring the large transformation ratio for the first branch circuit 1111 helps further improve the efficiency of the conversion circuit 111. However, because an application scenario of the PMU 11 is not very stable, for example, the battery voltage fluctuates, the operating voltage of the load 13 changes, and the like, the transformation ratio of the first branch circuit 1111 usually needs to dynamically change with a change of the application scenario.

In a possible implementation, in this embodiment of this application, the first transformation ratio N1 and the second transformation ratio N2 are adjustable. In this embodiment of this application, the controller 112 may further detect a current total input voltage Vi and a target output voltage Va of the conversion circuit 111. The current total input voltage Vi may be the battery voltage of the terminal battery 12. As described above, in the discharging process of the terminal battery 12, the battery voltage of the terminal battery 12 gradually decreases. The target output voltage Va of the conversion circuit 111 may be an operating voltage currently required by the load 13. Specifically, the load 13 may have a plurality of operating states, and operating voltages required in different operating states are different. For example, the load 13 is a GPU.

When the GPU runs in a multi-thread mode, an operating voltage required by the GPU is large, and when the GPU runs in a single-thread mode, the operating voltage required by the GPU is small.

It should be understood that the output voltage Vo of the conversion circuit 111 may be the same as the target output voltage Va, or may be different from the target output voltage Va.

When the output voltage Vo of the conversion circuit 111 is different from the target output voltage Va, the controller 112 may adjust the transformation ratio of the conversion circuit 111, to adjust the output voltage Vo of the conversion circuit 111 to a required target output voltage Va.

For example, the controller 112 may detect a current output voltage Vo and a current total input voltage Vi. When the current output voltage Vo is different from the target output voltage Va of the conversion circuit 111, the controller 112 may adjust the transformation ratio of the first branch circuit and the transformation ratio of the second branch circuit based on the total input voltage Vi, to adjust the output voltage Vo of the conversion circuit 111 to the target output voltage Va.

Figure 18:
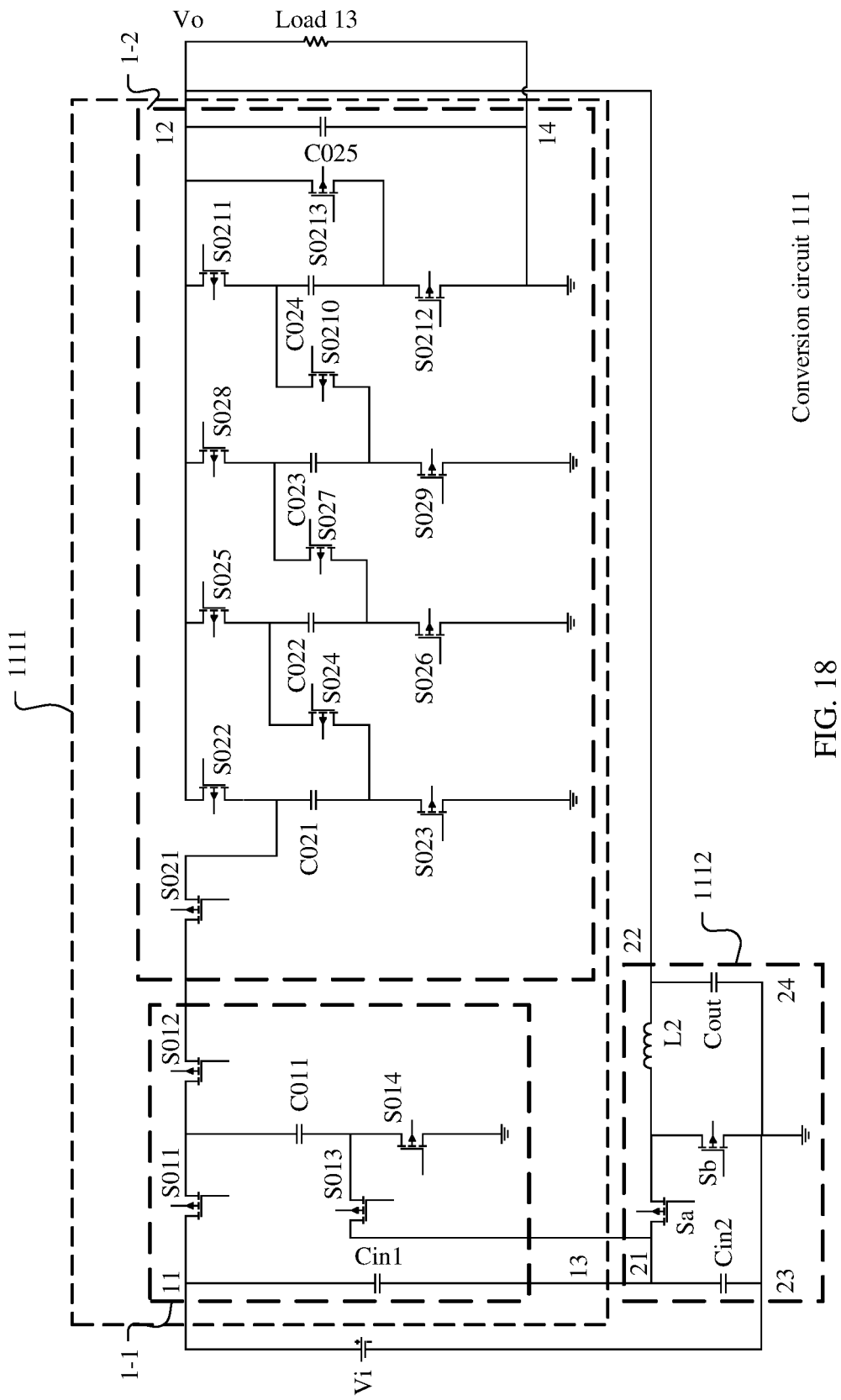
FIG. 18 is a schematic diagram of a structure of a specific conversion circuit according to an embodiment of this application.
Figures 1, 18:
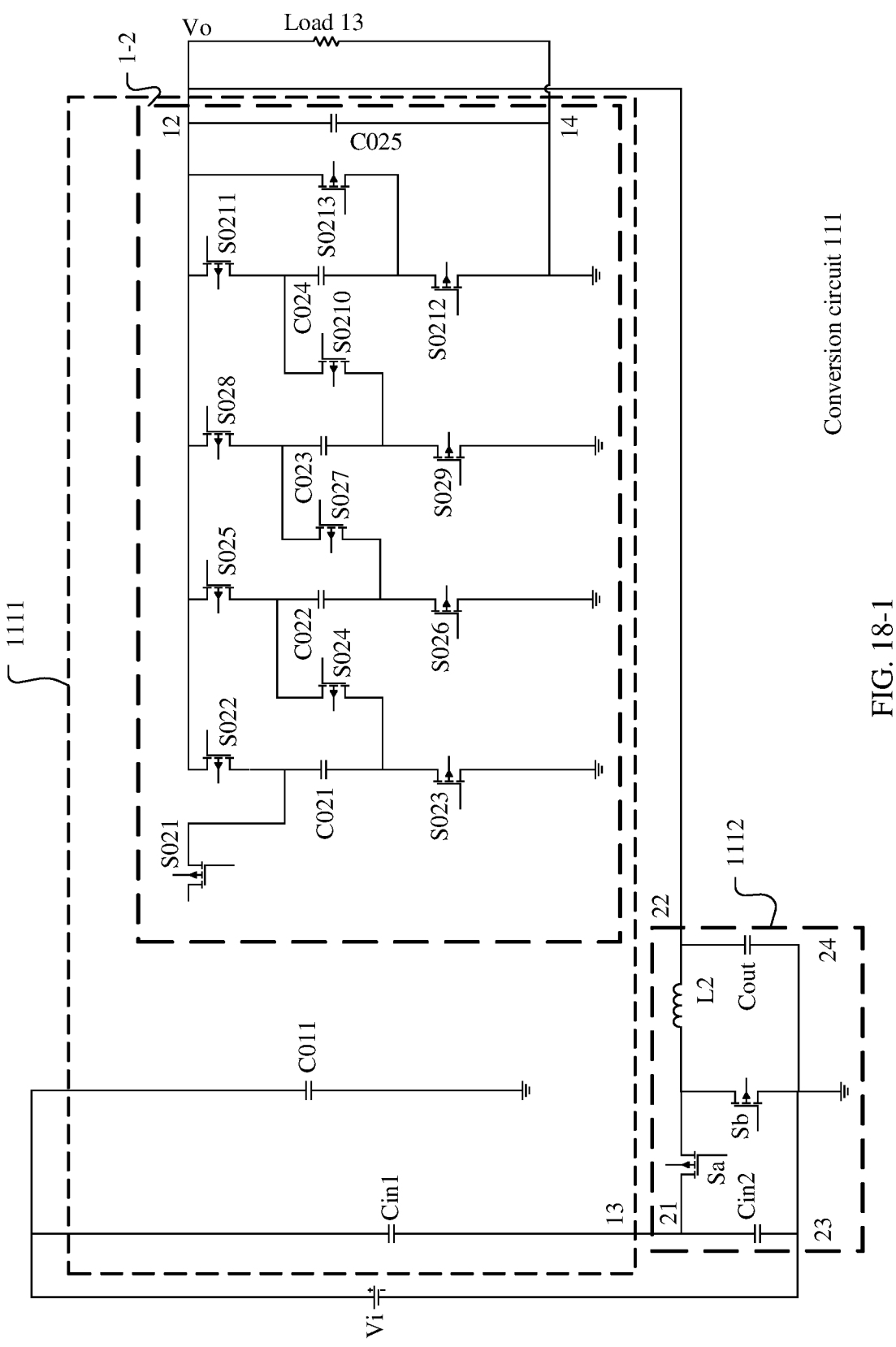
Figures 2, 18:
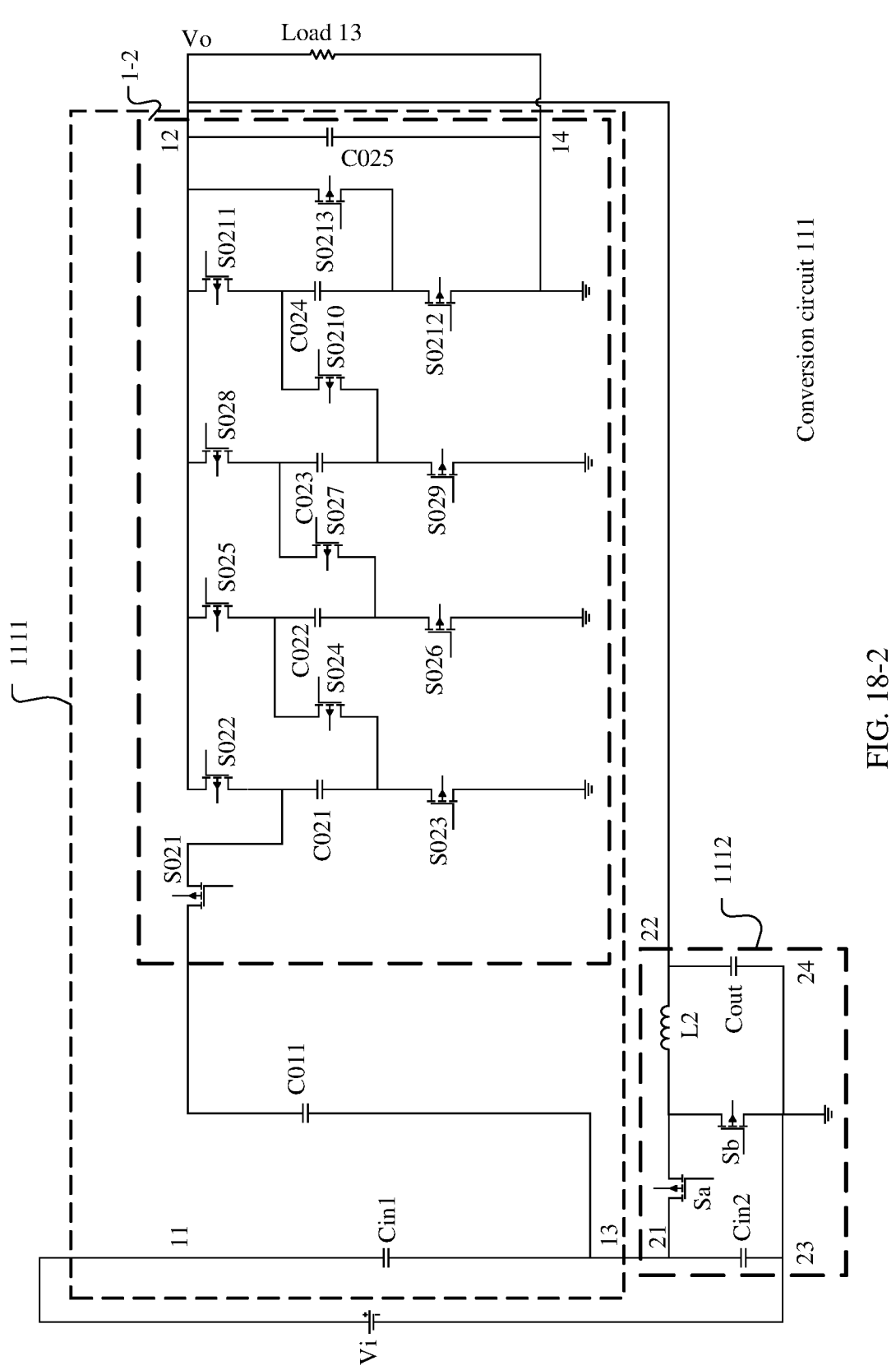
Figures 3, 18:
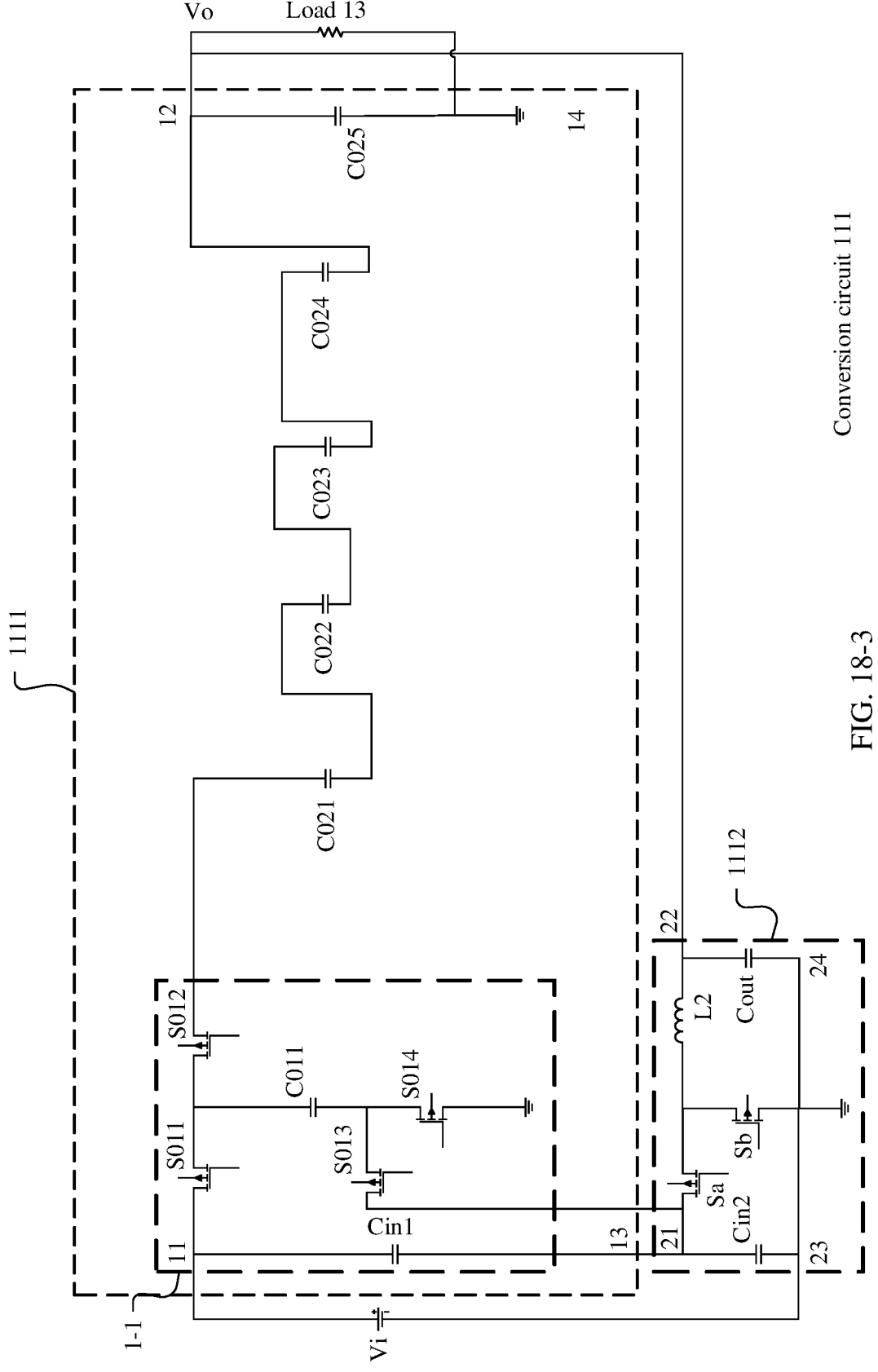
Figures 4, 18:
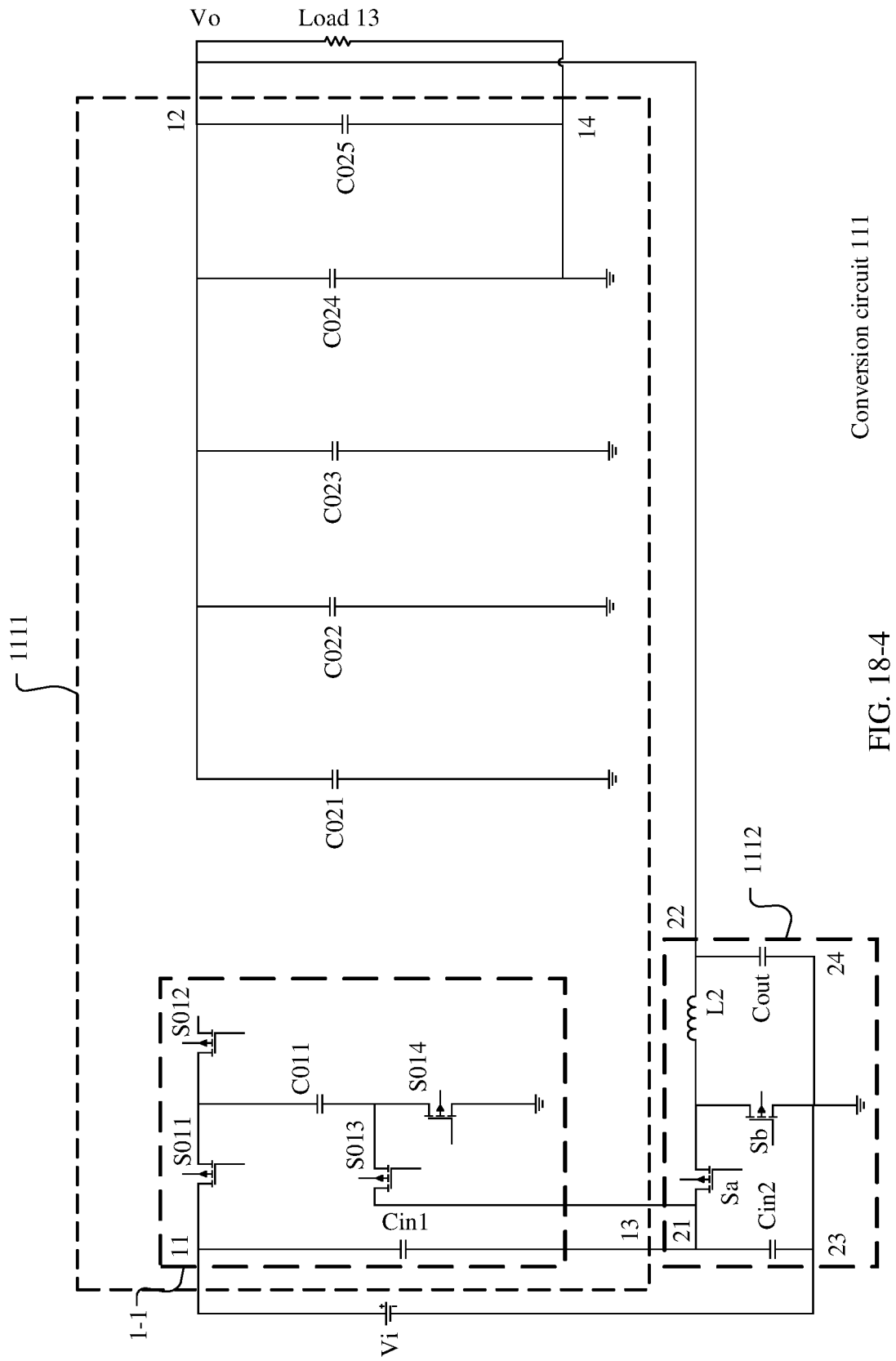
Figures 5, 18:
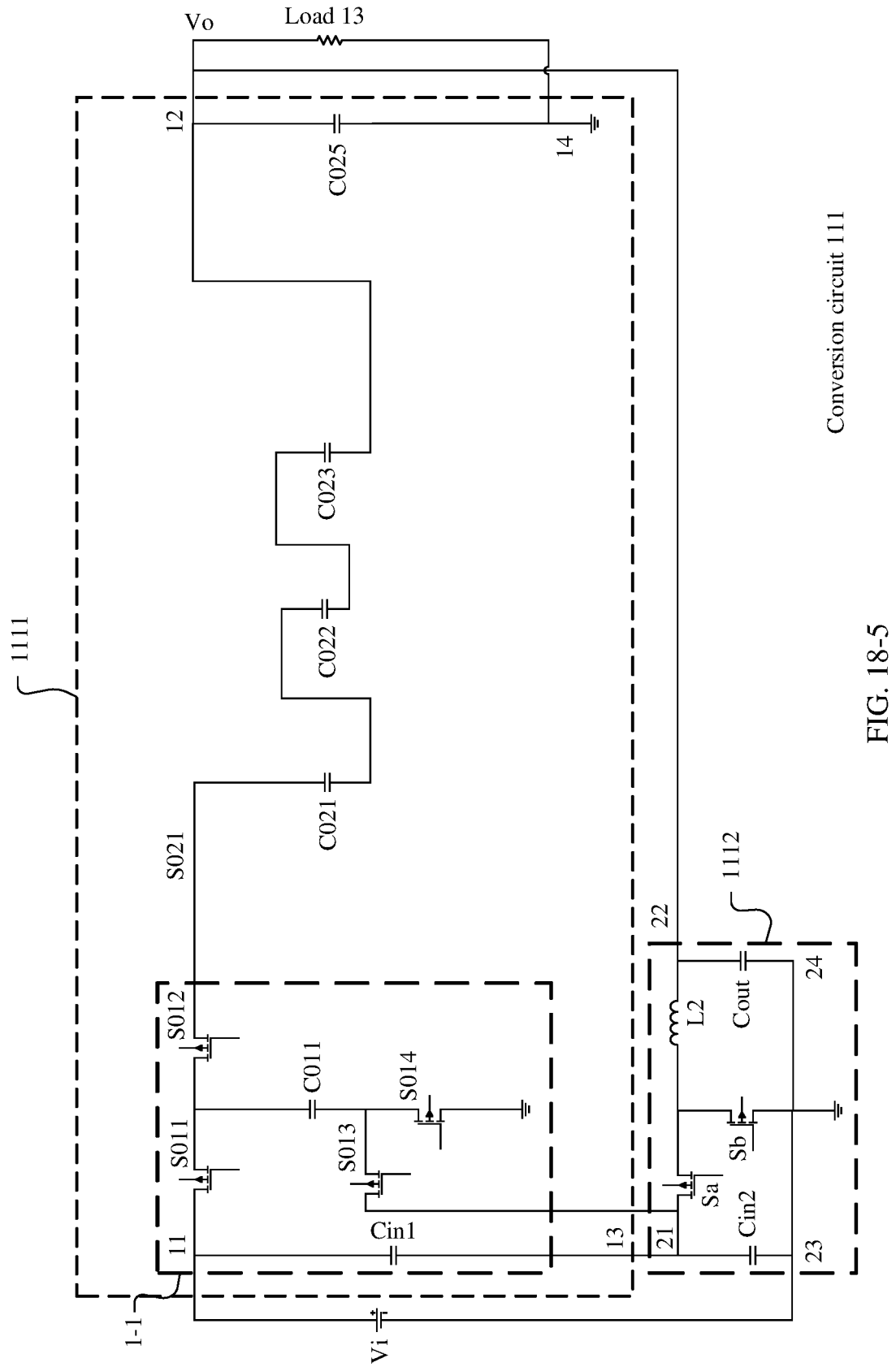
FIG. 5 is a schematic flowchart of a method for adjusting a transformation ratio of a conversion circuit according to an embodiment of this application.
Figures 6, 18:
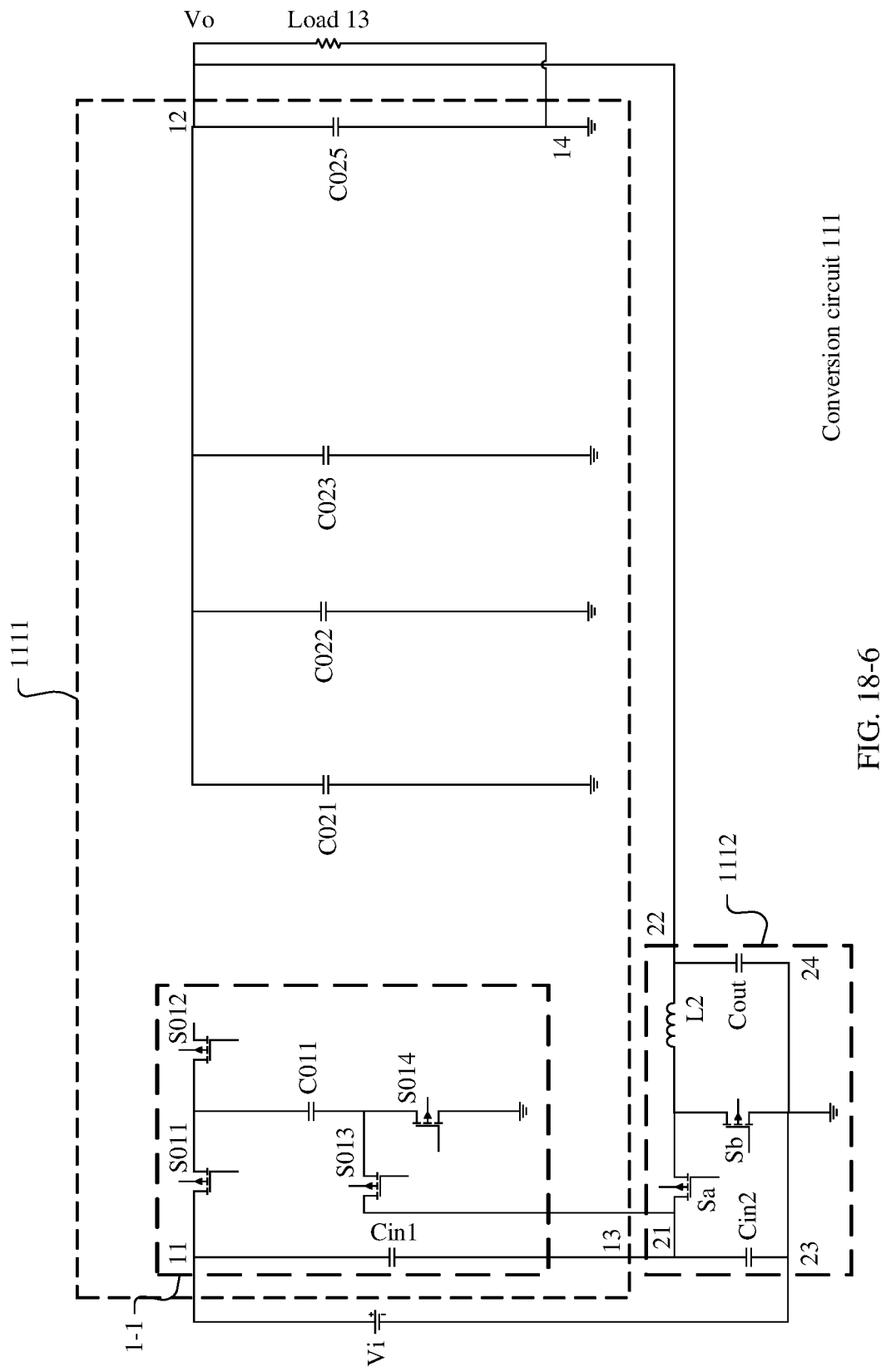

Specifically; the controller 112 may perform a control method shown in FIG. 5 to adjust the transformation ratio of the first branch circuit and the transformation ratio of the second branch circuit, and the method mainly includes the following steps.

S501: The controller 112 determines a value range of the first transformation ratio N1 of the first branch circuit 1111 based on a target transformation ratio Na and a maximum transformation ratio Nmax of the first branch circuit 1111. The first transformation ratio N1 is less than the target transformation ratio Na between the total input voltage Vi and the target output voltage Va, and is less than or equal to the maximum transformation ratio Nmax of the first branch circuit 1111. The target transformation ratio Na=Vi/Va.

S502: The controller 112 sets the first transformation ratio N1 to any value within the value range. Usually, the controller 112 may set the first transformation ratio N1 by controlling a switch-on or switch-off time sequence of a switching transistor in the first branch circuit 1111. A specific implementation process of setting the first transformation ratio N1 by the controller 112 is related to a structure of the first branch circuit 1111. The controller 112 may flexibly select an implementation of setting the transformation ratio of the first branch circuit 1111 based on a specific structure of the first branch circuit 1111.

S503: The controller 112 adjusts the second transformation ratio N2 based on a current total input voltage Vi and the set first transformation ratio N1, so that an output voltage of the second branch circuit 1112 is the target output voltage Va.

Specifically; the controller 112 may determine an adjusted input voltage Vi1 based on the set first transformation ratio N1, that is, the adjusted input voltage Vi1 is a product (Vi1=N1×Va) of the set first transformation ratio N1 and the target output voltage Va.

The controller 112 may further determine, based on the current total input voltage Vi, an adjusted input voltage Vi2 of the second branch circuit 1112, that is, Vi2=Vi−Vi1=Vi−N1×Va. That is, the second transformation ratio N2 should be set to N2=(Vi−N1×Va)/Va. The controller 112 may flexibly select an implementation of setting the transformation ratio of the second branch circuit 1112 based on a specific structure of the second branch circuit 1112.

For ease of understanding, in this embodiment of this application, the following describes the control method shown in FIG. 5 by using an example in which the efficiency a % of the first branch circuit 1111 is greater than the efficiency b % of the second branch circuit 1112. It should be understood that the case in which the efficiency a % of the first branch circuit 1111 is less than the efficiency b % of the second branch circuit 1112 should also be included in this embodiment of this application.

In this embodiment of this application, the first transformation ratio N1 may be continuously adjustable. For example, an adjustable range of the first transformation ratio is [1, 6]. In other words, the first transformation ratio N1 may be any value from 1 to 6. The first transformation ratio N1 may also be discontinuously adjustable, that is, the first branch circuit 1111 has a plurality of discontinuously adjustable transformation ratios. Usually, in this case, values of the plurality of adjustable transformation ratios of the first branch circuit 1111 are all integers. The following describes the details based on different cases.

Case 1: The first branch circuit 1111 has a plurality of adjustable transformation ratios.

As described above, if the efficiency a % of the first branch circuit 1111 is greater than the efficiency b % of the second branch circuit 1112, the input voltage Vi1 of the first branch circuit 1111 should be increased as much as possible. Therefore, when the first branch circuit 1111 has the plurality of discontinuously adjustable transformation ratios, the first transformation ratio N1 may be an adjustable transformation ratio that is in the plurality of adjustable transformation ratios of the first branch circuit 1111 and that is less than the target transformation ratio Na and closest to the target transformation ratio Na.

Figure 6:
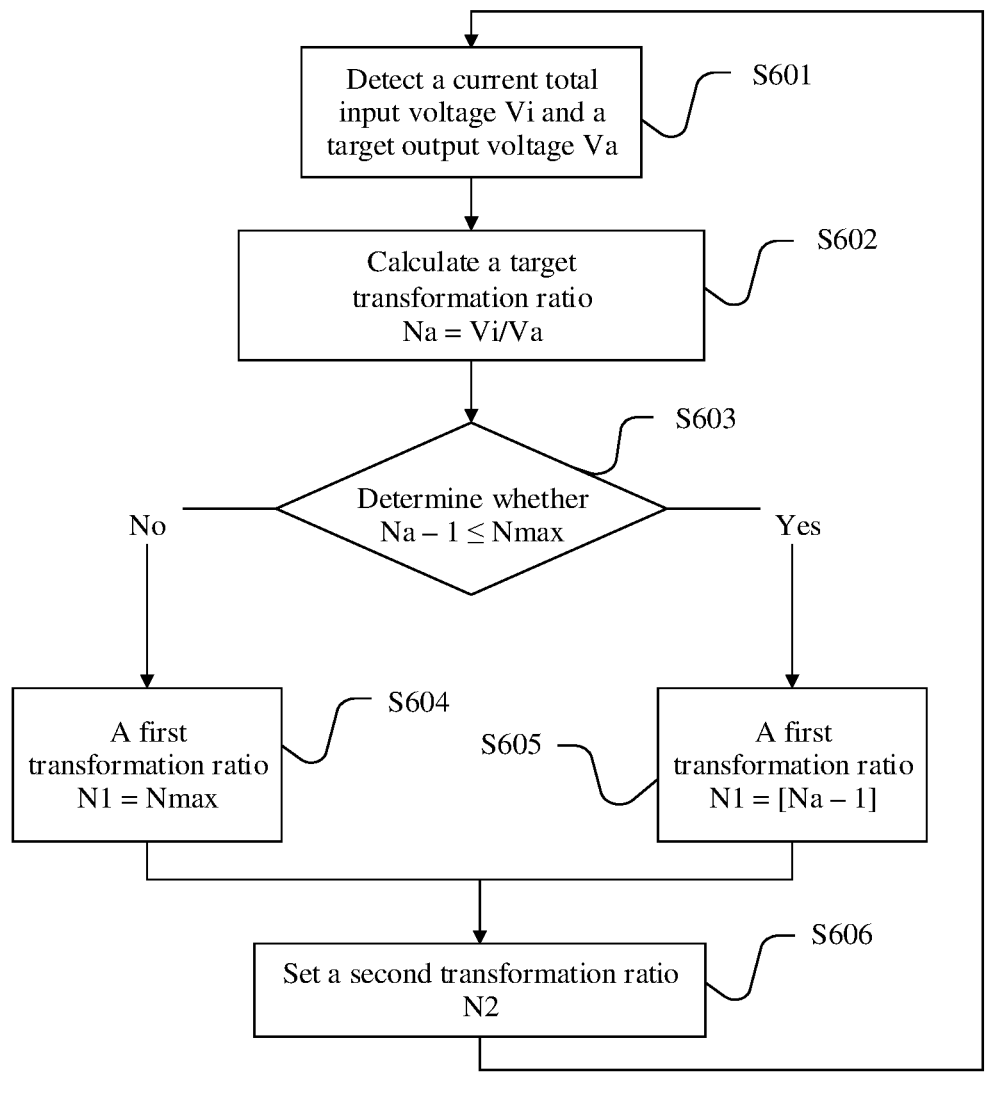
FIG. 6 is a schematic flowchart of a specific method for adjusting a transformation ratio of a conversion circuit according to an embodiment of this application.

For example, values of the plurality of adjustable transformation ratios of the first branch circuit 1111 are consecutive integers (for example, adjustable transformation ratios of 4, 3, 2, and 1). The controller 112 may adjust the first transformation ratio N1 and the second transformation ratio N2 by using a method shown in FIG. 6. As shown in FIG. 6, the method mainly includes the following steps.

S601: The controller 112 detects a current total input voltage Vi and the target output voltage Va.

S602: The controller 112 calculates the target transformation ratio Na. The target transformation ratio Na is a ratio of the total input voltage Vi to the target output voltage Va, that is, Na=Vi/Va.

S603: When the target transformation ratio Na minus 1 is less than the maximum transformation ratio Nmax of the first branch circuit 1111, perform S605 to determine that the first transformation ratio N1 is a value obtained after the target transformation ratio Na minus 1 is rounded.

For example, if the target transformation ratio Na is 2.8, it may be determined that the first transformation ratio N1 is [1.8]=1. When the target transformation ratio Na minus 1 is greater than the maximum transformation ratio Nmax of the first branch circuit 1111, perform S604 to determine that the first transformation ratio N1 is the maximum transformation ratio Nmax.

As described above, ideally, the second transformation ratio N2 may reach 1. In this case, Vi2=Va, and the first transformation ratio is N1=(Vi−Vi2)/Va=Na−1. That is, in an ideal case, the first transformation ratio N1=Na−1. Therefore, when Na−1 is greater than Nmax, the first transformation ratio N1 may be set to Nmax, and when Na−1 is less than or equal to Nmax, the first transformation ratio N1 may be set to a value obtained after Na−1 is rounded. Therefore, the first transformer ratio N1 may be closer to Na−1, which helps increase the input voltage of the first branch circuit 1111 as much as possible, to improve efficiency of the conversion circuit 111 as much as possible.

S606: The controller 112 sets the second transformation ratio N2 based on the total input voltage Vi and the first transformation ratio N1. For specific implementation, refer to S503. Details are not described again.

It may be understood that the controller 112 may repeatedly perform the adjustment method shown in FIG. 6 for a plurality of times. That is, after performing S606, the controller 112 may return to S601 to continue to perform the foregoing process.

Figure 7A:
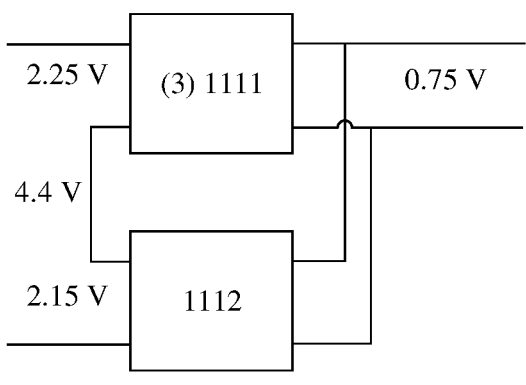
FIG. 7a to FIG. 7c each are a schematic diagram of a change of a transformation ratio according to an embodiment of this application.

For example, it is assumed that the first branch circuit 1111 has three adjustable transformation ratios of 3, 2, and 1. As shown in FIG. 7a, the total input voltage Vi is 4.4 V, and the target output voltage Na is 0.75 V. In this case, the target transformation ratio Na is 5.87, and Na−1=4.87. 4.87 is greater than the maximum adjustable transformation ratio Nmax, and Nmax=3. Therefore, the controller 112 may set the first transformation ratio N1 to 3. Further, the input voltage Vi1 is 2.25 V, and the input voltage Vi2 is 2.15 V.

Figure 7B:
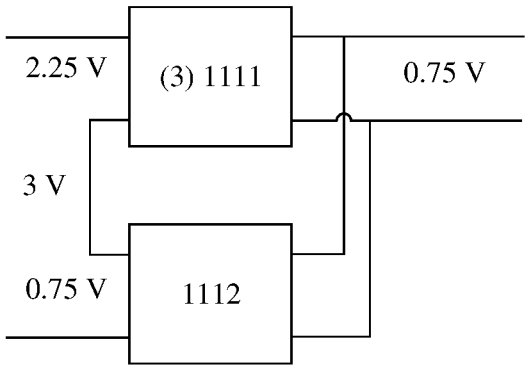

After the terminal battery 12 discharges for a period of time, the battery voltage of the terminal battery 12 decreases, that is, the total input voltage Vi decreases. For example, as shown in FIG. 7b, the total input voltage Vi decreases to 3 V, and the target output voltage Va is still 0.75 V. In this case, the target transformation ratio Na is 4, and Na−1=3. 3 is rounded to 3. Therefore, the controller 112 may maintain the first transformation ratio N1 as 3. Further, the input voltage Vi1 is 2.25 V, and the input voltage Vi2 is 0.75 V.

Figure 7C:
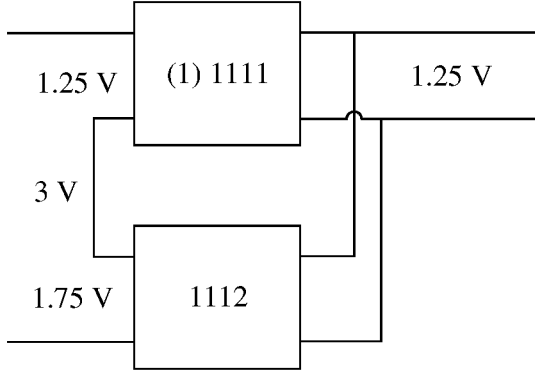

For another example, as shown in FIG. 7c, when the total input voltage Vi is 3 V, an operating voltage required by the load 13 increases to 1.25 V, that is, the target output voltage Va of the conversion circuit 111 increases to 1.25 V. In this case, the target transformation ratio Na is 2.4, and Na−1=1.4. 1.4 is rounded to 1. Therefore, the controller 112 may set the first transformation ratio N1 to 1. Further, the input voltage Vi1 is 1.25 V, and the input voltage Vi2 is 1.75 V.

Case 2: The first transformation ratio N1 is continuously adjustable.

Figure 8:
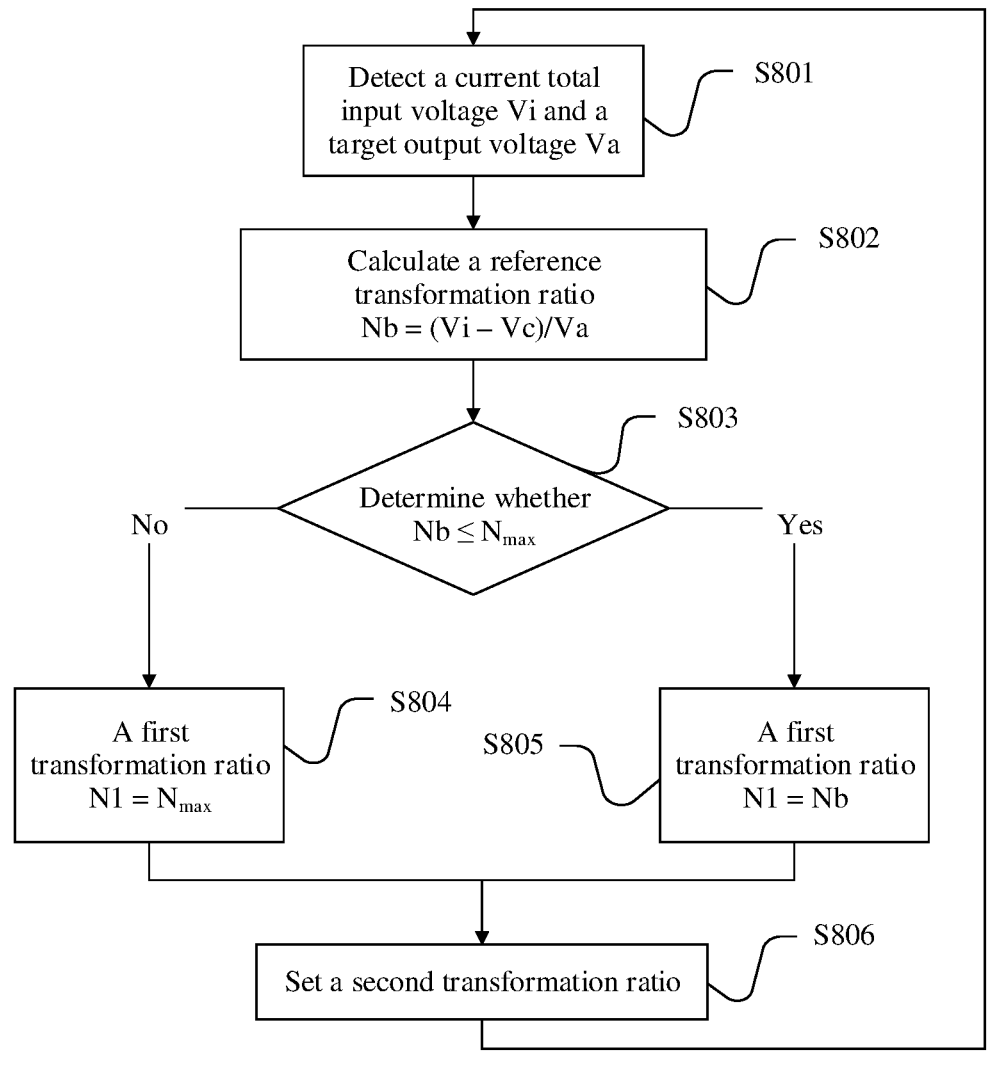
FIG. 8 is a schematic flowchart of a specific method for adjusting a transformation ratio of a conversion circuit according to an embodiment of this application.

For example, as shown in FIG. 8, the method mainly includes the following steps.

S801: The controller 112 detects a current total input voltage Vi and the target output voltage Va.

S802: The controller 112 calculates a reference transformation ratio Nb. The reference transformation ratio Nb is a ratio of a first voltage difference between the total input voltage Vi and a reference voltage Vc to the target output voltage, that is, Nb=(Vi−Vc)/Va. The reference voltage Vc is less than the total input voltage Vi, and is greater than or equal to the target output voltage Va.

In a possible implementation, a value of the reference voltage Vc is less than or equal to Vi/2, and the value of the reference voltage Vc is greater than or equal to the target output voltage Va.

Specifically, the reference voltage Vc may be understood as a preset second input voltage Vi2 of the second branch circuit 1112. Because the value of the reference voltage Vc is less than or equal to Vi/2, when the reference voltage Vc is used as the second input voltage Vi2, the second input voltage Vi2 is less than or equal to the first input voltage Vi1. Therefore, in most cases, the first branch circuit 1111 can transmit large power, which helps further improve efficiency of the conversion circuit 111. In this case, the input voltage Vi1 may be Vi−Vc. If the first branch circuit 1111 can convert the input voltage Vi1=Vi−Vc into the target output voltage Va, the first transformation ratio N1 should be the reference transformation ratio Nb.

S803: When the reference transformation ratio Nb is less than or equal to the maximum transformation ratio Nmax of the first branch circuit 1111, perform S805 to determine that the first transformation ratio N1 of the first branch circuit 1111 is the reference transformation ratio Nb. When the reference transformation ratio Nb is greater than the maximum transformation ratio Nmax of the first branch circuit 1111, determine that the first transformation ratio N1 of the first branch circuit 1111 is the maximum transformation ratio Nmax of the first branch circuit 1111. S806: The controller 112 sets the second transformation ratio N2 based on the first transformation ratio N1 and the current total input voltage Vi. For specific implementation, refer to S503. Details are not described again in relation to S806.

It may be understood that the controller 112 may repeatedly perform the adjustment method shown in FIG. 8 for a plurality of times. That is, after performing S806, the controller 112 may return to S801 to continue to perform the foregoing process.

It can be learned from Case 1 and Case 2 that, based on the conversion circuit 111 provided in this embodiment of this application, the controller 112 may flexibly adjust the transformation ratio of the first branch circuit 1111 and the transformation ratio of the second branch circuit 1112 based on the total input voltage Vi and the target output voltage Va of the conversion circuit 111. In this way, in application scenarios of different total input voltages Vi and target output voltages Va, the first branch circuit 1111 can receive a large input voltage Vi1 as much as possible while adapting to the application scenarios. With reference to Formula 4, it can be learned that, when the efficiency a % of the first branch circuit 1111, the efficiency b % of the second branch circuit 1112, and the output voltage Vo are fixed, and when the input voltage Vi1=N1×Vo of the first branch circuit 1111 increases, the efficiency of the conversion circuit 111 also increases accordingly. Therefore, the methods for setting the first transformation ratio N1 and the second transformation ratio N2 shown in FIG. 6 and FIG. 8 in this embodiment of this application help further improve the efficiency of the conversion circuit 111.

As disclosed in this embodiment of this application, the first branch circuit 1111 has a plurality of possible implementations. Next, in this embodiment of this application, the first branch circuit 1111 provided in this embodiment of this application is further described by using the following examples.

Example 1 of the First Branch Circuit 1111

Figure 9:
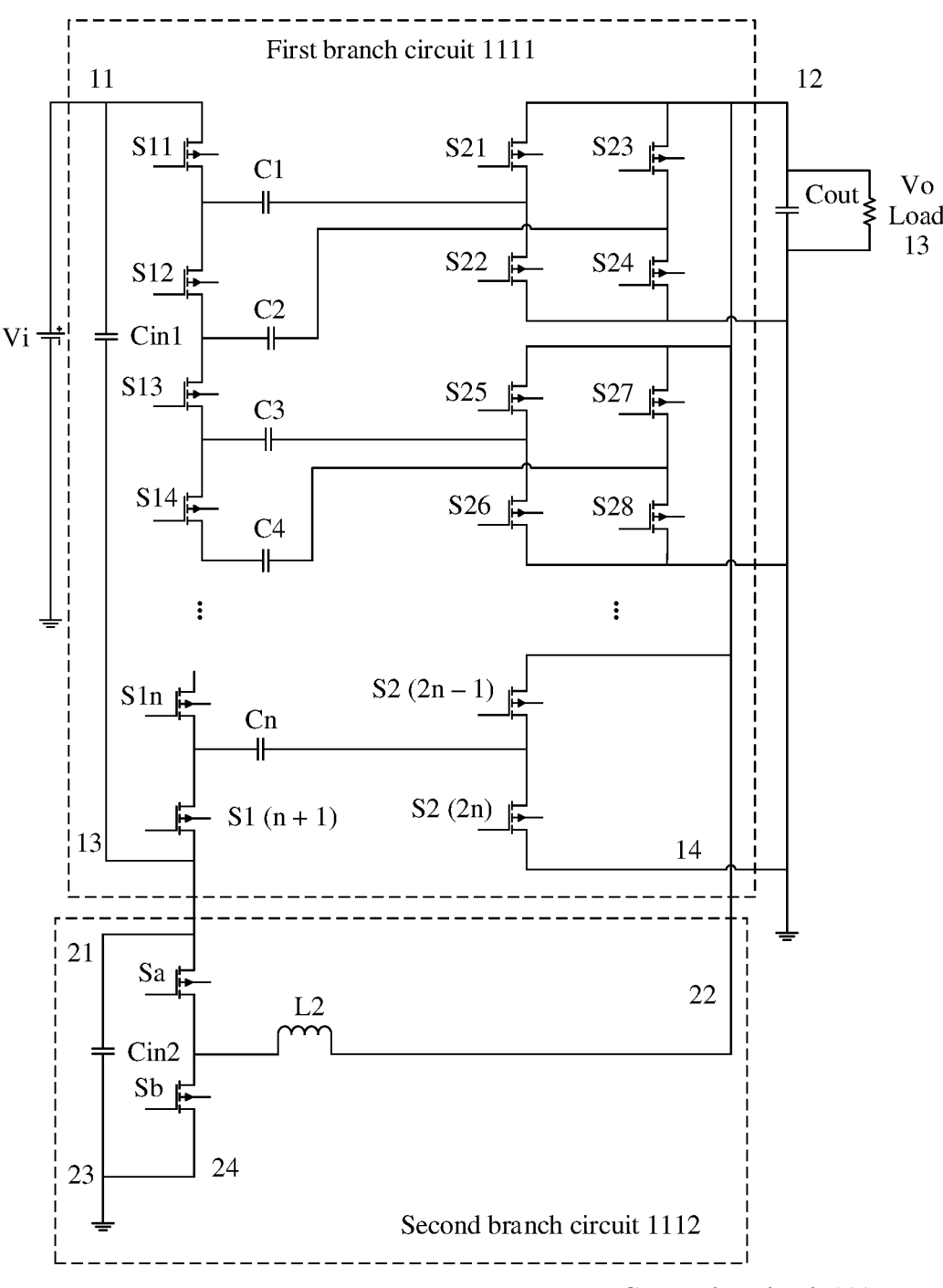
FIG. 9 is a schematic diagram of a structure of a first branch circuit according to an embodiment of this application.

An embodiment of this application provides a conversion circuit 111, as shown in FIG. 9. The first branch circuit 1111 mainly includes n+1 input switching transistors (an input switching transistor S11 to an input switching transistor S1 (n+1)), n isolation capacitors (an isolation capacitor C1 to an isolation capacitor Cn), and n output combinations, where n is an integer greater than or equal to 1.

The input switching transistor S11 to the input switching transistor S1 (n+1) are sequentially connected in series between the input end 11 and the connection end 13. That is, a second electrode of an $i^{th}$ input switching transistor is connected to a first electrode of an $(i+1)^{th}$ input switching transistor, a first electrode of the $i^{th}$ input switching transistor is connected to a second electrode of an $(i-1)^{th}$ input switching transistor, and a value of i is sequentially obtained from 2 to n. Specifically, a first electrode of the input switching transistor S11 is connected to the input end 11, a second electrode of the input switching transistor S11 is connected to a first electrode of the input switching transistor S12, a second electrode of the input switching transistor S12 is connected to a first electrode of the input switching transistor S13 . . . , a second electrode of the input switching transistor S1n is connected to a first electrode of the input switching transistor S1 (n+1), and a second electrode of the input switching transistor S1 (n+1) may be used as the connection end 13 to connect to the connection end 21 of the second branch circuit 1112.

Every two adjacent input switching transistors are connected through a first series connection node. It should be noted that the first series connection node is merely for simplified description. In specific implementation, the first series connection node may be a connection point between two connected input switching transistors, and may also be understood as any position on an electrical connection line between the second electrode of the $i^{th}$ input switching transistor and the first electrode of the $(i+1)^{th}$ input switching transistor. As shown in FIG. 9, a series structure formed by the n+1 input switching transistors includes n first series connection nodes.

The first branch circuit 1111 includes n output combinations, each output combination includes two output switching transistors, and different output combinations include different output switching transistors. For example, in FIG. 9, an output switching transistor S21 and an output switching transistor S22 belong to a same output combination, an output switching transistor S23 and an output switching transistor S24 belong to a same output combination, an output switching transistor S25 and an output switching transistor S26 belong to a same output combination, an output switching transistor S27 and an output switching transistor S28 belong to a same output combination, . . . , and an output switching transistor S2 (2n-1) and an output switching transistor S2 (2n) belong to a same output combination.

The n output combinations in the first branch circuit 1111 are connected in parallel between the output end 12 and the output end 14, and two output switching transistors in each output combination are connected through a second series connection node. As shown in FIG. 9, the output switching transistor S21 and the output switching transistor S22 are connected through a second series connection node, the output switching transistor S23 and the output switching transistor S24 are connected through a second series connection node . . . the output switching transistor S2 (2n−1) and the output switching transistor S2 (2n) are connected through a second series connection node, and the n output combinations in the first branch circuit 1111 include n second series connection nodes in total.

It should be noted that the second series connection node is merely for simplified description. In specific implementation, the second series connection node may be a connection point between two connected output switching transistors, and may also be understood as any position on an electrical connection line between a first electrode of one output switching transistor and a second electrode of the other output switching transistor.

As shown in FIG. 9, the n first series connection nodes, the n isolation capacitors, and the n second series connection nodes in the first branch circuit 1111 are respectively connected in a one-to-one correspondence, one end of each isolation capacitor is connected to a first series connection node corresponding to each isolation capacitor, and the other end of each isolation capacitor is connected to a second series connection node corresponding to each isolation capacitor.

For example, in FIG. 9, one end of the isolation capacitor C1 is connected to the first series connection node between the input switching transistor S11 and the input switching transistor S12, and the other end of the isolation capacitor C1 is connected to the second series connection node between the output switching transistor S21 and the output switching transistor S22, one end of the isolation capacitor C2 is connected to the first series connection node between the input switching transistor S12 and the input switching transistor S13, and the other end of the isolation capacitor C2 is connected to the second series connection node between the output switching transistor S23 and the output switching transistor S24, one end of the isolation capacitor C3 is connected to the first series connection node between the input switching transistor S13 and the input switching transistor S14, and the other end of the isolation capacitor C3 is connected to the second series connection node between the output switching transistor S25 and the output switching transistor S26, one end of the isolation capacitor C4 is connected to the first series connection node between the input switching transistor S14 and the input switching transistor S15, and the other end of the isolation capacitor C4 is connected to the second series connection node between the output switching transistor S27 and the output switching transistor S28, . . . , and one end of the isolation capacitor Cn is connected to the first series connection node between the input switching transistor S1n and the input switching transistor S1 (n+1), and the other end of the isolation capacitor Cn is connected to the second series connection node between the output switching transistor S2 (2n−1) and the output switching transistor S2 (2n).

In a possible implementation, as shown in FIG. 9, the conversion circuit 111 may further include an input capacitor Cin1 and an input capacitor Cin2. One end of the input capacitor Cin1 is connected to the input end 11, and the other end of the input capacitor Cin1 is connected to the connection end 13. The input capacitor Cin1 may filter a first input capacitor Vin1.

In a possible implementation, as shown in FIG. 9, the conversion circuit 111 may further include an output capacitor Cout. One end of the output capacitor Cout is connected to the output end 12 of the first branch circuit 1111, and the other end of the output capacitor Cout is connected to the output end 14 of the first branch circuit 1111. The output capacitor Cout may filter the output voltage Vo, to reduce a loss caused by fluctuation of the output voltage Vo to the load 13.

In the first branch circuit 1111 provided in Example 1, a maximum transformation ratio that can be implemented by the first branch circuit 1111 is n. Next, it is assumed that in the first branch circuit 1111, n=3, and a principle of the first branch circuit 1111 provided in Example 1 is described. In this case, the structure of the first branch circuit 1111 may be shown in FIG. 10a, and the specific circuit structure is not described again.

Figure 10A:
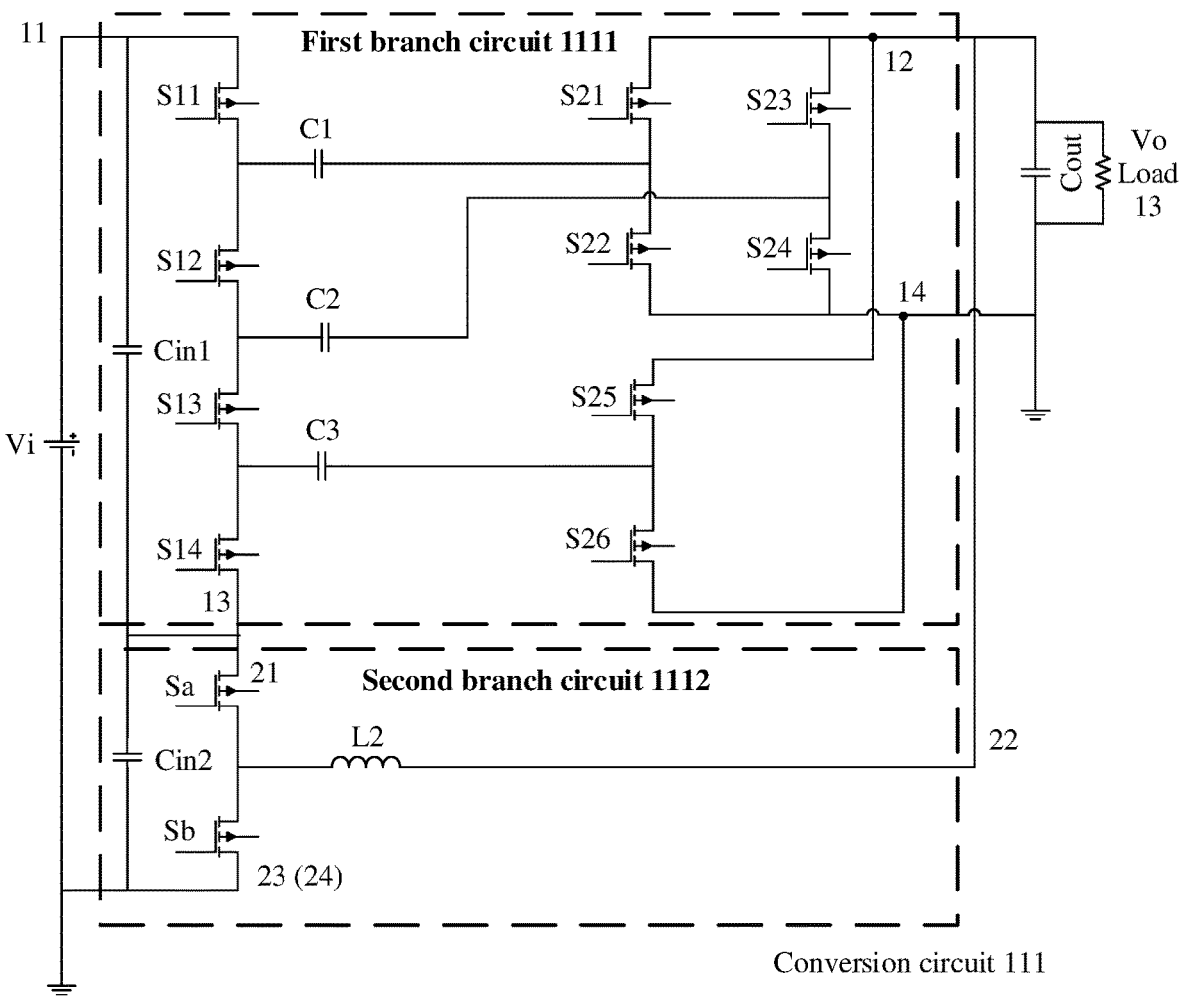
FIG. 10a is a schematic diagram of a structure of a specific conversion circuit according to an embodiment of this application.

The first branch circuit 1111 shown in FIG. 10a has three adjustable transformation ratios of 3, 2, and 1. It should be noted that the adjustable transformation ratio is a transformation ratio that can be theoretically achieved by the first branch circuit 1111. Limited by a parasitic resistor, a parasitic inductor, and another reason, an actual transformation ratio of the first branch circuit 1111 may slightly deviate from the adjustable transformation ratio. However, implementation of the technical solutions of this application is not affected.

First implementation: The first transformation ratio N1 is 3.

Figure 11:
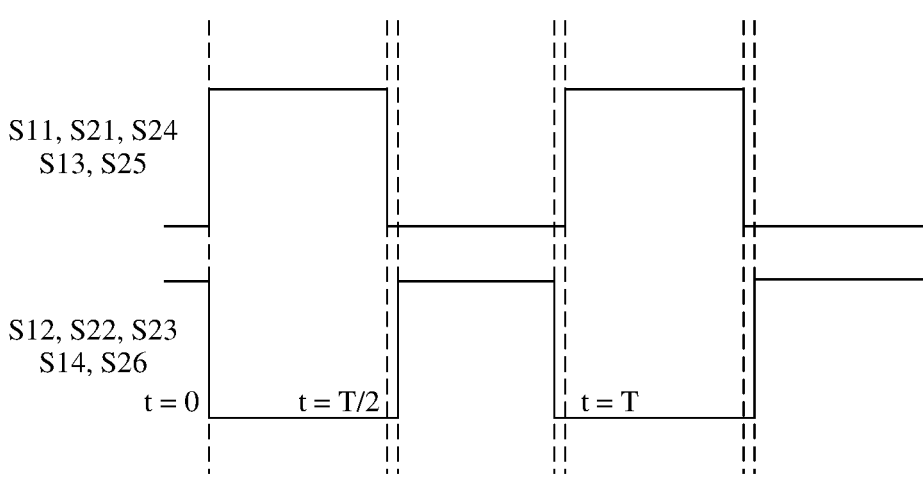
FIG. 11 is a schematic diagram of a drive signal according to an embodiment of this application.

It is assumed that all the switching transistors in the first branch circuit 1111 are switched on at a high voltage and are switched off at a low voltage. When the controller 112 provides drive signals shown in FIG. 11 for the switching transistors in the first branch circuit 1111, the first transformation ratio N1 is 3. As shown in FIG. 11, a period of the drive signal is T. The input switching transistor S11, the input switching transistor S13, the output switching transistor S21, the output switching transistor S24, and the output switching transistor S25 correspond to a same drive signal. The input switching transistor S12, the input switching transistor S14, the output switching transistor S22, the output switching transistor S23, and the output switching transistor S26 correspond to a same drive signal.

Figure 12A:
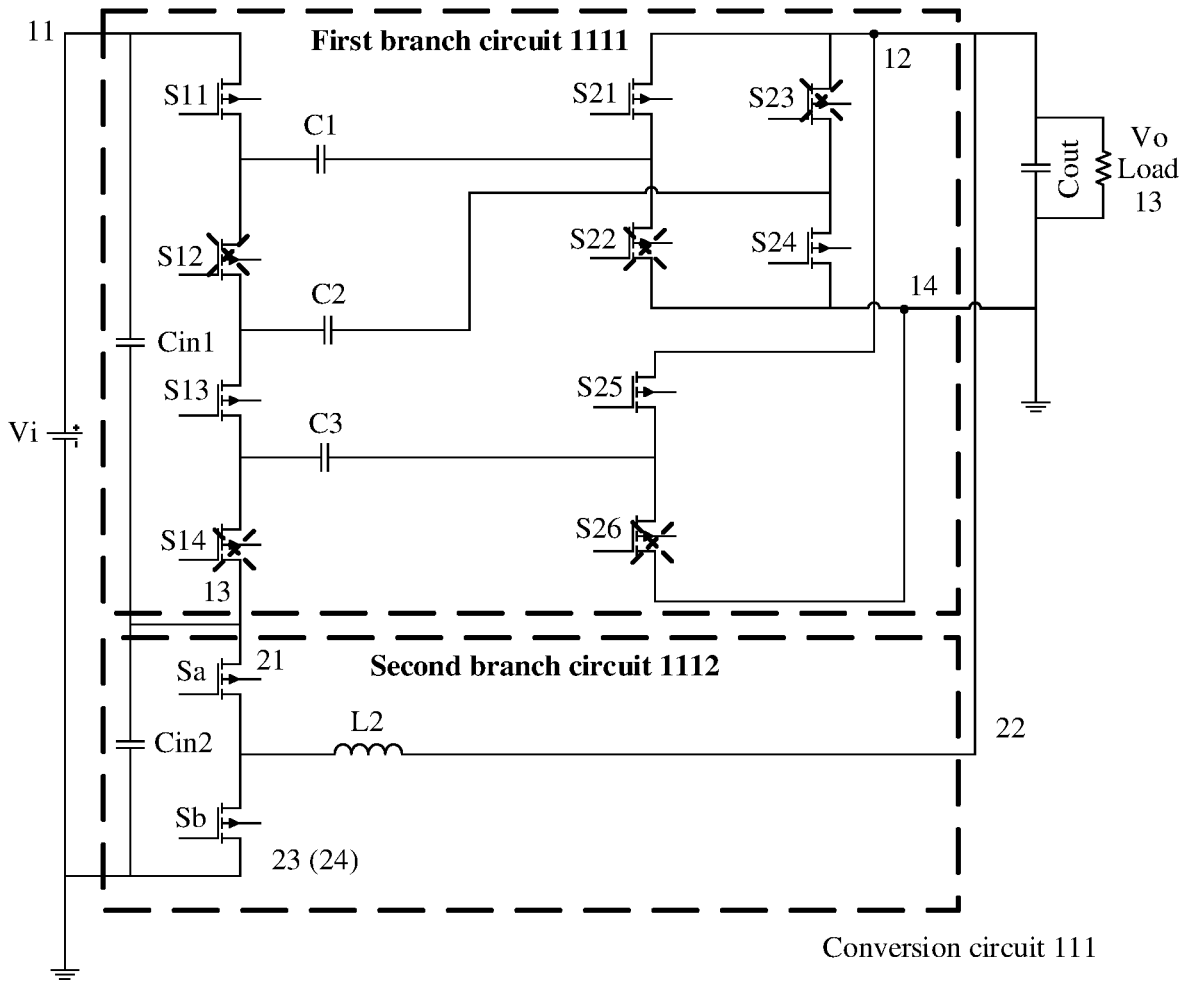
FIG. 12a is a schematic diagram of an on/off state of a first branch circuit according to an embodiment of this application.
Figures 1, 12A:
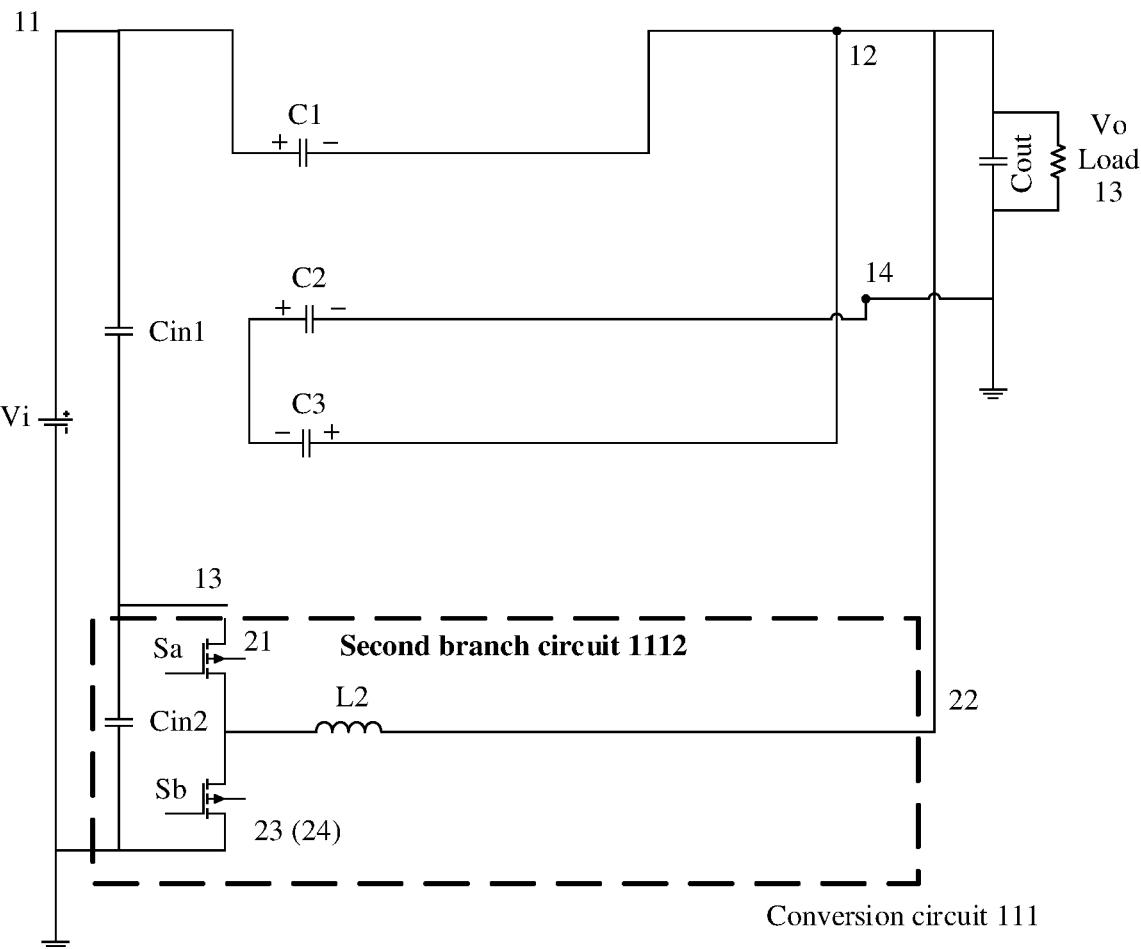

In a time period from 0 to T/2, states of the switching transistors may be shown in FIG. 12a. The input switching transistor S11, the input switching transistor S13, the output switching transistor S21, the output switching transistor S24, and the output switching transistor S25 are switched on. The input switching transistor S12, the input switching transistor S14, the output switching transistor S22, the output switching transistor S23, and the output switching transistor S26 are switched off.

In this case, the input switching transistor S11, the isolation capacitor C1, the output switching transistor S21, the output switching transistor S25, the isolation capacitor C3, the input switching transistor S13, the isolation capacitor C2, and the output switching transistor S24 form a path. An equivalent circuit may be shown in FIG. 12a-1, and circuit elements in FIG. 12a satisfy the following relationships:

$$Vi = V_{C1} + Vo \qquad \text{(Formula 6)}$$

$$Vo = V_{C2} + V_{C3} \qquad \text{(Formula 7)}$$

$V_{C1}$ represents a voltage of the isolation capacitor C1, $V_{C2}$ represents a voltage of the isolation capacitor C2, and $V_{C3}$ represents a voltage of the isolation capacitor C3.

Figure 12B:
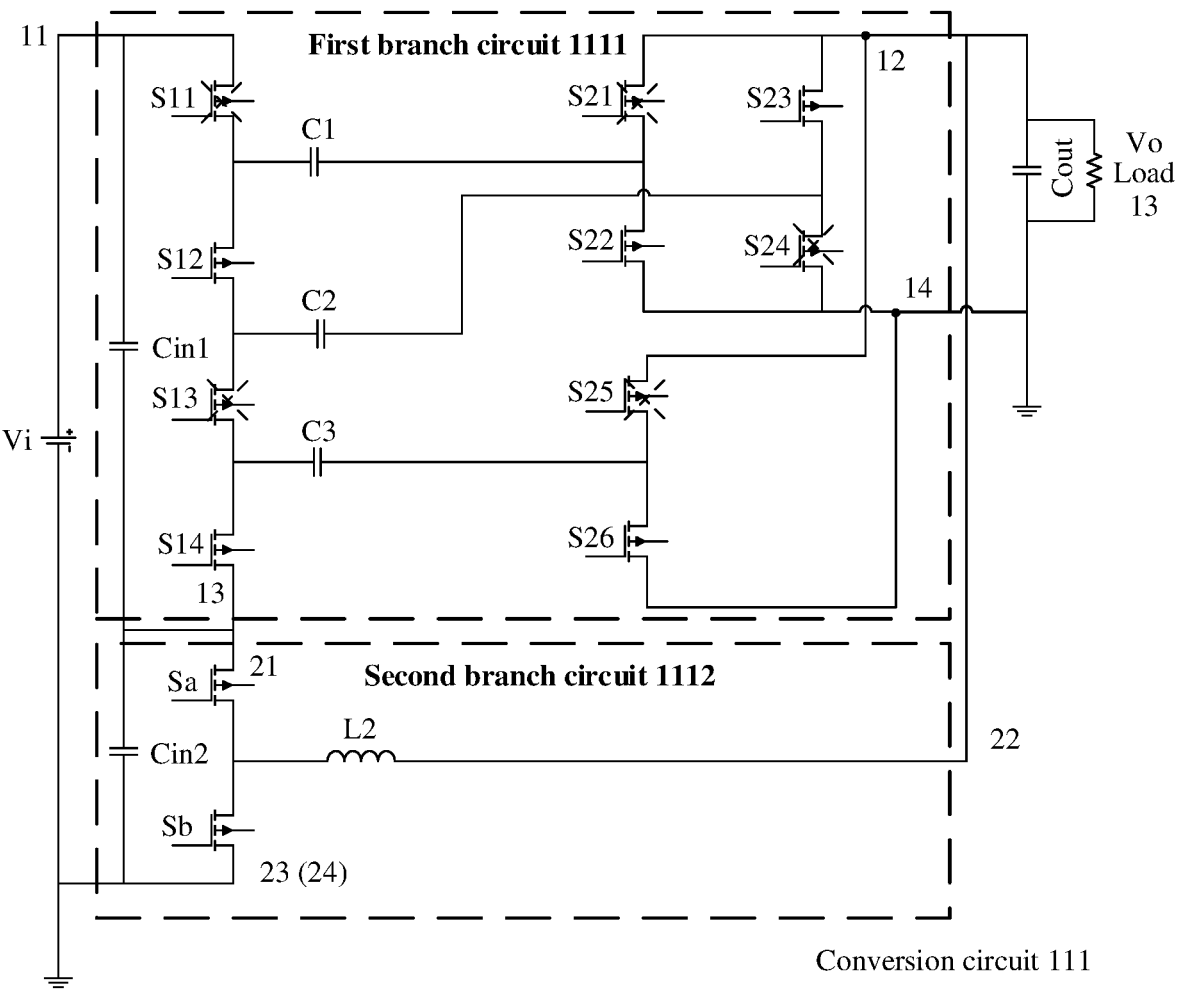
FIG. 12b is a schematic diagram of an on/off state of a first branch circuit according to an embodiment of this application.
Figures 1, 12B:
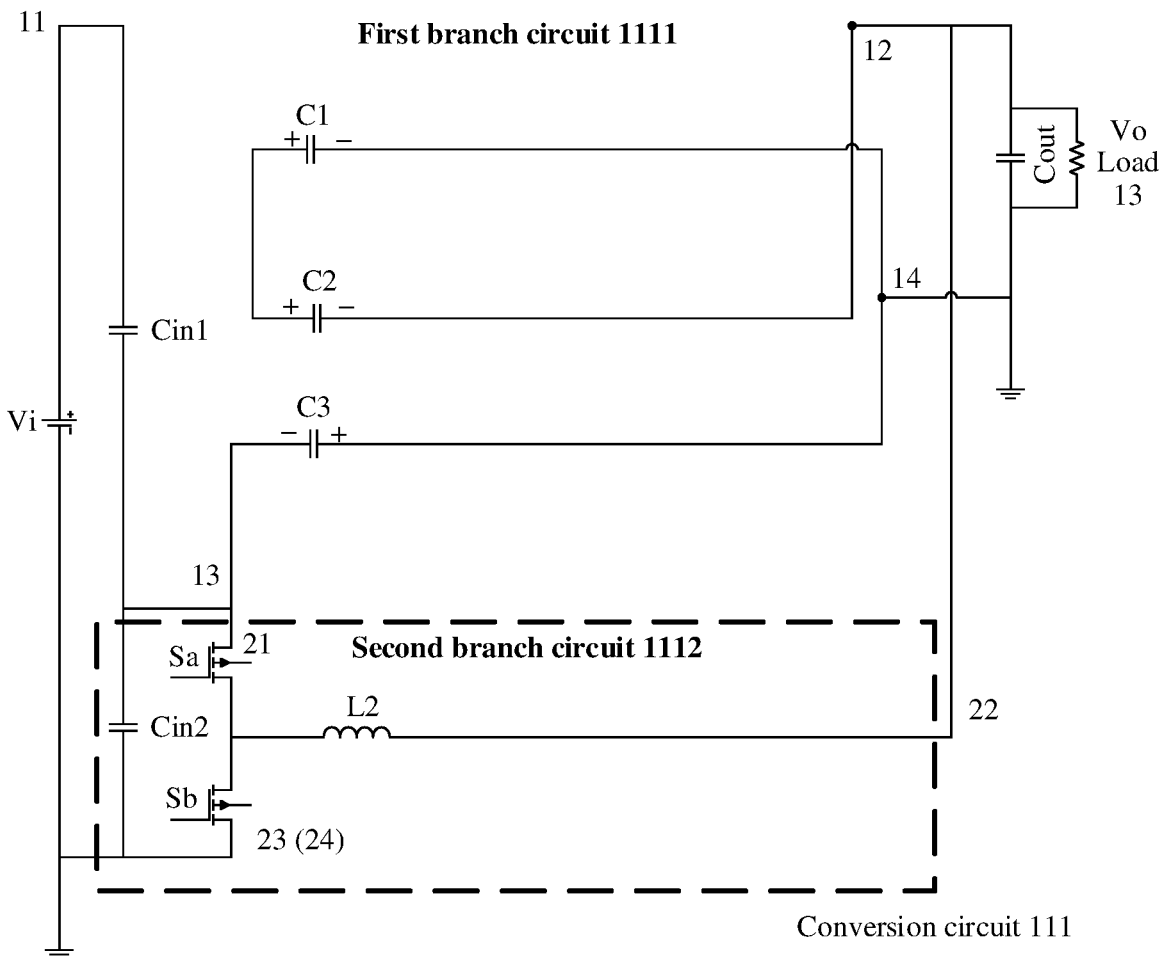

In a time period from T/2 to T, states of the switching transistors may be shown in FIG. 12b. The input switching transistor S11, the input switching transistor S13, the output switching transistor S21, the output switching transistor S24, and the output switching transistor S25 are switched off. The input switching transistor S12, the input switching transistor S14, the output switching transistor S22, the output switching transistor S23, and the output switching transistor S26 are switched on.

It should be noted that, because most switching transistors have a switching delay, there is a specific time interval between a falling edge of one drive signal and a rising edge of the other drive signal. Ideally, a falling edge of one drive signal and a rising edge of the other drive signal should be aligned. The following drive signals are in a similar way, and details are not described herein again in relation to FIG. 12b.

In the case shown in FIG. 12b, the output switching transistor S23, the isolation capacitor C2, the input switching transistor S12, and the isolation capacitor C1 form a path. One end of the isolation capacitor C3 is grounded through the output switching transistor S26, and the other end of the isolation capacitor C3 is connected to the connection end 13 through the input switching transistor S14. An equivalent circuit may be shown in FIG. 12b-1, and circuit elements in FIG. 12b satisfy the following relationships:

$$V_{C1} - V_{C2} = Vo \qquad \text{(Formula 8)}$$

$$V_{C3} + Vi2 = 0 \qquad \text{(Formula 9)}$$

According to Formula 9, because Vi=Vi1+Vi2, the following may be further obtained:

$$Vi1 = Vi + V_{C3} \qquad \text{(Formula 10)}$$

Based on Formula 10 and with reference to Formula 6, the following may be obtained:

$$Vi1=V_{C1}+Vo+V_{C3} \qquad \text{(Formula 11)}$$

Based on Formula 11 and with reference to Formula 8, the following may be obtained:

$$Vi1=2Vo+V_{C2}+V_{C3} \qquad \text{(Formula 12)}$$

Based on Formula 12 and with reference to Formula 7, the following may be obtained:

$$Vi1=3Vo \qquad \text{(Formula 13)}$$

It can be learned from Formula 13 that, when the controller 112 provides the drive signals shown in FIG. 11 for the switching transistors in the first branch circuit 1111, the first transformation ratio N1 is 3.

Figure 12C:
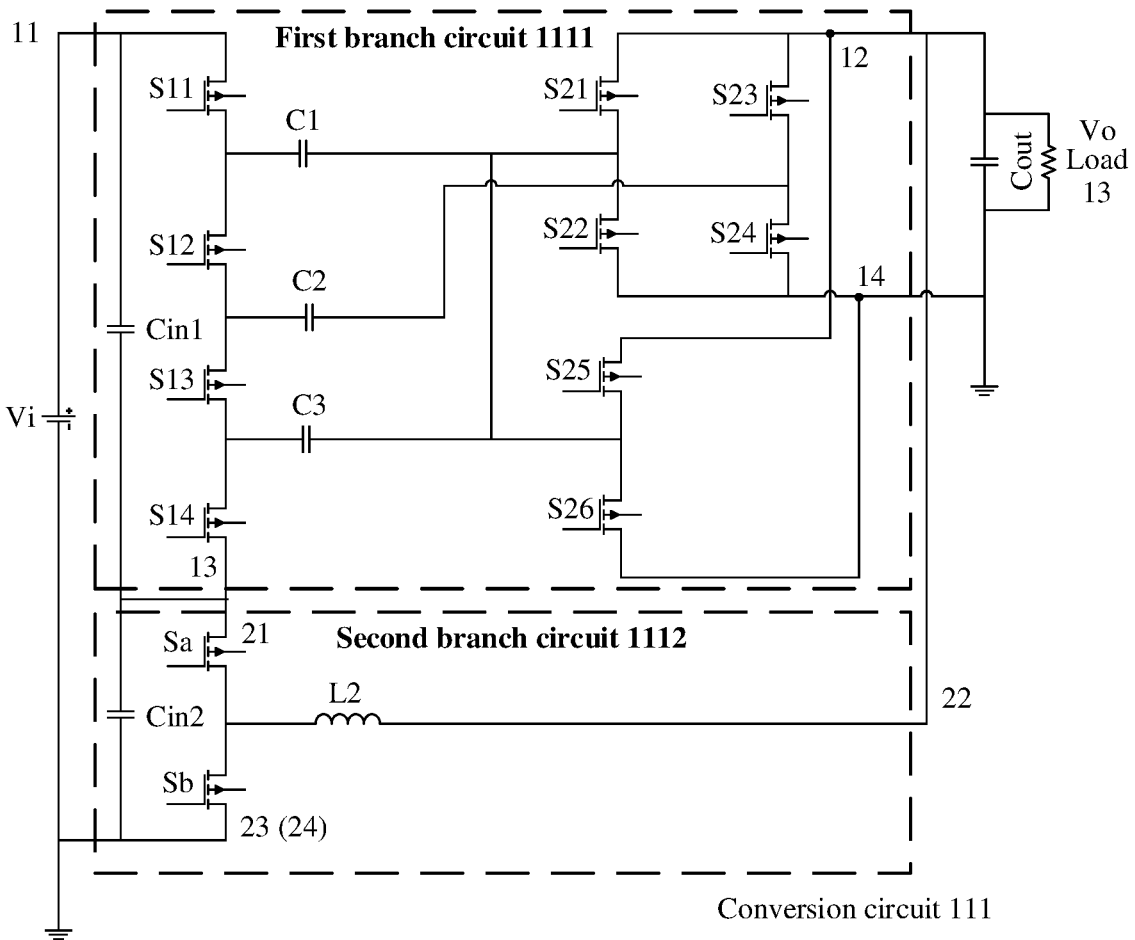
FIG. 12c is a schematic diagram of a structure of a specific conversion circuit according to an embodiment of this application.

In a possible implementation, as shown in FIG. 12c, the other end of the isolation capacitor C1 is further connected to the other end of the isolation capacitor C3. In this case, the controller 112 may further flexibly adjust the drive signals of the output switching transistor S25 and the output switching transistor S26 based on an operating state of the load 13.

Figure 12D:
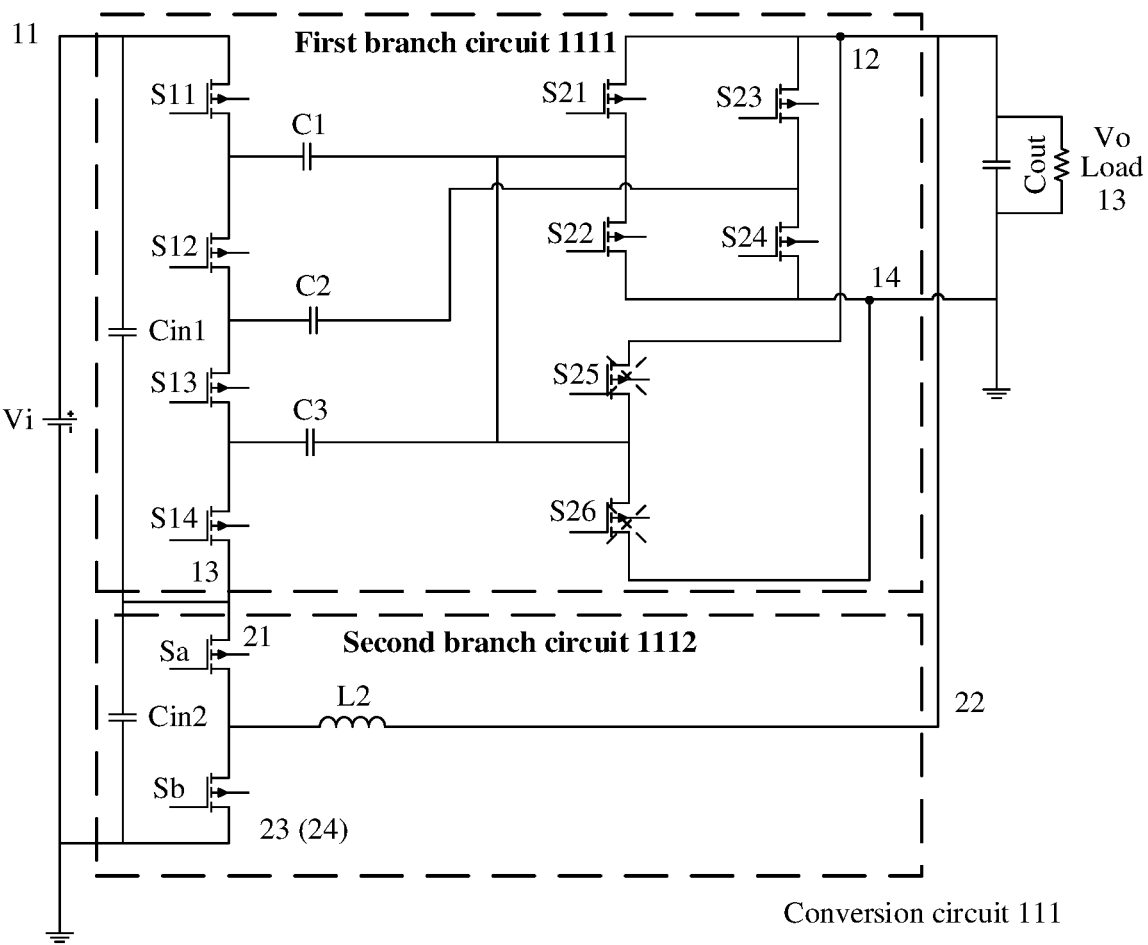
FIG. 12d is a schematic diagram of an on/off state of a first branch circuit according to an embodiment of this application: tion.

Specifically; when the load 13 is lightly loaded, an operating current of the load 13 is small. In this case, the controller 112 may keep the output switching transistor S25 and the output switching transistor S26 off, as shown in FIG. 12d. In the time period from 0 to T/2, the other end of the isolation capacitor C3 may conduct a transmission path between the isolation capacitor C3 and the output end 12 through the output switching transistor S21. In the time period from T/2 to T, the other end of the isolation capacitor C3 may conduct a transmission path between the isolation capacitor C3 and the output end 14 through the output switching transistor S22. It can be learned that, by using the first branch circuit 1111 disclosed in FIG. 12c, the transformation ratio of 3 can still be implemented. In addition, the output switching transistor S25 and the output switching transistor S26 do not need to be switched on or off, so that a driving loss of the switching transistor is reduced.

When the load 13 is heavily or fully loaded, an operating current of the load 13 is large.

In this case, the output switching transistor S25 and the output switching transistor S26 may be controlled based on the on/off states shown in FIG. 12a and FIG. 12b, and a specific process is not described again. Because the operating current of the load 13 is large, influence of a current transmission loss exceeds the driving loss of the switching transistor. Because both the output switching transistor S25 and the output switching transistor S26 can transmit a current, a current transmission loss in the output switching transistor S21 and the output switching transistor S22 can be reduced, to help reduce the current transmission loss.

Second implementation: The first transformation ratio N1 is 2.

Figure 13:
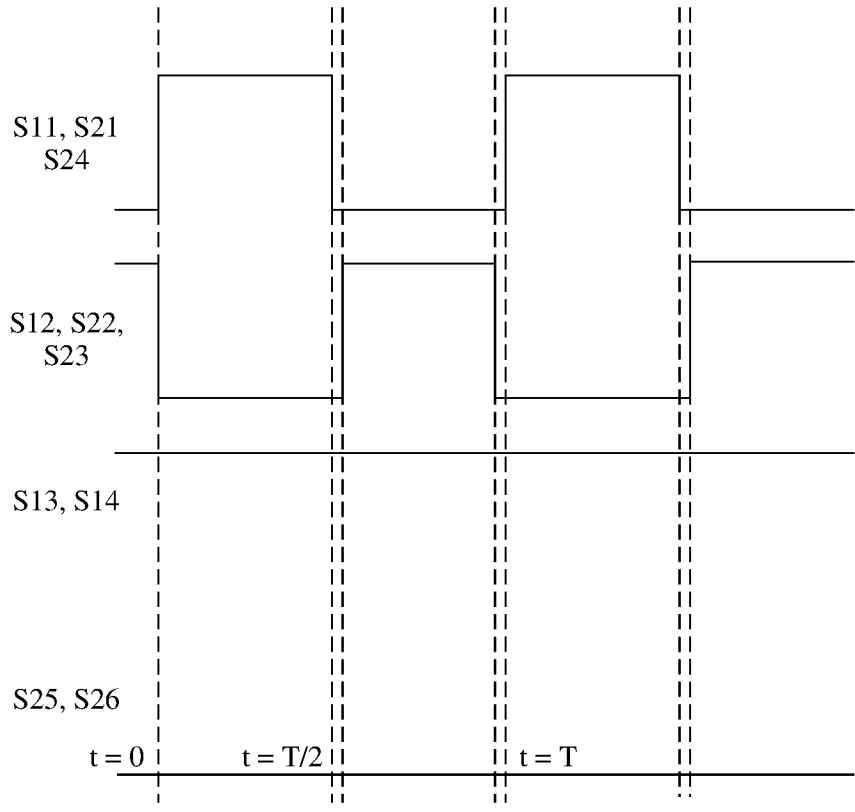
FIG. 13 is a schematic diagram of a drive signal according to an embodiment of this application.

It is assumed that all the switching transistors in the first branch circuit 1111 are switched on at a high voltage and are switched off at a low voltage. When the controller 112 provides drive signals shown in FIG. 13 for the switching transistors in the first branch circuit 1111, the first transformation ratio N1 is 2. As shown in FIG. 13, a period of the drive signal is T. The input switching transistor S11, the output switching transistor S21, and the output switching transistor S24 correspond to a same drive signal. The input switching transistor S12, the output switching transistor S22, and the output switching transistor S23, correspond to a same drive signal. The input switching transistor S13 and the input switching transistor S14 correspond to a same drive signal, and the output switching transistor S25 and the output switching transistor S26 correspond to a same drive signal.

The drive signal corresponding to the input switching transistor S13 and the input switching transistor S14 is a continuous high-level signal, that is, the input switching transistor S13 and the input switching transistor S14 keep in an on state in the period T. The drive signal corresponding to the output switching transistor S25 and the output switching transistor S26 is a continuous low-level signal, that is, the output switching transistor S25 and the output switching transistor S26 keep in an off state.

Figure 14A:
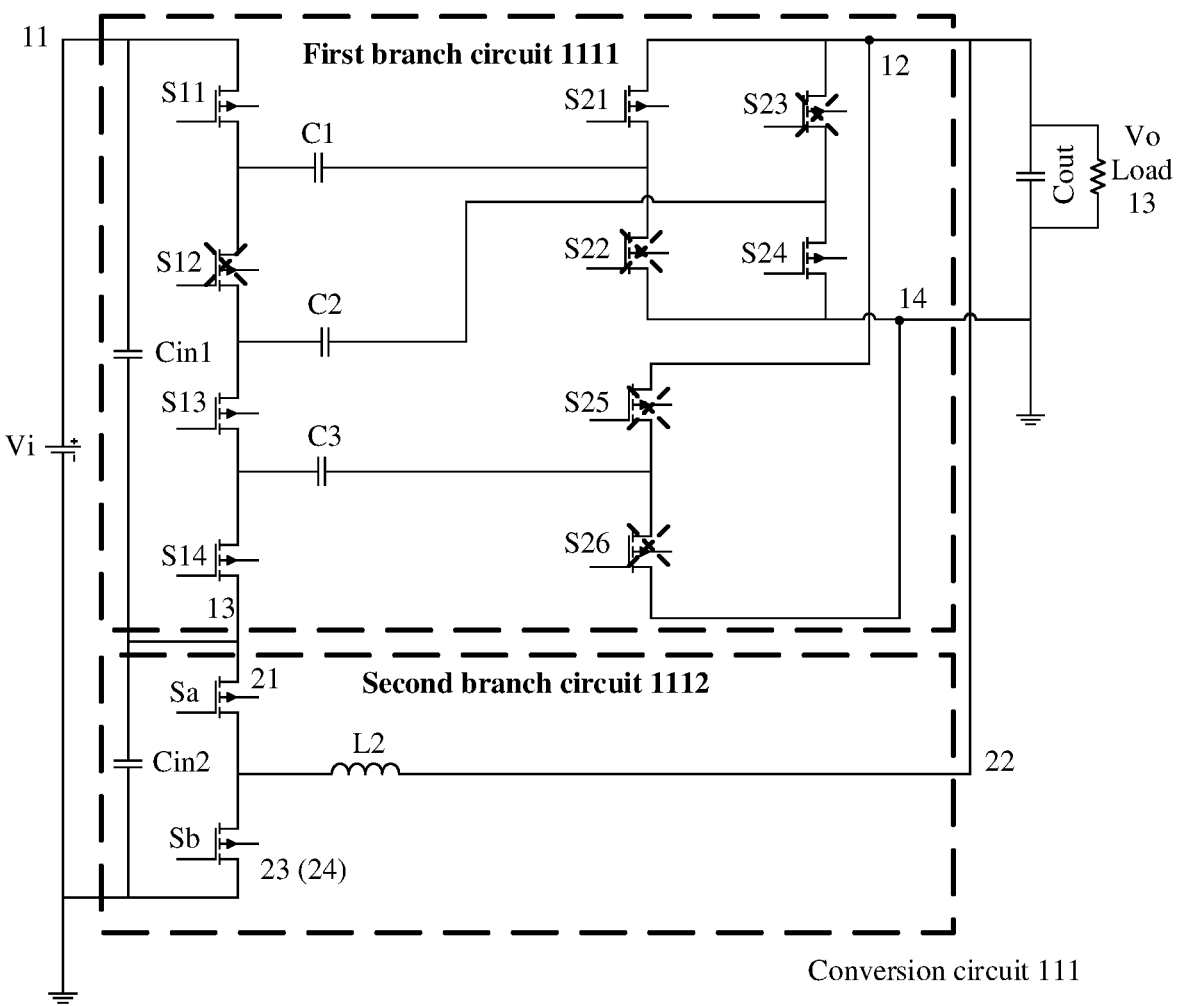
FIG. 14a is a schematic diagram of an on/off state of a first branch circuit according to an embodiment of this application: tion.
Figures 1, 14A:
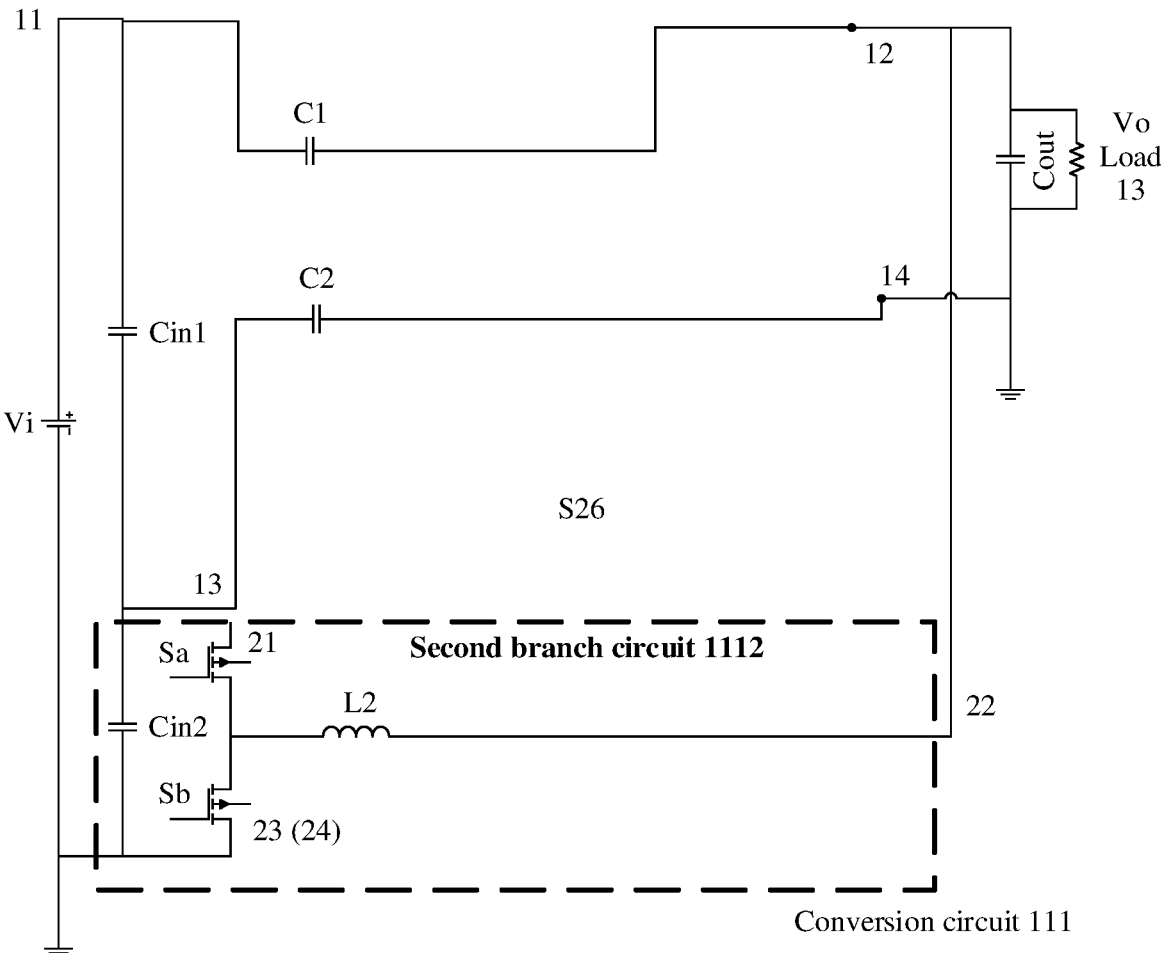

In a time period from 0 to T/2, states of the switching transistors may be shown in FIG. 14a. The input switching transistor S11, the input switching transistor S13, the input switching transistor S14, the output switching transistor S21, and the output switching transistor S24 are switched on. The input switching transistor S12, the output switching transistor S22, the output switching transistor S23, the output switching transistor S25, and the output switching transistor S26 are switched off.

In this case, the input switching transistor S11, the isolation capacitor C1, and the output switching transistor S21 form a path. The input switching transistor S14, the input switching transistor S13, the isolation capacitor C2, and the output switching transistor S24 form a path. An equivalent circuit may be shown in FIG. 14a-1, and circuit elements in FIG. 14a satisfy the following relationships:

$$V_{C1} = Vi - Vo \qquad \text{(Formula 14)}$$

$$V_{C2} = Vi2 \qquad \text{(Formula 15)}$$

Figure 14B:
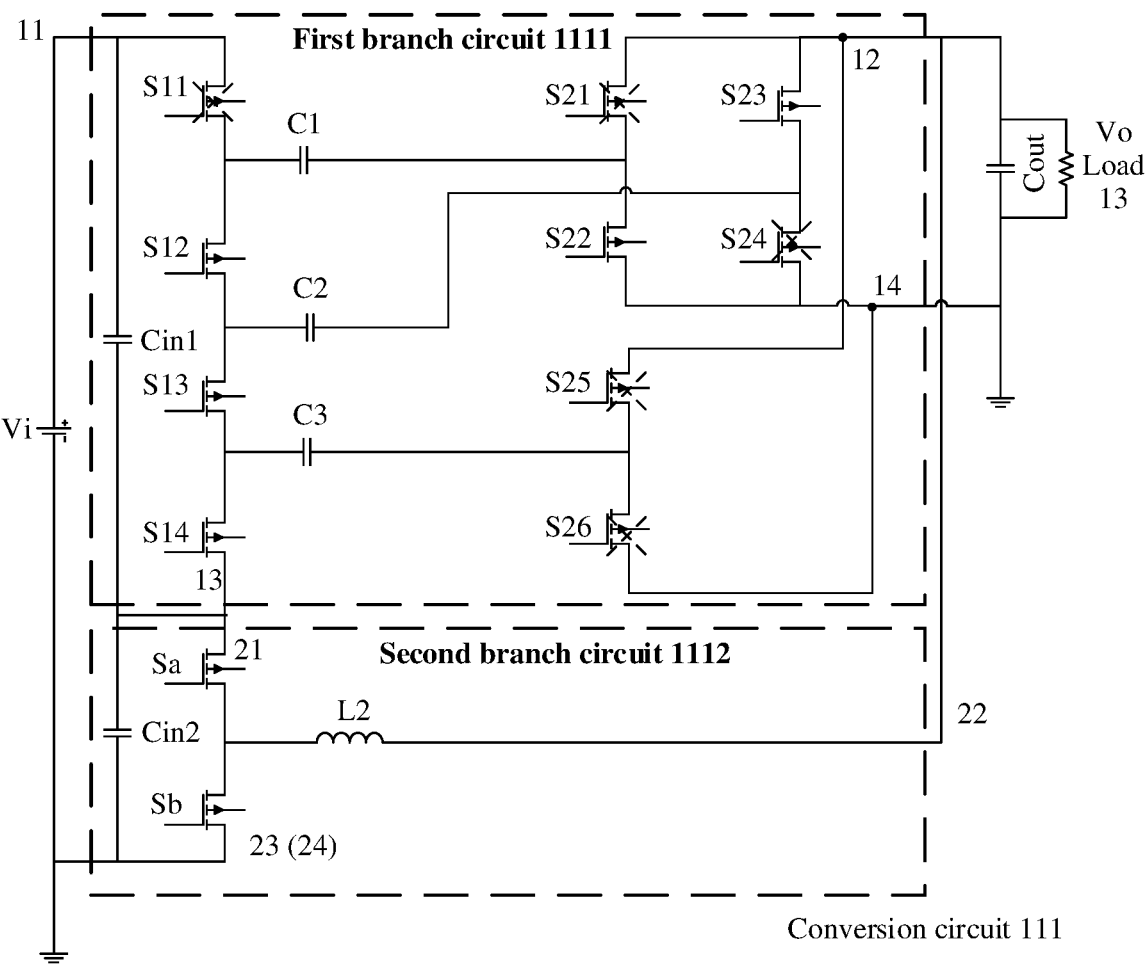
FIG. 14b is a schematic diagram of an on/off state of a first branch circuit according to an embodiment of this application: tion.
Figures 1, 14B:
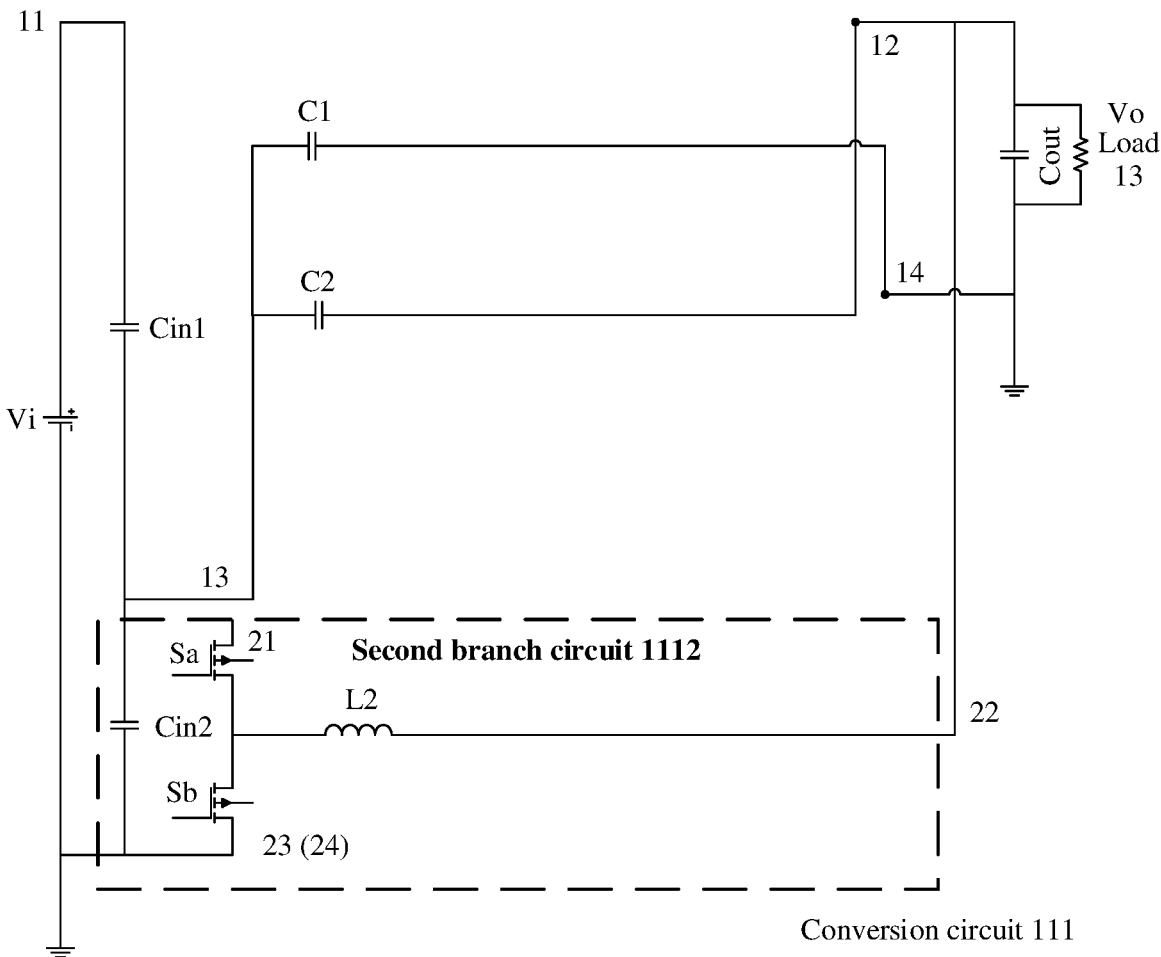

In a time period from T/2 to T, states of the switching transistors may be shown in FIG. 14b. The input switching transistor S12, the input switching transistor S13, the input switching transistor S14, the output switching transistor S22, and the output switching transistor S23 are switched on. The input switching transistor S11, the output switching transistor S21, the output switching transistor S24, the output switching transistor S25, and the output switching transistor S26 are switched off.

In this case, the output switching transistor S23, the isolation capacitor C2, the input switching transistor S12, the isolation capacitor C1, and the output switching transistor S22 form a path. An equivalent circuit may be shown in FIG. 14b-1, and circuit elements in FIG. 14b satisfy the following relationships:

$$V_{C1}-V_{C2}=Vo \qquad \text{(Formula 16)}$$

Based on Formula 16 and with reference to Formula 15 and Vi=Vi1+Vi2, the following may be obtained:

$$V_{C1}-Vi+Vi1=Vo \qquad \text{(Formula 17)}$$

Based on Formula 17 and with reference to Formula 14, the following may be obtained:

$$Vi1=2Vo \qquad \text{(Formula 18)}$$

It can be learned from Formula 18 that, when the controller 112 provides the drive signals shown in FIG. 13 for the switching transistors in the first branch circuit 1111, the first transformation ratio N1 is 2.

Third implementation: The first transformation ratio N1 is 1.

Figure 15:
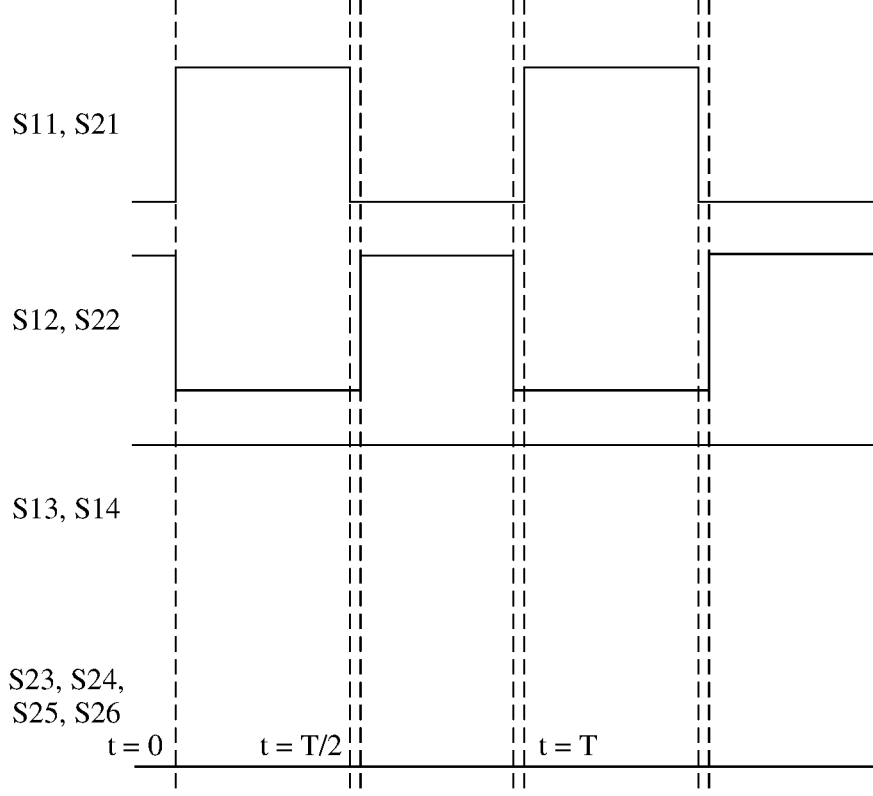
FIG. 15 is a schematic diagram of a drive signal according to an embodiment of this application.

It is assumed that all the switching transistors in the first branch circuit 1111 are switched on at a high voltage and are switched off at a low voltage. When the controller 112 provides drive signals shown in FIG. 15 for the switching transistors in the first branch circuit 1111, the first transformation ratio N1 is 1. As shown in FIG. 15, a period of the drive signal is T. The input switching transistor S11 and the output switching transistor S21 correspond to a same drive signal. The input switching transistor S12 and the output switching transistor S22 correspond to a same drive signal. The input switching transistor S13 and the input switching transistor S14 correspond to a same drive signal. The output switching transistor S23, the output switching transistor S24, the output switching transistor S25, and the output switching transistor S26 correspond to a same drive signal.

The drive signal corresponding to the input switching transistor S13 and the input switching transistor S14 is a continuous high-level signal, that is, the input switching transistor S13 and the input switching transistor S14 keep in an on state in the period T. The drive signal corresponding to the output switching transistor S23, the output switching transistor S24, the output switching transistor S25, and the output switching transistor S26 is a continuous low-level signal, that is, the output switching transistor S23, the output switching transistor S24, the output switching transistor S25, and the output switching transistor S26 keep in an off state.

Figure 16A:
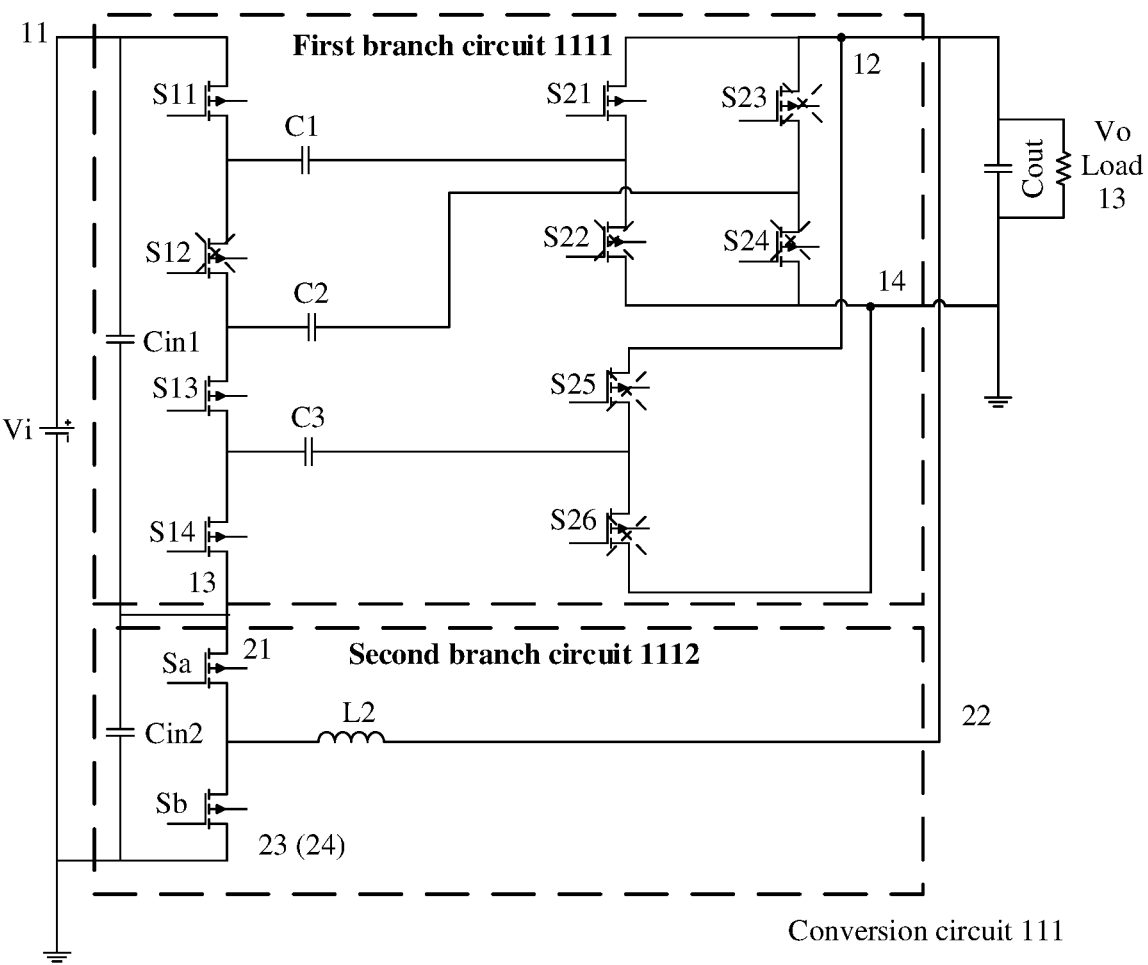
FIG. 16a is a schematic diagram of an on/off state of a first branch circuit according to an embodiment of this application: tion.
Figures 1, 16A:
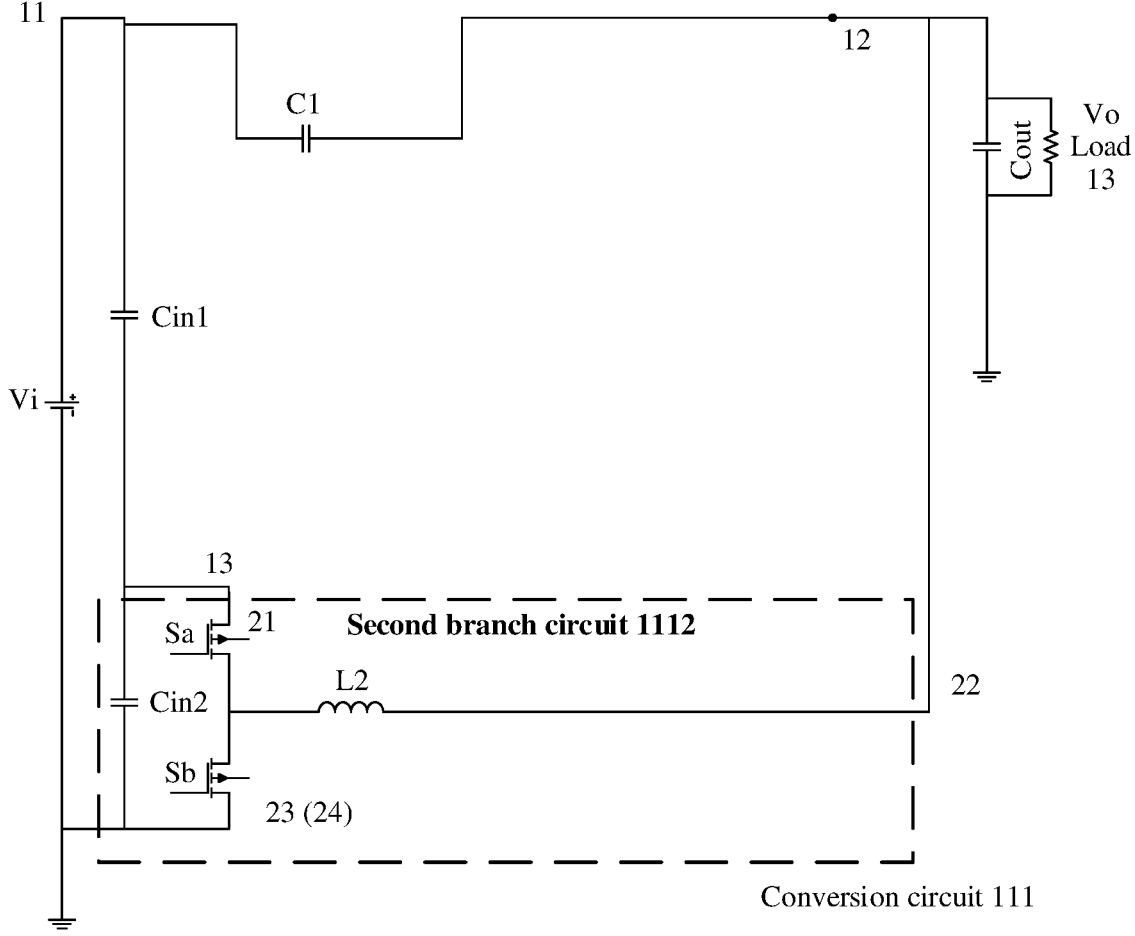

In a time period from 0 to T/2, states of the switching transistors may be shown in FIG. 16a. The input switching transistor S11, the input switching transistor S13, the input switching transistor S14, and the output switching transistor S21 are switched on. The input switching transistor S12, the output switching transistor S22, the output switching transistor S23, the output switching transistor S24, the output switching transistor S25, and the output switching transistor S26 are switched off.

In this case, the input switching transistor S11, the isolation capacitor C1, and the output switching transistor S21 form a path. An equivalent circuit may be shown in FIG. 16a-1, and circuit elements in FIG. 16a satisfy the following relationships:

$$Vi-V_{C1}=Vo \qquad \text{(Formula 19)}$$

Figure 16B:
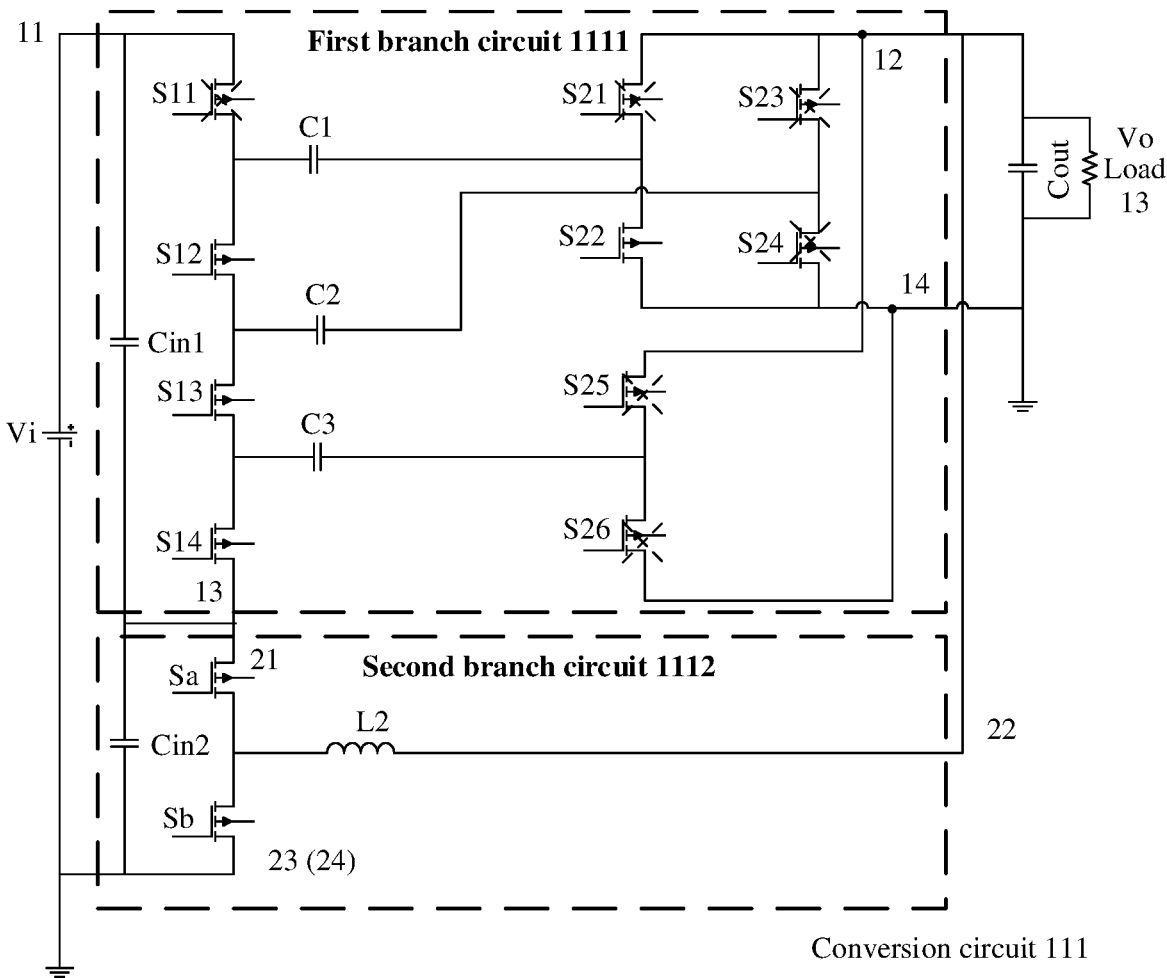
FIG. 16b is a schematic diagram of an on/off state of a first branch circuit according to an embodiment of this application: tion.
Figures 1, 16B:
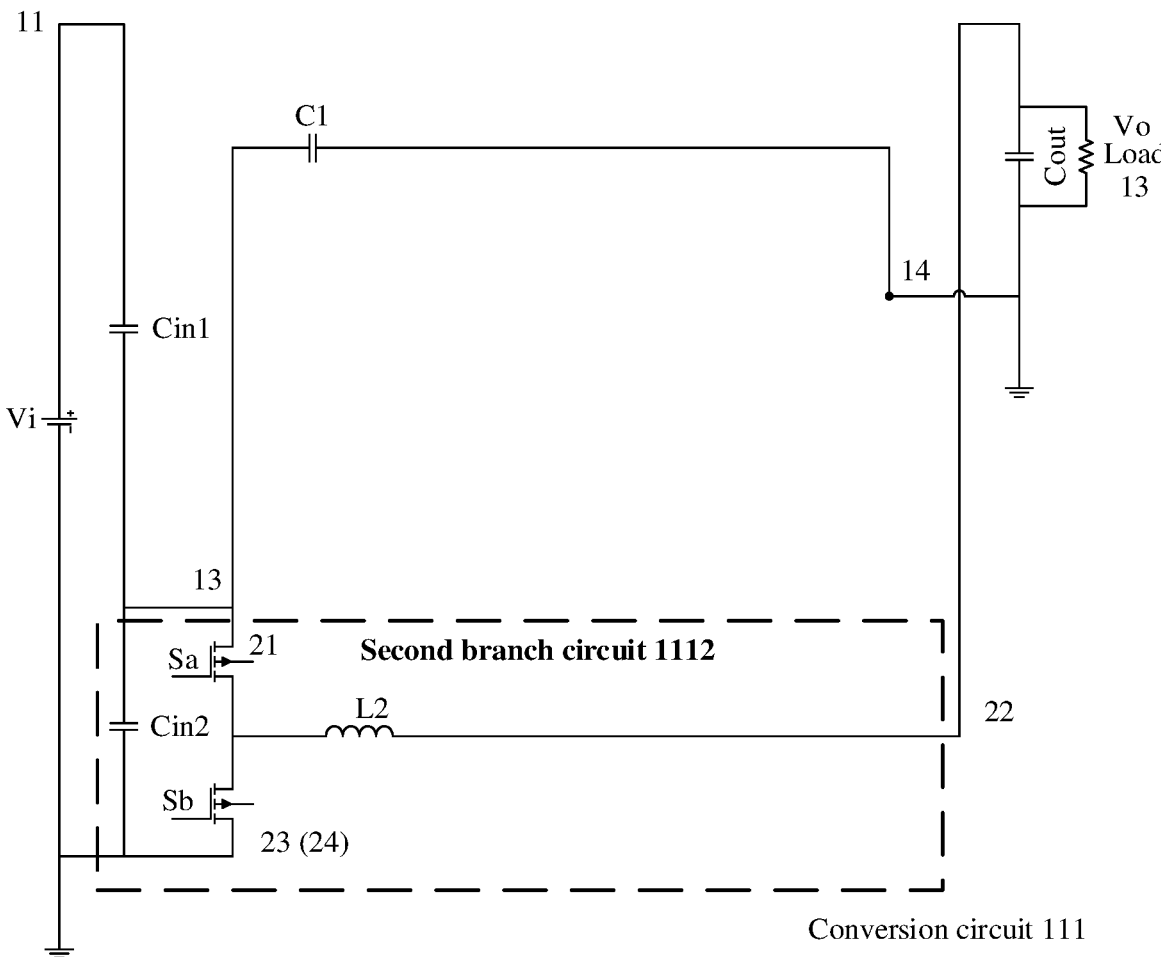

In a time period from T/2 to T, states of the switching transistors may be shown in FIG. 16b. The input switching transistor S12, the input switching transistor S13, the input switching transistor S14, and the output switching transistor S22 are switched on. The input switching transistor S11, the output switching transistor S21, the output switching transistor S23, the output switching transistor S24, the output switching transistor S25, and the output switching transistor S26 are switched off.

In this case, the input switching transistor S14, the input switching transistor S13, the input switching transistor S12, the isolation capacitor C1, and the output switching transistor S22 form a path. An equivalent circuit may be shown in FIG. 16b-1, and circuit elements in FIG. 16b satisfy the following relationships:

$$Vi2-V_{C1}=0 \qquad \text{(Formula 20)}$$

Based on Vi=Vi1+Vi2 and with reference to Formula 19 and Formula 20, the following may be obtained:

$$Vi1=Vo \qquad \text{(Formula 21)}$$

It can be learned from Formula 21 that, when the controller 112 provides the drive signals shown in FIG. 15 for the switching transistors in the first branch circuit 1111, the first transformation ratio N1 is 1.

In conclusion, the first branch circuit 1111 provided in this embodiment of this application has n adjustable transformation ratios of integer values, and the maximum adjustable transformation ratio is n. In this case, the controller 112 may adjust the transformation ratio of the first branch circuit 1111 and the transformation ratio of the second branch circuit 1112 according to the method shown in FIG. 6.

Figure 17A:
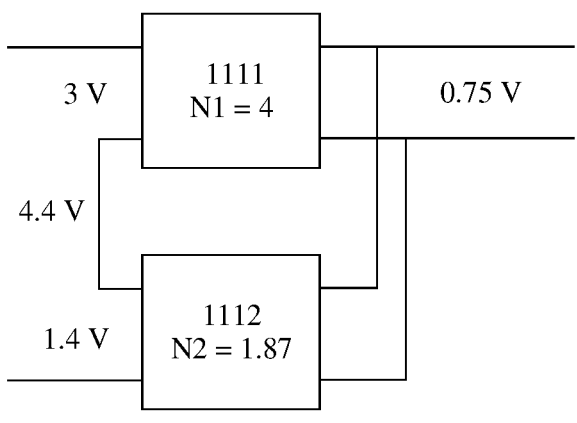
FIG. 17a to FIG. 17c each are a schematic diagram of a change of a transformation ratio according to an embodiment of this application.

For example:

As shown in FIG. 17a, the total input voltage Vi=4.4 V, and the target output voltage Va=0.75 V. In this case, according to the method shown in FIG. 6, the controller 112 may set the first transformation ratio N1 to 4, and set the second transformation ratio N2 to 1.87.

Figure 17B:
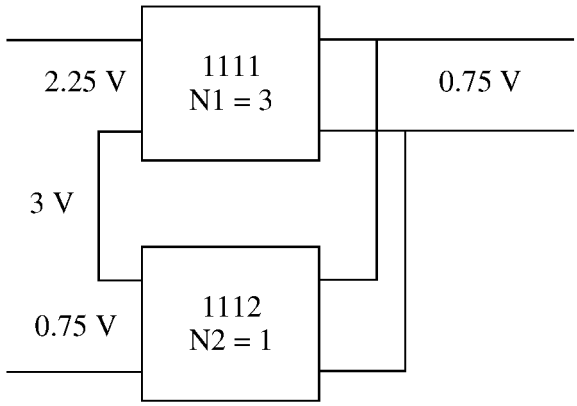

As shown in FIG. 17b, after the terminal battery 12 works for a period of time, the battery voltage decreases, and the total input voltage Vi changes to 3 V, and in this case, the target output voltage Va is still 0.75 V. In this case, according to the method shown in FIG. 6, the controller 112 may set the first transformation ratio N1 to 3, and set the second transformation ratio N2 to 1.

Figure 17C:
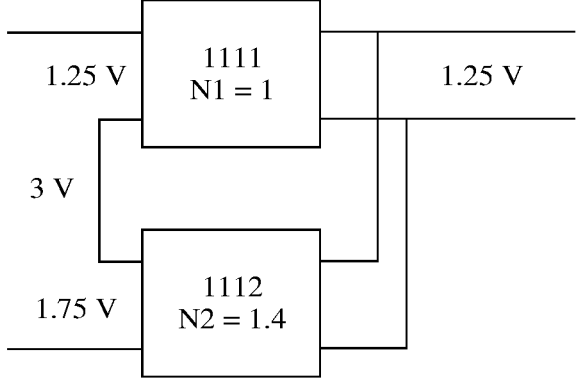

As shown in FIG. 17c, the total input voltage Vi is 3 V, but the target output voltage Va changes to 1.25 V. In this case, according to the method shown in FIG. 6, the controller 112 may set the first transformation ratio N1 to 1, and set the second transformation ratio N2 to 1.4. As described above, setting the first transformation ratio N1 based on real-time total input voltage Vi and target output voltage Va can further improve the efficiency of the conversion circuit 111. However, in an actual application process, a correspondence between the first transformation ratio N1 and the total input voltage may also be preset based on a change range of the total input voltage Vi. For example, the correspondence may be shown in Table 1.

TABLE 1

| Vi | Va | N1 | Vi1 = N1 x Vo | Vi2 = Vi − N1 x Vo |
|---|---|---|---|---|
| 3.75 to 4.4 | 0.75 | 4 | 3 | 0.75 to 1.4 |
| 3 to 3.75 | 0.75 | 3 | 2.25 | 0.75 to 1.5 |
| 2.7 to 3 | 0.75 | 2 | 1.5 | 1.2 to 1.5 |

The correspondence shown in Table 1 is applicable to a case in which the target output voltage Va is 0.75 V and a change range of the battery voltage of the terminal battery 12 is 2.7 V to 4.4 V. Specifically, when the battery voltage is between [3.75, 4.4], the first transformation ratio N1 may be set to 4, the input voltage Vi1 of the first branch circuit 1111 is 3 V, and a range of the input voltage Vi2 of the second branch circuit 1112 is [0.75, 1.4]. After a period of time, when the battery voltage drops to [3, 3.75), the first transformation ratio N1 may be set to 3, the input voltage Vi1 of the first branch circuit 1111 is 2.25 V, and the range of the input voltage Vi2 of the second branch circuit 1112 is [0.75, 1.5]. After a period of time, when the battery voltage drops to [2.7. 3), the first transformation ratio N1 may be set to 2, the input voltage Vi1 of the first branch circuit 1111 is 1.5 V, and the range of the input voltage Vi2 of the second branch circuit 1112 is [1.2, 1.5].

Figure 10B:
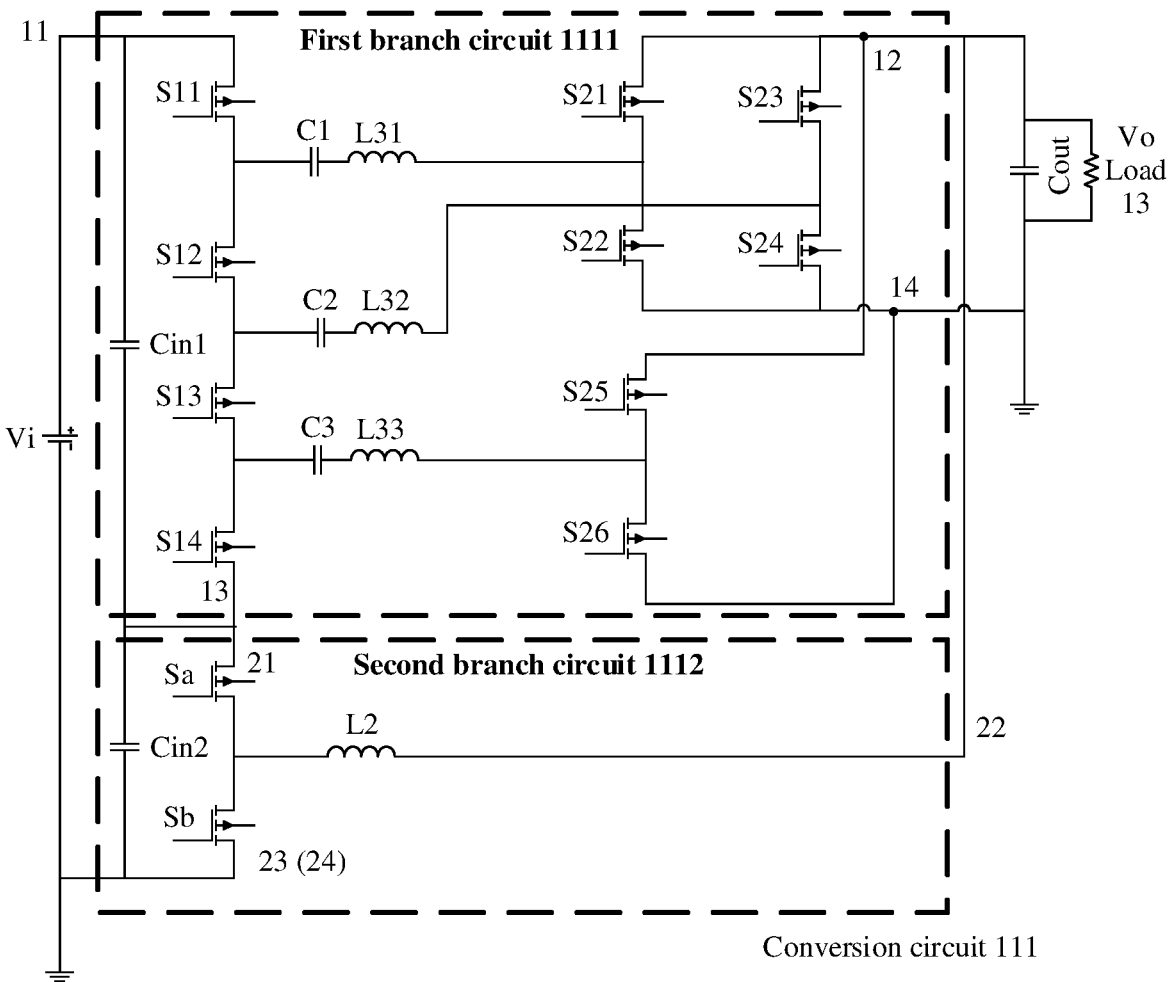
FIG. 10b is a schematic diagram of a structure of a specific conversion circuit according to an embodiment of this application.

In a possible implementation, the first branch circuit 1111 may further include n resonant inductors, and the n resonant inductors are respectively connected in series to the n isolation capacitors in a one-to-one correspondence. As shown in FIG. 10b, when n is 3, the first branch circuit 1111 further includes resonant inductors L31 to L33. One end of the resonant inductor L31 is connected to the other end of the isolation capacitor C1, and the other end of the resonant inductor L31 is connected to the second series connection node between the output switching transistor S21 and the output switching transistor S22. One end of the resonant inductor L32 is connected to the other end of the isolation capacitor C2, and the other end of the resonant inductor L32 is connected to the second series connection node between the output switching transistor S23 and the output switching transistor S24. One end of the resonant inductor L33 is connected to the other end of the isolation capacitor C3, and the other end of the resonant inductor L33 is connected to the second series connection node between the output switching transistor S25 and the output switching transistor S26.

Adding the resonant inductor connected in series to the isolation capacitor in the first branch circuit 1111 helps implement zero-voltage switch-on of the n+1 input switching transistors and the 2n output switching transistors in the first branch circuit 1111, reduce a switching loss of each switching transistor, and further improve the efficiency of the conversion circuit 111. It may be understood that resonant inductors less than n may also be added to the first branch circuit 1111. and these resonant inductors are respectively connected in series to some isolation capacitors in a one-to-one correspondence. For example, only the resonant inductor L31 connected in series to the isolation capacitor C1 is added, and the resonant inductors L32 and L33 are not added. This is not limited in this embodiment of this application.

Example 2 of the First Branch Circuit 1111

An embodiment of this application provides a conversion circuit 111, as shown in FIG. 18. The first branch circuit 1111 mainly includes an isolation unit 1-1 and a conversion unit 1-2. The conversion unit 1-2 is a series-parallel connection (Series-Parallel) structure.

Specifically, the conversion unit 1-2 mainly includes K conversion capacitors, K first conversion switching transistors, K−1 second conversion switching transistors, and K−1 third conversion switching transistors, and K is an integer greater than 1. In FIG. 18, a value of K is 5 is used as an example. The conversion unit 1-2 mainly includes conversion capacitors C021 to C025, first conversion switching transistors S021, S024, S027, S0210, and S0213, second conversion switching transistors S022, S025, S028, and S0211, and third conversion switching transistors S023, S026, S029, and S0212.

First to $(K-1)^{th}$ conversion capacitors and the K first conversion switching transistors in the conversion unit 1-2 are sequentially alternately connected, one end of a $j^{th}$ conversion capacitor is connected to a second electrode of a $j^{th}$ first conversion switching transistor, the other end of the $j^{th}$ conversion capacitor is connected to a first electrode of a $(j+1)^{th}$ first conversion switching transistor, and j is an integer greater than or equal to 1 and less than K: One end a $K^{th}$ conversion capacitor is connected to the output end 12, and the other end of the $K^{th}$ conversion capacitor and the output end 14 are grounded.

For example, in FIG. 18, the first conversion switching transistor S021, the conversion capacitor C021, the first conversion switching transistor S024, the conversion capacitor C022, the first conversion switching transistor S027, the conversion capacitor C023, the first conversion switching transistor S0210, the conversion capacitor C024 and the first conversion switching transistor S0213 are sequentially connected. One end of the conversion capacitor C025 is connected to the output end 12, and the other end of the conversion capacitor C025 is grounded.

In the conversion unit 1-2, the first to the $(K-1)^{th}$ conversion capacitors are further respectively connected to the K−1 second conversion switching transistors and the K−1 third conversion switching transistors in a one-to-one correspondence. One end of the $j^{th}$ conversion capacitor is connected to a second electrode of a second conversion switching transistor corresponding to the $j^{th}$ conversion capacitor, and the other end of the $j^{th}$ conversion capacitor is connected to a first electrode of a third conversion switching transistor corresponding to the $j^{th}$ conversion capacitor.

For example, in FIG. 18, one end of the conversion capacitor C021 is connected to a second electrode of the second conversion switching transistor S022, and the other end of the conversion capacitor C021 is connected to a first electrode of the third conversion switching transistor S023. One end of the conversion capacitor C022 is connected to a second electrode of the second conversion switching transistor S025, and the other end of the conversion capacitor C022 is connected to a first electrode of the third conversion switching transistor S026. One end of the conversion capacitor C023 is connected to a second electrode of the second conversion switching transistor S028, and the other end of the conversion capacitor C023 is connected to a first electrode of the third conversion switching transistor S029. One end of the conversion capacitor C024 is connected to a second electrode of the second conversion switching transistor S0211, and the other end of the conversion capacitor C024 is connected to a first electrode of the third conversion switching transistor S0212.

In addition, first electrodes of the K−1 second conversion switching transistors are connected to the output end 12 of the conversion circuit 111, and second electrodes of the K−1 third conversion switching transistors are grounded with the output end 14 of the conversion circuit 111. As shown in FIG. 18, the first electrodes of the second conversion switching transistors S022, S025, S028, and S0211 are connected to the output end 12. Second electrodes of the third conversion switching transistors S023, S026, S029, and S0212 are grounded with the output end 14.

It can be learned from the conversion unit 1-2 shown in FIG. 18, a low potential input end (the second electrode of the switching transistor S023) of the conversion unit 1-2 is grounded, so that the conversion unit 1-2 cannot directly be connected in parallel to the input capacitor Cin1, and therefore cannot directly receive the input voltage Vi1. In view of this, the first branch circuit 1111 may further include the isolation unit 1-1. A first end of the isolation unit 1-1 is connected to a first electrode of a $1^{st}$ first conversion switching transistor (the first conversion switching transistor S021 in FIG. 18), and a second end of the isolation unit 1-1 is grounded. The isolation unit 1-1 may provide the first input voltage for the conversion unit 1-2 through the first end and the second end.

For example, as shown in FIG. 18, the isolation unit includes a first isolation switching transistor S011, a second isolation switching transistor S012, a third isolation switching transistor S013, a fourth isolation switching transistor S014, and an isolation capacitor C011.

A first electrode of the first isolation switching transistor S011 is connected to the input end 11, and a second electrode of the first isolation switching transistor S011 is separately connected to a first electrode of the second isolation switching transistor S012 and one end of the isolation capacitor C011. A second electrode of the second isolation switching transistor S012 is the first end of the isolation unit 1-1, and is connected to the first electrode of the 1st first conversion switching transistor (the first conversion switching transistor S021). The other end of the isolation capacitor C011 is separately connected to a second electrode of the third isolation switching transistor S013 and a first electrode of the fourth isolation switching transistor S014. A first electrode of the third isolation switching transistor S013 is the connection end 13, and is connected to the connection end 21 of the second branch circuit 1112. A first electrode of the fourth isolation switching transistor S014 is the second end of the isolation unit 1-1, and a second electrode of the fourth isolation switching transistor S014 is grounded.

The isolation unit 1-1 may provide the input voltage Vi for the conversion unit 1-2. Specifically; in a first time period of a period T1, the controller 112 may switch on the first isolation switching transistor S011 and the fourth isolation switching transistor S014, and an equivalent circuit is shown in FIG. 18-1. It can be learned from FIG. 18-1 that, the first isolation switching transistor S011 and the fourth isolation switching transistor S014 are switched on, so that the isolation capacitor C011 can be charged, and a voltage of the isolation capacitor C011 is Vi. It may be understood that the second isolation switching transistor S012 and the third isolation switching transistor S013 are switched off during this period.

In a second time period of the period T1, the controller 112 may switch on the second isolation switching transistor S012 and the third isolation switching transistor S013, and switch off the first isolation switching transistor S011 and the fourth isolation switching transistor S014. An equivalent circuit is shown in FIG. 18-2. It can be learned from FIG. 18-2 that, the second isolation switching transistor S012 and the third isolation switching transistor S013 are switched on, so that the isolation capacitor C011 can discharge. Because the voltage of the isolation capacitor C011 is equal to the input voltage Vi, and a voltage of one end that is of the isolation capacitor C011 and that is connected to the connection end 13 is Vi2, a voltage of the other end that is of the isolation capacitor C011 and that is connected to the conversion unit 1-2 is Vi–Vi2=Vi1. Therefore, the isolation capacitor C011 may provide the input voltage Vi1 for the conversion unit 1-2.

The conversion unit 1-2 may further convert the input voltage Vi1. Specifically, in a first time period of a period T2, the controller 112 may switch on the first conversion switching transistors S021, S024, S027, S0210, and S0213, so that the conversion capacitors C021 to C025 are charged.

In the first time period, an equivalent circuit of the conversion unit 1-2 may be shown in FIG. 18-3. The capacitor C021 to the capacitor C025 are sequentially connected in series, and a voltage of each conversion capacitor is Vi1/5. It may be understood that the second conversion switching transistors S022, S025, S028, and S0211, and the third isolation switching transistors S023, S026, S029, and S0212 should be kept switched off during this period.

In the second time period of the period T2, the controller 112 may switch off the first conversion switching transistors S021, S024, S027, S0210, and S0213, switch on the second conversion switching transistors S022, S025, S028, and S0211, and switch on the third conversion switching transistors S023, S026, S029, and S0212.

In the second time period, an equivalent circuit of the conversion unit 1-2 may be shown in FIG. 18-4. In this case, the conversion capacitor C021 to the conversion capacitor C025 output voltages in parallel. Because the voltage of each conversion capacitor is Vi/5, the output voltage Vo of each of the conversion capacitor C021 to the conversion capacitor C025 is Vi/5.

When the isolation unit 1-1 is in the first time period of the T1 period, the conversion unit 1-2 may be in the second time period of the T2 period. That is, when the isolation capacitor C011 is charged, the conversion capacitors in the conversion unit 1-2 discharge. When the isolation unit 1-1 is in the second time period of the T1 period, the conversion unit 1-2 may be in the first time period of the T2 period. That is, when the isolation capacitor C011 discharges, the conversion capacitors in the conversion unit 1-2 are charged.

It can be learned from the foregoing conversion process that a maximum transformation ratio of the first branch circuit 1111 shown in FIG. 18 is 5, which is equal to a quantity of conversion capacitors in the first branch circuit 1111. That is, if the first branch circuit 1111 includes K conversion capacitors, the maximum transformation ratio of the first branch circuit 1111 is K.

The first branch circuit 1111 shown in FIG. 18 may also implement transformation ratios of 4, 3, 2, and 1. Details are as follows:

The first transformation ratio N1 is set to 4.

The controller 112 may switch on the first conversion switching transistor S021, the first conversion switching transistor S024, the first conversion switching transistor S027, the first conversion switching transistor S0210, and the second conversion switching transistor S0211 in the first time period of the period T2. An equivalent circuit may be shown in FIG. 18-5. As shown in FIG. 18-5, the conversion capacitor C021, the conversion capacitor C022, the conversion capacitor C023, and the conversion capacitor C025 are charged in series, and a voltage of each conversion capacitor is Vi1/4. It may be understood that other switching transistors may be kept switched off during this period.

In the second time period of the period T2, the controller 112 may switch on the second conversion switching transistors S022, S025, and S028, and switch on the third conversion switching transistors S023, S026, and S029. An equivalent circuit may be shown in FIG. 18-6. As shown in FIG. 18-6, the conversion capacitor C021, the conversion capacitor C022, the conversion capacitor C023, and the conversion capacitor C025 discharge in parallel. Because the voltage of each of the conversion capacitor C021, the conversion capacitor C022, the conversion capacitor C023, and the conversion capacitor C025 is Vi1/4, the output voltage Vo of each of the conversion capacitor C021 to the conversion capacitor C025 is Vi1/4. It may be understood that other switching transistors may be kept switched off during this period.

The first transformation ratio N1 is set to 3.

Figures 7, 18:
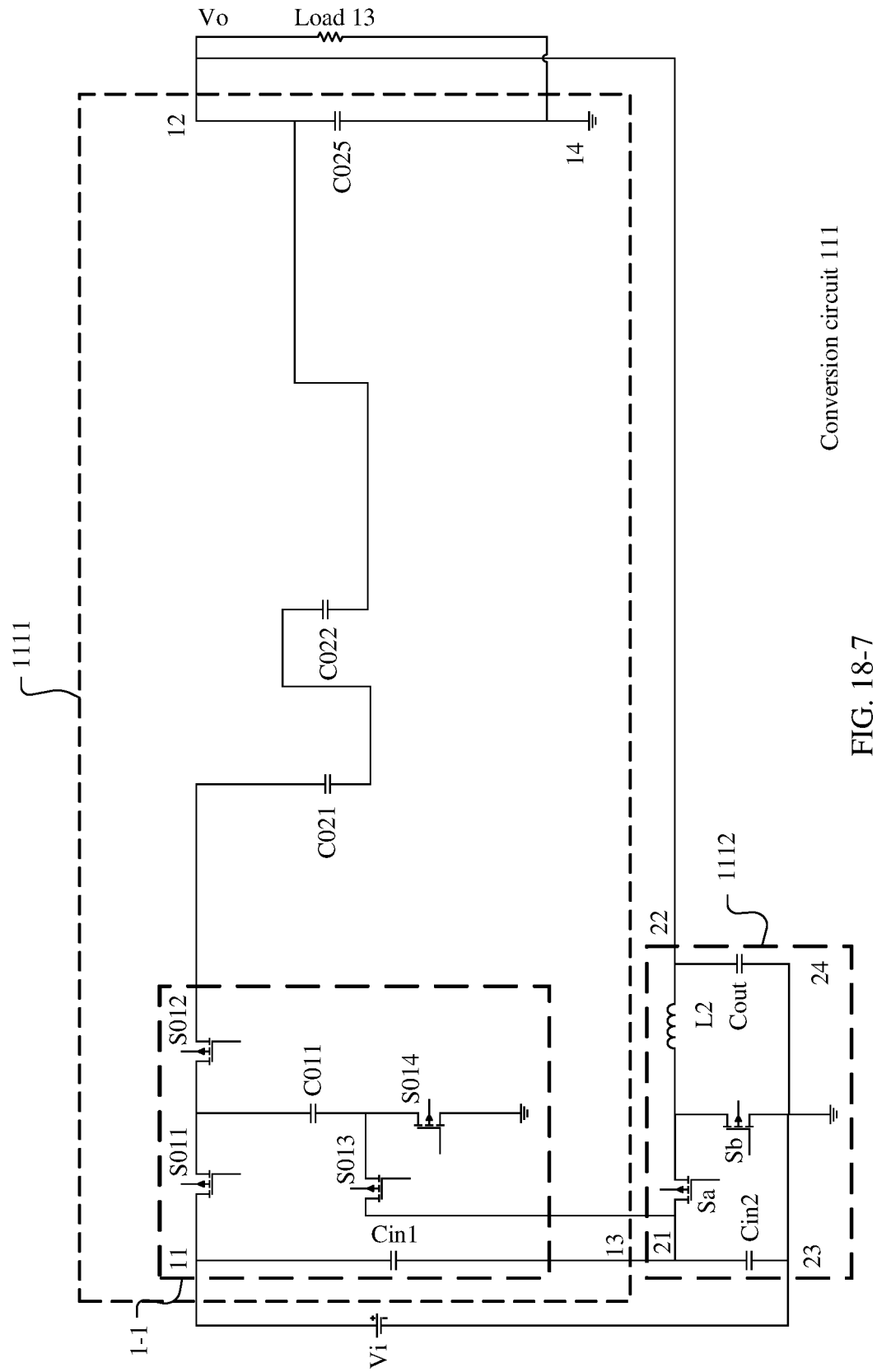
Figures 8, 18:
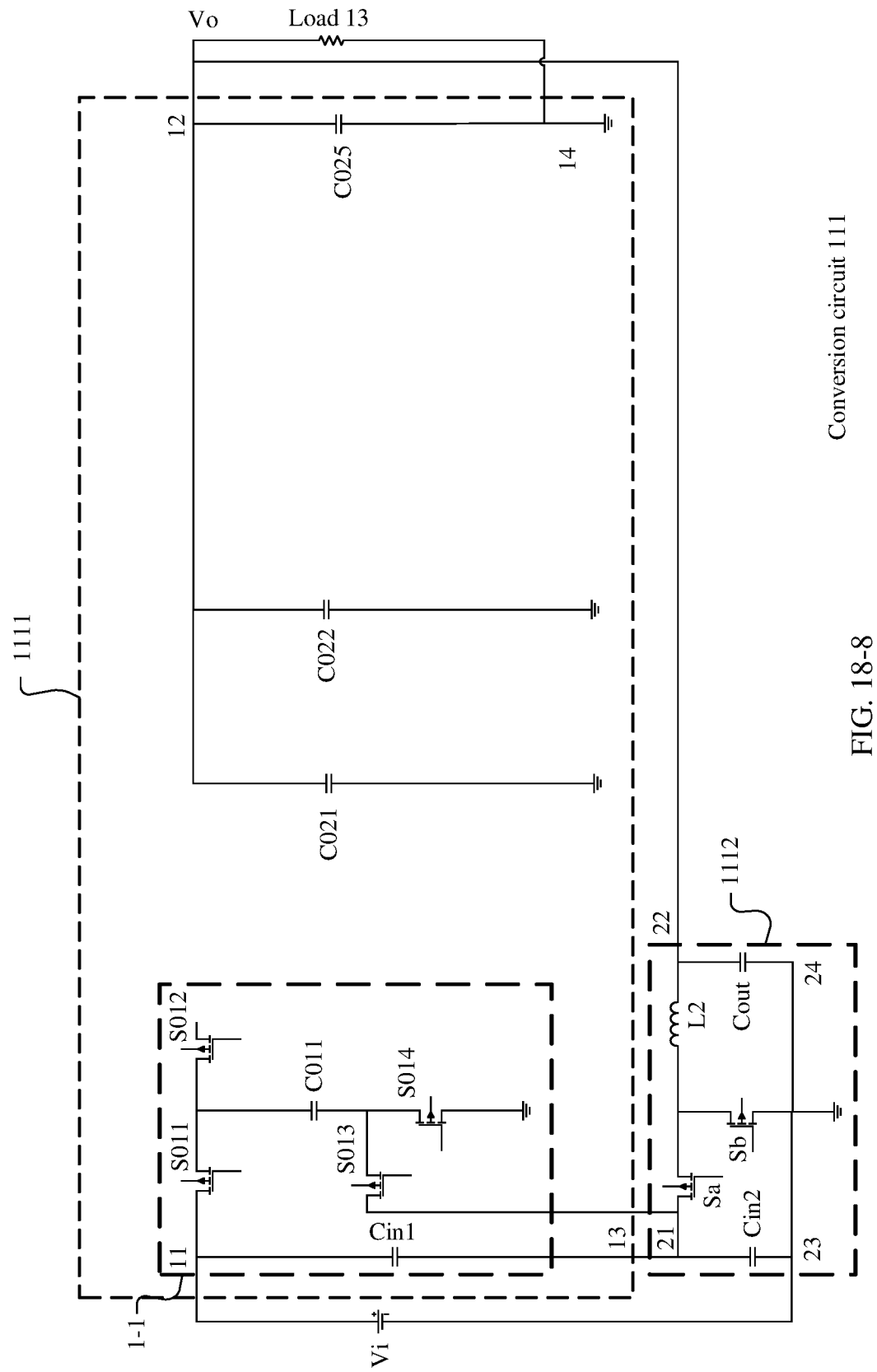
Figures 9, 18:
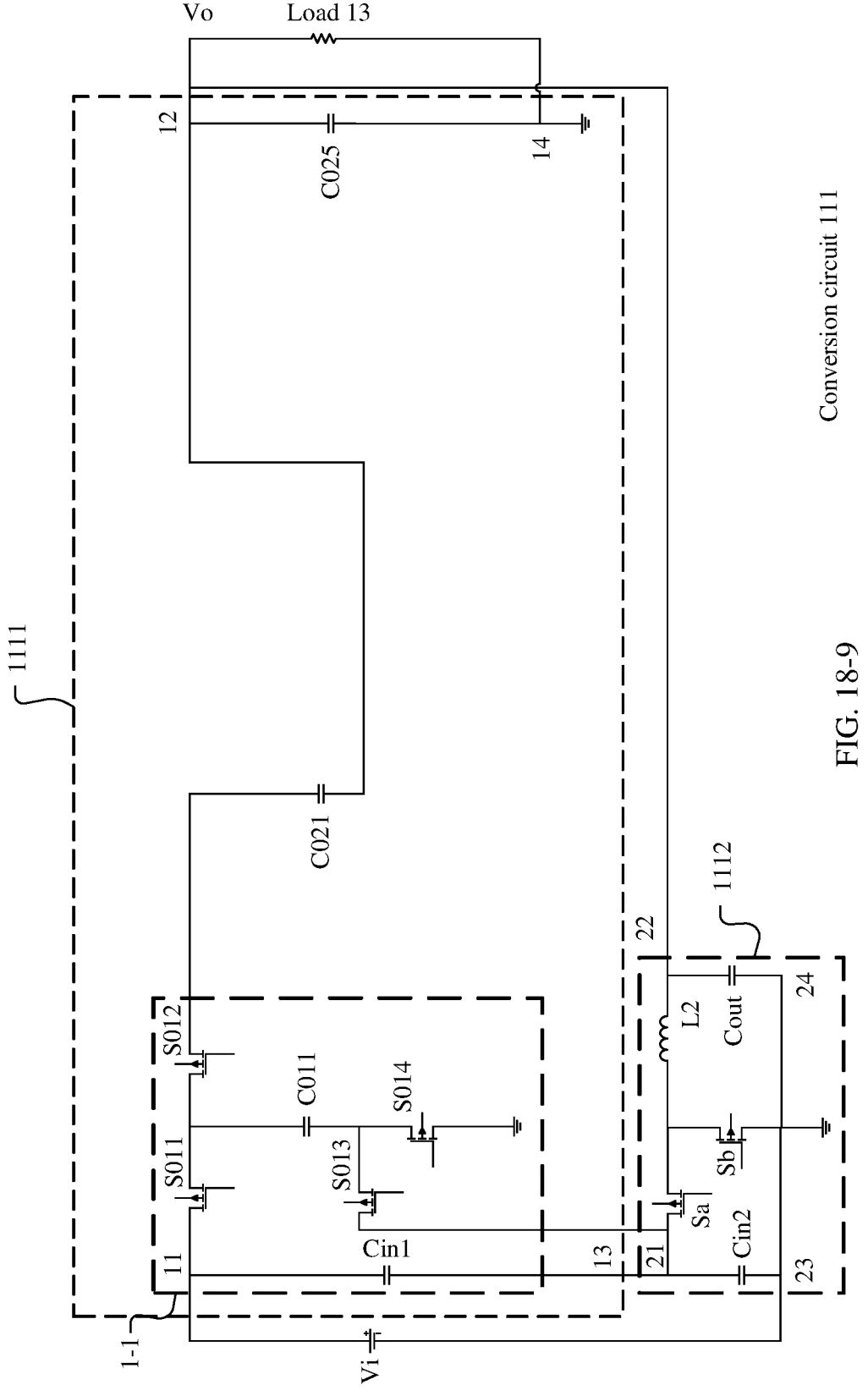

The controller 112 may switch on the first conversion switching transistor S021, the first conversion switching transistor S024, the first conversion switching transistor S027, and the second conversion switching transistor S028 in the first time period of the period T2. An equivalent circuit may be shown in FIG. 18-7. As shown in FIG. 18-7, the conversion capacitor C021, the conversion capacitor C022, and the conversion capacitor C025 are charged in series, and a voltage of each conversion capacitor is Vi1/3. It may be understood that other switching transistors may be kept switched off during this period.

In the second time period of the period T2, the controller 112 may switch on the second conversion switching transistors S022 and S025, and switch on the third conversion switching transistors S023 and S026. An equivalent circuit may be shown in FIG. 18-8. As shown in FIG. 18-8, the conversion capacitor C021, the conversion capacitor C022, and the conversion capacitor C025 discharge in parallel. Because the voltage of each of the conversion capacitor C021, the conversion capacitor C022, and the conversion capacitor C025 is Vi1/3, the output voltage Vo of each of the conversion capacitor C021, the conversion capacitor C022, and the conversion capacitor C025 is Vi1/3. It may be understood that other switching transistors may be kept switched off during this period.

The first transformation ratio N1 is set to 2.

The controller 112 may switch on the first conversion switching transistor S021, the first conversion switching transistor S024, and the second conversion switching transistor S025 in the first time period of the period T2, and an equivalent circuit may be shown in FIG. 18-9. As shown in FIG. 18-9, the conversion capacitor C021 and the conversion capacitor C025 are charged in series, and a voltage of each conversion capacitor is Vi1/2. It may be understood that other switching transistors may be kept switched off during this period.

Figures 10, 18:
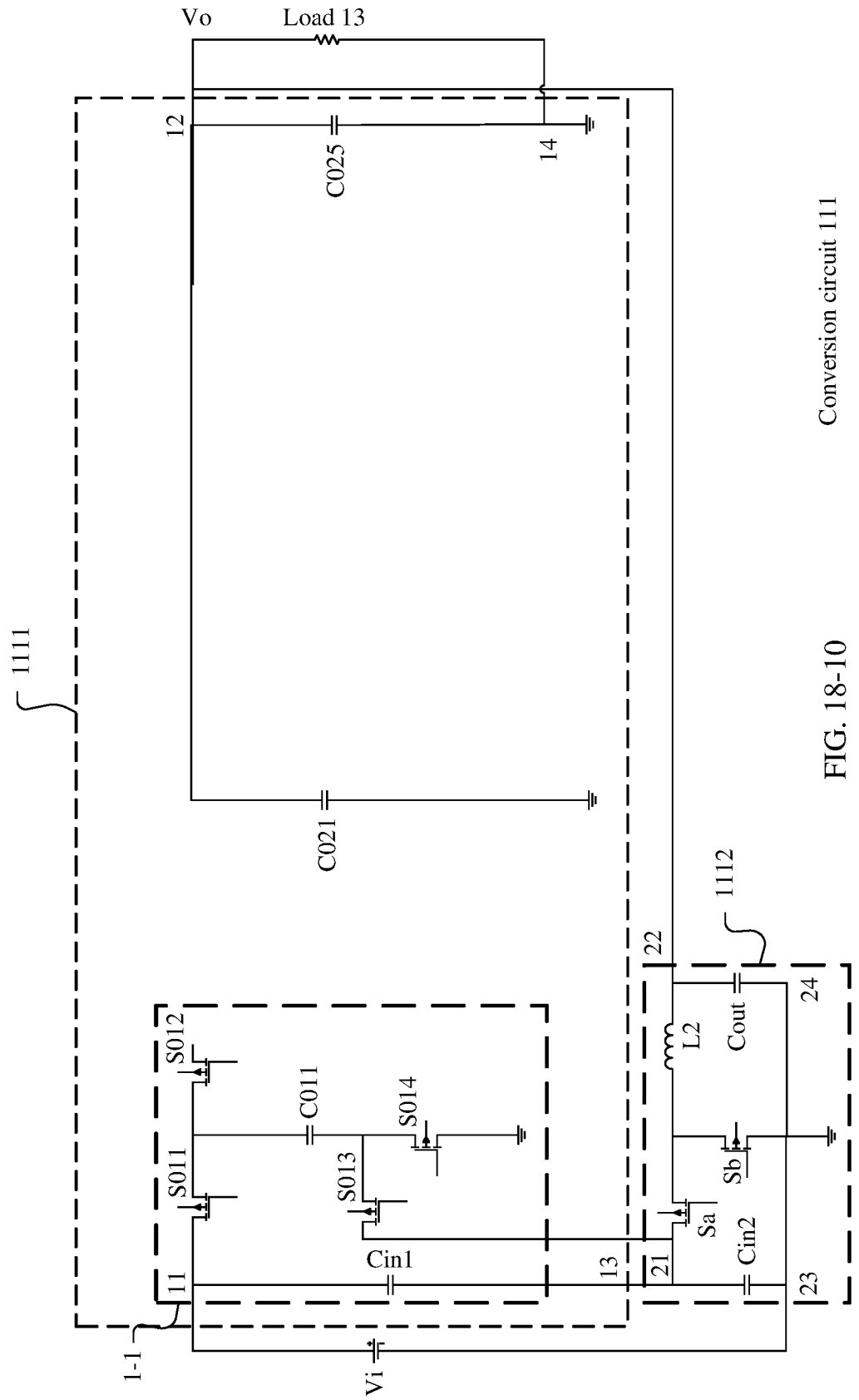
Figures 11, 18:
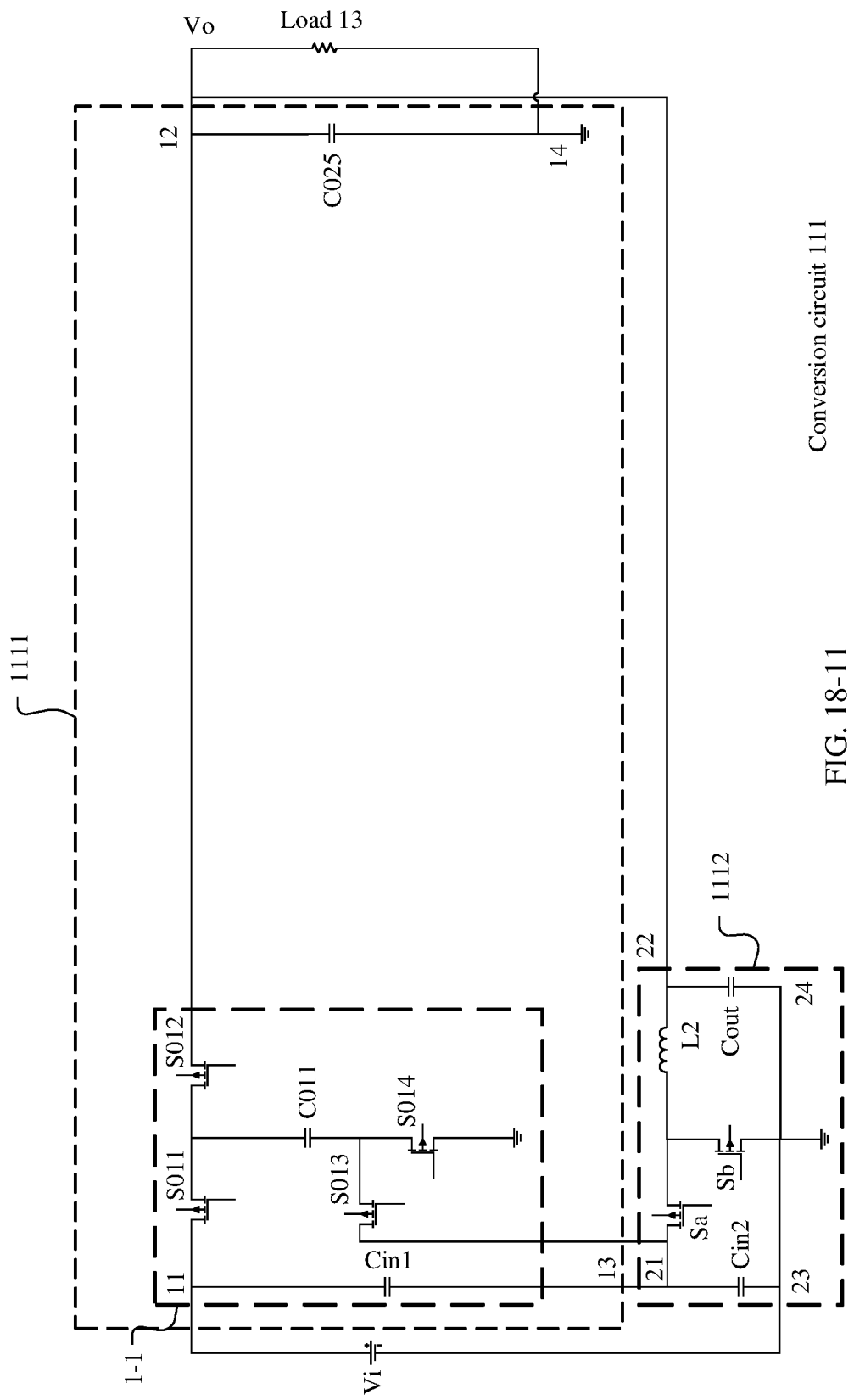

In the second time period of the period T2, the controller 112 may switch on the second conversion switching transistor S022 and the third conversion switching transistors S023. An equivalent circuit may be shown in FIG. 18-10. As shown in FIG. 18-10, the conversion capacitor C021 and the conversion capacitor C025 discharge in parallel. Because the voltage of each of the conversion capacitor C021 and the conversion capacitor C025 is Vi1/2, the output voltage Vo of each of the conversion capacitor C021 and the conversion capacitor C025 is Vi1/2. It may be understood that other switching transistors may be kept switched off during this period. The first transformation ratio N1 is set to 1.

The controller 112 may keep the first conversion switching transistor S021 and the second conversion switching transistor S022 switched on in the period T2, and an equivalent circuit may be shown in FIG. 18-11. The input voltage Vi1 is directly output from the output end 12, so that the output voltage Vo=Vi1. It may be understood that other switching transistors may be kept switched off during this period.

Example 3 of the First Branch Circuit 1111

Figure 19:
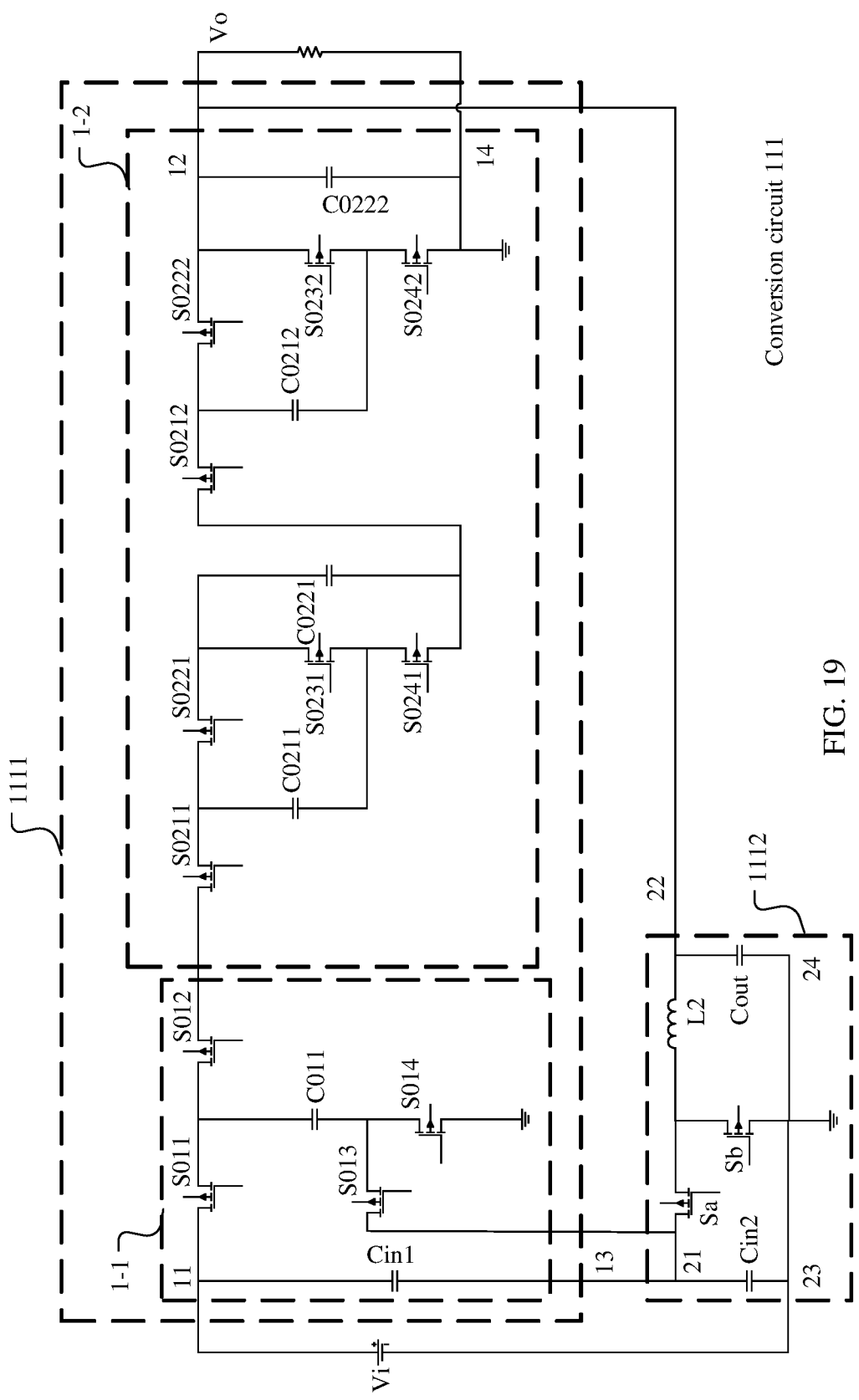
FIG. 19 is a schematic diagram of a structure of a specific conversion circuit according to an embodiment of this application.
Figures 1, 19:
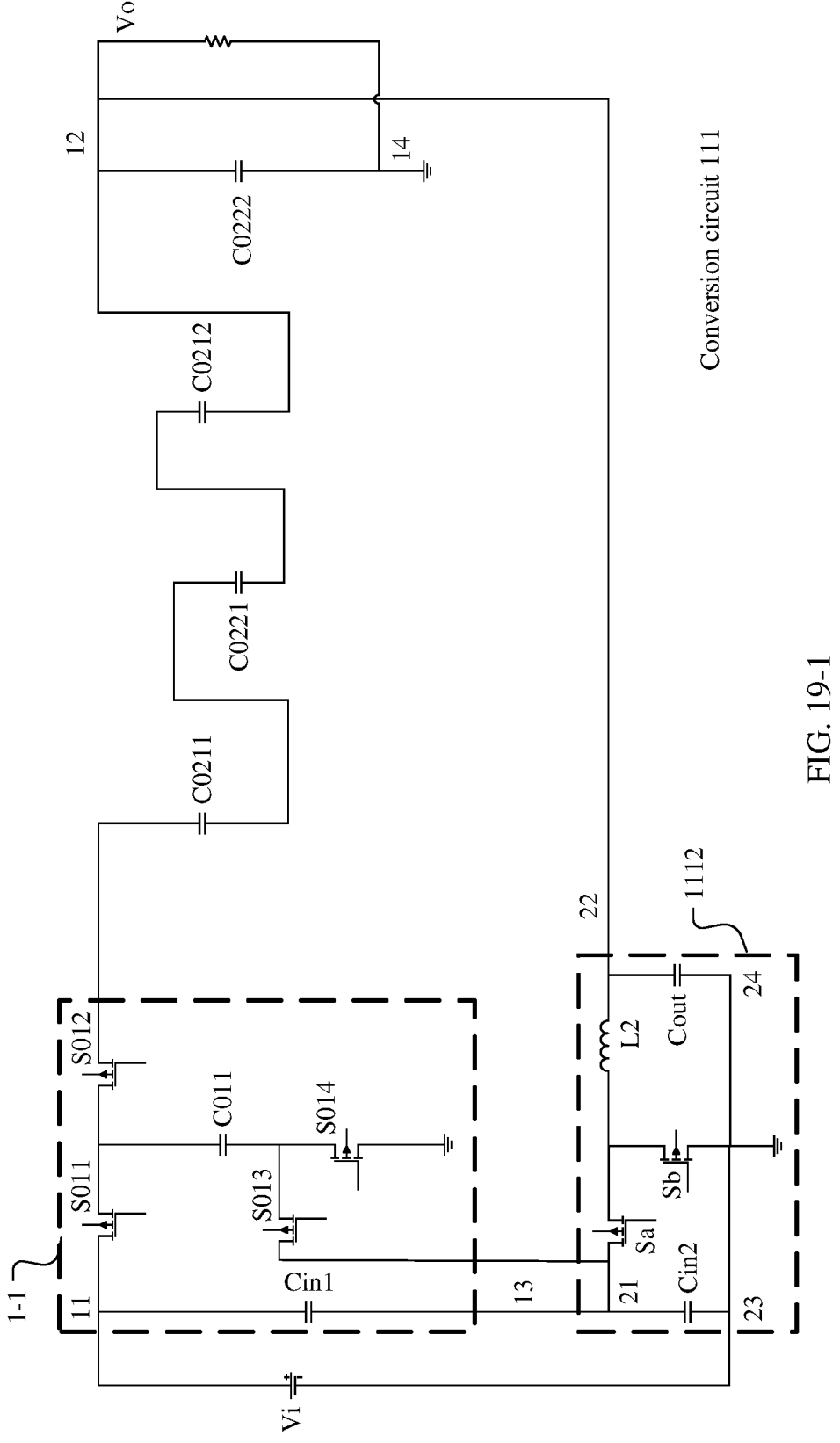
Figures 2, 19:
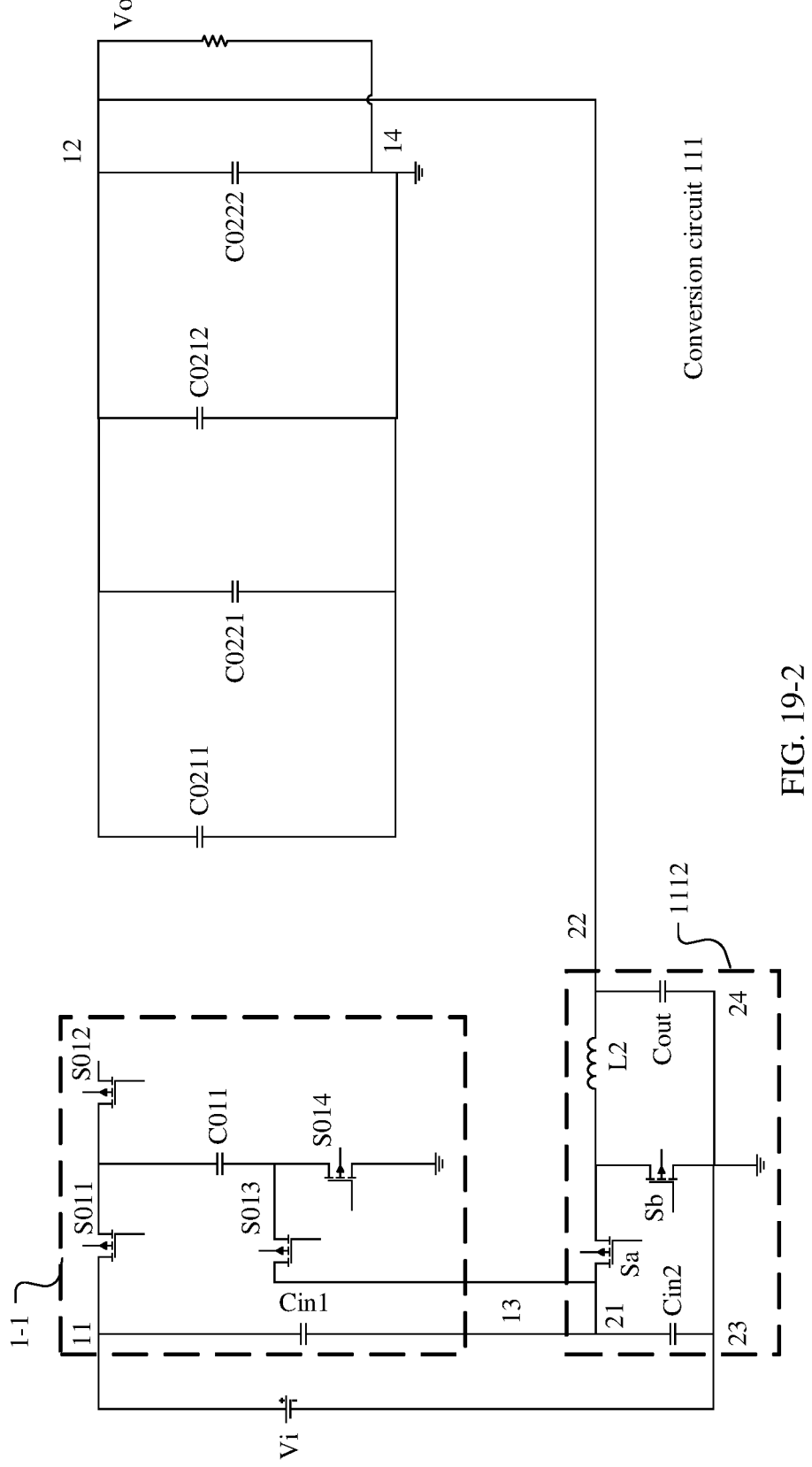
Figures 3, 19:
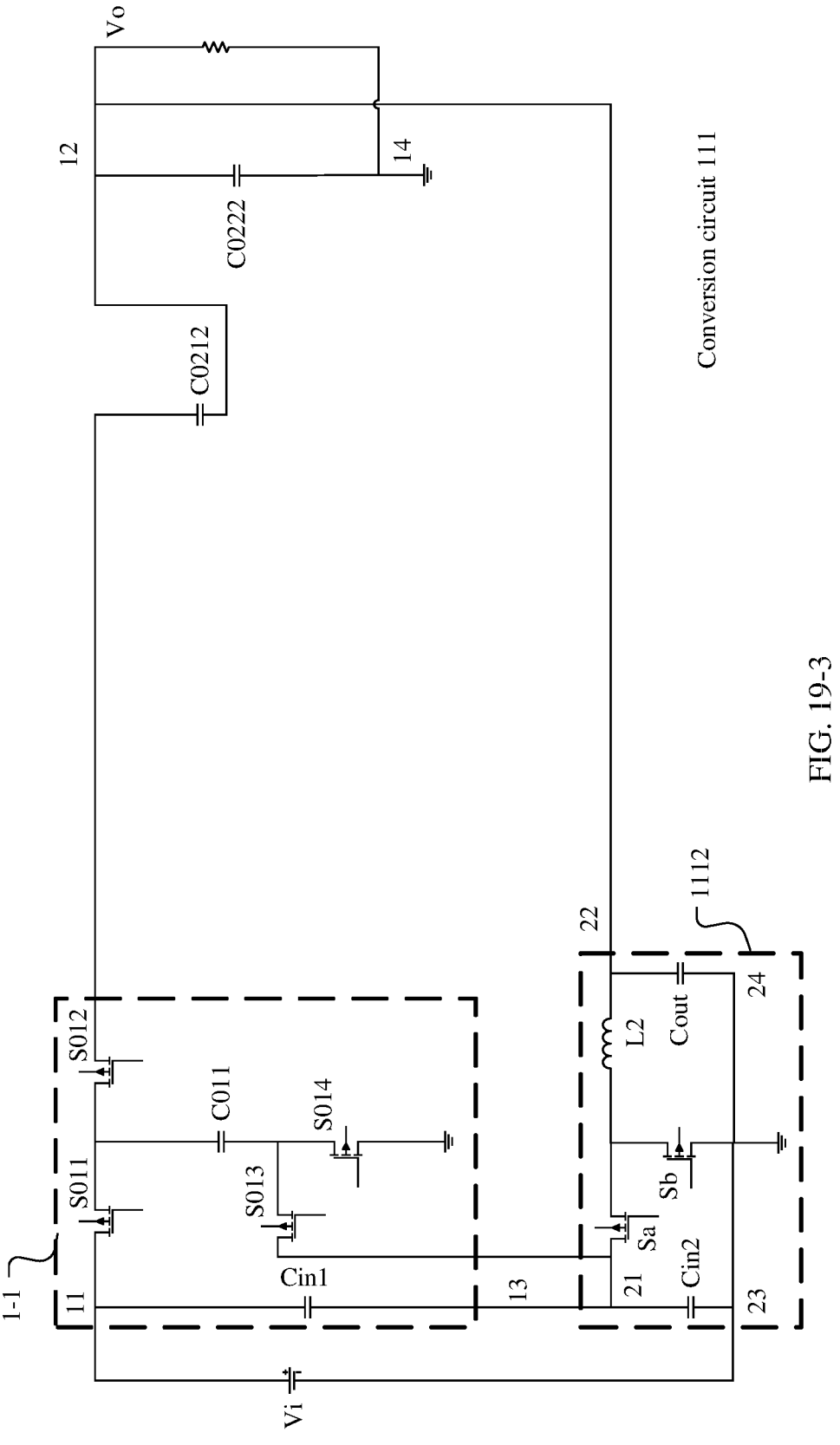
Figures 4, 19:
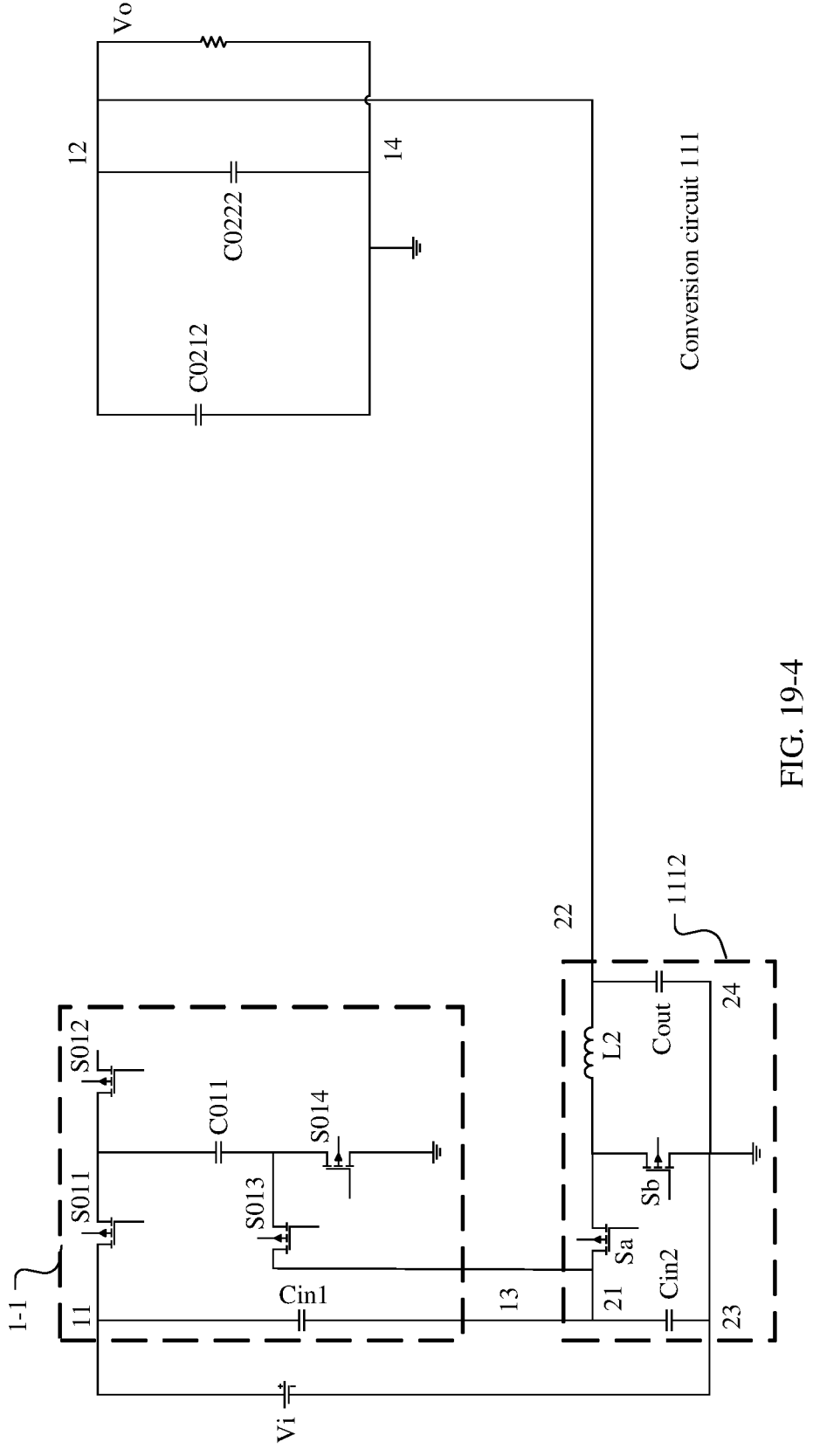
Figures 5, 19:
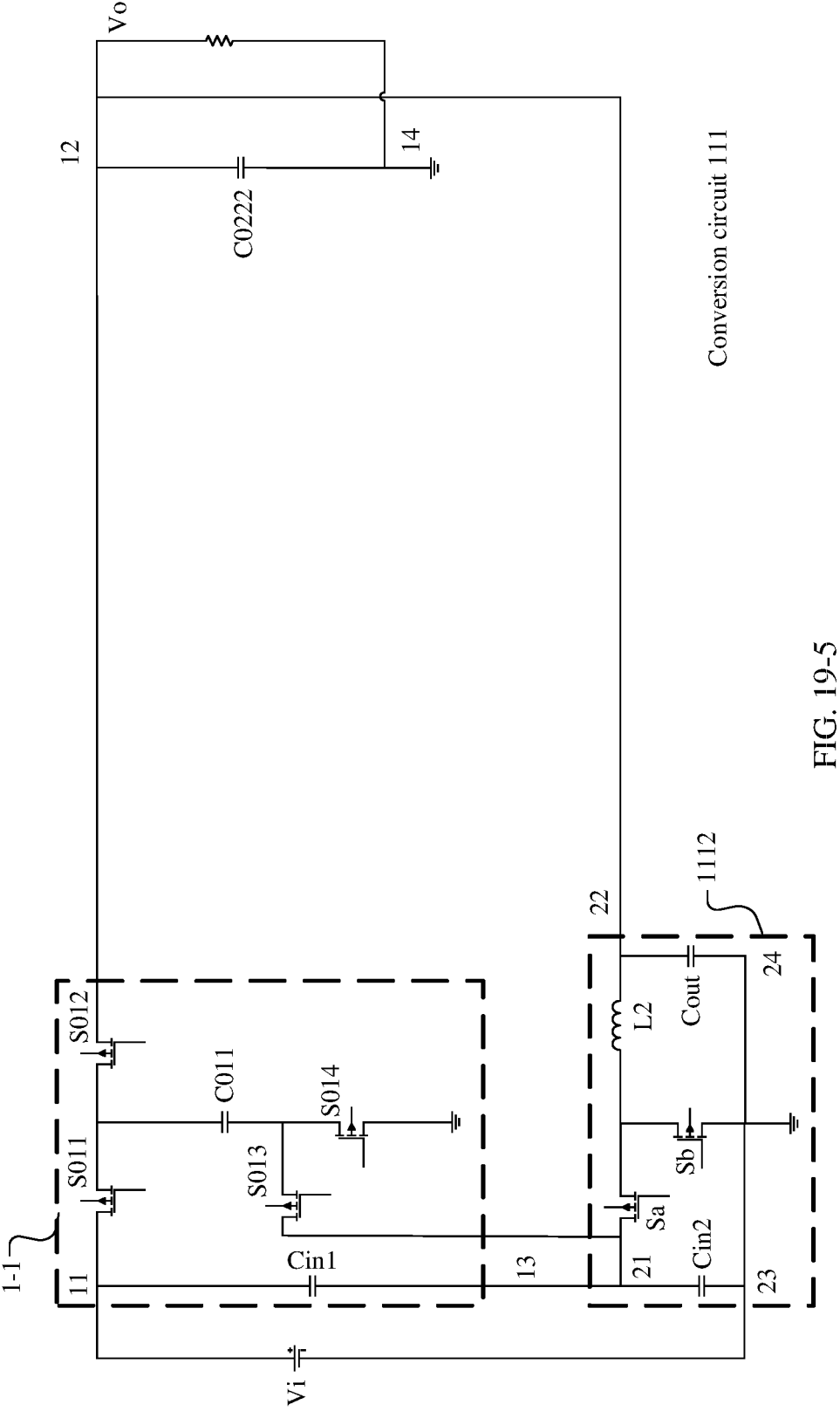

An embodiment of this application provides a conversion circuit 111, as shown in FIG. 19. The first branch circuit 1111 mainly includes an isolation unit 1-1 and a conversion unit 1-2.

Specifically, the conversion unit 1-2 mainly includes K first conversion capacitors, K second conversion capacitors, K first conversion switching transistors, K second conversion switching transistors, K third conversion switching transistors, and K fourth conversion switching transistors, and K is an integer greater than 1. In FIG. 19, a value of K is 2 is used as an example. The conversion unit 1-2 mainly includes first conversion capacitors C0211 and C0212, second conversion capacitors C0221 and C0222, first conversion switching transistors S0211 and S0212, second conversion switching transistors S0221 and S0222, third conversion switching transistors S0231 and S0232, and fourth conversion switching transistors S0241 and S0242.

In the conversion unit 1-2. one ends of the K first conversion capacitors are respectively connected to second electrodes of the K first conversion switching transistors and first electrodes of the K second conversion switching transistors in a one-to-one correspondence, and the other ends of the K first conversion capacitors are respectively connected to second electrodes of the K third conversion switching transistors and first electrodes of the K fourth conversion switching transistors in a one-to-one correspondence.

As shown in FIG. 19, one end of the first conversion capacitor C0211 is separately connected to a second electrode of the first conversion switching transistor S0211 and a first electrode of the second conversion switching transistor S0221, and the other end of the first conversion capacitor C0211 is separately connected to a second electrode of the third conversion switching transistor S0231 and a first electrode of the fourth conversion switching transistor S0241.

For another example, in FIG. 19, one end of the first conversion capacitor C0212 is separately connected to a second electrode of the first conversion switching transistor S0212 and a first electrode of the second conversion switching transistor S0222, and the other end of the first conversion capacitor C0212 is separately connected to a second electrode of the third conversion switching transistor S0232 and a first electrode of the fourth conversion switching transistor S0242.

In the conversion unit 1-2, one ends of the K second conversion capacitors are respectively connected to second electrodes of the K second conversion switching transistors and first electrodes of the K third conversion switching transistors in a one-to-one correspondence, and the other ends of the K second conversion capacitors are respectively connected to second electrodes of the K fourth conversion switching transistors in a one-to-one correspondence.

For example, in FIG. 19, one end of the second conversion capacitor C0221 is separately connected to a second electrode of the second conversion switching transistor S0221 and a first electrode of the third conversion switching transistor S0231, and the other end of the second conversion capacitor C0221 is separately connected to a second electrode of the fourth conversion switching transistor S0241.

For another example, in FIG. 19, one end of the second conversion capacitor C0222 is separately connected to a second electrode of the second conversion switching transistor S0222 and a first electrode of the third conversion switching transistor S0232, and the other end of the second conversion capacitor C0222 is separately connected to a second electrode of the fourth conversion switching transistor S0242.

In addition, in the conversion unit 1-2, second electrodes of first to $(K-1)^{th}$ fourth conversion switching transistors are respectively connected to first electrodes of second to $K^{th}$ first conversion switching transistors in a one-to-one correspondence. For example, in FIG. 19, the second electrode of the fourth conversion switching transistor S0241 is connected to a first electrode of the first conversion switching transistor S0212, and the second electrode of the fourth conversion switching transistor S0242 is grounded with the output end 14.

It can be learned from the conversion unit 1-2 shown in FIG. 19 that, the conversion unit 1-2 cannot be connected in parallel to the input capacitor Cin1, and therefore cannot directly receive the input voltage Vi1. In view of this, the first branch circuit 1111 may further include the isolation unit 1-1. For specific implementation of the isolation unit 1-1, refer to Example 2 of the first branch circuit 1111. Details are not described herein again.

The conversion unit 1-2 may convert the input voltage Vi1. Specifically, in a first time period of a period T2, the controller 112 may switch on the first conversion switching transistors S0211 and S0212, and switch on the third conversion switching transistors S0231 and S0232, and an equivalent circuit is shown in FIG. 19-1. As shown in FIG. 19-1, the first conversion capacitor C0211, the second conversion capacitor C0221, the first conversion capacitor C0212, and the second conversion capacitor C0222 are sequentially charged in series, and a voltage of each conversion capacitor is Vi1/4. It may be understood that the other switching transistors should be kept switched off during this period.

In a second time period of the period T2, the controller 112 may switch on the second conversion switching transistors S0221 and S0222, and switch on the fourth conversion switching transistors S0241 and S0242, and an equivalent circuit is shown in FIG. 19-2. It can be learned from FIG. 19-2 that, the first conversion capacitor C0211, the second conversion capacitor C0221, the first conversion capacitor C0212, and the second conversion capacitor C0222 discharge in parallel. Because a voltage of each conversion capacitor is Vi1/4, the output voltage Vo of the conversion unit 1-2 is Vi1/4. It may be understood that the controller 112 may keep the other switching transistors switched off during this period.

It can be learned from the foregoing conversion process that a maximum transformation ratio of the first branch circuit 1111 shown in FIG. 19 is 4, which is equal to twice a quantity of first conversion capacitors in the first branch circuit 1111. That is, if the first branch circuit 1111 includes K first conversion capacitors, the maximum transformation ratio of the first branch circuit 1111 is 2K.

The first branch circuit 1111 shown in FIG. 19 may also implement transformation ratios of 2 and 1. Details are as follows: The first transformation ratio N1 is set to 2:

The controller 112 may switch on the first conversion switching transistor S0211, the second conversion switching transistor S0221, the third conversion switching transistor S0231, and the fourth conversion switching transistor S0241 in the first time period of the period T2, and an equivalent circuit may be shown in FIG. 19-3. It can be learned from FIG. 19-3, the first conversion capacitor C0211 and the second conversion capacitor C0221 are short-circuited. The controller 112 further needs to switch on the first conversion switching transistor S0212 and the third conversion switching transistor S0232, so that the first conversion capacitor C0212 and the second conversion capacitor C0222 are charged in series, and a voltage of each conversion capacitor is Vi1/2. It may be understood that the controller 112 may keep the other switching transistors switched off during this period.

In the second time period of the period T2, the controller 112 may keep the first conversion switching transistor S0211, the second conversion switching transistor S0221, the third conversion switching transistor S0231, and the fourth conversion switching transistor S0241 switched on, switch off the first conversion switching transistor S0212 and the third conversion switching transistor S0232, and switch on the second conversion switching transistor S0222 and the fourth conversion switching transistor S0242. An equivalent circuit is shown in FIG. 19-4. As shown in FIG. 19-4, the first conversion capacitor C0212 and the second conversion capacitor C0222 discharge in parallel. Because the voltage of the first conversion capacitor C0212 and the voltage of the second conversion capacitor C0222 are Vi1/2 each, the output voltage Vo of the conversion unit 1-2 is Vi1/2.

The first transformation ratio N1 is set to 1:

The controller 112 may keep the first conversion switching transistors S0211 and S0212, the second conversion switching transistors S0221 and S0222, the third conversion switching transistors S0231 and S0232, the fourth conversion switching transistors S0241 and S0242 switched on in the period T2, and an equivalent circuit may be shown in FIG. 19-5. The input voltage Vi1 is directly output from the output end 12, so that the output voltage Vo=Vi1.

Example 4 of the First Branch Circuit 1111

Figure 20:
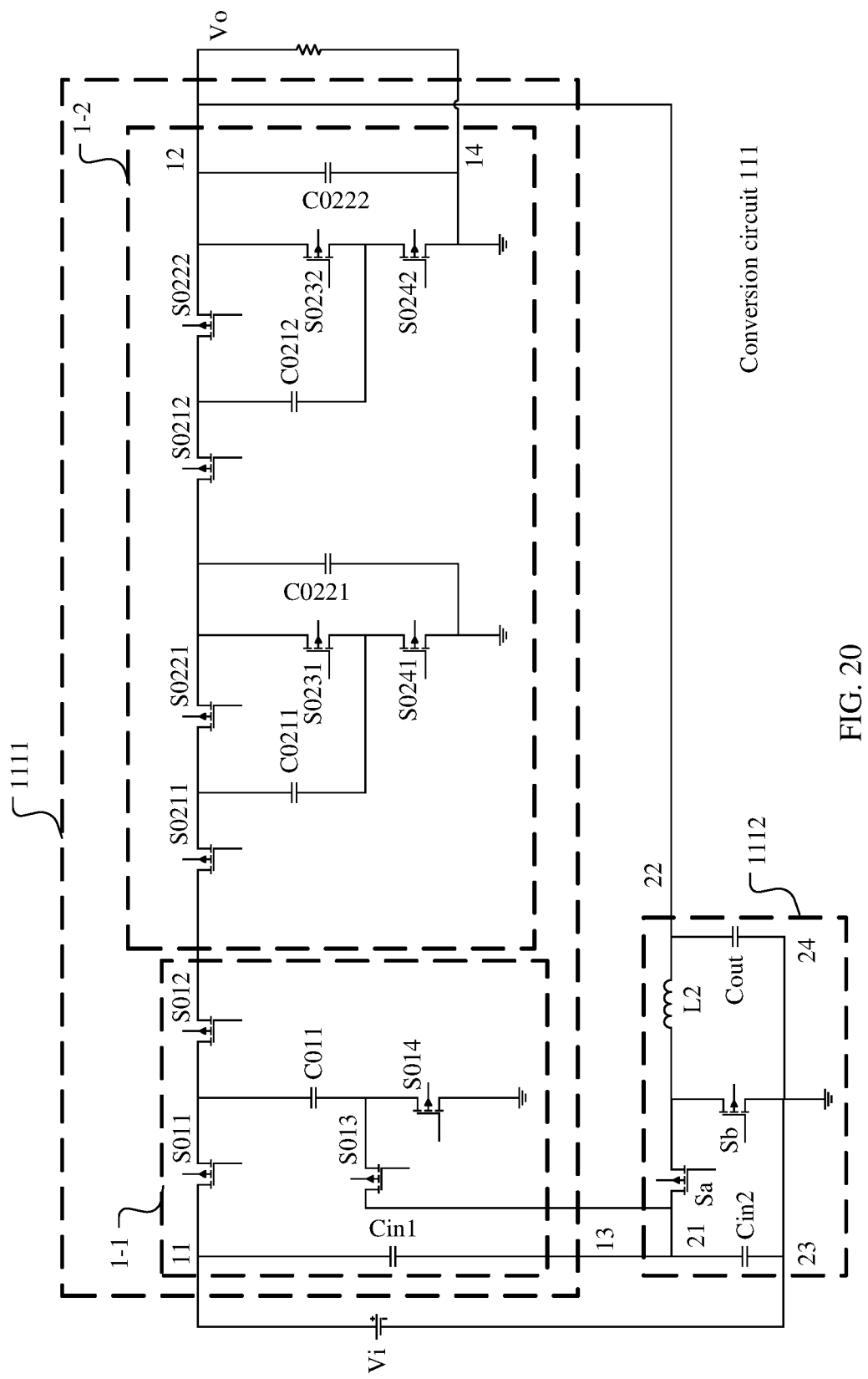
FIG. 20 is a schematic diagram of a structure of a specific conversion circuit according to an embodiment of this application.
Figures 1, 20:
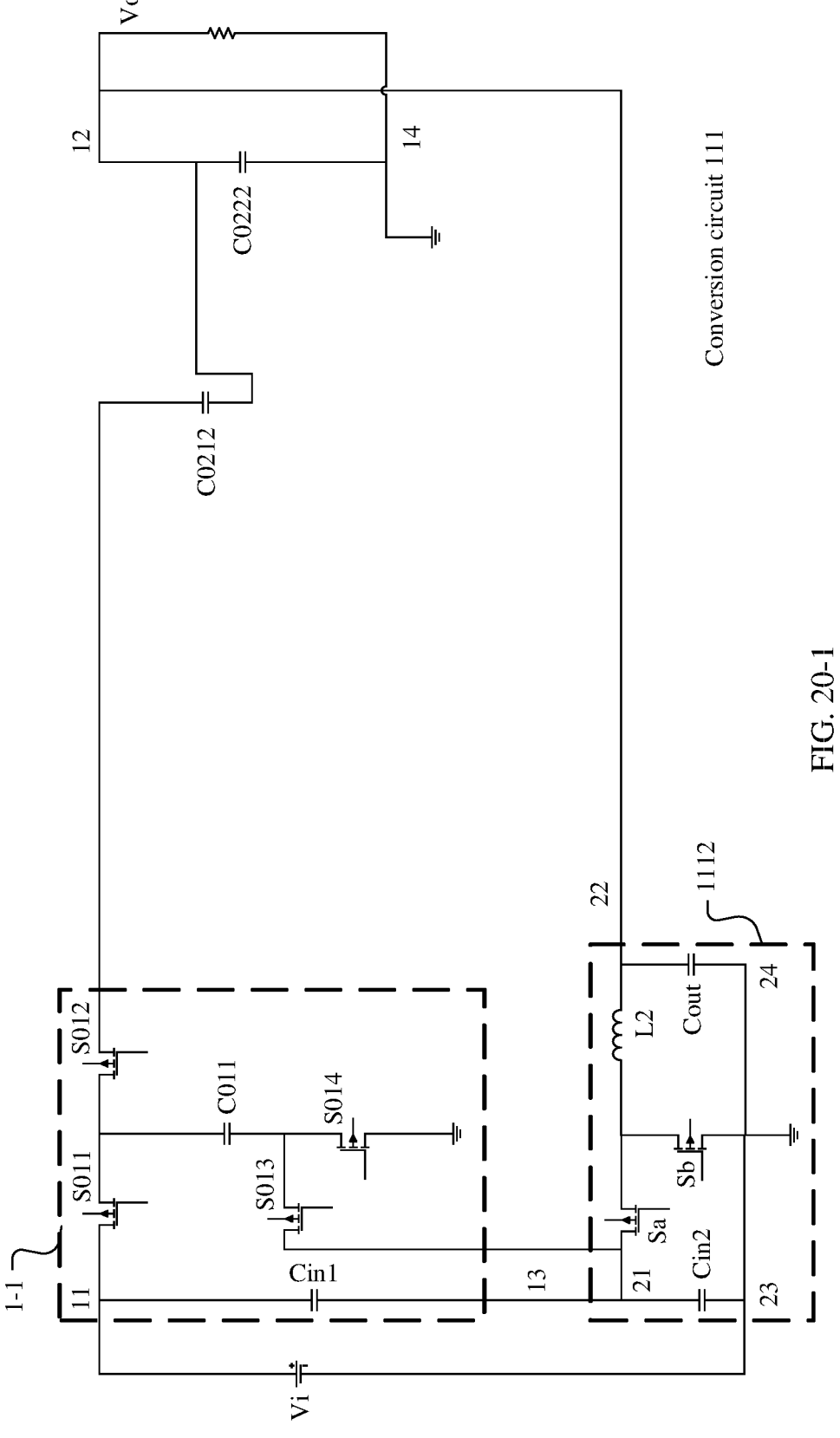
Figures 2, 20:
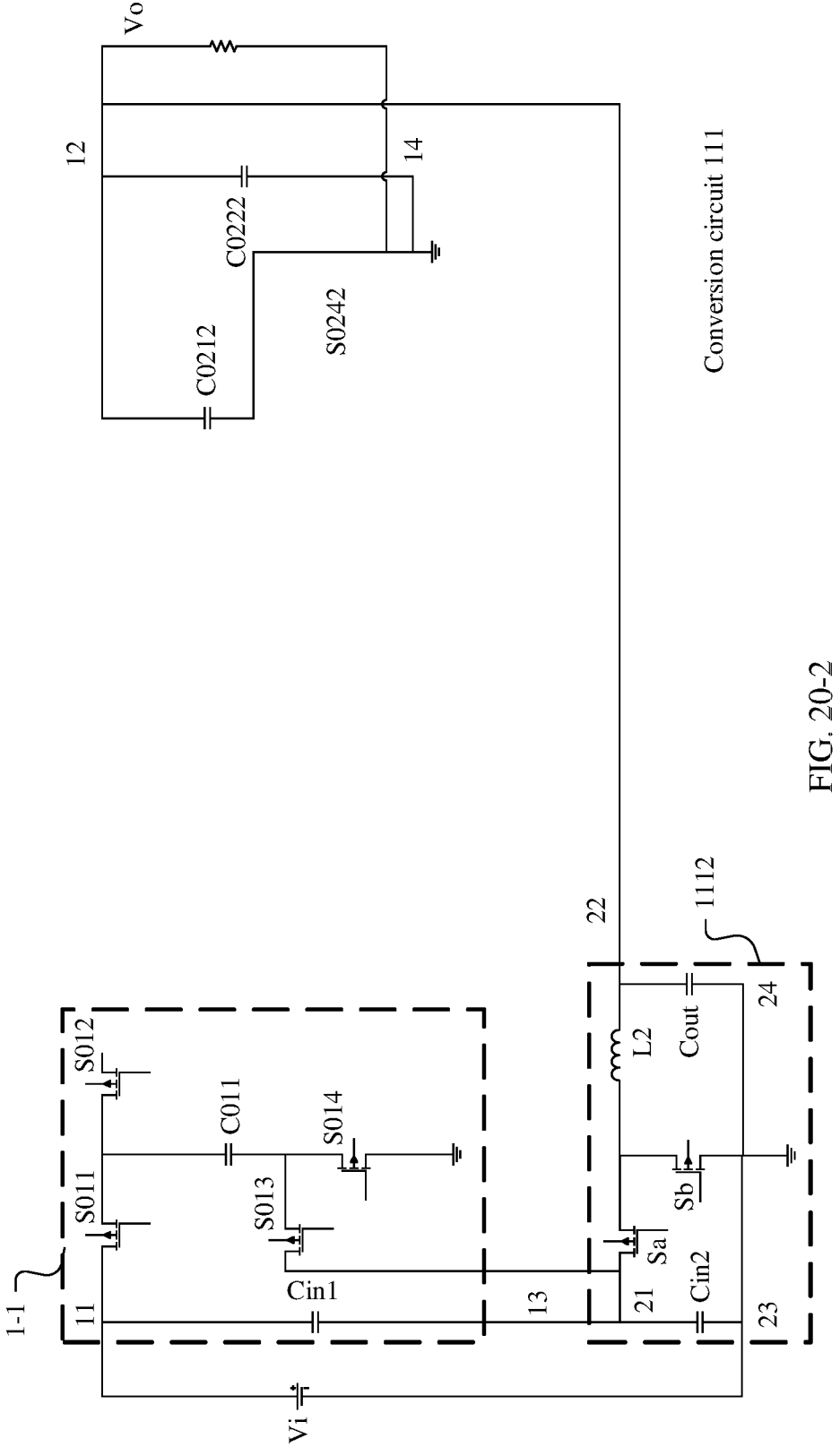
Figures 3, 20:
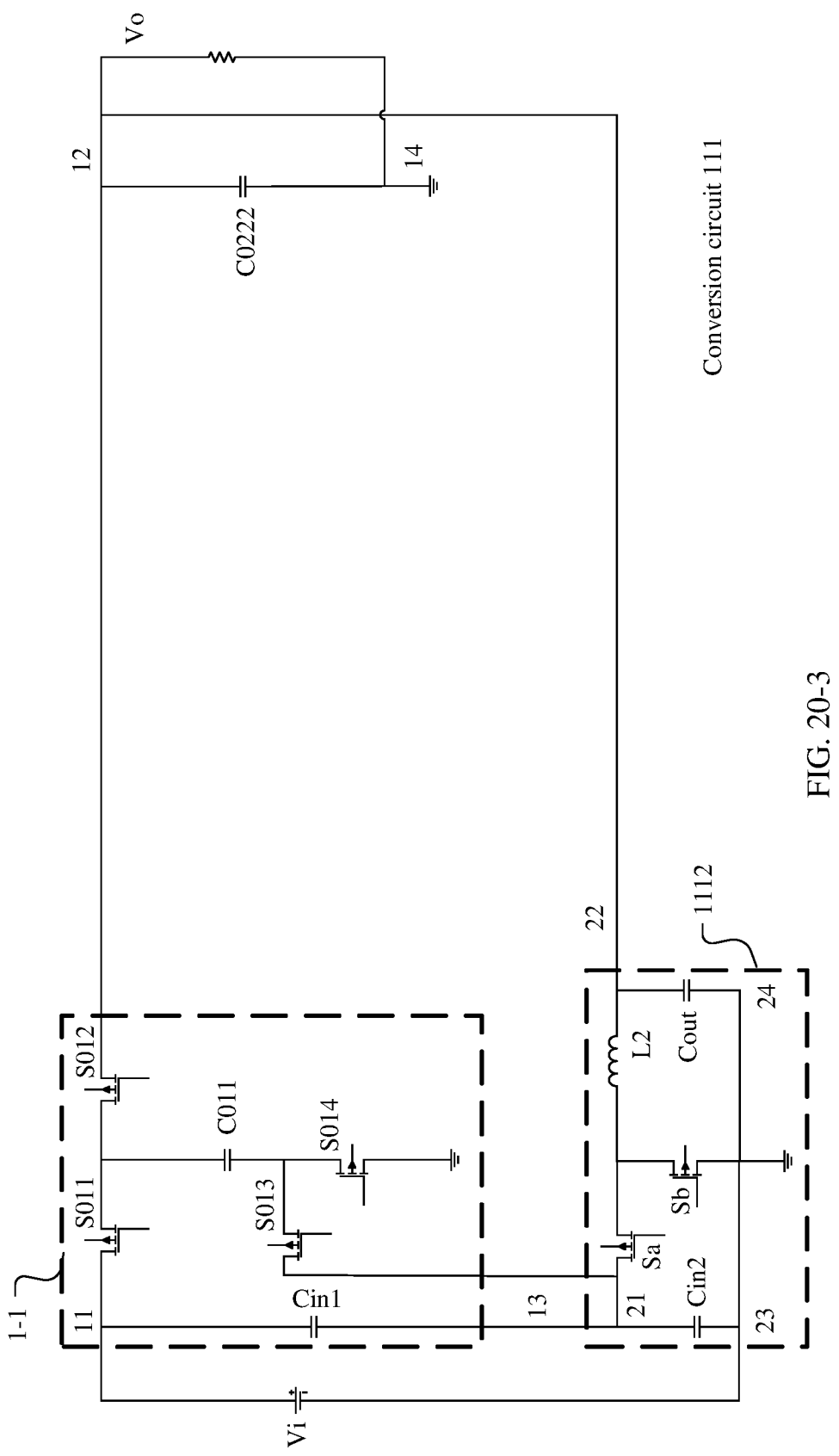

An embodiment of this application provides a conversion circuit 111, as shown in FIG. 20. The first branch circuit 1111 mainly includes an isolation unit 1-1 and a conversion unit 1-2.

Specifically, the conversion unit 1-2 mainly includes K first conversion capacitors. K second conversion capacitors, K first conversion switching transistors, K second conversion switching transistors, K third conversion switching transistors, and K fourth conversion switching transistors. In FIG. 20, a value of K is 2 is used as an example. The conversion unit 1-2 mainly includes first conversion capacitors C0211 and C0212, second conversion capacitors C0221 and C0222. first conversion switching transistors S0211 and S0212, second conversion switching transistors S0221 and S0222, third conversion switching transistors S0231 and S0232, and fourth conversion switching transistors S0241 and S0242.

In the conversion unit 1-2, one ends of the K first conversion capacitors are respectively connected to second electrodes of the K first conversion switching transistors and first electrodes of the K second conversion switching transistors in a one-to-one correspondence, and the other ends of the K first conversion capacitors are respectively connected to second electrodes of the K third conversion switching transistors and first electrodes of the K fourth conversion switching transistors in a one-to-one correspondence.

As shown in FIG. 20, one end of the first conversion capacitor C0211 is separately connected to a second electrode of the first conversion switching transistor S0211 and a first electrode of the second conversion switching transistor S0221, and the other end of the first conversion capacitor C0211 is separately connected to a second electrode of the third conversion switching transistor S0231 and a first electrode of the fourth conversion switching transistor S0241.

For another example, in FIG. 20, one end of the first conversion capacitor C0212 is separately connected to a second electrode of the first conversion switching transistor S0212 and a first electrode of the second conversion switching transistor S0222, and the other end of the first conversion capacitor C0212 is separately connected to a second electrode of the third conversion switching transistor S0232 and a first electrode of the fourth conversion switching transistor S0242.

In the conversion unit 1-2, one ends of the K second conversion capacitors are respectively connected to second electrodes of the K second conversion switching transistors and first electrodes of the K third conversion switching transistors in a one-to-one correspondence, and the other ends of the K second conversion capacitors are connected to second electrodes of the K fourth conversion switching transistors in a one-to-one correspondence.

For example, in FIG. 20, one end of the second conversion capacitor C0221 is separately connected to a second electrode of the second conversion switching transistor S0221 and a first electrode of the third conversion switching transistor S0231, and the other end of the second conversion capacitor C0221 is separately connected to a second electrode of the fourth conversion switching transistor S0241.

For another example, in FIG. 20, one end of the second conversion capacitor C0222 is separately connected to a second electrode of the second conversion switching transistor S0222 and a first electrode of the third conversion switching transistor S0232, and the other end of the second conversion capacitor C0222 is separately connected to a second electrode of the fourth conversion switching transistor S0242.

In addition, in the conversion unit 1-2, the second electrodes of the K fourth conversion switching transistors are grounded with the output end 14, second electrodes of first to $(K-1)^{th}$ second conversion switching transistors are respectively connected to first electrodes of second to $K^{th}$ first conversion switching transistors in a one-to-one correspondence, and a second electrode of a $K^{th}$ second conversion switching transistor is connected to the output end 12.

For example, in FIG. 20, the second electrodes of the fourth conversion switching transistors S0241 and S0242 are grounded, the second electrode of the second conversion switching transistor S0221 is connected to a first electrode of the first conversion switching transistor S0212, and the second electrode of the second conversion switching transistor S0222 is connected to the output end 12.

It can be learned from the conversion unit 1-2 shown in FIG. 20 that, the conversion unit 1-2 cannot be connected in parallel to the input capacitor Cin1, and therefore cannot directly receive the input voltage Vi1. In view of this, the first branch circuit 1111 may further include the isolation unit 1-1. For specific implementation of the isolation unit 1-1, refer to Example 2 of the first branch circuit 1111. Details are not described herein again.

The conversion unit 1-2 may convert the input voltage Vi1. For a specific implementation in which the controller 112 sets the first transformation ratio N1 to 4, refer to Example 3 of the first branch circuit 1111. Details are not described herein again.

The first transformation ratio N1 is set to 2:

The controller 112 may switch on the first conversion switching transistor S0211 and the second conversion switching transistor S0221, and switch off the third conversion switching transistor S0231 and the fourth conversion switching transistor S0241 in a first time period of a period T2. The controller 112 further needs to switch on the first conversion switching transistor S0212 and the third conversion switching transistor S0232, and an equivalent circuit is shown in FIG. 20-1. The first conversion capacitor C0212 and the second conversion capacitor C0222 are charged in series, and a voltage of each conversion capacitor is Vi1/2.

In a second time period of the period T2, the controller 112 may keep the first conversion switching transistor S0211 and the second conversion switching transistor S0221 switched on, and keep the third conversion switching transistor S0231 and the fourth conversion switching transistor S0241 switched off. The controller 112 switches off the first conversion switching transistor S0212 and the third conversion switching transistor S0232, and switches on the second conversion switching transistor S0222 and the fourth conversion switching transistor S0242. An equivalent circuit is shown in FIG. 20-2. The first conversion capacitor C0212 and the second conversion capacitor C0222 c. Because the voltage of the first conversion capacitor C0212 and the voltage of the second conversion capacitor C0222 are Vi1/2 each, the output voltage Vo of the conversion unit 1-2 is Vi1/2.

The first transformation ratio N1 is set to 1:

The controller 112 may keep the first conversion switching transistors S0211 and S0212 and the second conversion switching transistors S0221 and S0222 switched on, and keep the third conversion switching transistors S0231 and S0232, and the fourth conversion switching transistors S0241 and S0242 switched off in the period T2, and an equivalent circuit is shown in FIG. 20-3. Therefore, the output voltage Vo=Vi1 can be implemented.

Example 5 of the First Branch Circuit 1111

Figure 21:
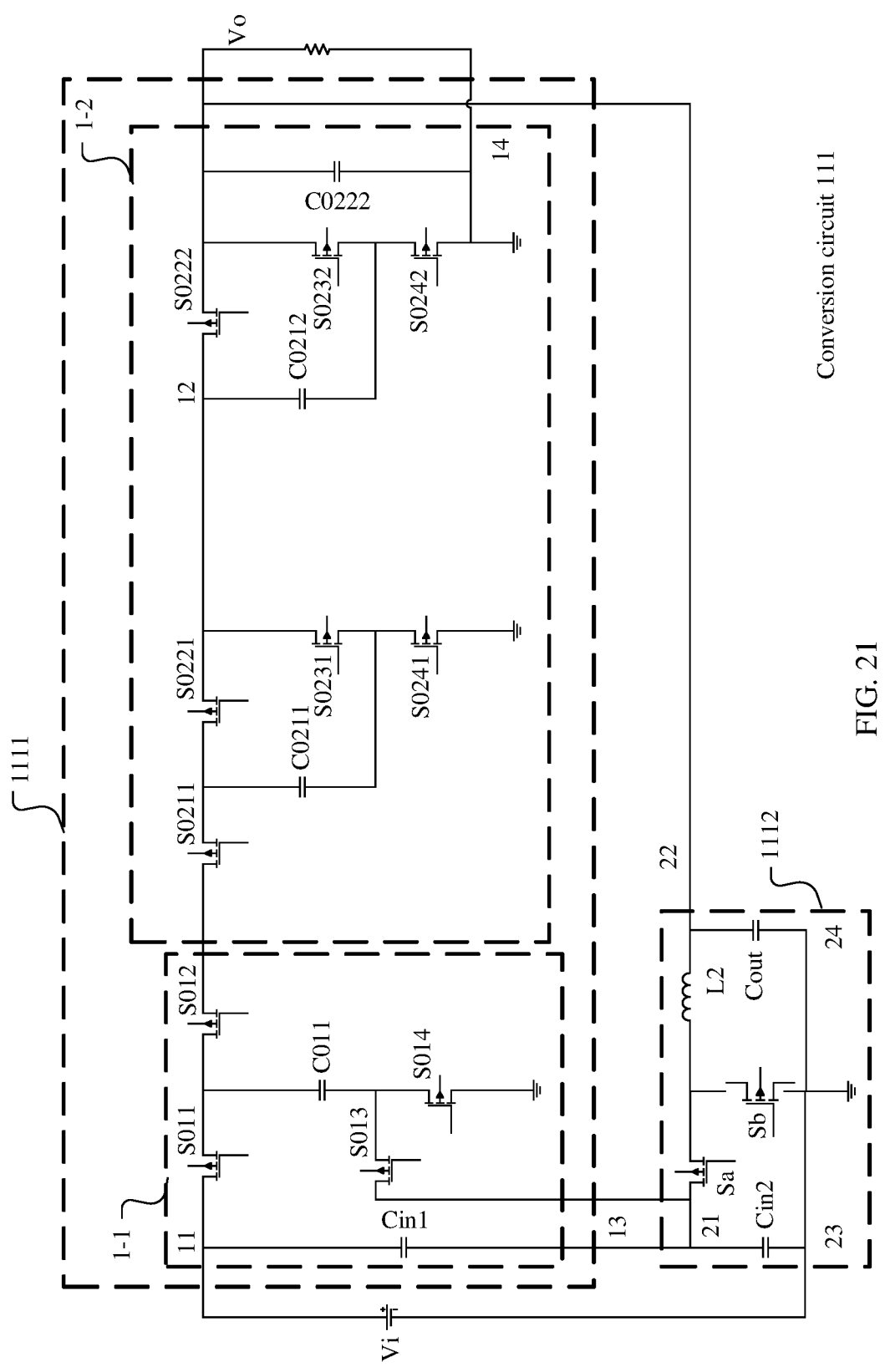
FIG. 21 is a schematic diagram of a structure of a specific conversion circuit according to an embodiment of this application.
Figures 1, 21:
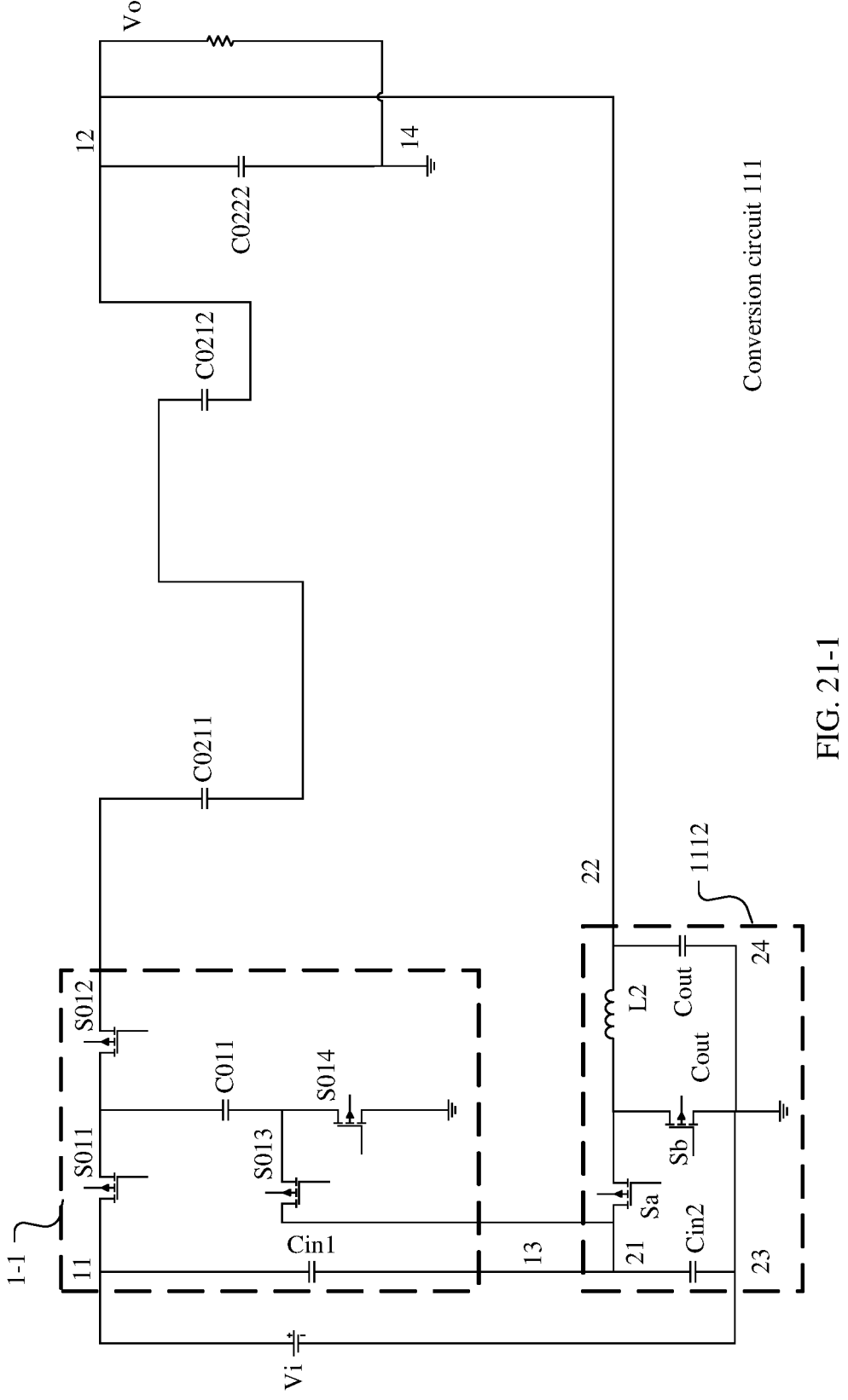
Figures 2, 21:
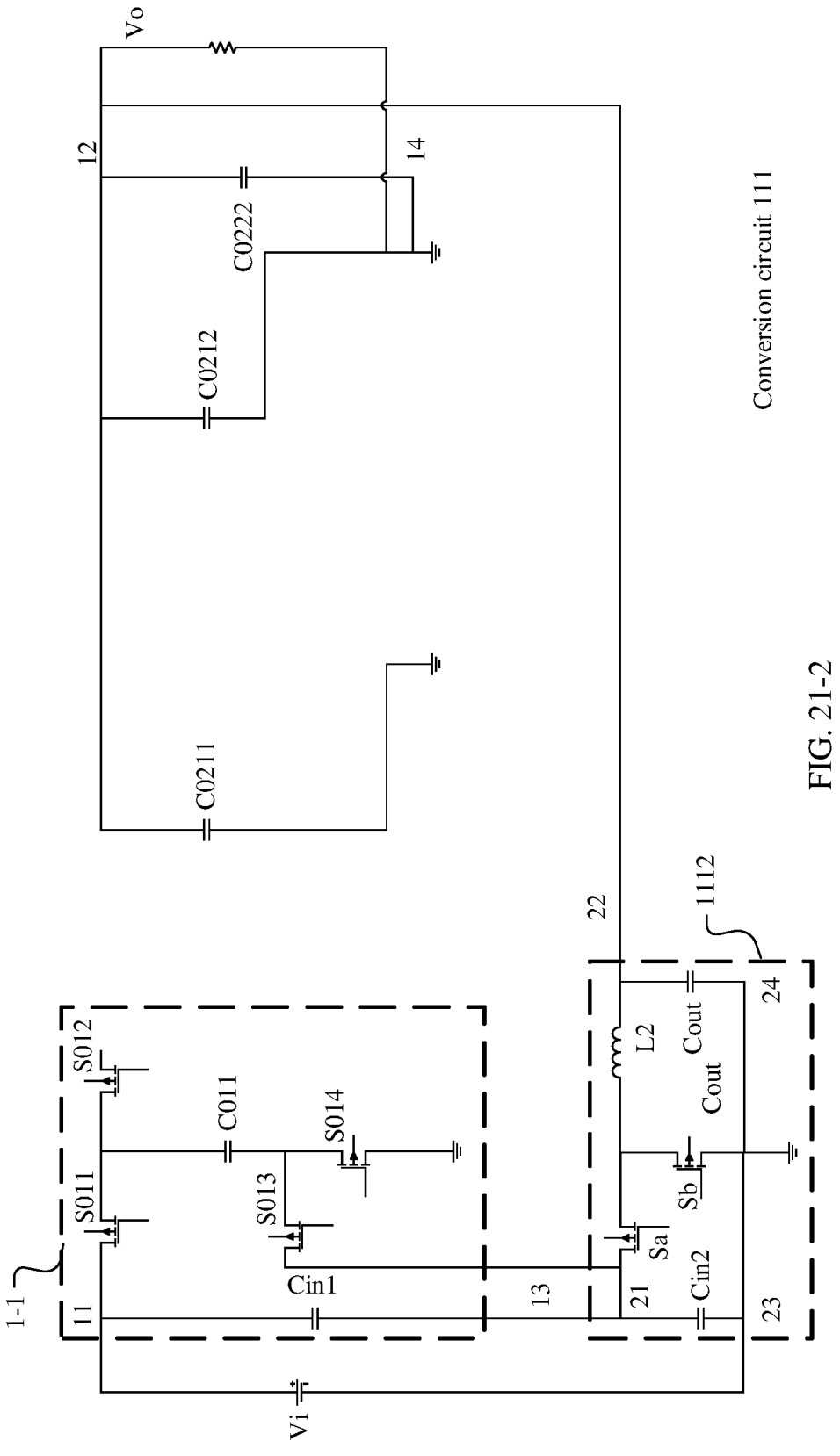
Figures 3, 21:
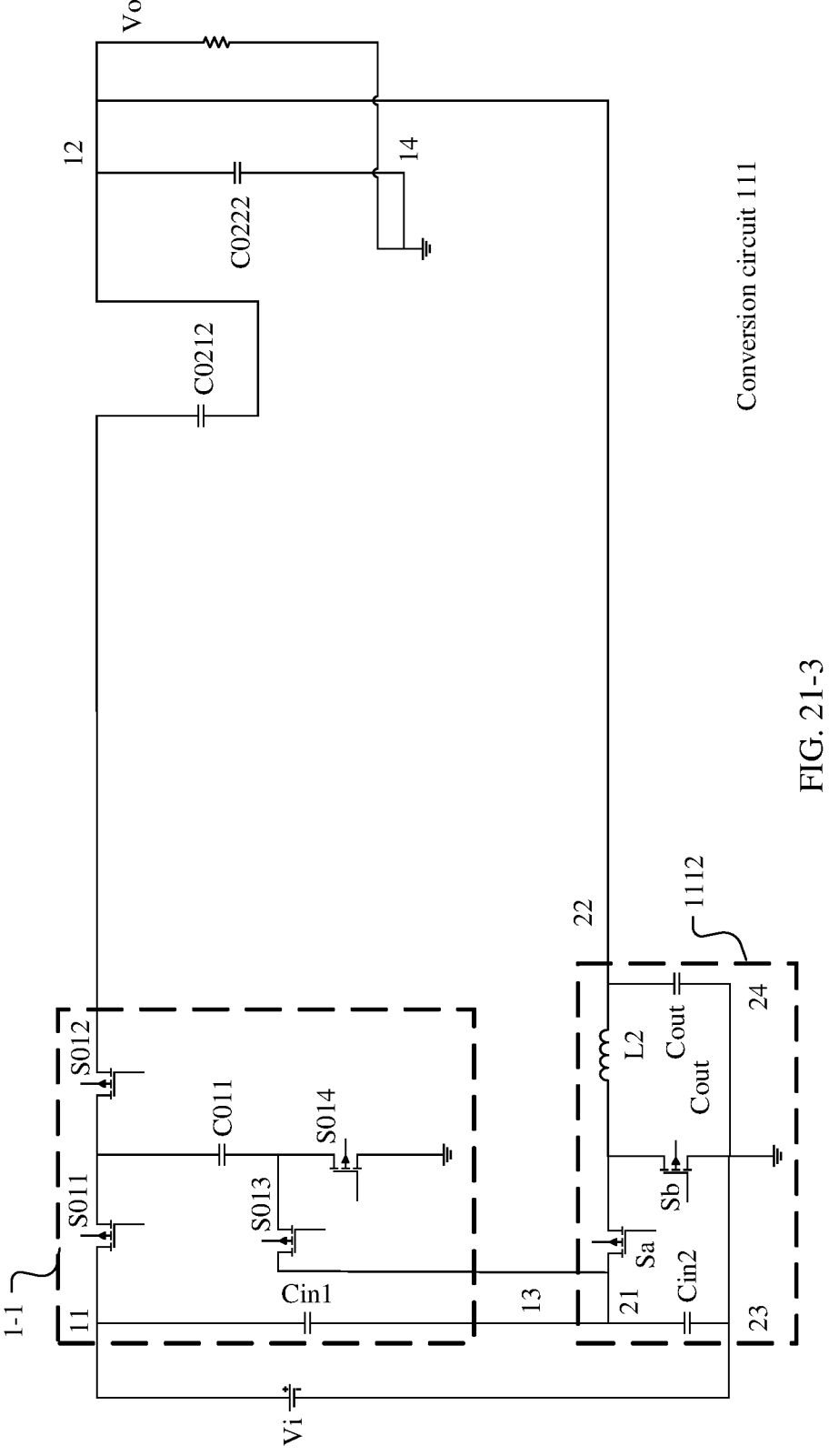
Figures 4, 21:
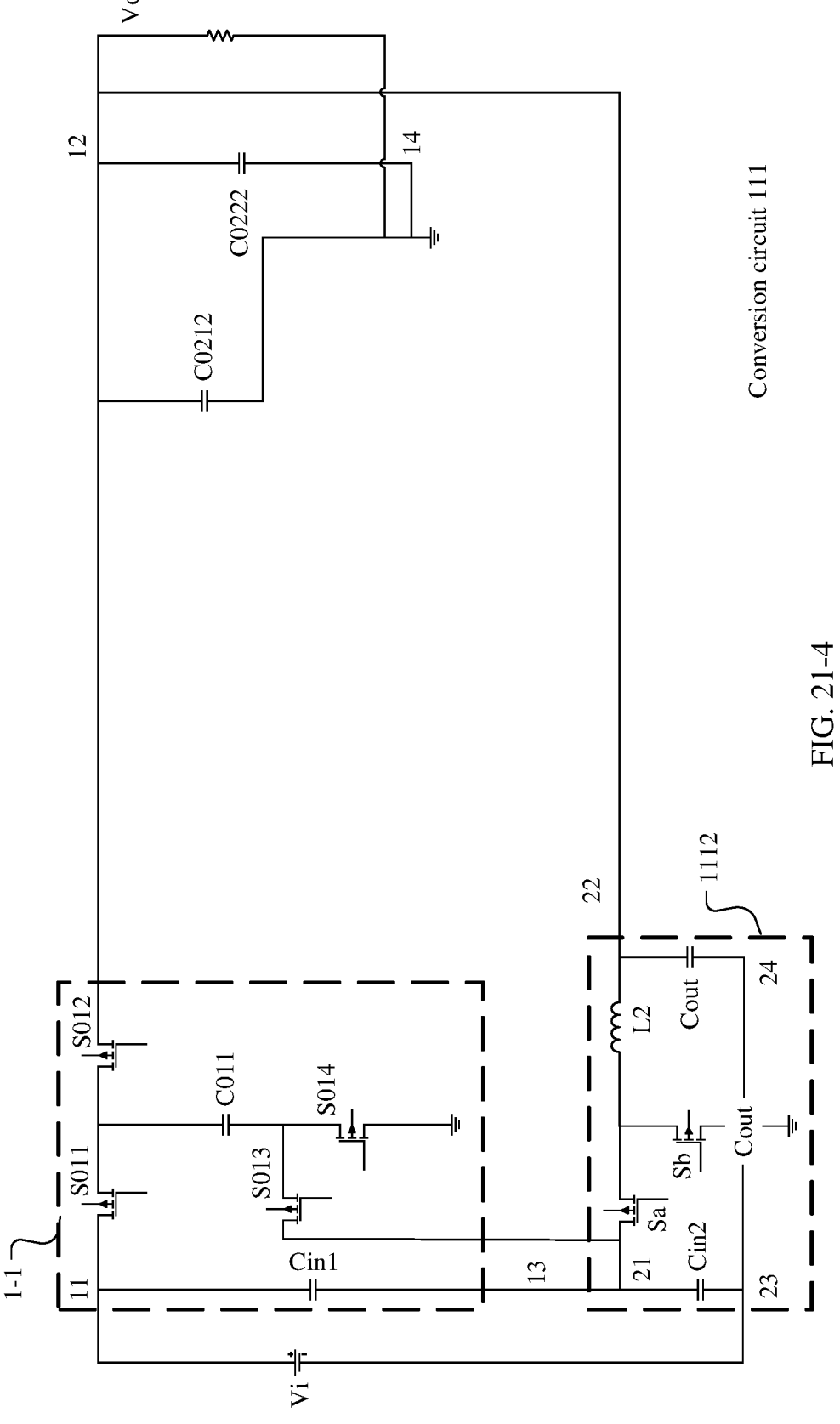
Figures 5, 21:
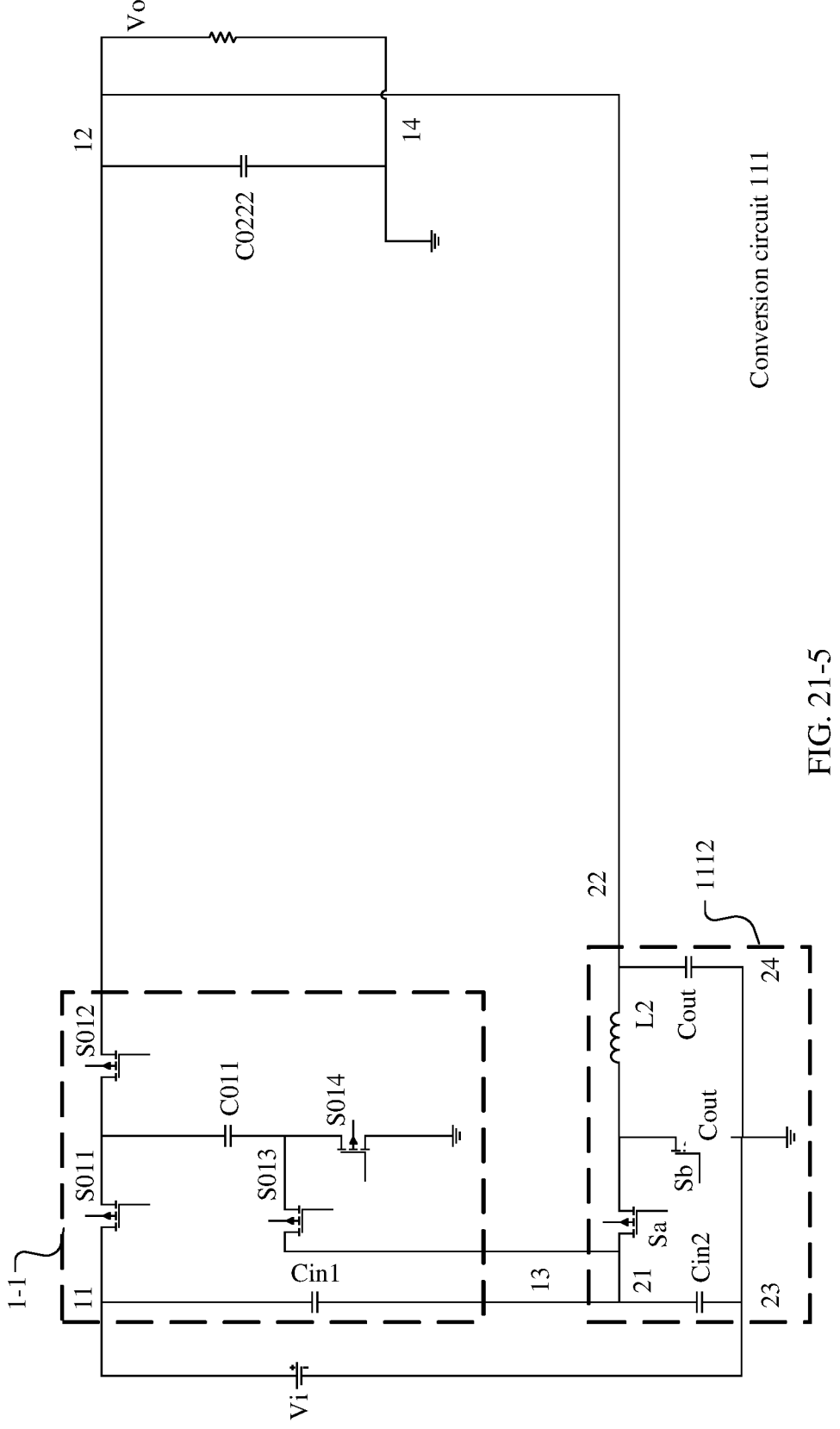

An embodiment of this application provides a conversion circuit 111, as shown in FIG. 21. The first branch circuit 1111 mainly includes an isolation unit 1-1 and a conversion unit 1-2.

Specifically, the conversion unit 1-2 mainly includes K first conversion capacitors, a first conversion switching transistor, K second conversion switching transistors, K third conversion switching transistors, K fourth conversion switching transistors, and a second conversion capacitor, and K is an integer greater than 1. In FIG. 21, a value of K is 2 is used as an example. The conversion unit 1-2 mainly includes first conversion capacitors C0211 and C0212, a first conversion switching transistor S0211, second conversion switching transistors S0221 and S0222, third conversion switching transistors S0231 and S0232, fourth conversion switching transistors S0241 and S0242, and a second conversion capacitor C0222.

In the conversion unit 1-2, one ends of the K first conversion capacitors are respectively connected to first electrodes of the K second conversion switching transistors in a one-to-one correspondence, and the other ends of the K first conversion capacitors are respectively connected to second electrodes of the K third conversion switching transistors and first electrodes of the K fourth conversion switching transistors in a one-to-one correspondence.

As shown in FIG. 21, one end of the first conversion capacitor C0211 is connected to a first electrode of the second conversion switching transistor S0221, and the other end of the first conversion capacitor C0211 is separately connected to a second electrode of the third conversion switching transistor S0231 and a first electrode of the fourth conversion switching transistor S0241. For another example, in FIG. 21, one end of the first conversion capacitor C0212 is connected to a first electrode of the second conversion switching transistor S0222, and the other end of the first conversion capacitor C0212 is separately connected to a second electrode of the third conversion switching transistor S0232 and a first electrode of the fourth conversion switching transistor S0242.

In the conversion unit 1-2, second electrodes of the K fourth conversion switching transistors are grounded with the output end 14, the K second conversion switching transistors are sequentially connected, a first electrode of a first second conversion switching transistor is connected to a second electrode of the first conversion switching transistor, and a second electrode of a $K^{th}$ second conversion switching transistor is connected to the output end 12.

For example, in FIG. 21, second electrodes of the fourth conversion switching transistors S0241 and S0242 are grounded, a second electrode of the second conversion switching transistor S0221 is connected to a first electrode of the first conversion switching transistor S0211, and a second electrode of the second conversion switching transistor S0222 is connected to the output end 12.

It can be learned from the conversion unit 1-2 shown in FIG. 21 that, the conversion unit 1-2 cannot be connected in parallel to the input capacitor Cin1, and therefore cannot directly receive the input voltage Vi1. In view of this, the first branch circuit 1111 may further include the isolation unit 1-1. For specific implementation of the isolation unit 1-1, refer to Example 2 of the first branch circuit 1111. Details are not described herein again.

The conversion unit 1-2 may convert the input voltage Vi1. Specifically, in a first time period of a period T2, the controller 112 may switch on the first conversion switching transistor S0211, and switch on the third conversion switching transistor S0231 and S0232, and an equivalent circuit is shown in FIG. 21-1. The first conversion capacitor C0211, the first conversion capacitor C0212, and the second conversion capacitor C0222 are connected in series and charged, and a voltage of each conversion capacitor is Vi1/3. It may be understood that the other switching transistors should be kept switched off during this period.

In a second time period of the period T2, the controller 112 may switch on the second conversion switching transistors S0221 and S0222, and switch on the fourth conversion switching transistors S0241 and S0242, and an equivalent circuit is shown in FIG. 21-2. The first conversion capacitor C0211, the first conversion capacitor C0212, and the second conversion capacitor C0222 discharge in parallel. Because a voltage of each conversion capacitor is Vi1/3, the output voltage Vo of the conversion unit 1-2 is Vi1/3. It may be understood that the controller 112 may keep the other switching transistors switched off during this period.

It can be learned from the foregoing conversion process that a maximum transformation ratio of the first branch circuit 1111 shown in FIG. 21 is 3, which is equal to a quantity of first conversion capacitors in the first branch circuit 1111 plus 1. That is, if the first branch circuit 1111 includes K first conversion capacitors, the maximum transformation ratio of the first branch circuit 1111 is K+1.

The first branch circuit 1111 shown in FIG. 21 may also implement transformation ratios of 2 and 1. Details are as follows:

When the first transformation ratio N1 is set to 2, the controller 112 may switch on the first conversion switching transistor S0211 and the second conversion switching transistor S0221, and switch off the third conversion switching transistor S0231 and the fourth conversion switching transistor S0241 in the first time period of the period T2. The controller 112 further needs to switch on the third conversion switching transistor S0232, and an equivalent circuit may be shown in FIG. 21-3. The first conversion capacitor C0212 and the second conversion capacitor C0222 are charged in series, and a voltage of each conversion capacitor is Vi1/2.

In the second time period of the period T2, the controller 112 may keep the first conversion switching transistor S0211 and the second conversion switching transistor S0221 switched on, and keep the third conversion switching transistor S0231 and the fourth conversion switching transistor S0241 switched off. The controller 112 switches off the third conversion switching transistor S0232, and switches on the second conversion switching transistor S0222 and the fourth conversion switching transistor S0242. An equivalent circuit may be shown in FIG. 21-4. The first conversion capacitor C0212 and the second conversion capacitor C0222 discharge in parallel. Because the voltage of the first conversion capacitor C0212 and the voltage of the second conversion capacitor C0222 are Vi1/2 each, the output voltage Vo of the conversion unit 1-2 is Vi 1/2.

When the first transformation ratio N1 is set to 1, the controller 112 may keep the first conversion switching transistor S0211, the second conversion switching transistors S0221 and S0222 switched on, and keep the third conversion switching transistors S0231 and S0232, and the fourth conversion switching transistors S0241 and S0242 switched off in the period T2, and an equivalent circuit may be shown in FIG. 21-5. The input voltage Vi1 is directly output from the output end 12, so that the output voltage Vo=Vi1.

Example 6 of the First Branch Circuit 1111

In Example 1 to Example 5, the first branch circuit 1111 supports only the transformation ratio of an integer value. In a possible implementation, the first branch circuit 1111 may further include a first adjustable inductor, and the first adjustable inductor may output the output voltage Vo obtained through the conversion by the first branch circuit. Because the first adjustable inductor is disposed in the first branch circuit 1111, the first branch circuit 1111 can perform finer adjustment on the output voltage Vo by using the first adjustable inductor. That is, the first transformation ratio N1 may change continuously in a specific range, and a value of the first transformation ratio N1 may be a non-integer.

Figure 22:
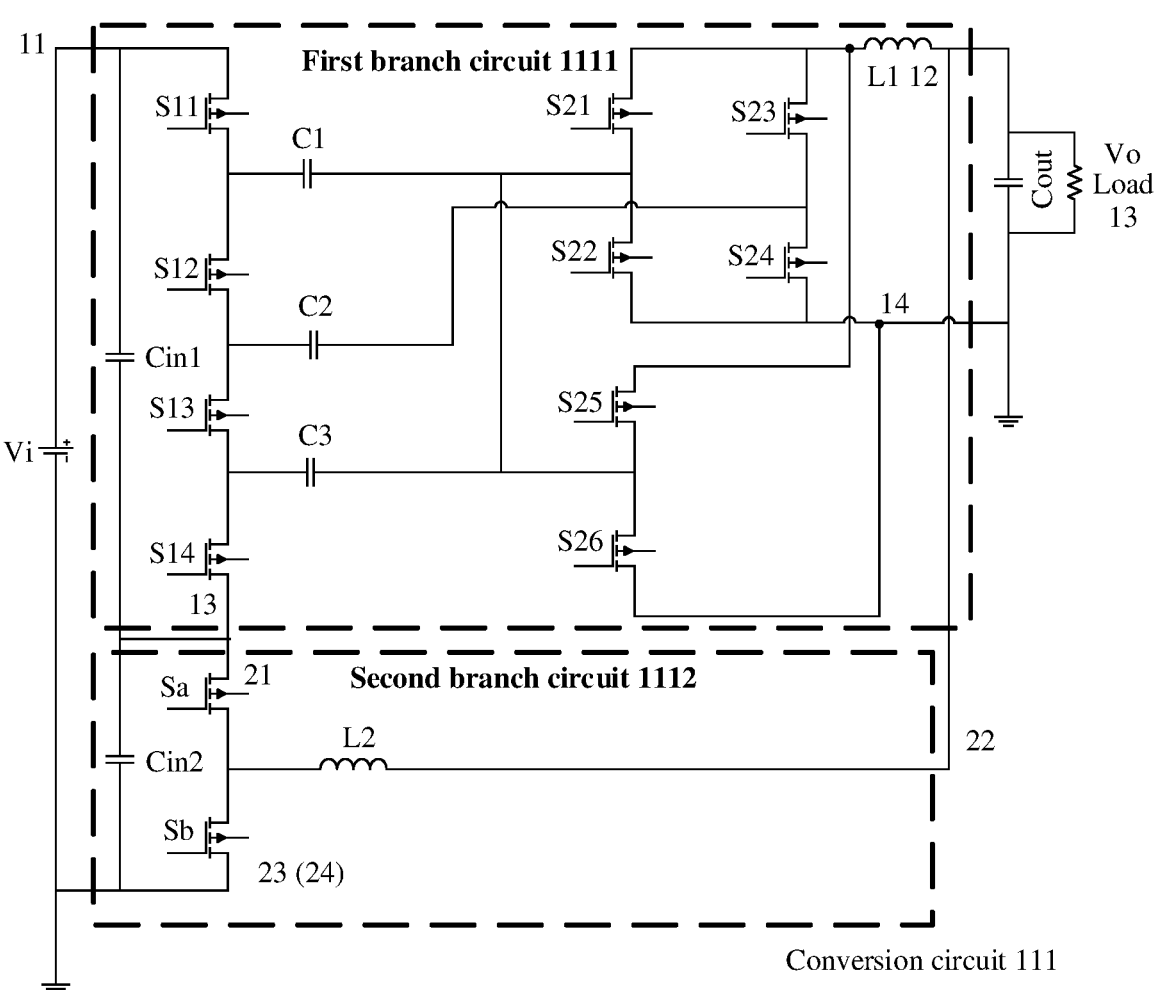
FIG. 22 is a schematic diagram of a structure of a specific conversion circuit according to an embodiment of this application.

For example, as shown in FIG. 22, a structure of the first branch circuit 1111 is similar to that of the first branch circuit 1111 in Example 1 of the first branch circuit 1111, and similarities are not described again. A difference lies in that the first branch circuit 1111 in FIG. 22 further includes a first adjustable inductor L2, one end of the first adjustable inductor L2 is connected to a first electrode of the output switching transistor S23, and the other end of the first adjustable inductor L2 is connected to the output end 12.

Accordingly, a manner in which the controller 112 controls the first branch circuit 1111 may also be further adjusted based on the control manner disclosed in Example 1 of the first branch circuit 1111. Specifically, after determining that the first transformation ratio N1 of the first branch circuit 1111 is the non-integer, the controller 112 may round the first transformation ratio N1, and a rounding result is represented by A. For example, if N1=4.3, A=4.

The controller 112 may control some switching transistors to be switched on in a first time period of each period, and control some other switching transistors to be switched on in a second time period of each period. The controller 112 may determine, based on the rounding result A, switching transistors that need to be switched on in different time periods in a manner similar to Example 1.

For example, if the rounding result A=2, the controller 112 switches on the input switching transistor S11, the input switching transistor S13, the input switching transistor S14, the output switching transistor S21, and the output switching transistor S24, and switches off the input switching transistor S12, the output switching transistor S22, the output switching transistor S23, the output switching transistor S25, and the output switching transistor S26 in the first time period. The controller 112 switches on the input switching transistor S12, the input switching transistor S13, the input switching transistor S14, the output switching transistor S22, and the output switching transistor S23, and switches off the input switching transistor S11, the output switching transistor S21, the output switching transistor S24, the output switching transistor S25, and the output switching transistor S26 in the second time period.

A difference lies in that in Example 1, a duty cycle of a drive signal used by the controller 112 for a switching transistor that is not frequently switched on or frequently switched off is 50%, that is, duration of the first time period is equal to that of the second time period. However, in Example 6, because the first adjustable inductor L1 is added to the first branch circuit 1111, the controller 112 may adjust charging and discharging time of the first adjustable inductor L1 by adjusting the duty cycle of the drive signal. In addition, because a voltage of the first adjustable inductor L1 may change continuously, the controller 112 may continuously adjust the output voltage Vo by adjusting the duty cycle of the drive signal, and further may continuously adjust a duty cycle of the first branch circuit 1111.

Figure 23A:
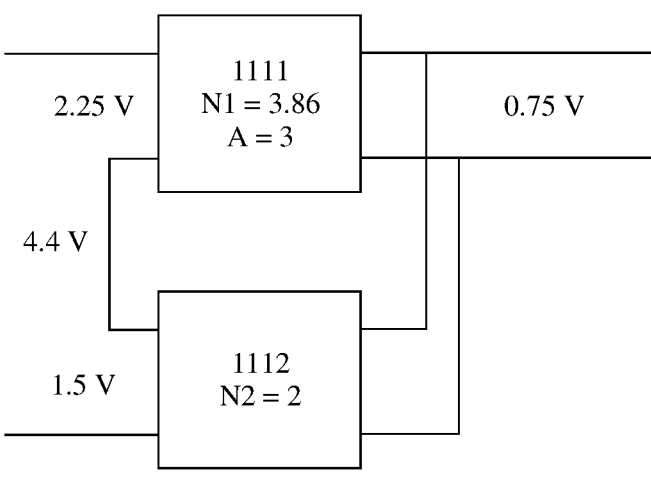
FIG. 23*a* to FIG. 23*c* each are a schematic diagram of a change of a transformation ratio according to an embodiment of this application.

Next, a discharging process of the terminal battery 12 is used as an example for description according to the method procedure shown in FIG. 8. It should be noted that, in the discharging process of the terminal battery 12, the controller 112 may keep the reference voltage Vc unchanged, or may dynamically adjust the reference voltage Vc based on a current input voltage Vi and the target output voltage Va. This is not limited in this embodiment of this application. Details are as follows:

At an initial stage of discharging of the terminal battery 12, as shown in FIG. 23*a*, the input voltage Vi of the conversion circuit 111 is 4.4 V, and the target output voltage Va is 0.75 V. It is assumed that the reference voltage Vc=1.5 V, and the controller 112 may determine that the first transformation ratio N1 of the first branch circuit 1111 is 3.86, the rounding result A of the first transformation ratio N1 is 3, and the second transformation ratio N2=2. The controller 112 may determine, based on the rounding result A=3, switching transistors that need to be separately switched on or off in the first time period and the second time period of each period. Then, a duty cycle of a drive signal of a switching transistor that is not frequently switched on or frequently switched off is adjusted, so that the first transformation ratio N1 reaches 3.86.

Figure 23B:
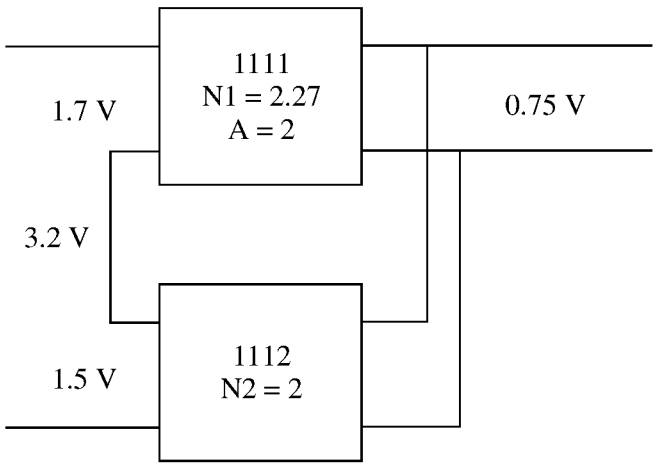

After the terminal battery 12 discharges for a period of time, as shown in FIG. 23*b*, the battery voltage decreases, and the input voltage Vi drops to 3.2 V, and in this case, the target output voltage Va is still 0.75 V. It is assumed that the reference voltage Vc is still 1.5 V, and the controller 112 may determine that the first transformation ratio N1 of the first branch circuit 1111 equals to 2.27, the rounding result A of the first transformation ratio N1 equals to 2, and the second transformation ratio N2 equals to 2. The controller 112 may determine, based on the rounding result A=2, switching transistors that need to be separately switched on or off in the first time period and the second time period of each period. Then, a duty cycle of a drive signal of a switching transistor that is not frequently switched on or frequently switched off is adjusted, so that the first transformation ratio N1 reaches 2.27.

Figure 23C:
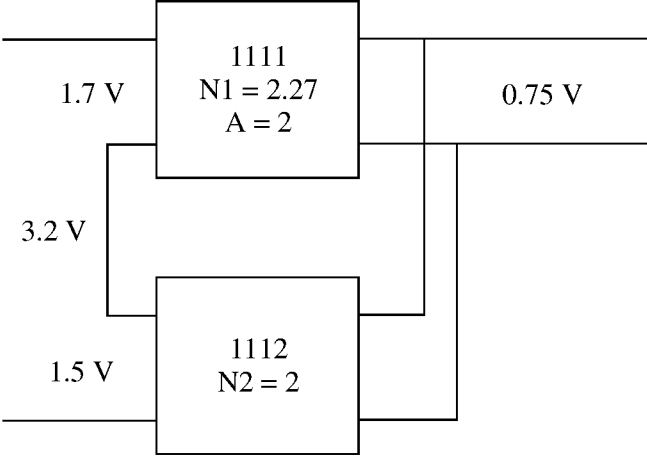

As shown in FIG. 23*c*, the input voltage is 4 V, and the target output voltage Va is 1.25 V. It is assumed that the reference voltage Vc is 2 V, and the controller 112 may determine that the first transformation ratio N1 of the first branch circuit 1111 equals to 1.6, the rounding result A of the first transformation ratio N1 equals to 1, and the second transformation ratio N2 equals to 1.6. The controller 112 may determine, based on the rounding result A=1, switching transistors that need to be separately switched on or off in the first time period and the second time period of each period. Then, a duty cycle of a drive signal of a switching transistor that is not frequently switched on or frequently switched off is adjusted, so that the first transformation ratio N1 reaches 1.6.

Next, the first transformation ratio N1 is further described by using FIG. 22 as an example.

The first transformation ratio N1 is set to 3.

Figure 24A:
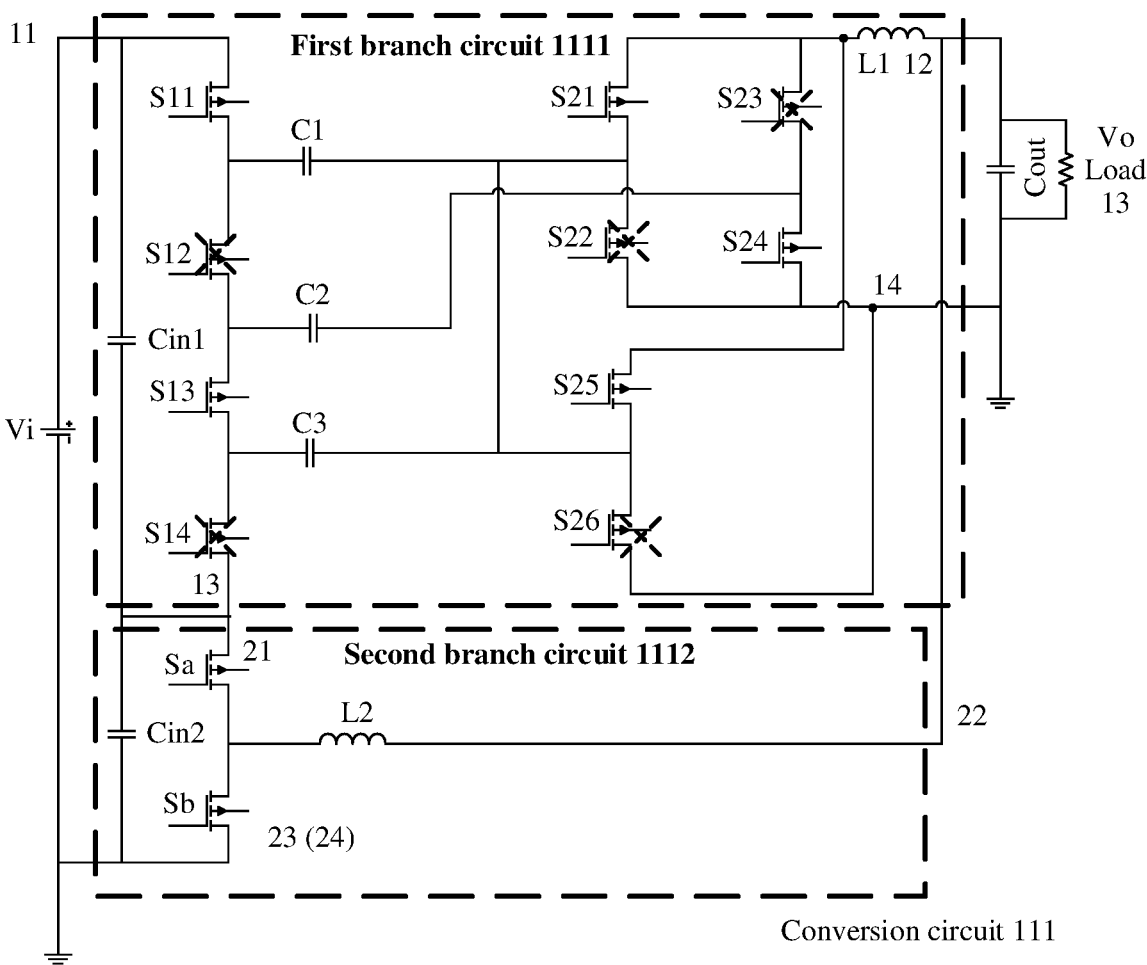
FIG. 24*a* and FIG. 24*b* each are a schematic diagram of an on/off state in a first branch circuit according to an embodiment of this application.

For example, it is assumed that all the switching transistors in the first branch circuit 1111 are switched on at a high voltage and are switched off at a low voltage, and the controller 112 may set the first transformation ratio N1 to 3 by using the drive signal shown in FIG. 11. Details are as follows:

In the time period from 0 to T/2, states of the switching transistors may be shown in FIG. 24*a*. The input switching transistor S11, the input switching transistor S13, the output switching transistor S21, the output switching transistor S24, and the output switching transistor S25 are switched on. The input switching transistor S12, the input switching transistor S14, the output switching transistor S22, the output switching transistor S23, and the output switching transistor S26 are switched off.

Figure 24B:
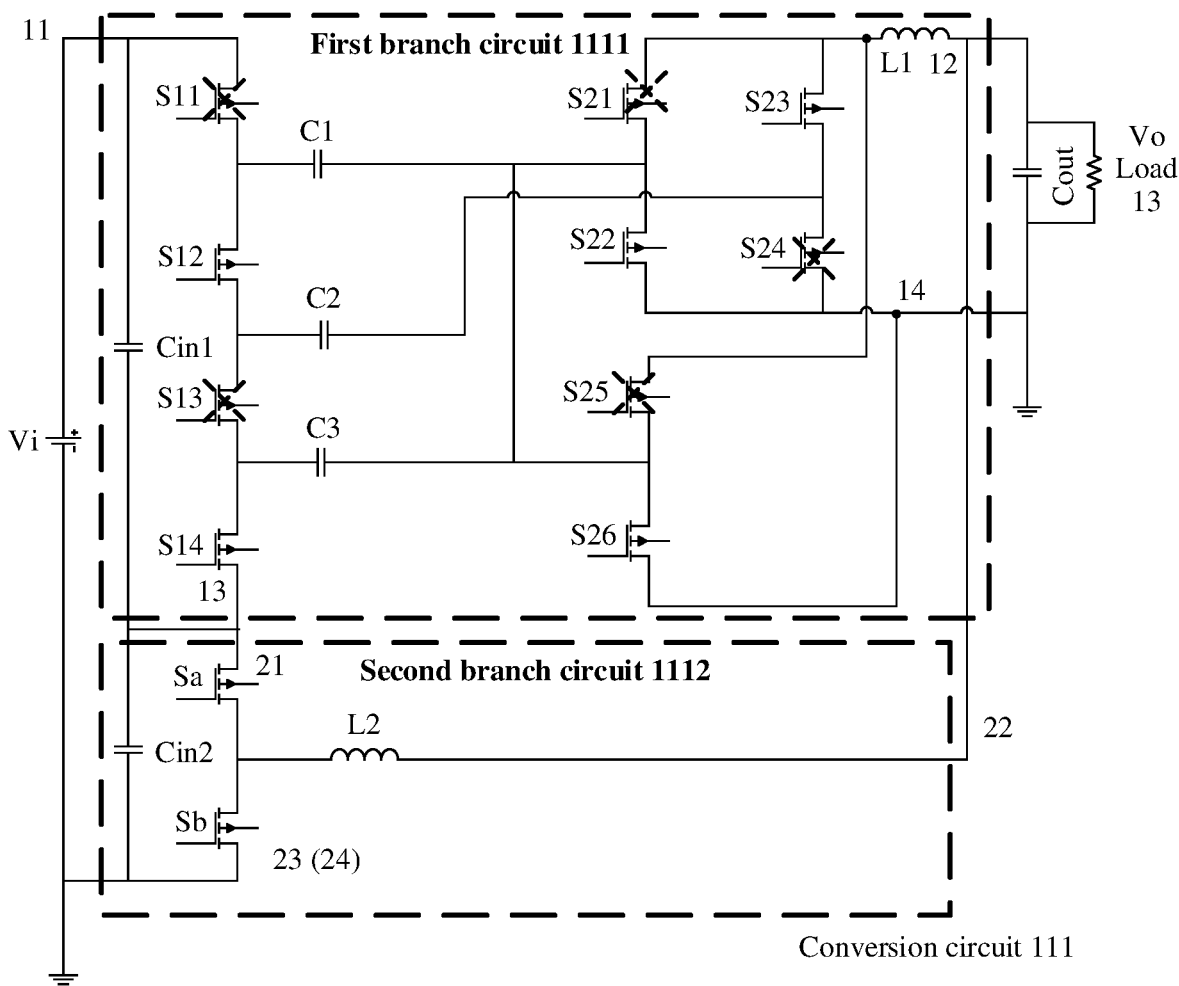

In the time period from T/2 to T, states of the switching transistors may be shown in FIG. 24*b*. The input switching transistor S11, the input switching transistor S13, the output switching transistor S21, the output switching transistor S24, and the output switching transistor S25 are switched off. The input switching transistor S12, the input switching transistor S14, the output switching transistor S22, the output switching transistor S23, and the output switching transistor S26 are switched on.

It can be learned by comparing FIG. 24*a* with FIG. 12*a* and comparing FIG. 24*b* with FIG. 12*b* that, the controller 112 switches on or off the switching transistors in a same manner. It should be noted that, because a voltage on the first adjustable inductor L1 is 0 in the time period from 0 to T/2 and the time period from T/2 to T, a value of the output voltage Vo is not changed.

The first transformation ratio N1 is set to 3.86.

Figure 25:
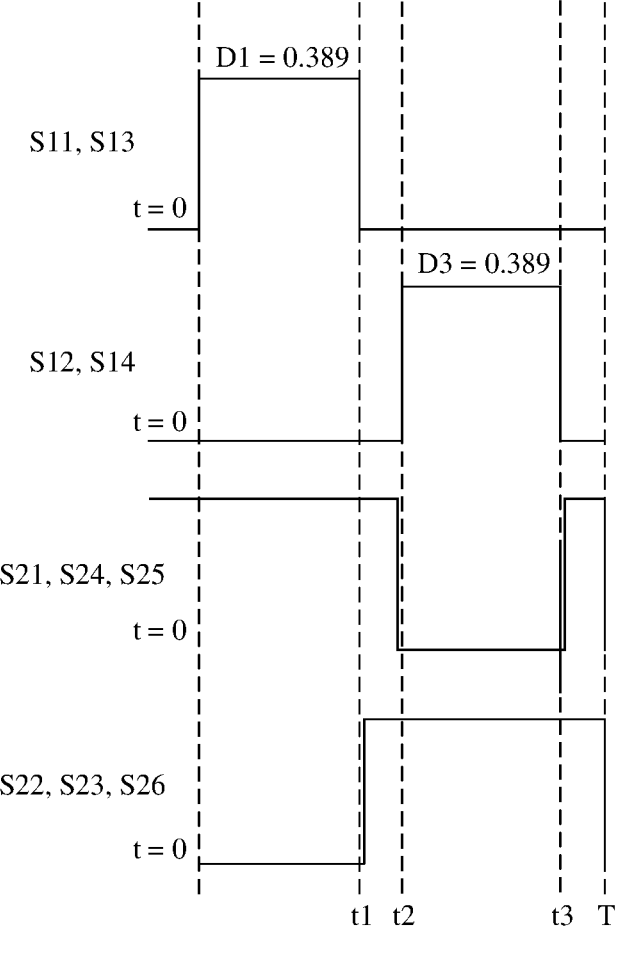
FIG. 25 is a schematic diagram of a drive signal according to an embodiment of this application.

For example, the controller 112 may set the first transformation ratio N1 to 3.86 by using drive signals shown in FIG. 25. As shown in FIG. 25, a period of the drive signal is T. The input switching transistor S11 and the input switching transistor S13 correspond to a same drive signal, the input switching transistor S12 and the input switching transistor S14 correspond to a same drive signal, the output switching transistor S21, the output switching transistor S24, and the output switching transistor S25 correspond to a same drive signal, and the output switching transistor S22, the output switching transistor S23, and the output switching transistor S26 correspond to a same drive signal.

Figure 26A:
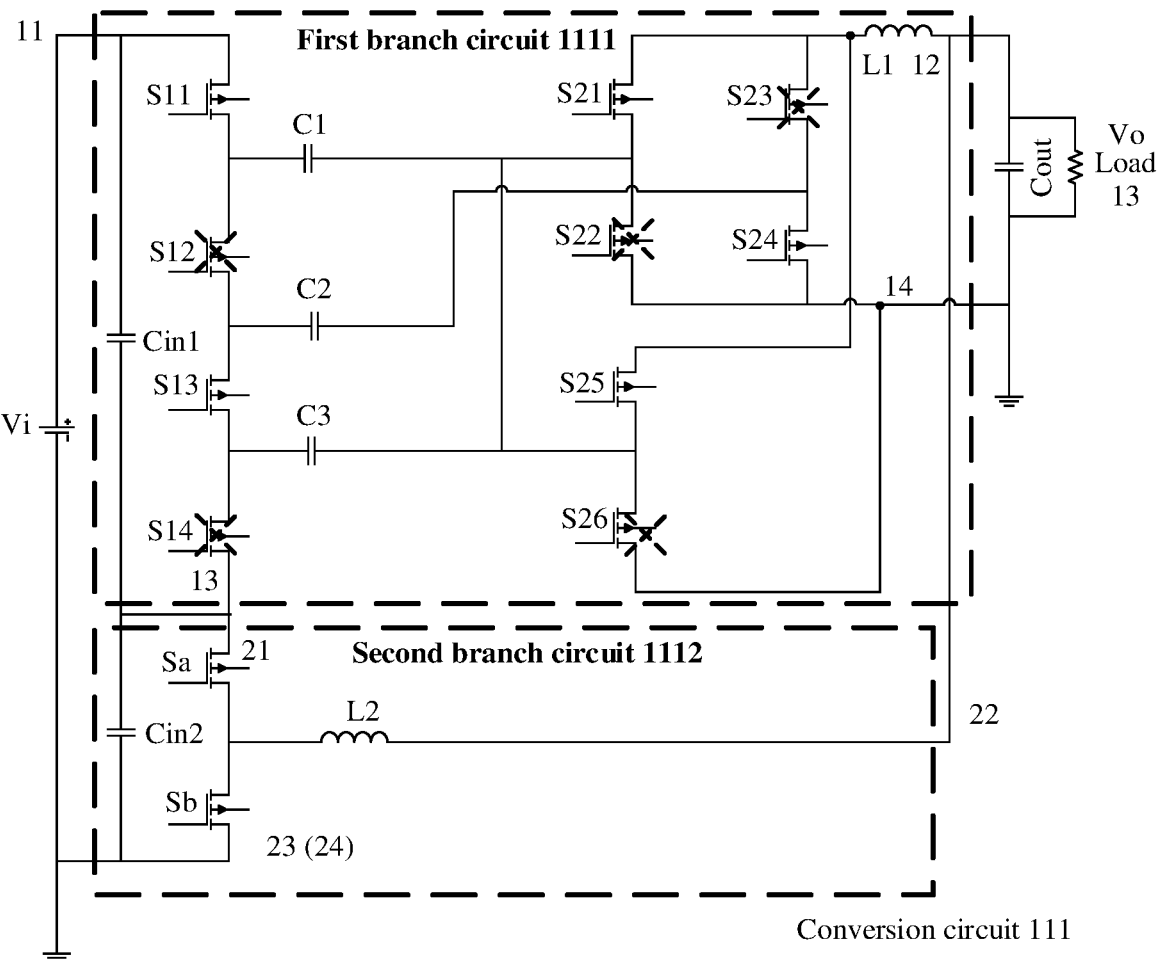
FIG. 26*a* to FIG. 26*d* each are a schematic diagram of an on/off state in a first branch circuit according to an embodiment of this application.

In a time period from 0 to t1, states of the switching transistors may be shown in FIG. 26*a*. The input switching transistor S11, the input switching transistor S13, the output switching transistor S21, the output switching transistor S24, and the output switching transistor S25 are switched on. The input switching transistor S12, the input switching transistor S14, the output switching transistor S22, the output switching transistor S23, and the output switching transistor S26 are switched off.

Figure 26B:
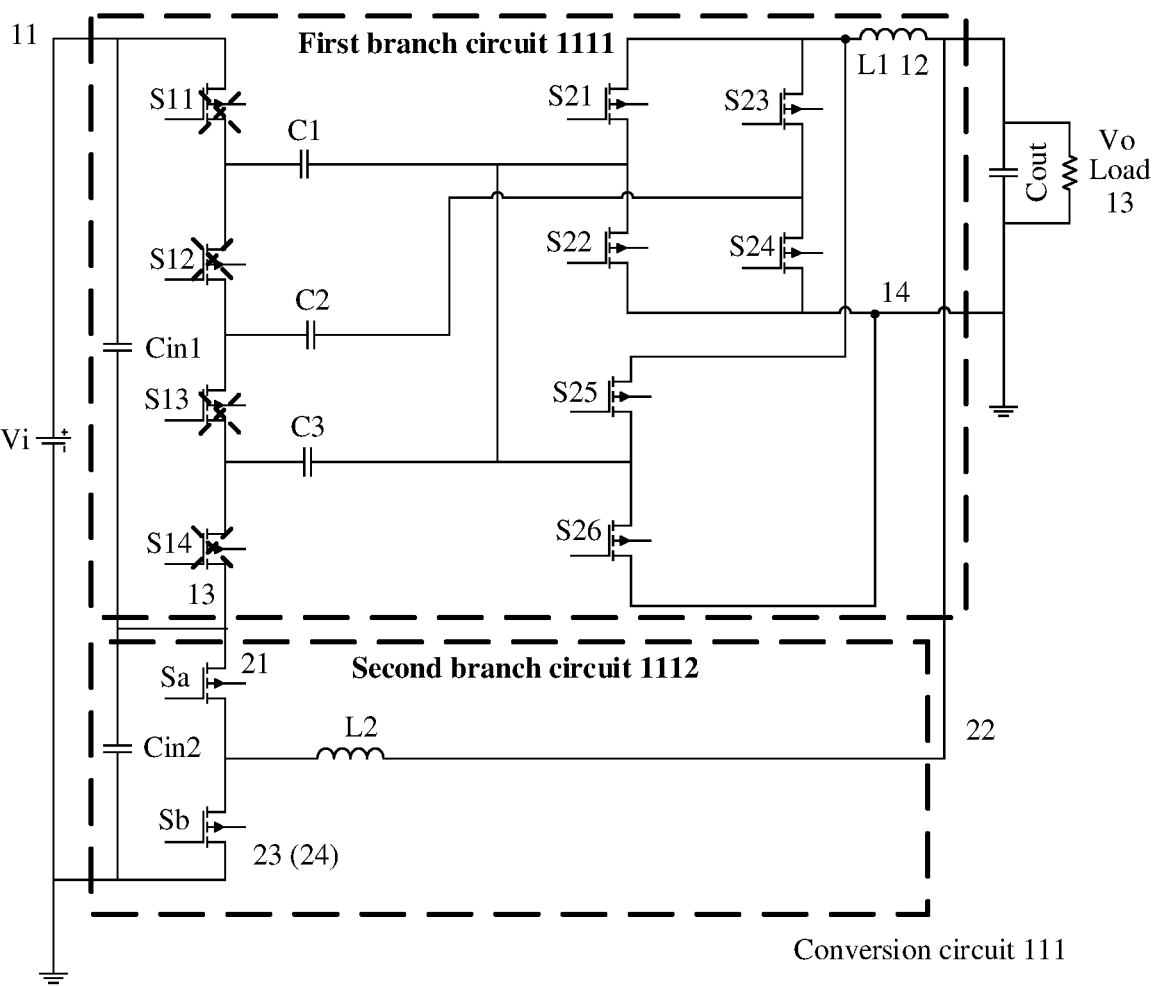

In a time period from t1 to t2, states of the switching transistors may be shown in FIG. 26*b*. The input switching transistor S11, the input switching transistor S12, the input switching transistor S13, and the input switching transistor S14 are switched off. The output switching transistor S21, the output switching transistor S22, the output switching transistor S23, the output switching transistor S24, the output switching transistor S25, and the output switching transistor S26 are switched on.

Figure 26C:
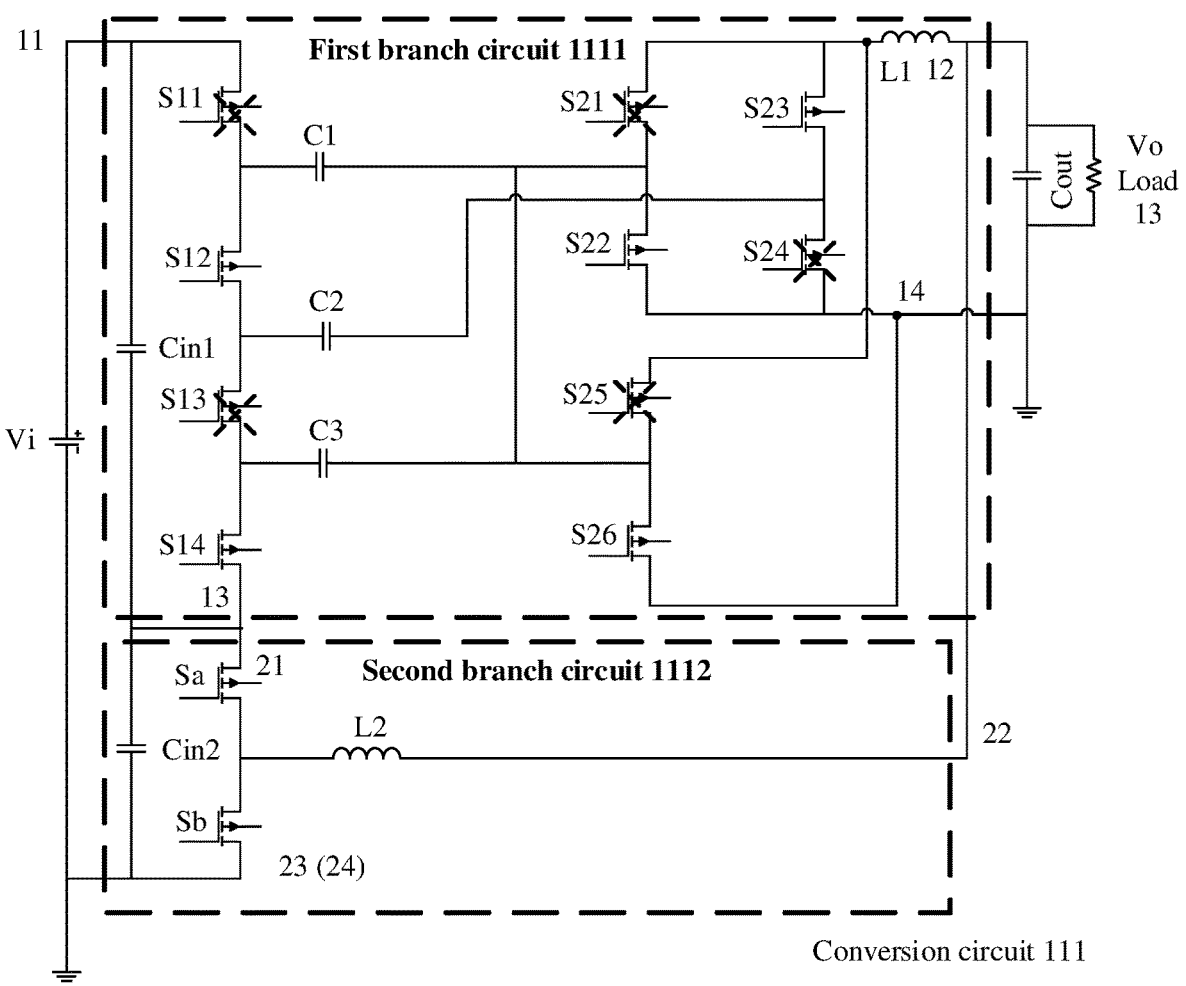

In a time period from t2 to t3, states of the switching transistors may be shown in FIG. 26*c*. The input switching transistor S12, the input switching transistor S14, the output switching transistor S22, the output switching transistor S23, and the output switching transistor S26 are switched on. The input switching transistor S11, the input switching transistor S13, the output switching transistor S21, the output switching transistor S24, and the output switching transistor S25 are switched off.

Figure 26D:
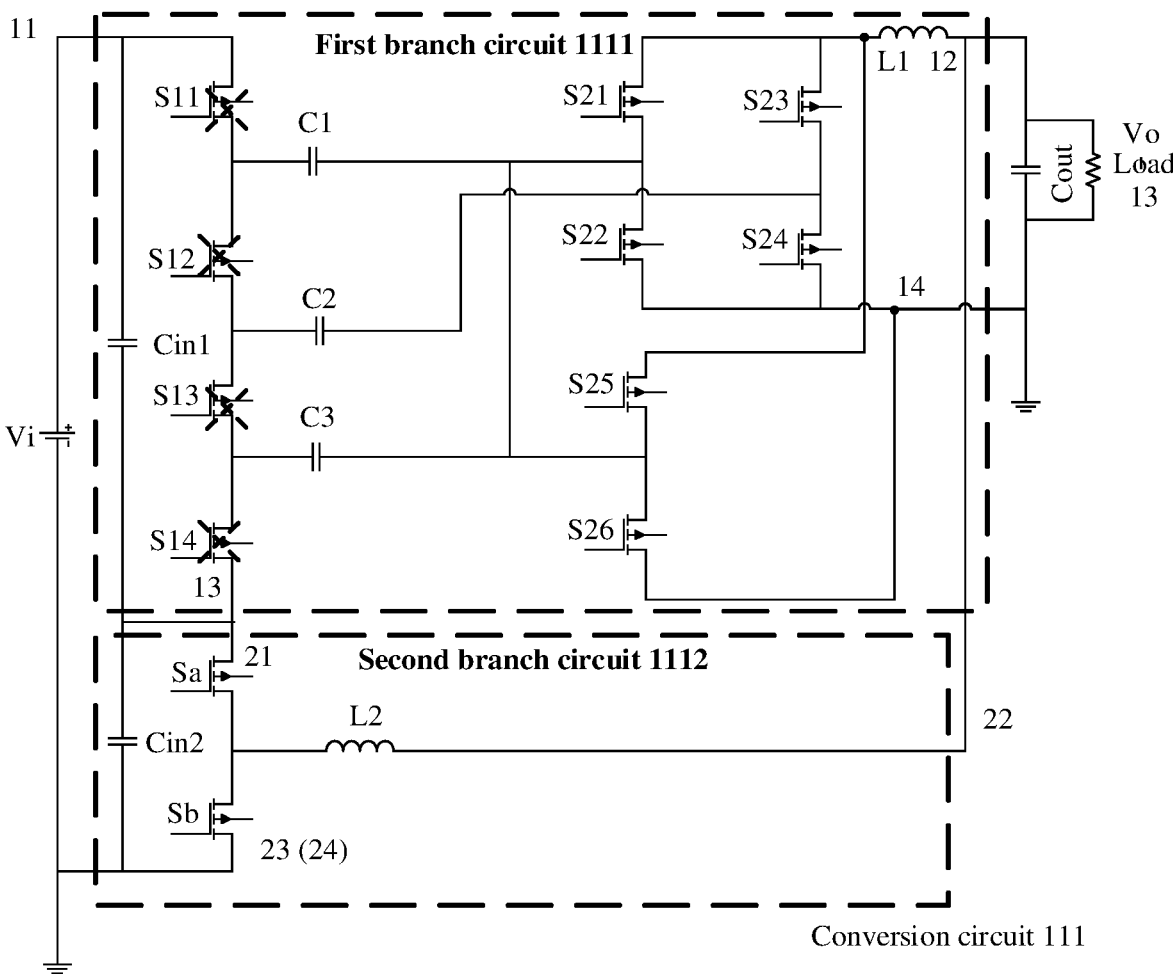

In a time period from t3 to T, states of the switching transistors may be shown in FIG. 26d. The input switching transistor S11, the input switching transistor S12, the input switching transistor S13, and the input switching transistor S14 are switched off. The output switching transistor S21, the output switching transistor S22, the output switching transistor S23, the output switching transistor S24, the output switching transistor S25, and the output switching transistor S26 are switched on.

It can be learned by comparing the drive signal in FIG. 25 with the drive signal in FIG. 11 that, the time period from t2 to t3 and the time period from t3 to T are added to the drive signal shown in FIG. 25, and the time period from t2 to t3 and the time period from t3 to T respectively correspond to the on/off states shown in FIG. 26b and FIG. 26d. The time period from t2 to t3 and the time period from t3 to T may be used for freewheeling of the first adjustable inductor L1.

It is assumed that D1 is a duty cycle of the time period from 0 to t1 in the period T, and D3 is a duty cycle of the time period from t2 to t3 in the period T. In this embodiment of this application, duration of the time period from 0 to t1 is the same as that of the time period from t2 to t3, that is, $$D1 = D3 = t1/T = (T3 - t2)/T$$

The controller 112 may adjust the output voltage Vo by adjusting D1, so that the first branch circuit 1111 implements a continuously adjustable transformation ratio. For example, in the first branch circuit 1111 shown in FIG. 22, D1 and the first transformation ratio N1 satisfy the following relationship:

$$\frac{2}{A} * D_1 = \frac{1}{N1} \qquad \text{(Formula 22)}$$

It can be learned from Formula 22 that, when N1=3.86, A=3, and D1=0.389. Therefore, the controller 112 adjusts D1 to 0.389, so that the first transformation ratio N1 can reach 3.86.

The controller 112 sets the first transformation ratio N1 to 2.

Figure 27A:
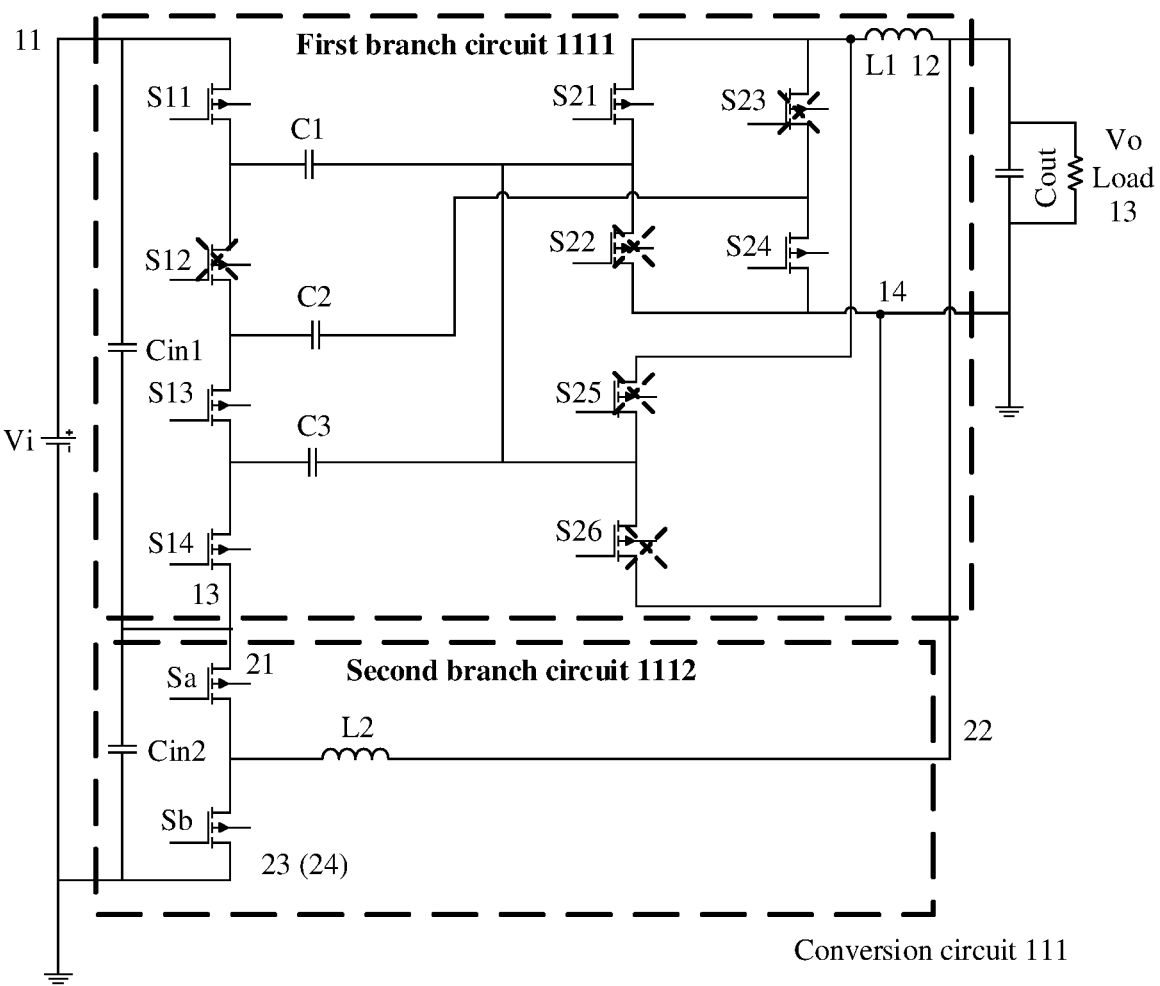
FIG. 27*a* and FIG. 27*b* each are a schematic diagram of an on/off state in a first branch circuit according to an embodiment of this application.

For example, the controller 112 may set the first transformation ratio N1 to 2 by using the drive signal shown in FIG. 13. Details are as follows:

In the time period from 0 to T/2, states of the switching transistors may be shown in FIG. 27a. The input switching transistor S11, the input switching transistor S13, the input switching transistor S14, the output switching transistor S21, and the output switching transistor S24 are switched on. The input switching transistor S12, the output switching transistor S22, the output switching transistor S23, the output switching transistor S25, and the output switching transistor S26 are switched off.

Figure 27B:
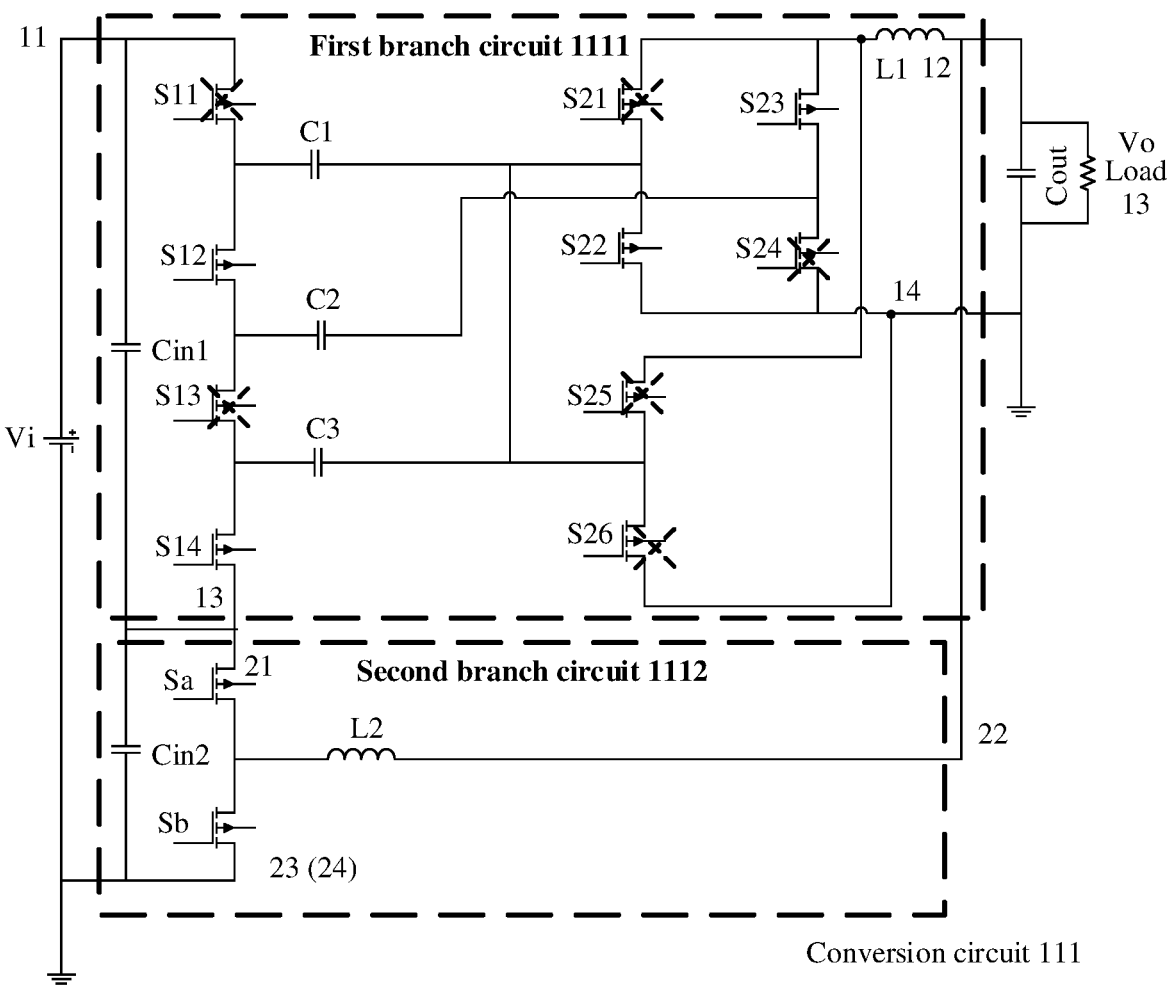

In the time period from T/2 to T, states of the switching transistors may be shown in FIG. 27b. The input switching transistor S12, the input switching transistor S14, the output switching transistor S22, and the output switching transistor S23 are switched on. The input switching transistor S11, the input switching transistor S13, the output switching transistor S21, the output switching transistor S24, the output switching transistor S25, and the output switching transistor S26 are switched off.

The first transformation ratio N1 is set to 2.27.

Figure 28:
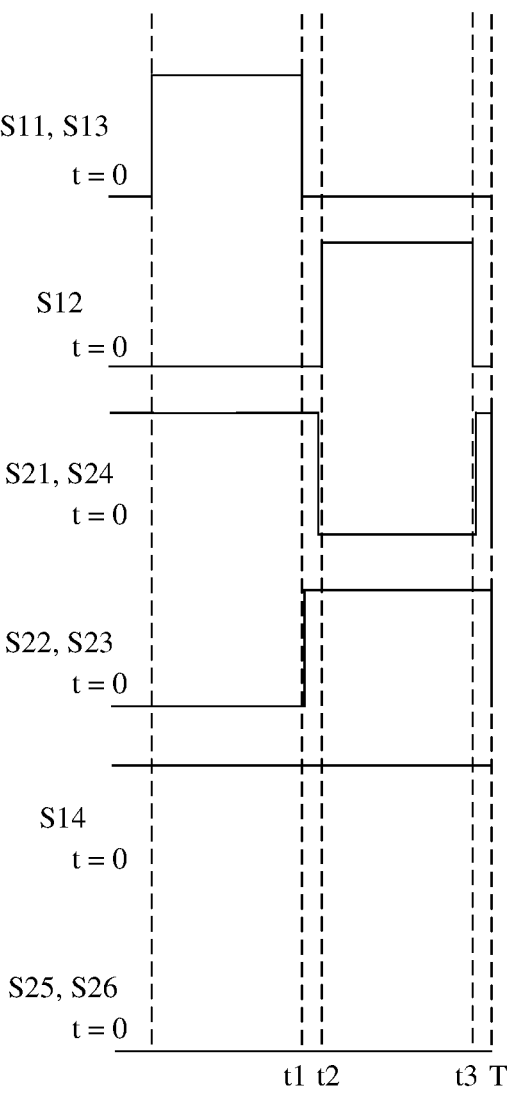
FIG. 28 is a schematic diagram of a drive signal according to an embodiment of this application.

For example, the controller 112 may set the first transformation ratio N1 to 2.27 by using drive signals shown in FIG. 28. As shown in FIG. 28, a period of the drive signal is T. The input switching transistor S11 and the input switching transistor S13 correspond to a same drive signal, the input switching transistor S12 corresponds to a drive signal, the input switching transistor S14 corresponds to a drive signal, the output switching transistor S21 and the output switching transistor S24 correspond to a same drive signal, the output switching transistor S22 and the output switching transistor S23 correspond to a same drive signal, and the output switching transistor S25 and the output switching transistor S26 correspond to a same drive signal.

The drive signal corresponding to the input switching transistor S14 is a continuous high-level signal, that is, the input switching transistor S14 keeps in an on state in the period T. The drive signal corresponding to the output switching transistor S25 and the output switching transistor S26 is a continuous low-level signal, that is, the output switching transistor S25 and the output switching transistor S26 keep in an off state.

Figure 29A:
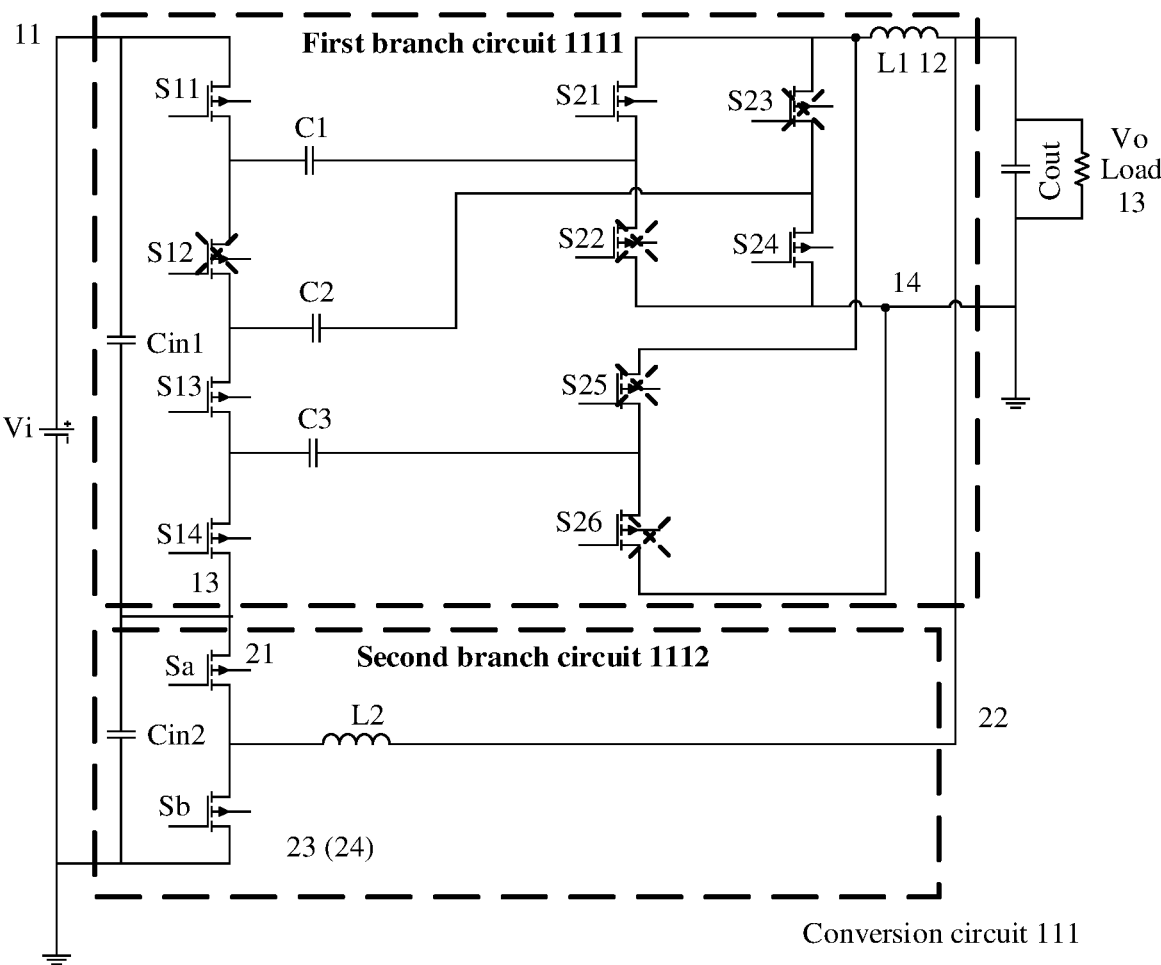
FIG. 29*a* to FIG. 29*d* each are a schematic diagram of an on/off state in a first branch circuit according to an embodiment of this application.

In a time period from 0 to t1, states of the switching transistors may be shown in FIG. 29a. The input switching transistor S11, the input switching transistor S13, the input switching transistor S14, the output switching transistor S21, and the output switching transistor S24 are switched on. The input switching transistor S12, the output switching transistor S22, the output switching transistor S23, the output switching transistor S25, and the output switching transistor S26 are switched off.

Figure 29B:
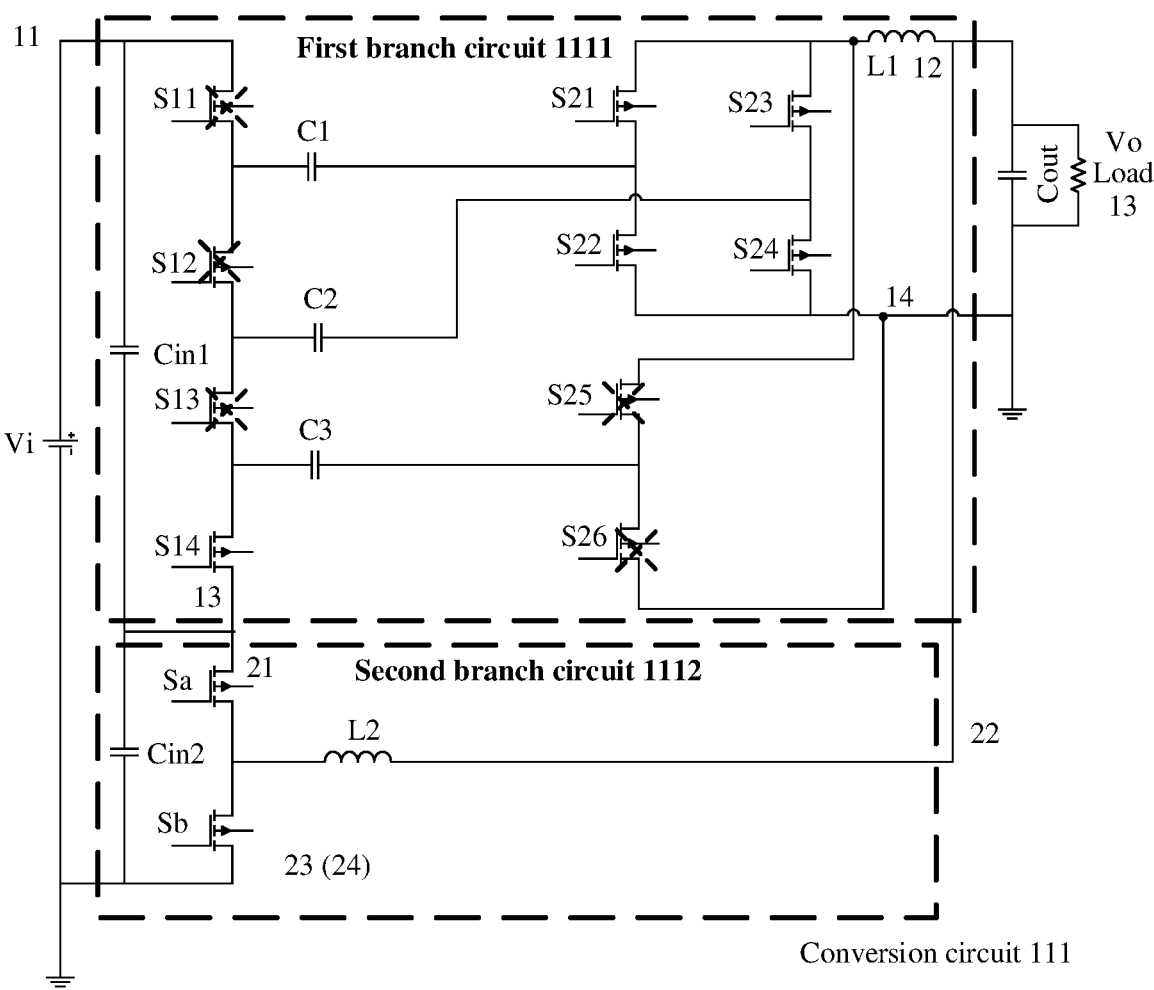

In a time period from t1 to t2, states of the switching transistors may be shown in FIG. 29b. The input switching transistor S11, the input switching transistor S12, the input switching transistor S13, the output switching transistor S25, and the output switching transistor S26 are switched off. The input switching transistor S14, the output switching transistor S21, the output switching transistor S22, the output switching transistor S23, and the output switching transistor S24 are switched on.

Figure 29C:
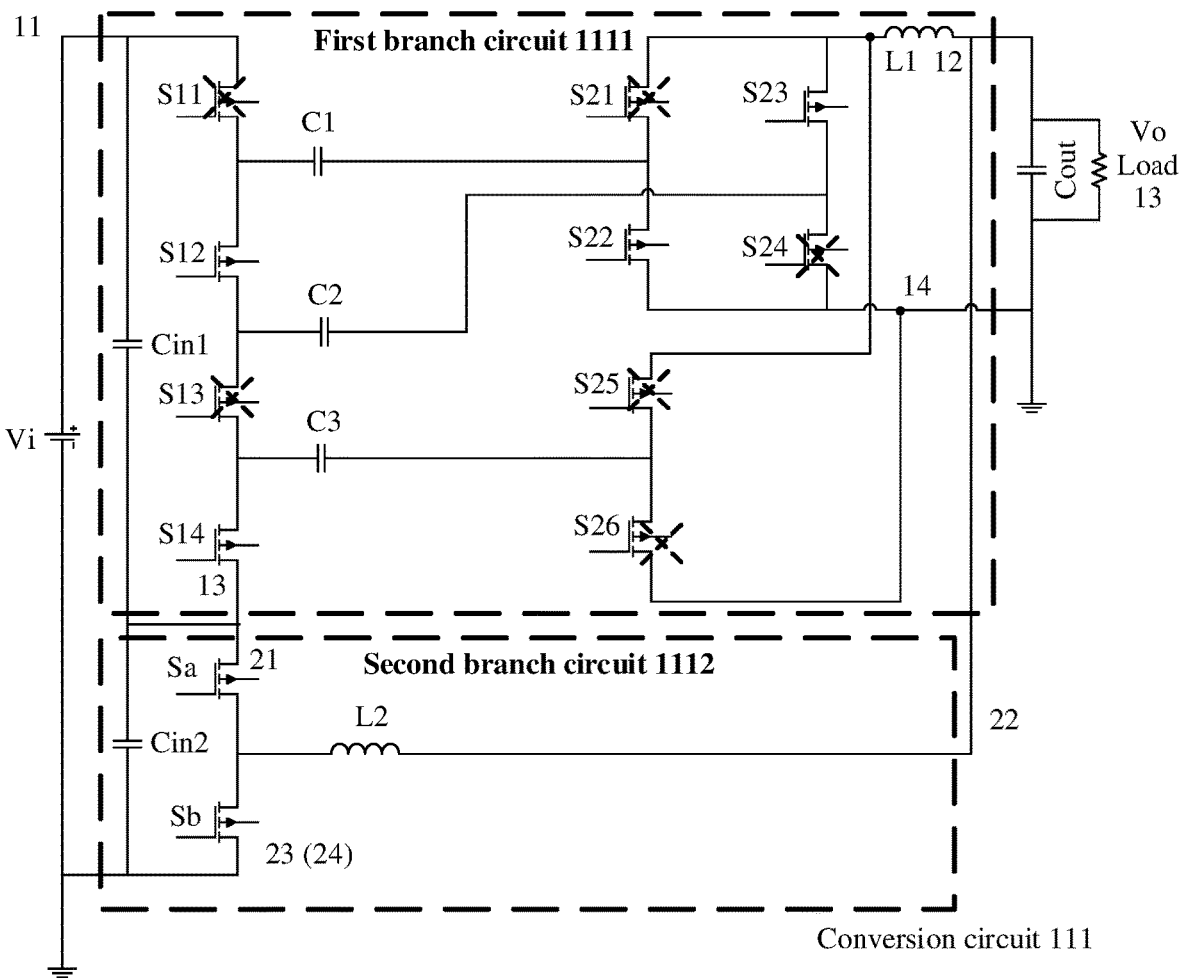

In a time period from t2 to t3, states of the switching transistors may be shown in FIG. 29c. The input switching transistor S12, the input switching transistor S14, the output switching transistor S22, and the output switching transistor S23 are switched on. The input switching transistor S11, the input switching transistor S13, the output switching transistor S21, the output switching transistor S24, the output switching transistor S25, and the output switching transistor S26 are switched off.

Figure 29D:
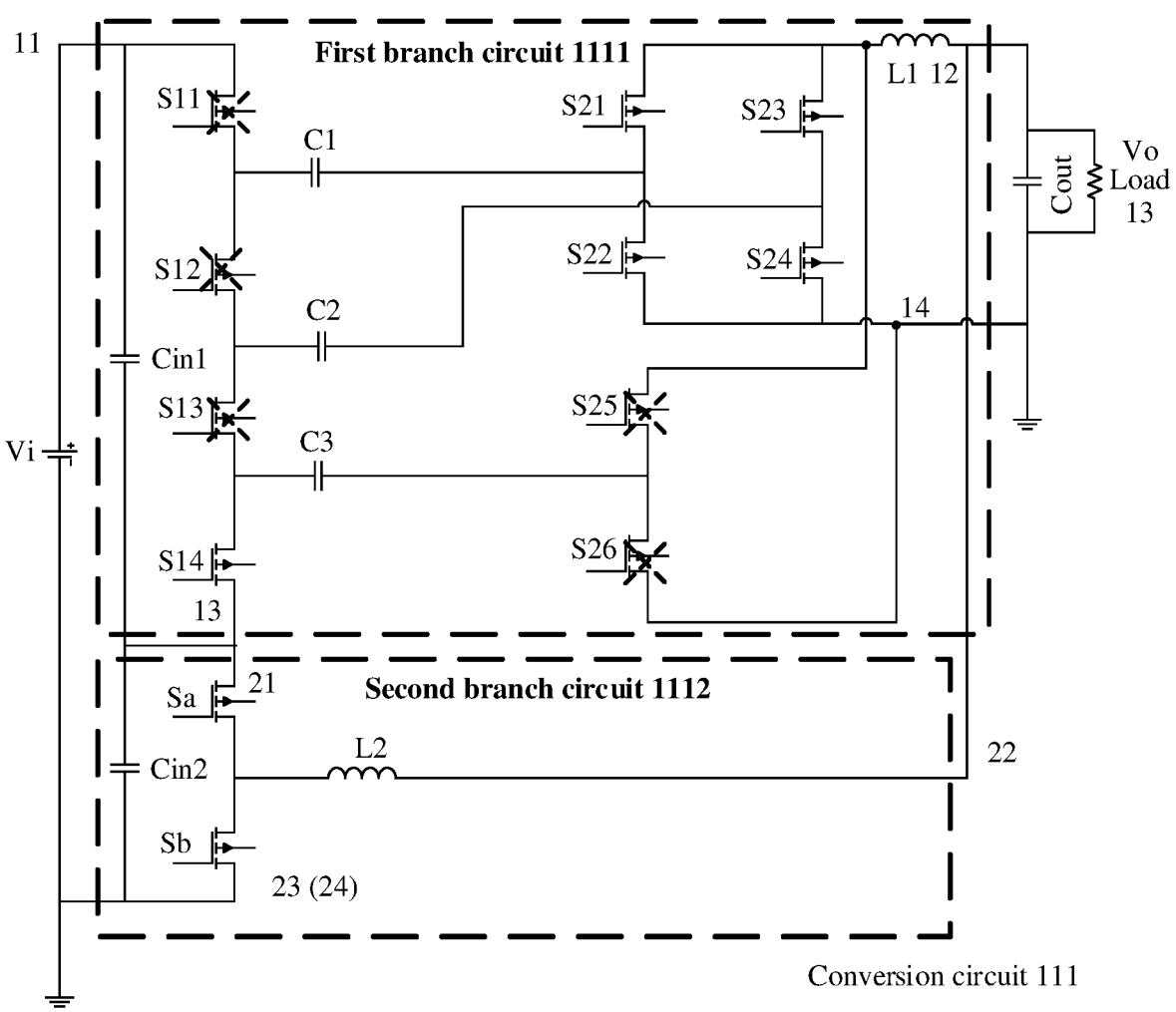

In a time period from t3 to T, states of the switching transistors may be shown in FIG. 29d. The input switching transistor S11, the input switching transistor S12, the input switching transistor S13, the output switching transistor S25, and the output switching transistor S26 are switched off. The input switching transistor S14, the output switching transistor S21, the output switching transistor S22, the output switching transistor S23, and the output switching transistor S24 are switched on.

It can be learned by comparing the drive signal in FIG. 28 with the drive signal in FIG. 13 that, the time period from t2 to t3 and the time period from t3 to T are added to the drive signal shown in FIG. 28, and the time period from t2 to t3 and the time period from t3 to T respectively correspond to the on/off states shown in FIG. 29*b* and FIG. 29*d*. The time period from t2 to t3 and the time period from t3 to T may be used for freewheeling of the first adjustable inductor L1.

According to Formula 22, when N1=2.27, A=2, and D1=0.44. Therefore, the controller 112 adjusts D1 to 0.44, so that the first transformation ratio N1 can reach 2.27. The controller 112 sets the first transformation ratio N1 to 1.

Figure 30A:
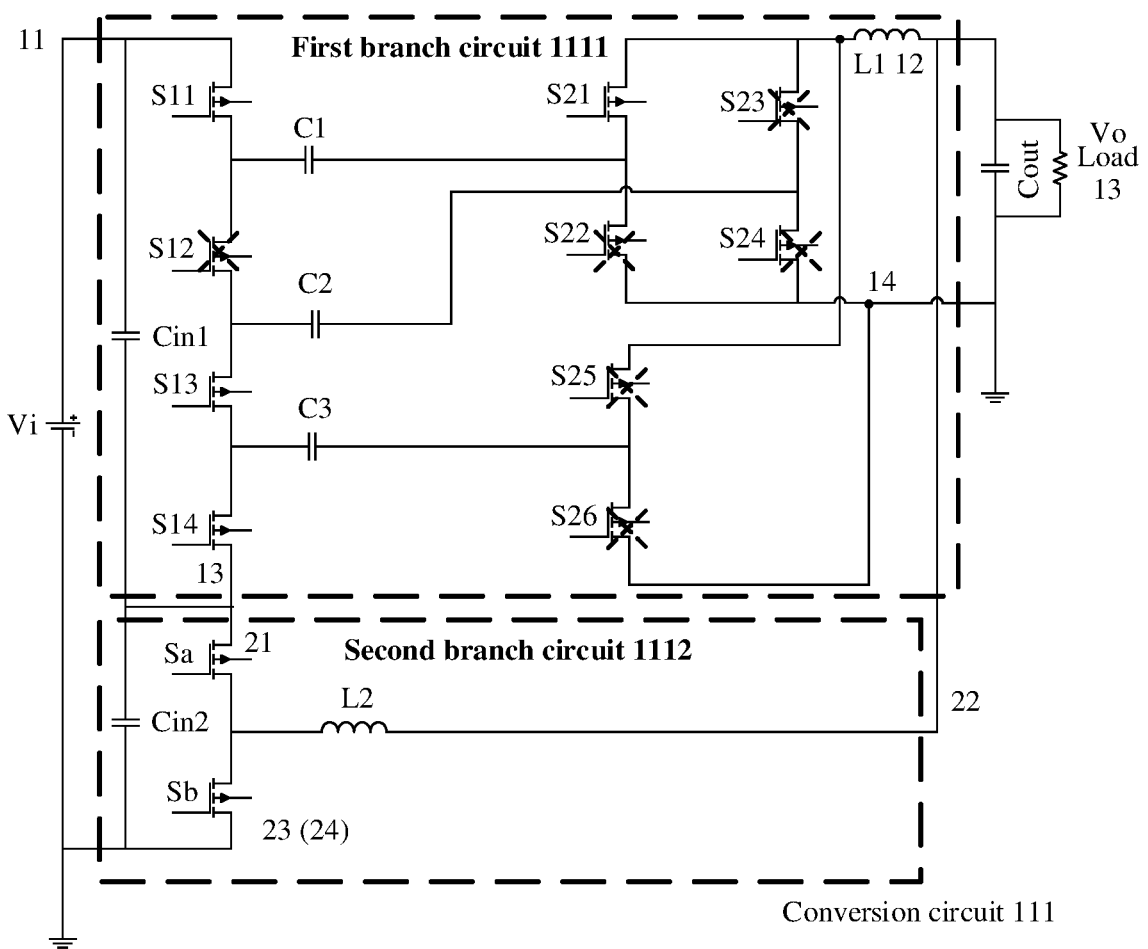
FIG. 30*a* and FIG. 30*b* each are a schematic diagram of an on/off state in a first branch circuit according to an embodiment of this application.

For example, the controller 112 may set the first transformation ratio N1 to 1 by using the drive signal shown in FIG. 15. Details are as follows:

In the time period from 0 to T/2, states of the switching transistors may be shown in FIG. 30*a*. The input switching transistor S11, the input switching transistor S13, the input switching transistor S14, and the output switching transistor S21 are switched on. The input switching transistor S12, the output switching transistor S22, the output switching transistor S23, the output switching transistor S24, the output switching transistor S25, and the output switching transistor S26 are switched off.

Figure 30B:
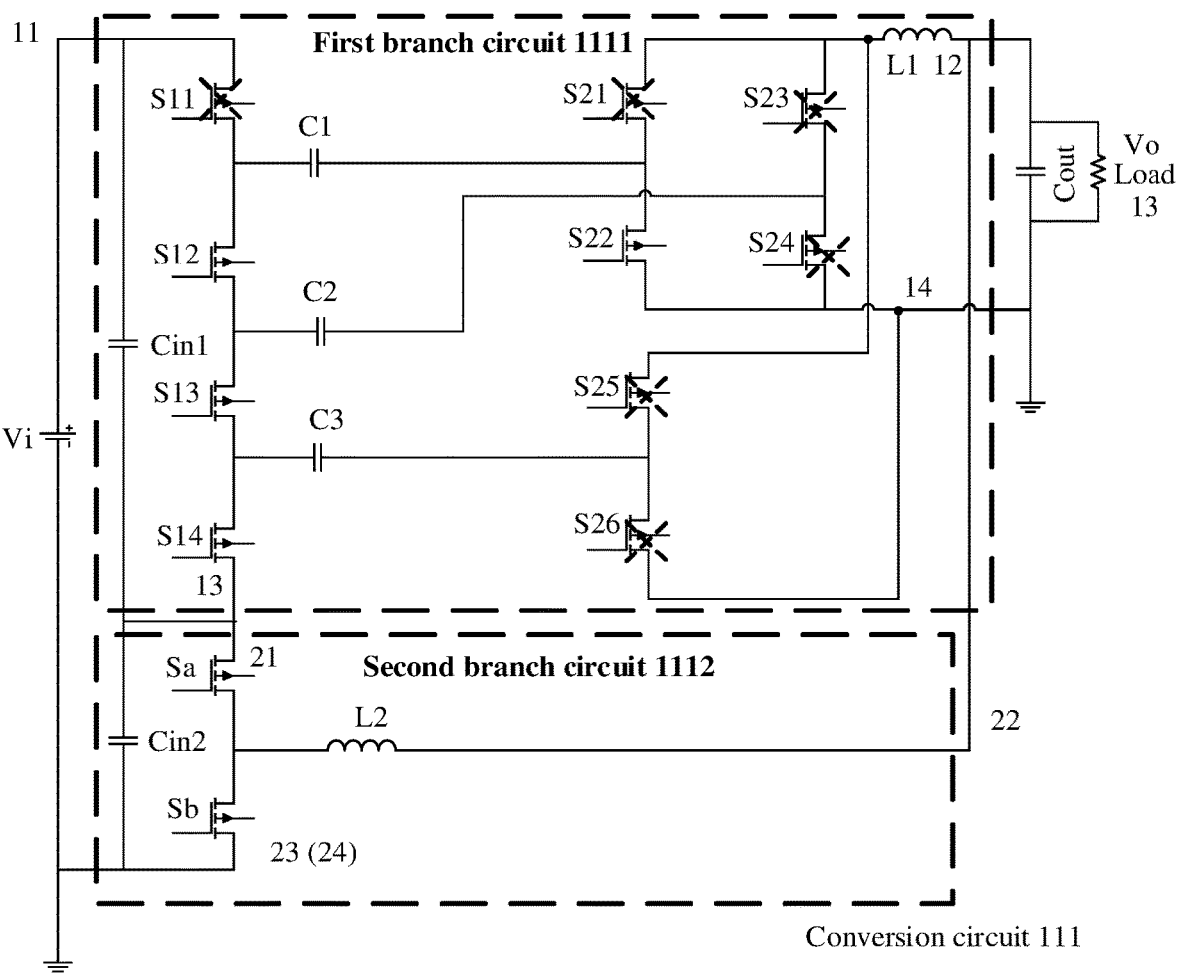

In the time period from T/2 to T, states of the switching transistors may be shown in FIG. 30*b*. The input switching transistor S12, the input switching transistor S13, the input switching transistor S14, and the output switching transistor S22 are switched on. The input switching transistor S11, the output switching transistor S21, the input switching transistor S23, the output switching transistor S24, the output switching transistor S25, and the output switching transistor S26 are switched off.

The controller 112 sets the first transformation ratio N1 to 1.6.

Figure 31:
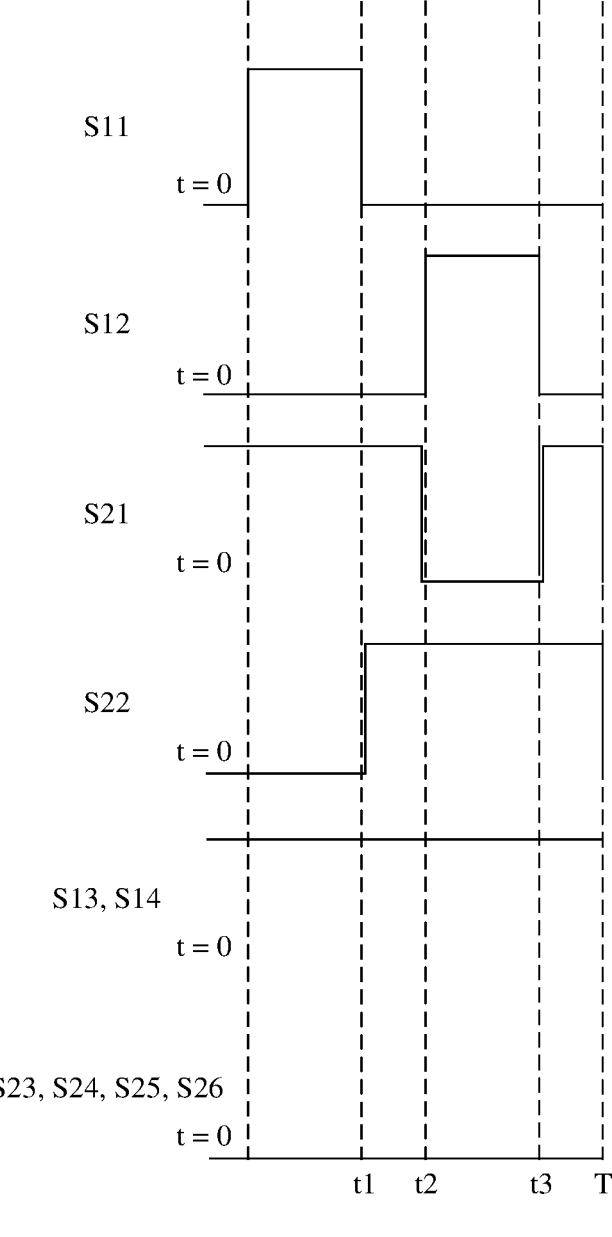
FIG. 31 is a schematic diagram of a drive signal according to an embodiment of this application.

For example, the controller 112 may set the first transformation ratio N1 to 1.6 by using drive signals shown in FIG. 31. As shown in FIG. 31, a period of the drive signal is T. The input switching transistor S11 corresponds to a drive signal, the input switching transistor S12 corresponds to a drive signal, the input switching transistor S13 and the input switching transistor S14 correspond to a same drive signal, the output switching transistor S21 corresponds to a drive signal, the output switching transistor S22 corresponds to a drive signal, and the output switching transistor S23, the output switching transistor S24, the output switching transistor S25, and the output switching transistor S26 correspond to a same drive signal.

The drive signal corresponding to the input switching transistor S13 and the input switching transistor S14 is a continuous high-level signal, that is, the input switching transistor S13 and the input switching transistor S14 keep in an on state in the period T. The drive signal corresponding to the output switching transistor S23, the output switching transistor S24, the output switching transistor S25, and the output switching transistor S26 is a continuous low-level signal, that is, the output switching transistor S23, the output switching transistor S24, the output switching transistor S25, and the output switching transistor S26 keep in an off state in the period T.

Figure 32A:
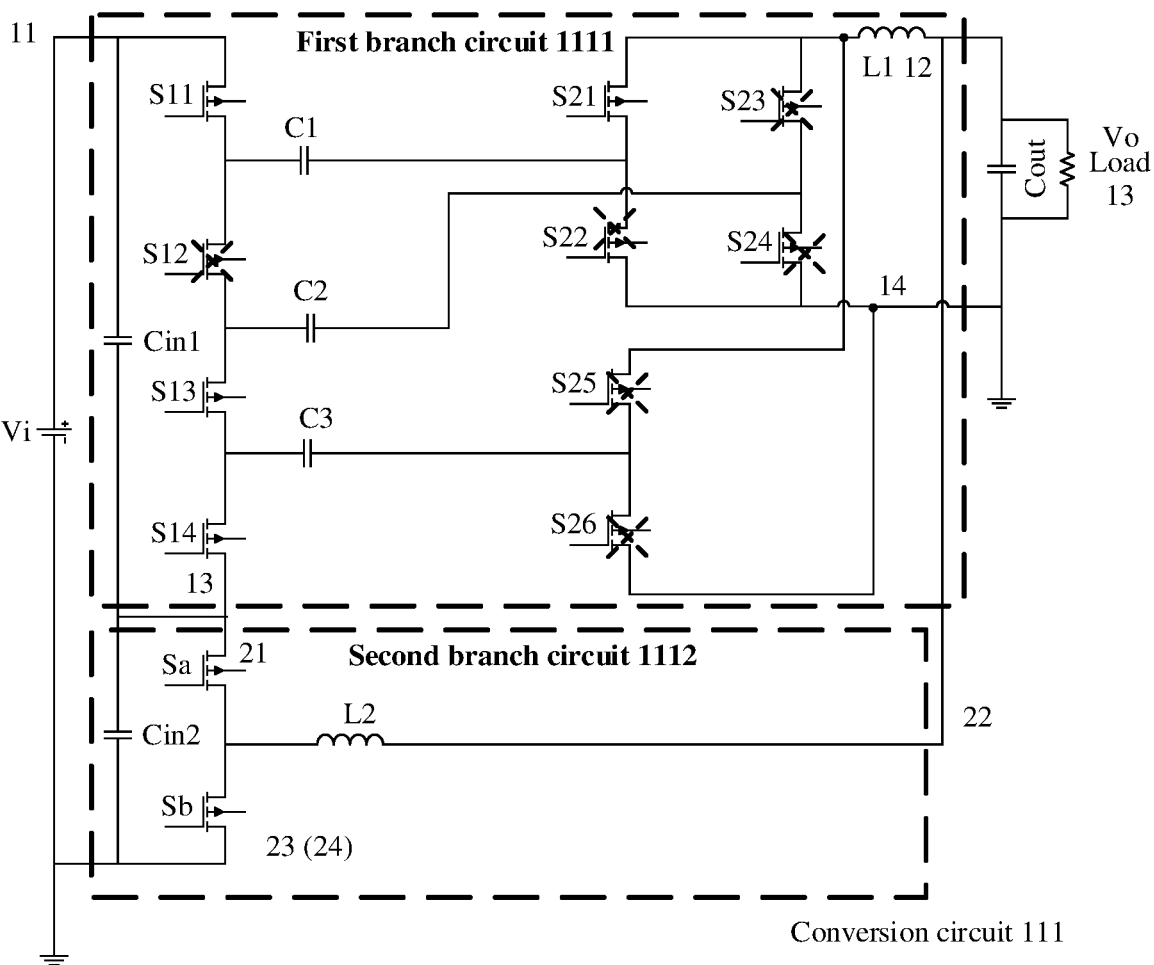
FIG. 32*a* to FIG. 32*d* each are a schematic diagram of an on/off state in a first branch circuit according to an embodiment of this application.

In a time period from 0 to t1, states of the switching transistors may be shown in FIG. 32*a*. The input switching transistor S11, the input switching transistor S13, the input switching transistor S14, and the output switching transistor S21 are switched on. The input switching transistor S12, the output switching transistor S22, the output switching transistor S23, the output switching transistor S24, the output switching transistor S25, and the output switching transistor S26 are switched off.

Figure 32B:
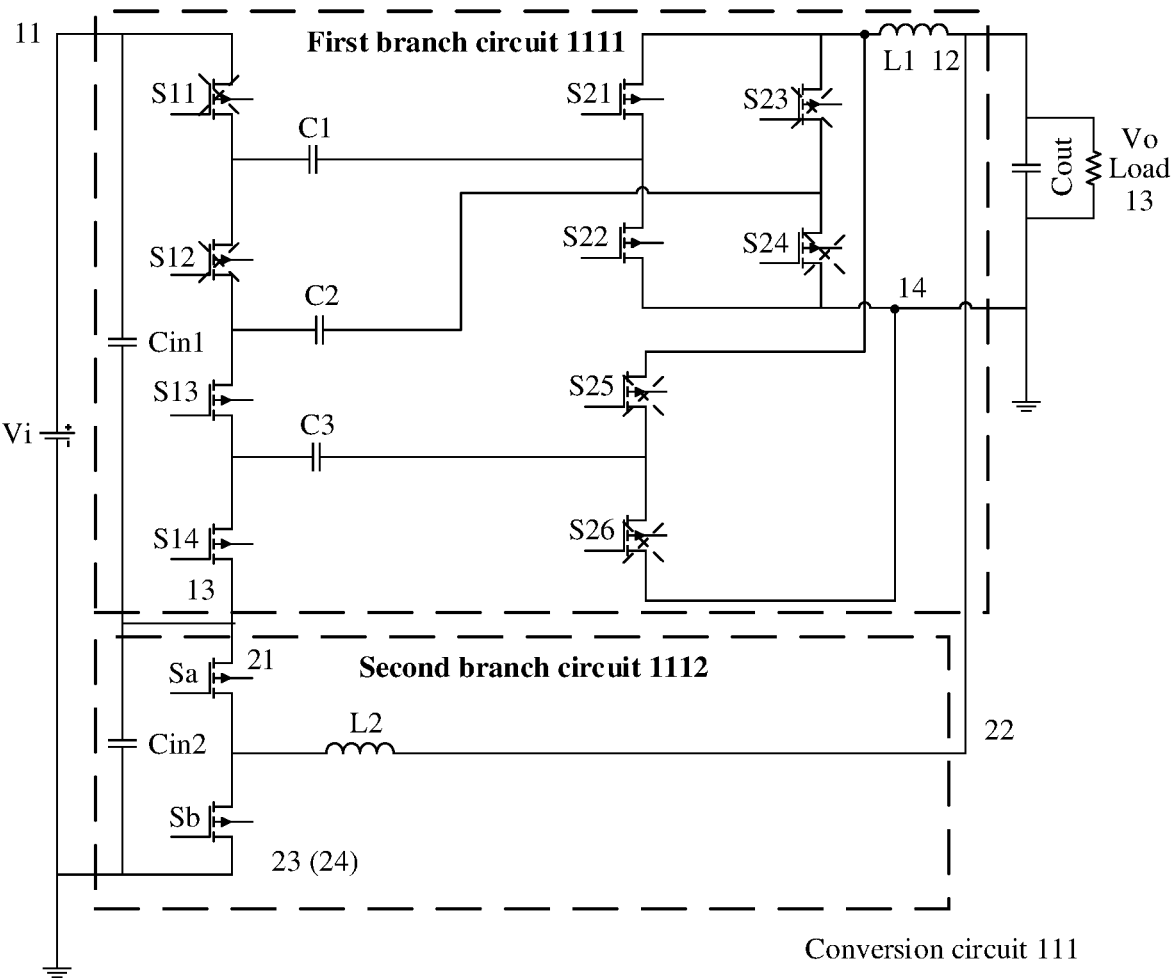

In a time period from t1 to t2, states of the switching transistors may be shown in FIG. 32*b*. The input switching transistor S11, the input switching transistor S12, the output switching transistor S23, the output switching transistor S24, the output switching transistor S25, and the output switching transistor S26 are switched off. The input switching transistor S13, the input switching transistor S14, the output switching transistor S21, and the output switching transistor S22 are switched on.

Figure 32C:
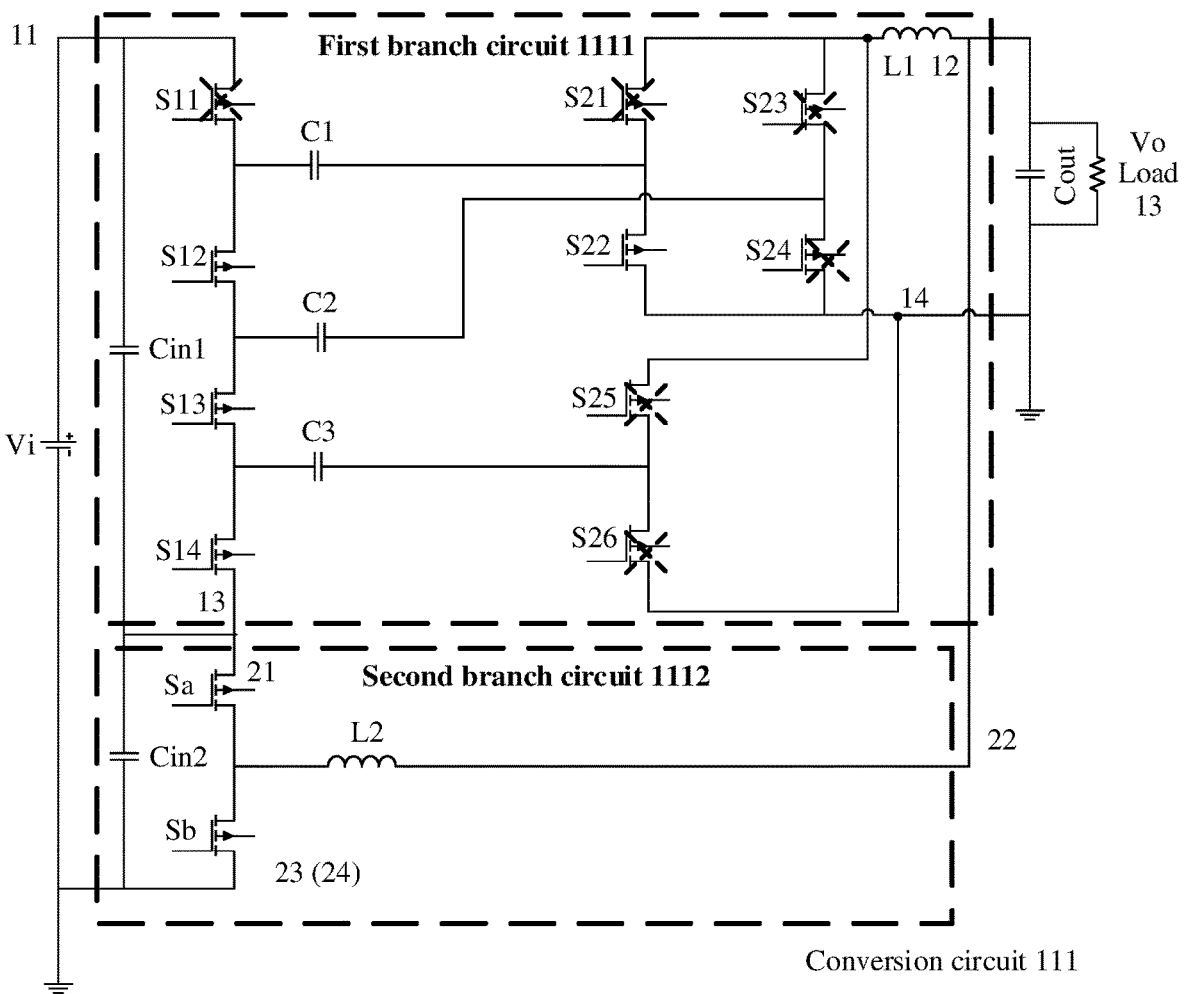

In a time period from t2 to t3, states of the switching transistors may be shown in FIG. 32*c*. The input switching transistor S12, the input switching transistor S13, the input switching transistor S14, and the output switching transistor S22 are switched on. The input switching transistor S11, the output switching transistor S21, the output switching transistor S23, the output switching transistor S24, the output switching transistor S25, and the output switching transistor S26 are switched off.

Figure 32D:
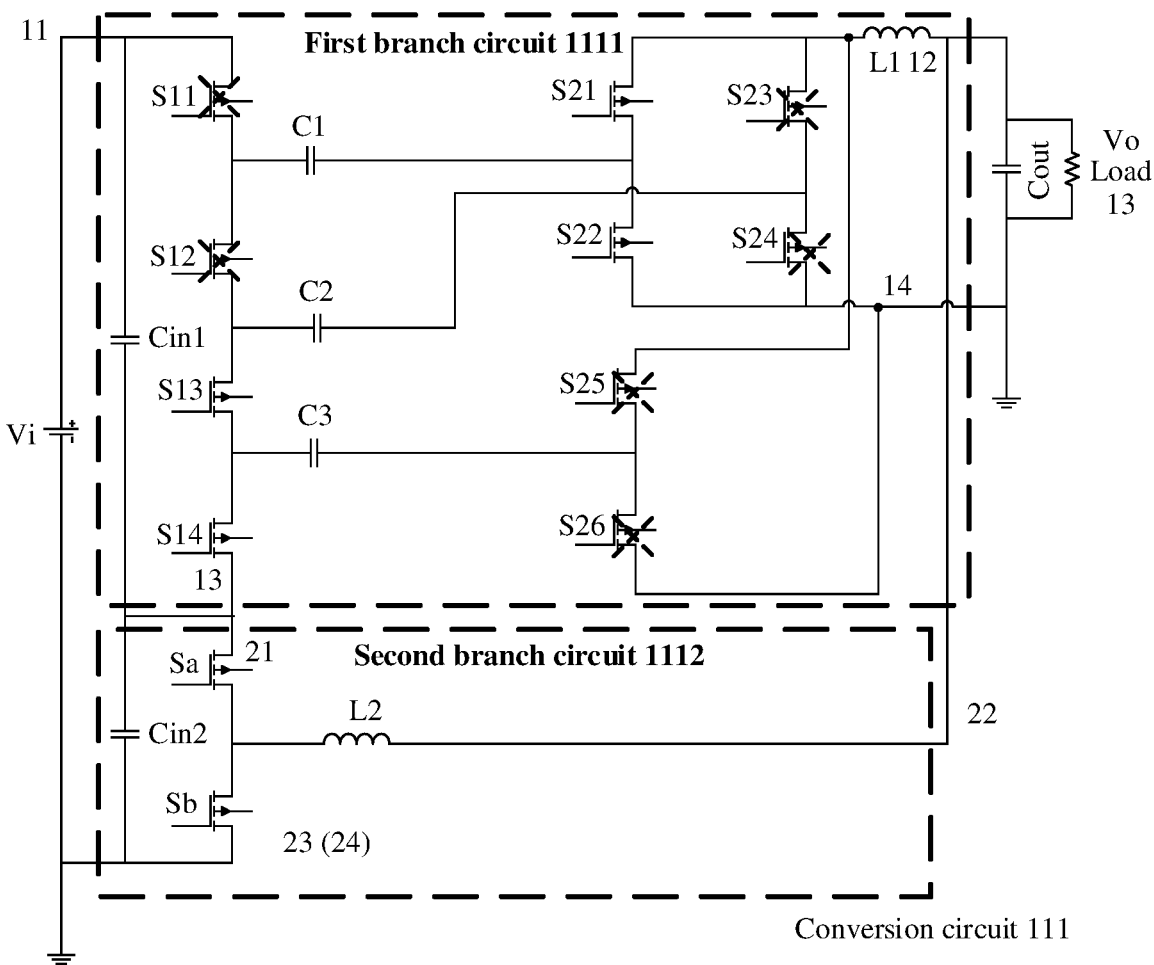

In a time period from t3 to T, states of the switching transistors may be shown in FIG. 32*d*. The input switching transistor S11, the input switching transistor S12, the output switching transistor S23, the output switching transistor S24, the output switching transistor S25, and the output switching transistor S26 are switched off. The input switching transistor S13, the input switching transistor S14, the output switching transistor S21, and the output switching transistor S22 are switched on.

It can be learned by comparing the drive signal in FIG. 31 with the drive signal in FIG. 15 that, the time period from t2 to t3 and the time period from t3 to T are added to the drive signal shown in FIG. 31, and the time period from t2 to 13 and the time period from t3 to T respectively correspond to the on/off states shown in FIG. 32*b* and FIG. 32*d*. The time period from t2 to t3 and the time period from 13 to T may be used for freewheeling of the first adjustable inductor L1.

According to Formula 22, when N1=1.6. A=1, and D1=0.3125. Therefore, the controller 112 adjusts D1 to 0.3125, so that the first transformation ratio N1 can reach 1.6.

It can be learned from the foregoing content that, disposing the first adjustable inductor L1 in the first branch circuit 1111 helps the controller 112 continuously adjust the first transformation ratio N1. In a possible implementation, the second branch circuit 1112 further includes a second adjustable inductor L2, and the second adjustable inductor L2 may be configured to adjust the output voltage Vo (adjust the second transformation ratio N2) of the second branch circuit 1112, so that the output voltage Vo reaches the target output voltage Va. In this case, the first adjustable inductor L1 in the first branch circuit 1111 may be electromagnetically coupled to the second adjustable inductor L2 in the second branch circuit 1112, that is, the first adjustable inductor L1 and the second adjustable inductor L2 are coupled inductors.

Figure 33:
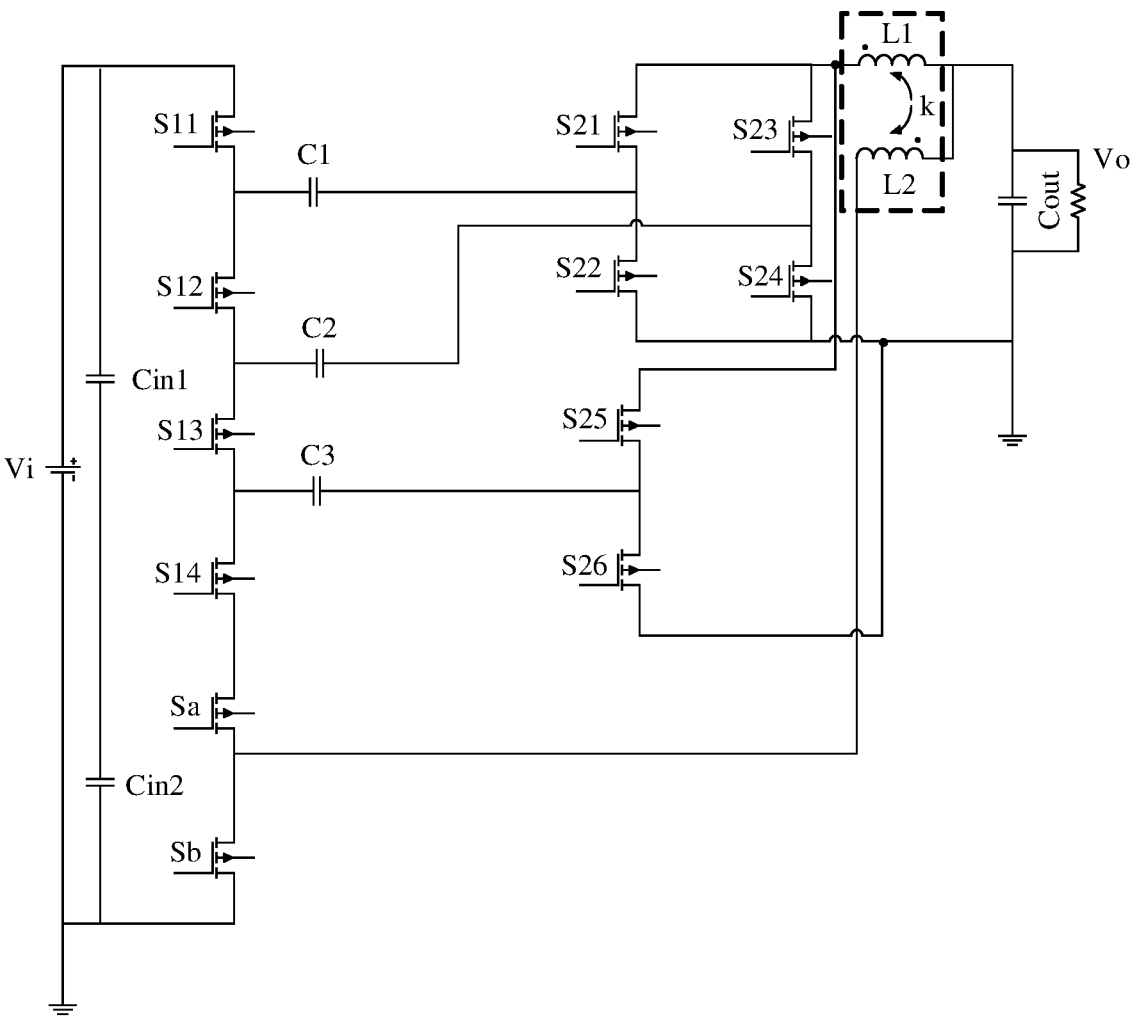
FIG. 33 is a schematic diagram of a structure of a specific conversion circuit according to an embodiment of this application.

For example, as shown in FIG. 33, the first adjustable inductor L1 and the second adjustable inductor L2 are the coupled inductors, a coupling coefficient between the first adjustable inductor L1 and the second adjustable inductor L2 is k, and the coupling between the first adjustable inductor L1 and the second adjustable inductor L2 may be positive coupling or negative coupling. Compared with two separate inductors, the first adjustable inductor L1 and the second adjustable inductor L2 are the coupled inductors, which helps reduce volumes of the first adjustable inductor L1 and the second adjustable inductor L2. In addition, ripples of output currents in the first adjustable inductor L1 and the second adjustable inductor L2 are further reduced, to further improve the efficiency of the conversion circuit 111.

In this embodiment of this application, the possible implementations of the first branch circuit 1111 are enumerated by using the six examples. It should be noted that, without violating a basic physical principle, some or all of the features of different examples may be combined and used for reference, to obtain a new technical solution.

Figure 34:
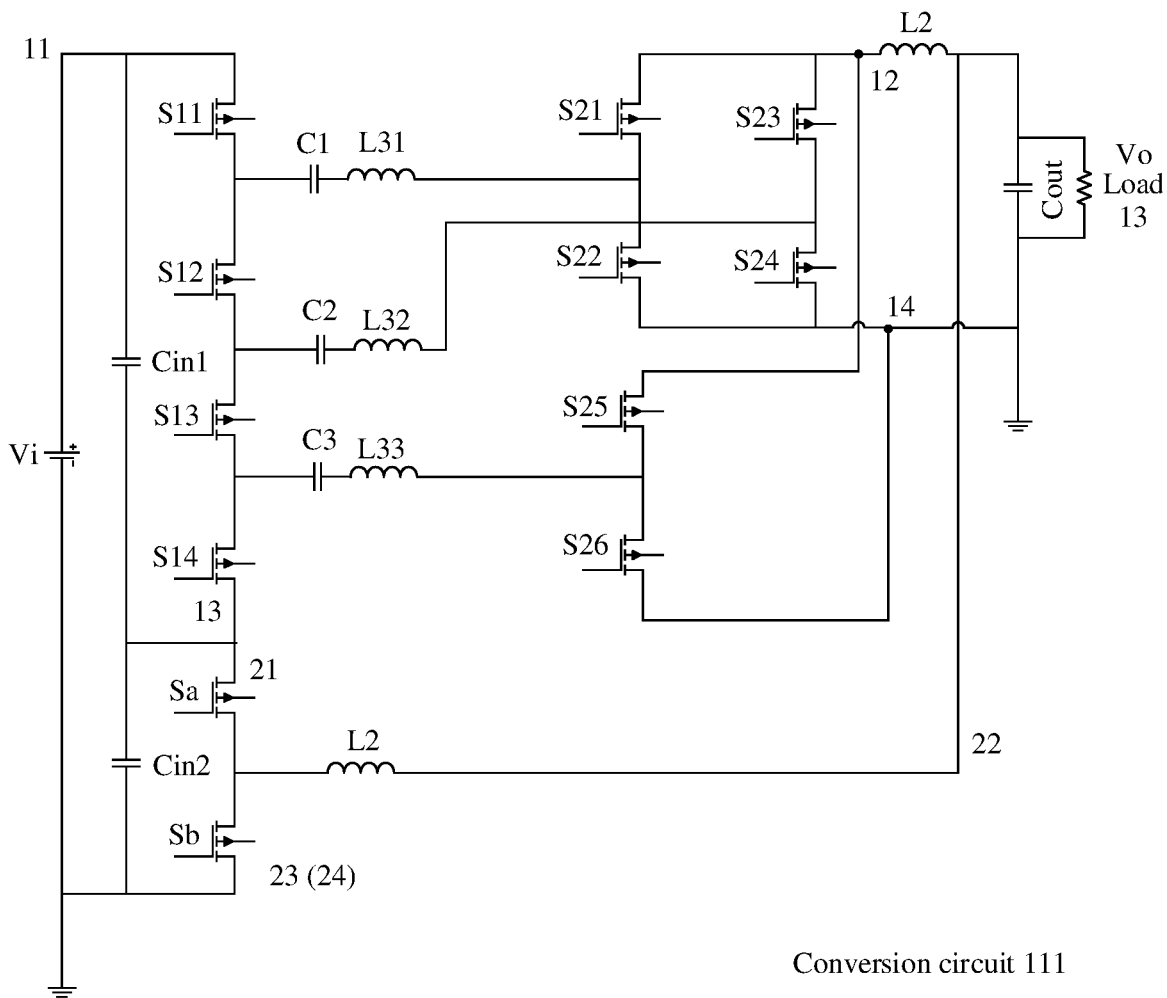
FIG. 34 is a schematic diagram of a structure of a specific conversion circuit according to an embodiment of this application.

For example, a conversion circuit 111 shown in FIG. 34 may be obtained based on Example 6 with reference to the resonant inductor disclosed in Example 1. Details are not described again.

Figure 35:
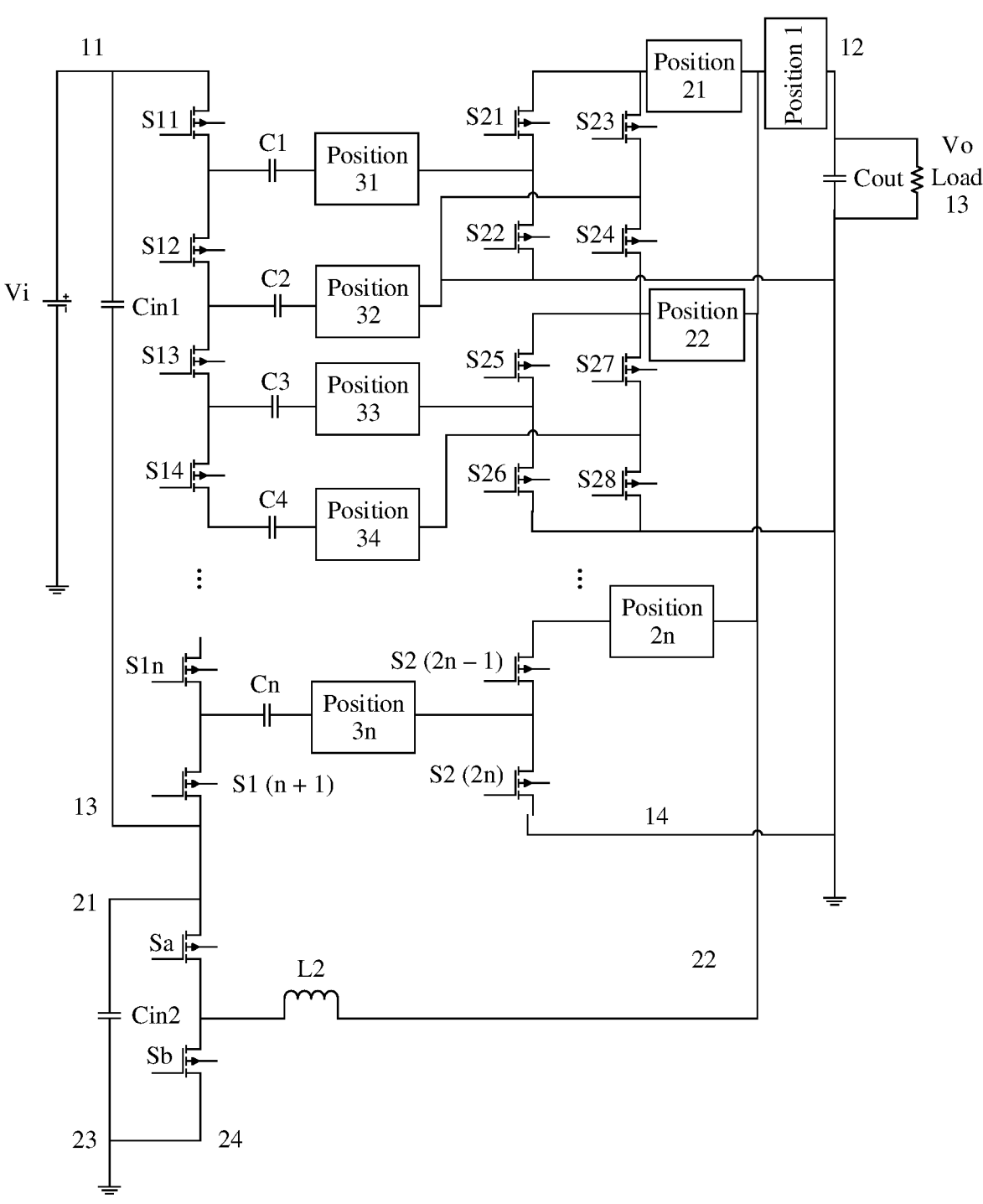
FIG. 35 is a schematic diagram of a structure of a specific conversion circuit according to an embodiment of this application.

For another example, a conversion circuit 111 shown in FIG. 35 may be obtained based on Example 1 with reference to the resonant inductor and the first adjustable inductor disclosed in Example 6. An inductor may be disposed in one or more of a position 1, a position 21 to a position 2n, and a position 31 to a position 3n.

In this embodiment of this application, the second branch circuit 1112 also has a plurality of possible implementations. Usually, when the efficiency of the second branch circuit 1112 is low; the second branch circuit 1112 may focus on fine adjustment of the output voltage Vo. Example 1 of the second branch circuit 1112:

The second branch circuit 1112 may be a buck circuit. For example, as shown in FIG. 9, the second branch circuit 1112 mainly includes a switching transistor Sa, a switching transistor Sb, and a first adjustable inductor L1. A first electrode of the switching transistor Sa may be connected to the connection end 13 of the first branch circuit 1111 as the connection end 21 of the second branch circuit 1112. A second electrode of the switching transistor Sa is separately connected to a first electrode of the switching transistor Sb and one end of the second adjustable inductor L2. A second electrode of the switching transistor Sb may be used as the output end 24, is connected to the input end 23, and is grounded. The other end of the second adjustable inductor L2 may be connected to the output end 14 of the first branch circuit 1111 as the output end 22.

Figure 36A:
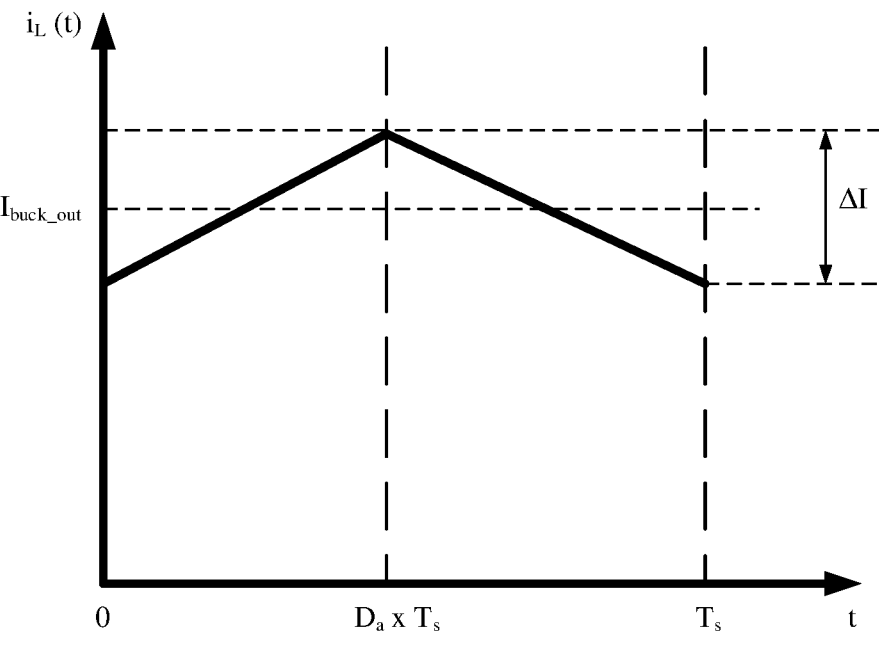
FIG. 36*a* to FIG. 36*c* each are a schematic diagram of a change of an inductor current in a buck circuit according to an embodiment of this application.
Figure 36B:
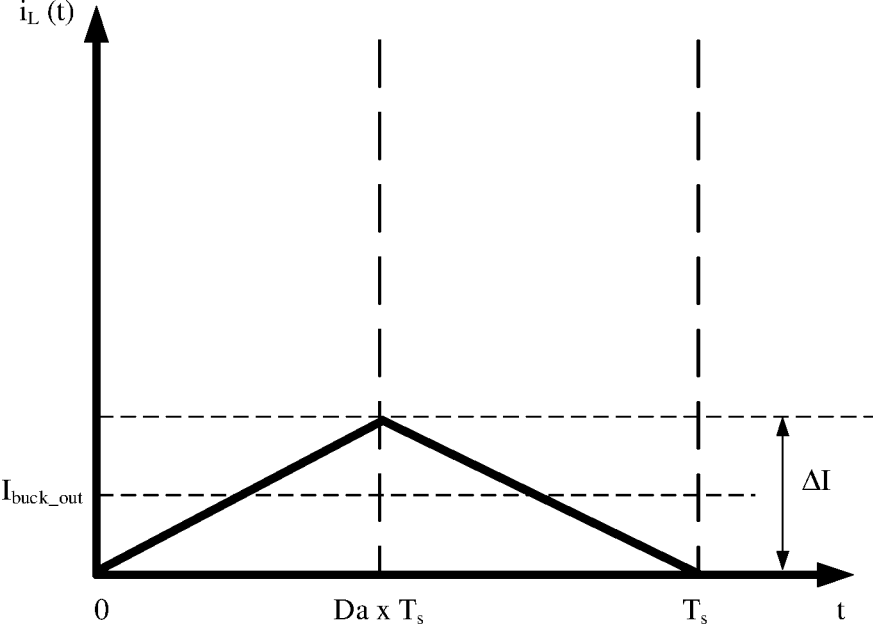
Figure 36C:
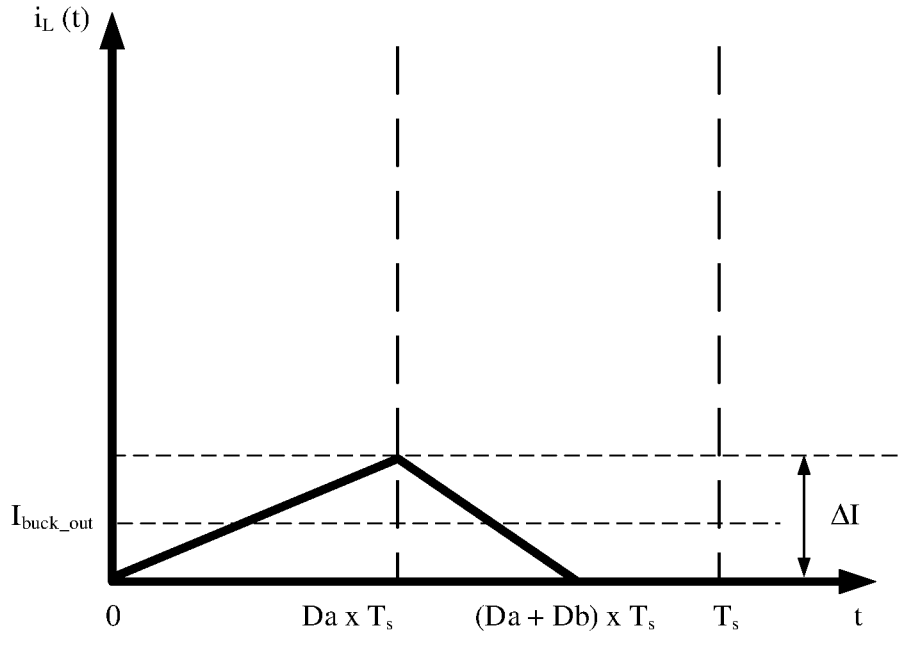

The buck circuit shown in FIG. 9 has at least three operating states, which are respectively shown in FIG. 36*a*, FIG. 36*b*, and FIG. 36*c*. Details are as follows:

As shown in FIG. 36*a*, $\Delta$I represents a ripple current on the second adjustable inductor L2, $I_{Buck\_out}$ represents an output current of the second branch circuit 1112, and Da represents a duty cycle of switch-on time of the switching transistor Sa in a period Ts. When $\Delta I/2 < I_{Buck\_out}$, the second branch circuit 1112 works in a continuous state, and a relationship between the output current $I_{Buck\_out}$ of the second branch circuit 1112 and time t may be shown in FIG. 36*a*. When $\Delta I/2 = I_{Buck\_out}$, the second branch circuit 1112 works in a continuous state, and a relationship between the output current $I_{Buck\_out}$ of the second branch circuit 1112 and the time t may be shown in FIG. 36*b*.

When $\Delta I/2 > I_{Buck\_out}$, the second branch circuit 1112 works in a discontinuous state, and a relationship between the output current $I_{Buck\_out}$ of the second branch circuit 1112 and the time t may be shown in FIG. 36*c*.

It can be learned from FIG. 36*a* to FIG. 36*c*, when the second branch circuit 1112 works in the continuous state and a critical state, only two states exist in one period of the second branch circuit 1112: An inductor current $I_L$ (t) in the second adjustable inductor L2 gradually increases, or the inductor current $I_L$ (t) gradually decreases. In this case, Da+Db=1, the output voltage Vo may be adjusted by adjusting the duty cycle Da in the second branch circuit 1112, and the second transformation ratio N2 may further, be adjusted, so that the output voltage Vo of the second branch circuit 1112 reaches the target output voltage Va.

The duty cycle Da and the second transformation ratio N2 satisfy the following relationship:

$$Da = \frac{Vo}{Vi - N1 * Vo} = \frac{1}{N2} \qquad \text{(Formula 23)}$$

When the second branch circuit 1112 works in the discontinuous state, three states exist in one period Ts: The inductor current $I_L$ (t) gradually increases, the inductor current $I_L$ (t) gradually decreases, and the inductor current $I_L$ (t) is 0. In this case, (Da+Db)<1, the output voltage Vo may be adjusted by adjusting the duty cycles Da and Db in the second branch circuit 1112. The duty cycle Da, the output voltage Vo, the first transformation ratio N1, and the second transformation ratio N2 satisfy the following relationship:

$$Vo = \frac{2}{1 + \sqrt{1 + \dfrac{4 * \dfrac{2 * L}{R * T_S}}{Da^2}}} (Vi - N1 * Vo) \qquad \text{(Formula 24)}$$

With reference to Formula 23 and Formula 24, it can be learned that:

$$\frac{2}{1 + \sqrt{1 + \dfrac{4 * \dfrac{2 * L}{R * T_s}}{Da^2}}} = \frac{1}{N2}$$

R represents an equivalent resistance of the load 13, and L represents an inductance of the second adjustable inductor L2. Usually, the equivalent resistance of the load 13 and the inductance of the second adjustable inductor L2 are not adjustable, and therefore the controller 112 may adjust the second transformation ratio N2 by adjusting the duty cycle Da.

Figure 37A:
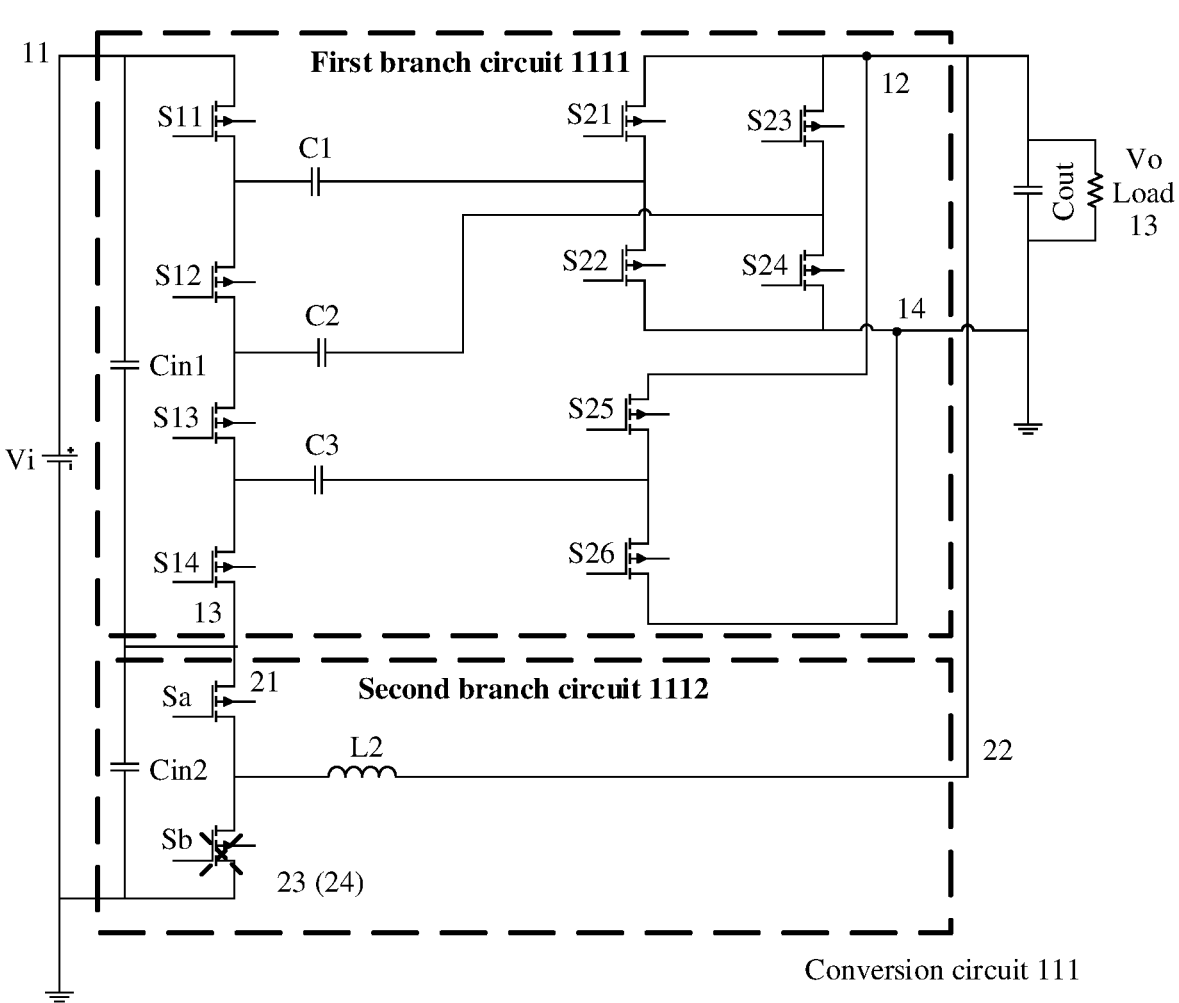
FIG. 37*a* to FIG. 37*c* each are a schematic diagram of an on/off state in a second branch circuit according to an embodiment of this application.
Figure 37B:
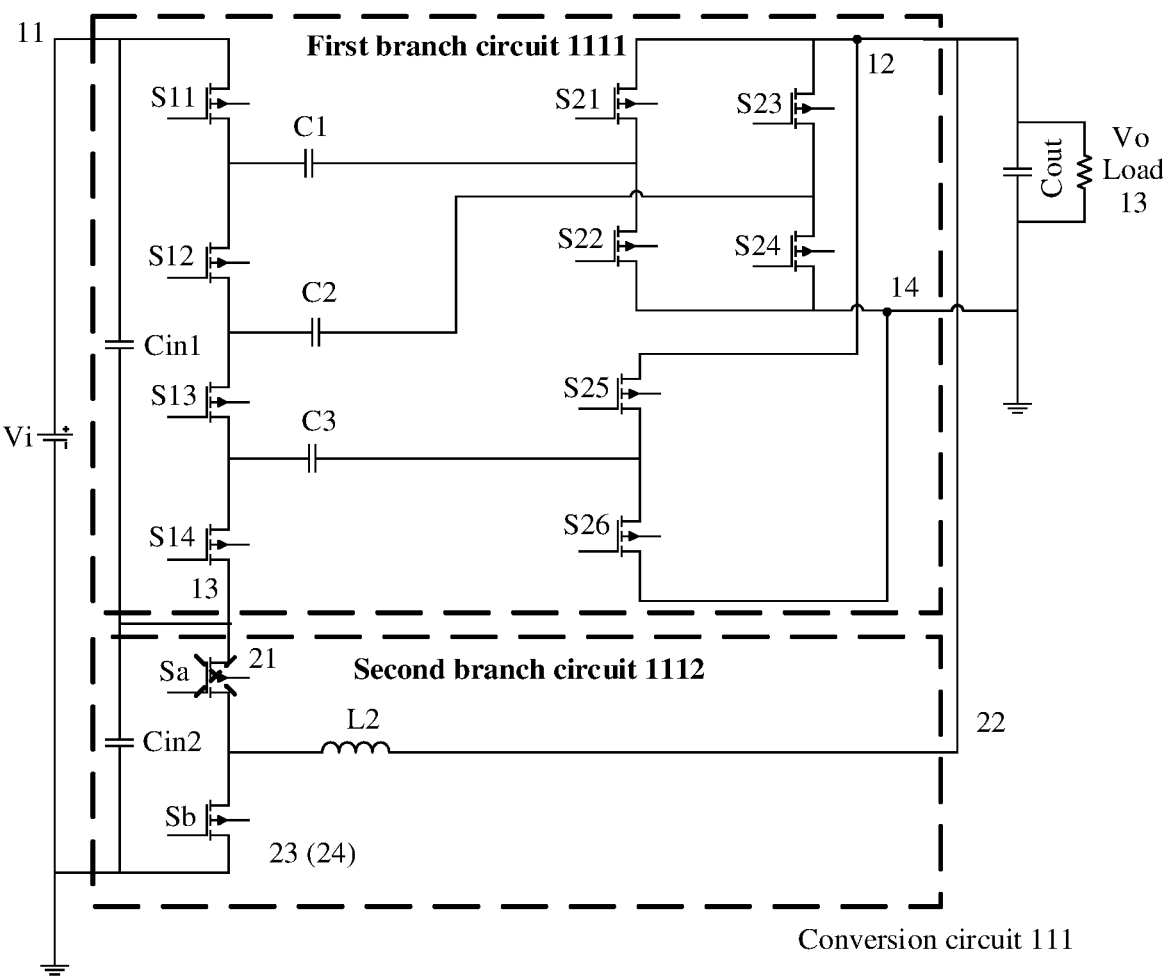

Specifically, in a time period from 0) to Da×Ts, states of the switching transistors in the second branch circuit 1112 may be shown in FIG. 37*a*. The switching transistor Sa is switched on, and the switching transistor Sb is switched off. In a time period from Da×Ts to (Da+Db)×Ts, states of the switching transistors in the second branch circuit 1112 may be shown in FIG. 37*b*.

Figure 37C:
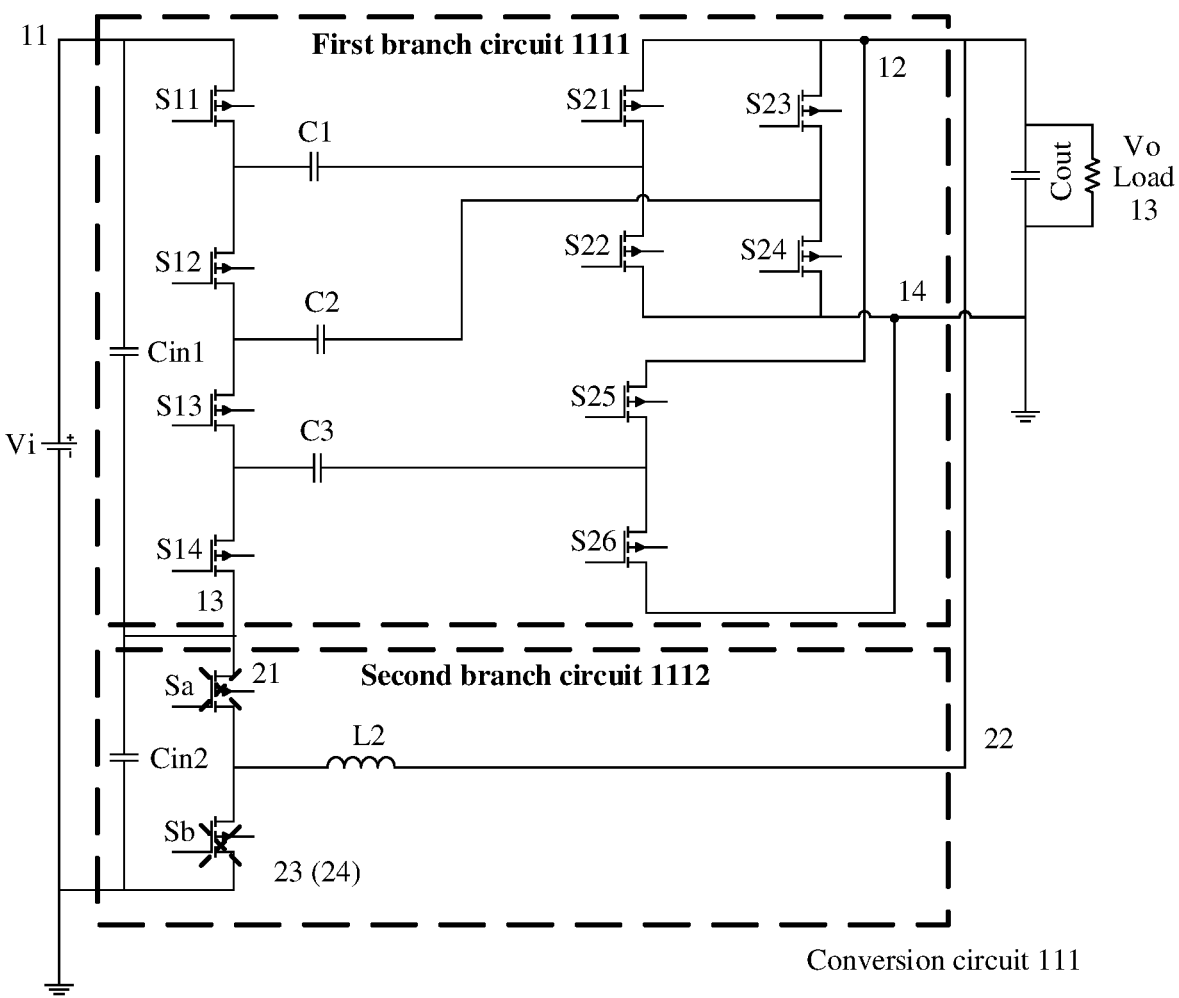

The switching transistor Sa is switched off, and the switching transistor Sb is switched on. In a time period from (Da+Db)×Ts to Ts, states of the switching transistors in the second branch circuit 1112 may be shown in FIG. 37*c*. The switching transistor Sa and the switching transistor Sb are both switched off. The controller 112 may adjust the second transformation ratio N2 by adjusting duration of each time period, so that the output voltage Vo of the second branch circuit 1112 reaches the target output voltage Va.

Example 2 of the Second Branch Circuit 1112

Figure 38:
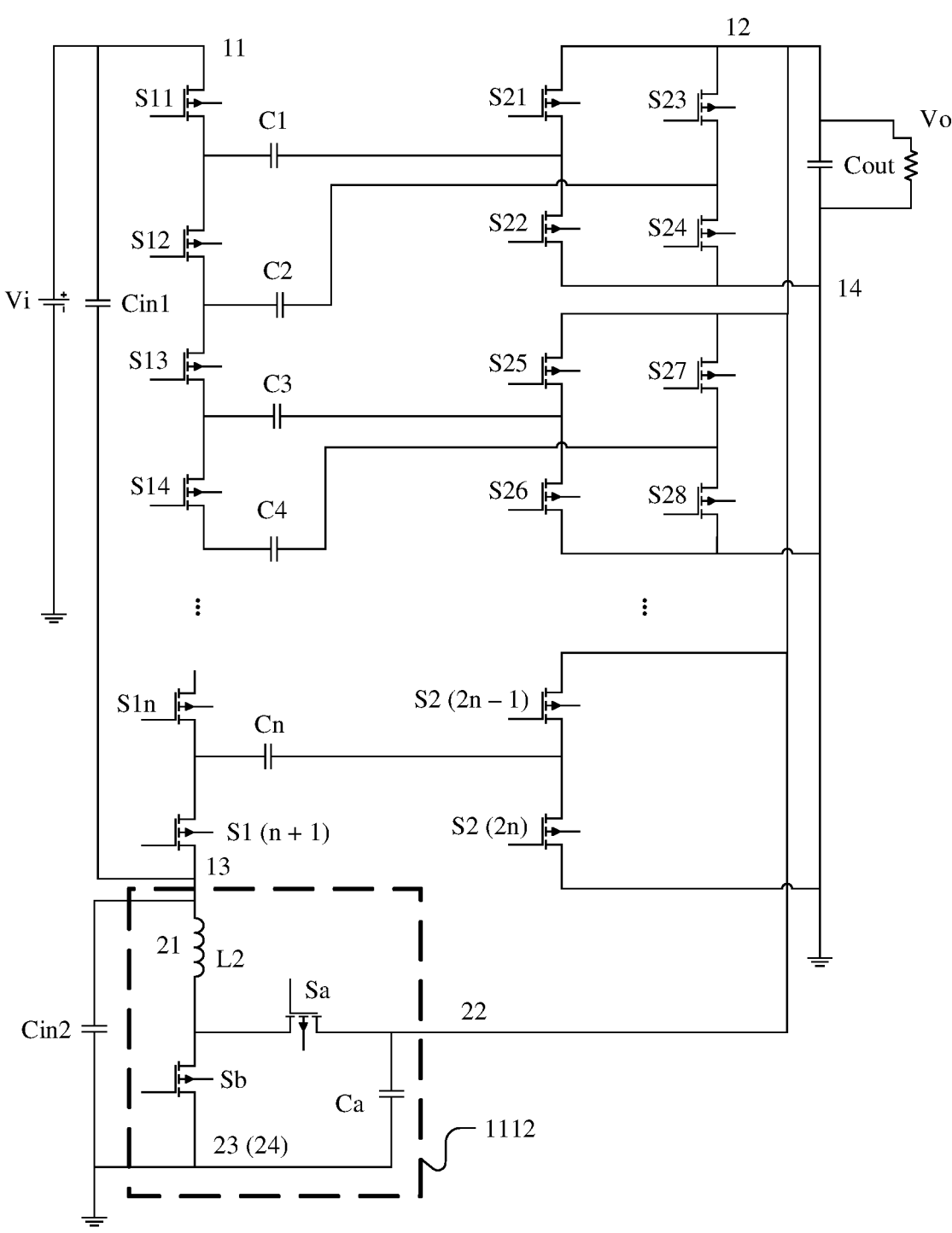
FIG. 38 is a schematic diagram of a structure of a specific conversion circuit according to an embodiment of this application.

The second branch circuit 1112 may alternatively be a voltage-adjustable boost circuit. For example, as shown in FIG. 38, the second branch circuit 1112 mainly includes a switching transistor Sa, a switching transistor Sb, an adjustable capacitor Ca, and a second adjustable inductor L2. One end of the second adjustable inductor L2 is connected to the connection end 13 of the first branch circuit 1111 as the connection end 21 of the second branch circuit 1112, and the other end of the second adjustable inductor L2 is separately connected to a first electrode of the switching transistor Sa and a first electrode of the switching transistor Sb. A second electrode of the switching transistor Sa is connected to one end of the adjustable capacitor Ca, and may be connected to the output end 12 of the first branch circuit 1111 as the output end 22. A second electrode of the switching transistor Sb and the other end of the adjustable capacitor Ca are grounded as the input end 23 and the output end 24.

Example 3 of the Second Branch Circuit 1112

Figure 39:
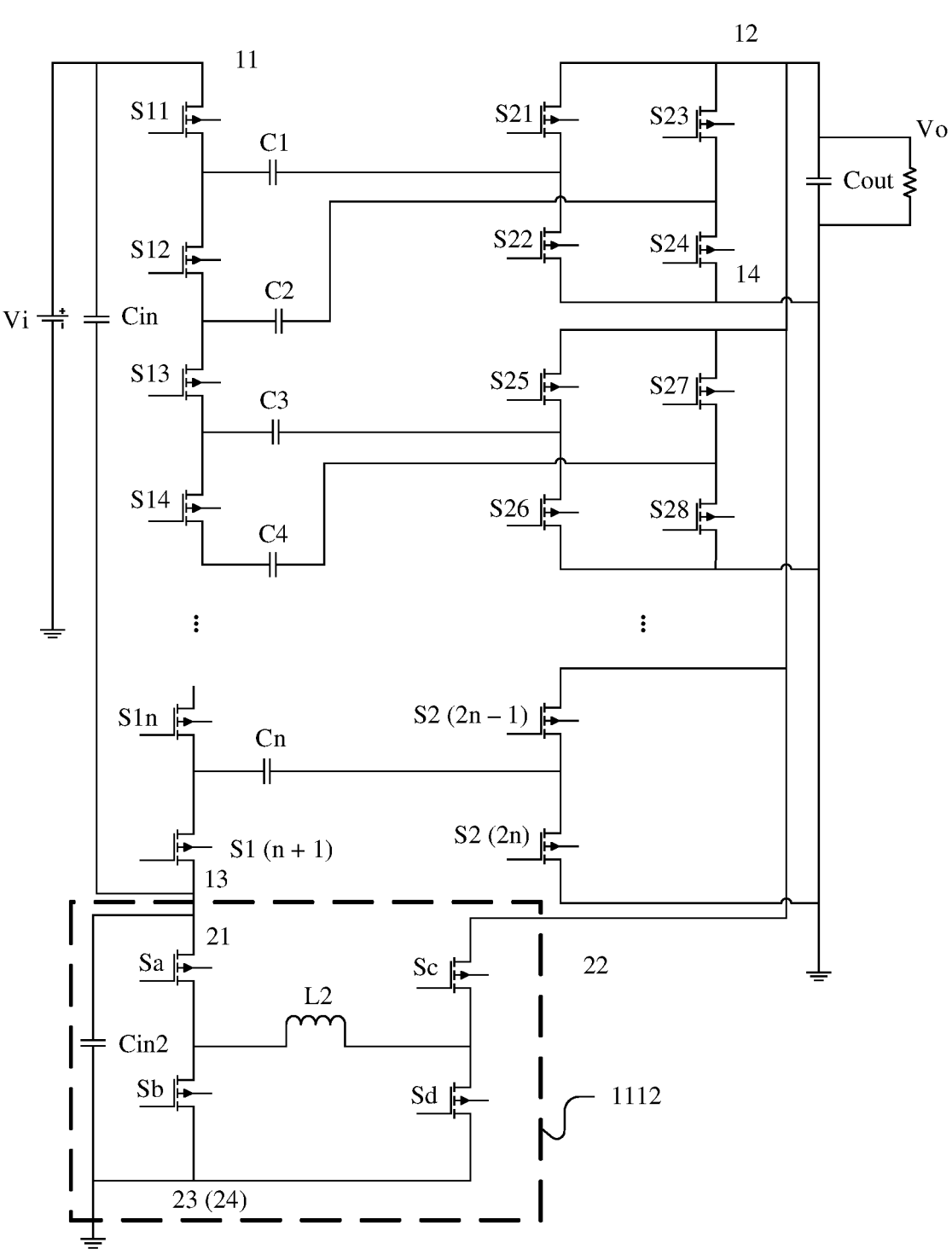
FIG. 39 is a schematic diagram of a structure of a specific conversion circuit according to an embodiment of this application.

The second branch circuit 1112 may alternatively be a buck-boost circuit. For example, as shown in FIG. 39, the second branch circuit 1112 mainly includes a switching transistor Sa, a switching transistor Sb, a switching transistor Sc, a switching transistor Sd, and a second adjustable inductor L2. A first electrode of the switching transistor Sa may be connected to the connection end 13 of the first branch circuit 1111 as the connection end 21 of the second branch circuit 1112. A second electrode of the switching transistor Sa may be separately connected to a first electrode of the switching transistor Sb and one end of the second adjustable inductor L2. The other end of the second adjustable inductor L2 is separately connected to a second electrode of the switching transistor Sc and a first electrode of the switching transistor Sd. A first electrode of the switching transistor Sc may be connected to the output end 12 of the first branch circuit 1111 as the output end 22. A second electrode of the switching transistor Sb and a second electrode of the switching transistor Sd are grounded as the input end 23 and the output end 24.

Example 4 of the Second Branch Circuit 1112

Figure 40:
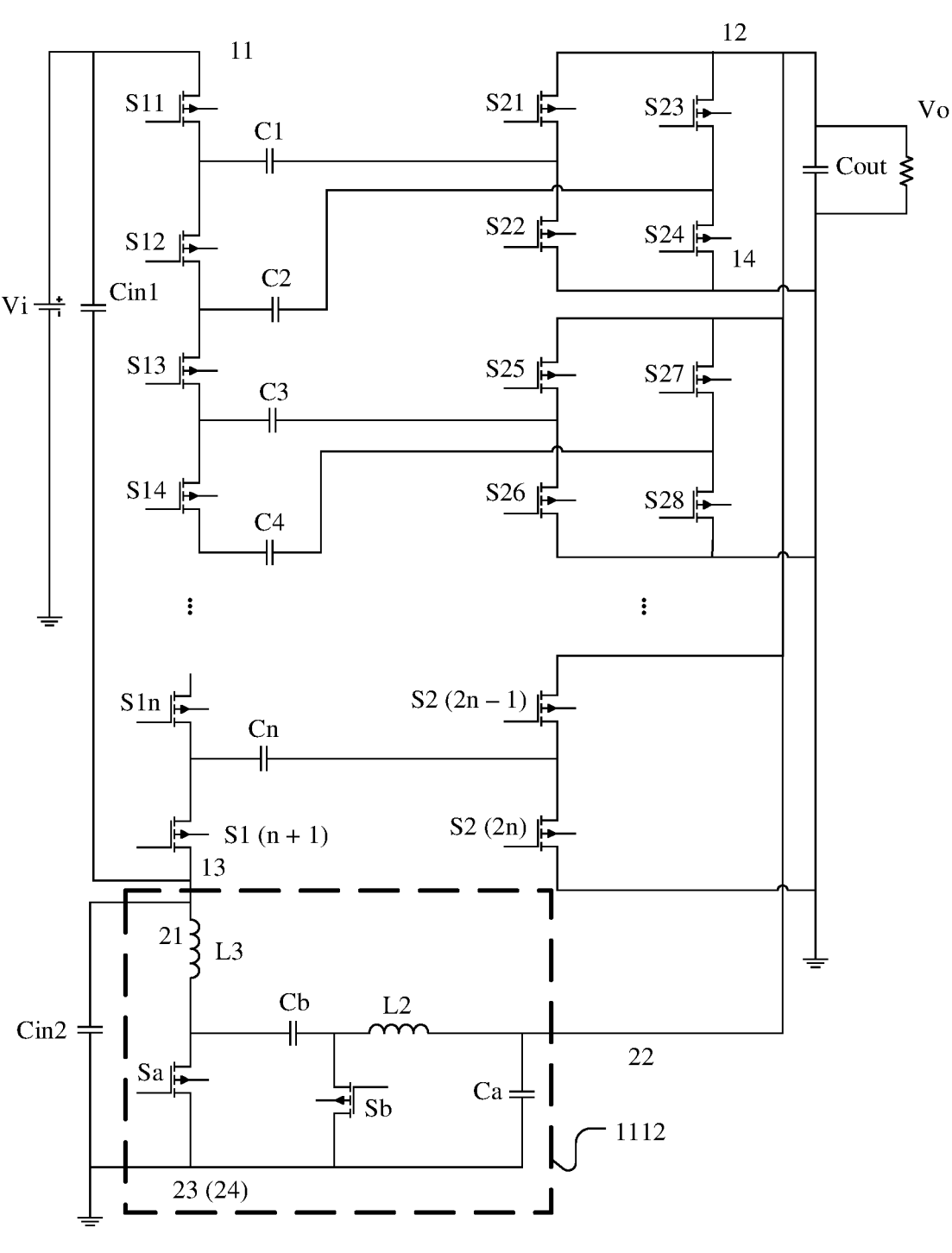
FIG. 40 is a schematic diagram of a structure of a specific conversion circuit according to an embodiment of this application.

The second branch circuit 1112 may alternatively be a chopper (cuk) circuit. For example, as shown in FIG. 40, the second branch circuit 1112 mainly includes a switching transistor Sa, a switching transistor Sb, an adjustable capacitor Ca, an adjustable capacitor Cb, a second adjustable inductor L2, and a third adjustable capacitor L3.

One end of the third adjustable inductor L3 may be connected to the connection end 13 of the first branch circuit 1111 as the connection end 21 of the second branch circuit 1112. The other end of the third adjustable capacitor L3 is separately connected to a first electrode of the switching transistor Sa and one end of the adjustable capacitor Cb. The other end of the adjustable capacitor Cb is separately connected to one end of the second adjustable inductor L2 and a first electrode of the switching transistor Sb. The other end of the second adjustable inductor L2 is connected to one end of the adjustable capacitor Ca. The other end of the adjustable capacitor Ca, a second electrode of the switching transistor Sa, and a second electrode of the switching transistor Sb are grounded.

Example 5 of the Second Branch Circuit 1112

Figure 41:
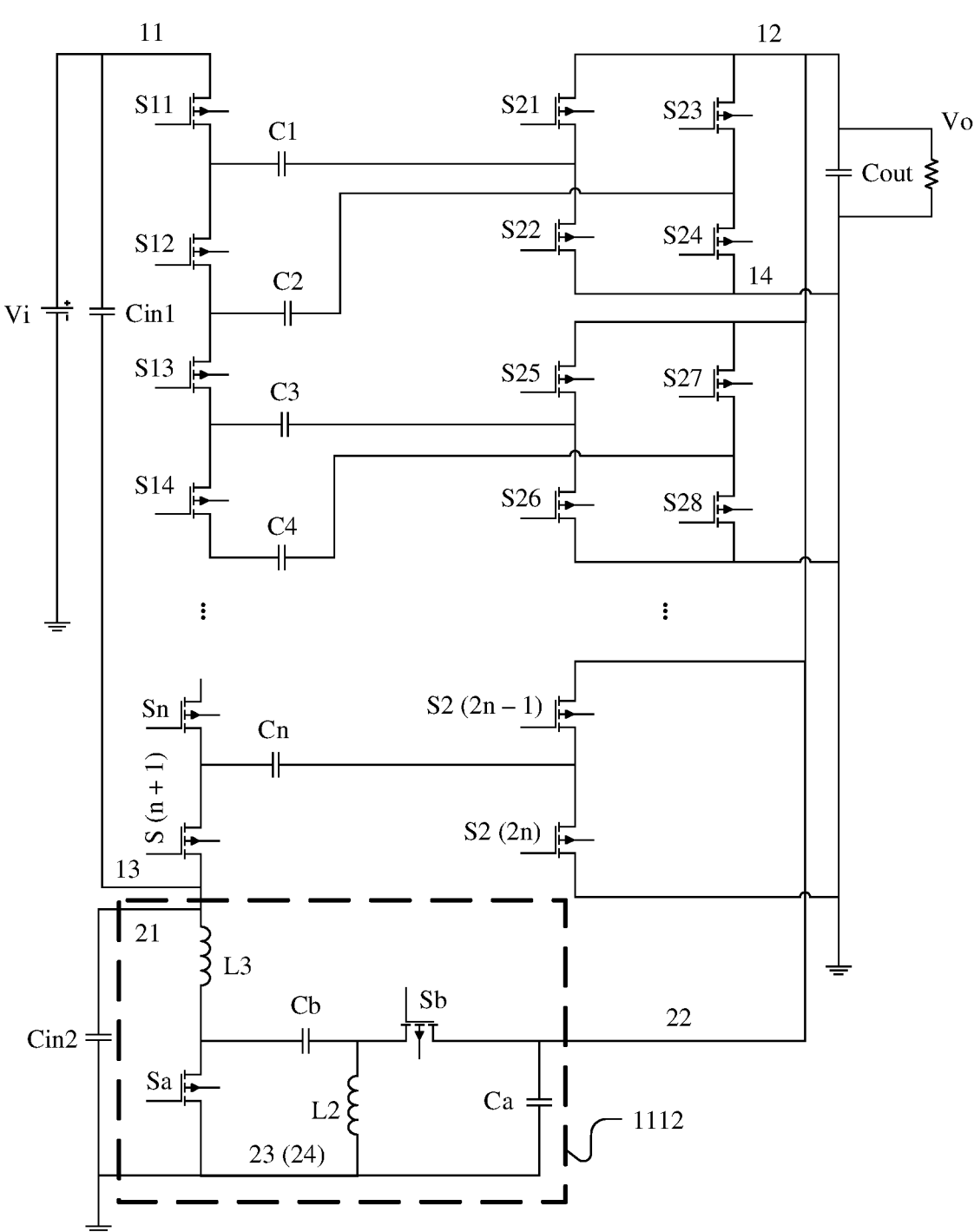
FIG. 41 is a schematic diagram of a structure of a specific conversion circuit according to an embodiment of this application.

The second branch circuit 1112 may alternatively be a single-ended primary-inductor converter (single-ended primary-inductor converter, sepic) circuit. For example, as shown in FIG. 41, the second branch circuit 1112 mainly includes a switching transistor Sa, a switching transistor Sb, a second adjustable inductor L2, a third adjustable inductor L3, a first adjustable capacitor Ca, and a second adjustable capacitor Cb. Details are as follows:

One end of the third adjustable inductor L3 is connected to the connection end 13 of the first branch circuit 1111 as the connection end 21, and the other end of the third adjustable inductor L3 is separately connected to one end of the second adjustable capacitor Cb and a first electrode of the switching transistor Sa. The other end of the second adjustable capacitor Cb is separately connected to one end of the second adjustable inductor L2 and a first electrode of the switching transistor Sb. A second electrode of the switching transistor Sb may be connected to the output end 12 of the first branch circuit 1111 as the output end 22. A second electrode of the switching transistor Sb is further connected to one end of the first adjustable capacitor Ca. A second electrode of the switching transistor Sa, the other end of the second adjustable inductor L2, and the other end of the first adjustable capacitor Ca are grounded.

Example 6 of the Second Branch Circuit 1112

Figure 42:
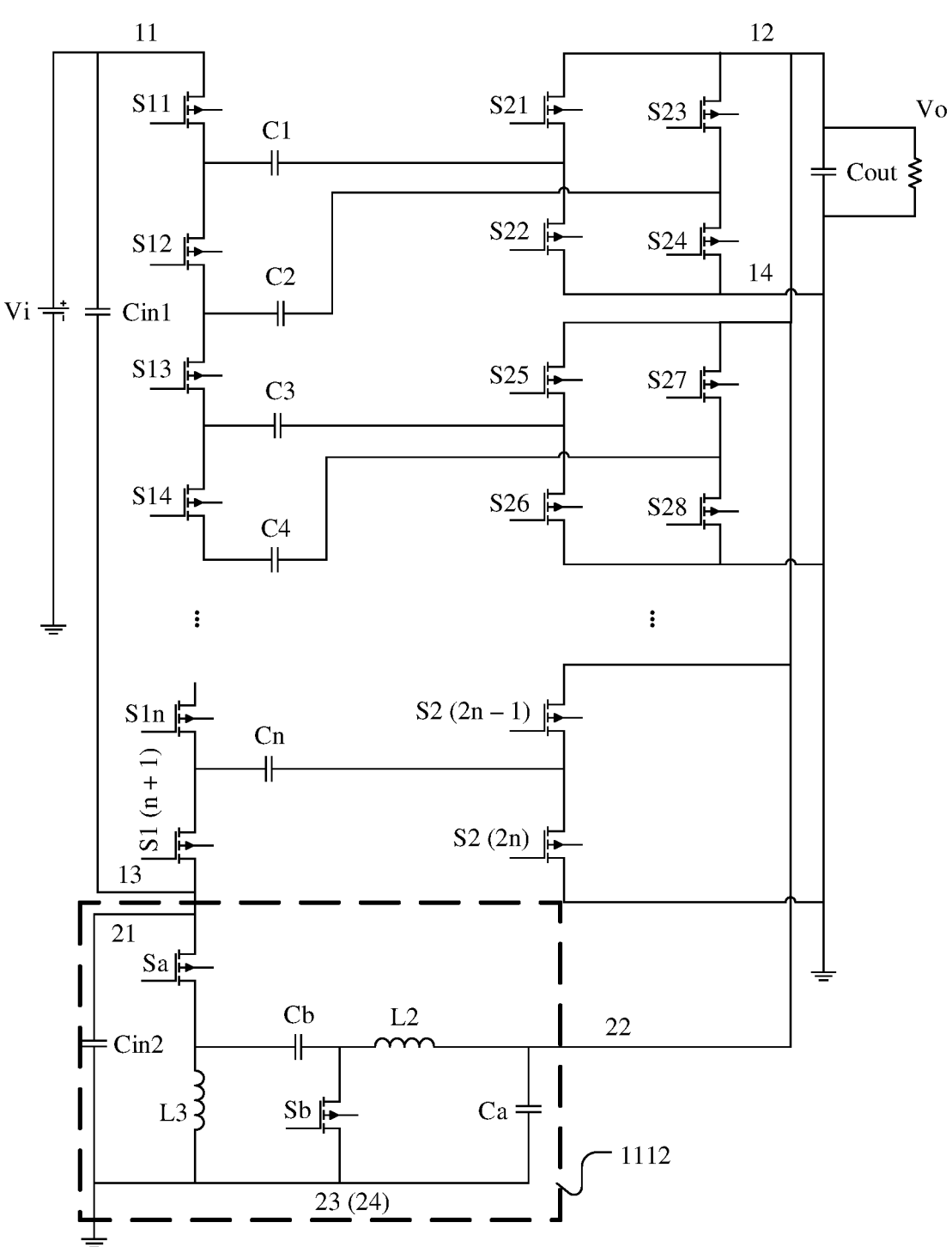
FIG. 42 is a schematic diagram of a structure of a specific conversion circuit according to an embodiment of this application.

The second branch circuit 1112 may alternatively be a zeta circuit. For example, as shown in FIG. 42, the second branch circuit 1112 mainly includes a switching transistor Sa, a switching transistor Sb, a second adjustable inductor L2, a third adjustable inductor L3, a first adjustable capacitor Ca, and a second adjustable capacitor Cb. Details are as follows:

A first electrode of the switching transistor Sa may be connected to the connection end 13 of the first branch circuit 1111 as the connection end 21 of the second branch circuit 1112, and a second electrode of the switching transistor Sa is separately connected to one end of the second adjustable capacitor Cb and one end of the third adjustable inductor L3. The other end of the second adjustable capacitor Cb is separately connected to one end of the second adjustable inductor L2 and a first electrode of the switching transistor Sb. The other end of the second adjustable inductor L2 may be connected to the output end 12 of the first branch circuit 1111 as the output end 22. The other end of the second adjustable inductor L2 may further be connected to one end of the first adjustable capacitor Ca. The other end of the third adjustable inductor L3, a second electrode of the switching transistor Sb, and the other end of the first adjustable capacitor Ca are grounded.

The foregoing examples show the possible implementations of the first branch circuit 1111 and the second branch circuit 1112 in the conversion circuit 111. As described above, the conversion circuit 111 provided in this embodiment of this application helps improve the efficiency of conversion circuit 111 and reduce the volume of the inductor in the conversion circuit 111.

Figure 43A:
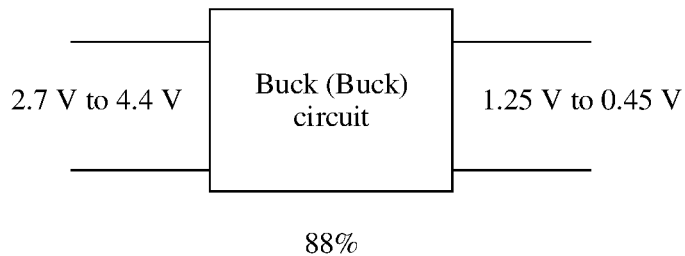
FIG. 43*a* is a schematic diagram of efficiency of a buck circuit.

As shown in FIG. 43a, when an input voltage of the buck circuit falls within a voltage range of 2.7 V to 4.4 V, and an output voltage of the buck circuit falls within a voltage range of 1.25 V to 0.45 V, efficiency of the buck circuit is approximately 88%.

Figure 43B:
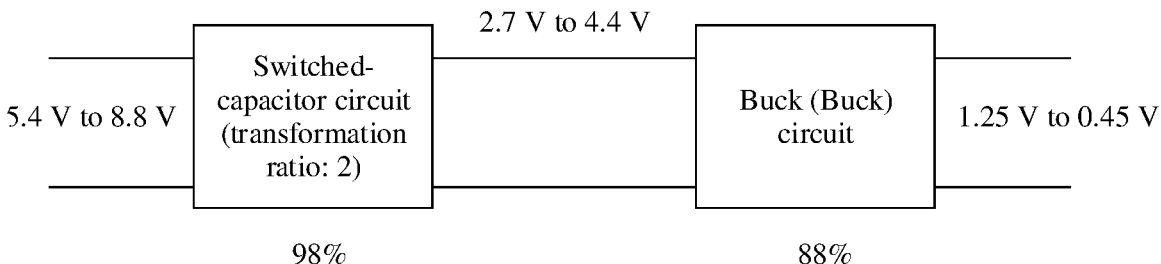
FIG. 43*b* is a schematic diagram of efficiency obtained after a switched-capacitor circuit and a buck circuit are connected in series.

As shown in FIG. 43b, if a switched-capacitor circuit is connected in series to the buck circuit, an input voltage of the switched-capacitor circuit falls within a voltage range of 5.4 V to 8.8 V, and a transformation ratio of the switched-capacitor circuit is 2. In this case, efficiency of the switched-capacitor circuit is approximately 98%. The input voltage of the buck circuit falls within the voltage range of 2.7 V to 4.4 V, and the output voltage of the buck circuit falls within the voltage range of 1.25 V to 0.45 V, and the efficiency of the buck circuit is approximately 88%.

Figure 43C:
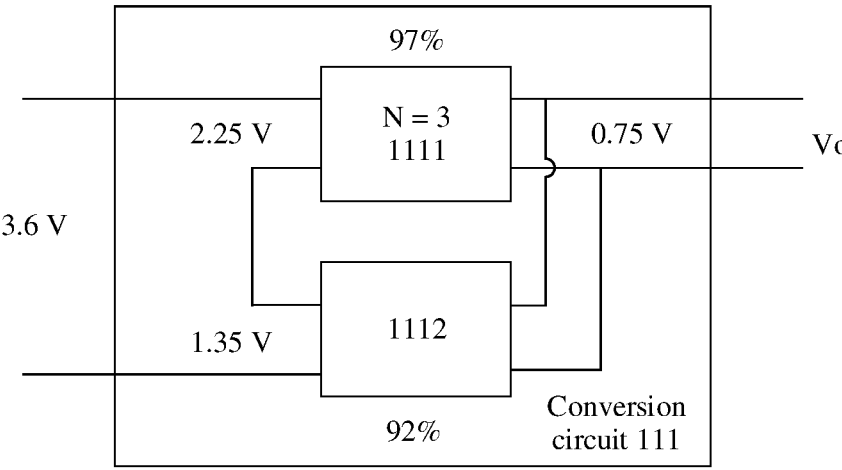
FIG. 43*c* is a schematic diagram of efficiency of a conversion circuit according to an embodiment of this application.

As shown in FIG. 43c, if the conversion circuit 111 provided in this embodiment of this application is used, and it is assumed that the first branch circuit 1111 has the structure shown in FIG. 10a, and the second branch circuit 1112 is the buck circuit. The input voltage Vi1=2.25 V, the input voltage Vi2=1.35 V, the first transformation ratio N1=3, and the output voltage Vo=0.75 V. In this case, the efficiency of the first branch circuit 1111 is approximately 97%, and the efficiency of the second branch circuit 1112 is approximately 92%.

The efficiency, heights, and areas of the three circuit structures shown in FIG. 43*a* to FIG. 43*c* may be shown in Table 2. The height refers to a height perpendicular to a direction of a circuit board in which the circuit structure is located, and the area refers to an area occupied by the circuit structure in the circuit board, and mainly includes an area of an inductor in the circuit structure and an area of a flying capacitor except an input capacitor and an output capacitor.

TABLE 2

| Circuit structure | Efficiency | Height | Area (Inductor + Flying capacitor, except chip, input capacitor, and output capacitor) |
|---|---|---|---|
| As shown in FIG. 43a | 88% | 0.8 mm | 2.4 mm²/5A (one inductor in a 2012 size) 110 nH |
| As shown in FIG. 43b | 86% | 0.8 mm | 1.7 mm²/5A (one capacitor in a 0402 size + one inductor in a 1210 size) 60 nH |
| As shown in FIG. 43c | 95% | 0.5 mm | 2 mm²/5A (three capacitors in a 0402 size + one inductor in a 0402 size) 30 nH |

The efficiency of the circuit structure shown in FIG. 43*a* is 88%, an inductor height is 0.8 mm, and each time a load current of 5 A passes, one inductor in a 2012 size is required, with an occupied area of 2.4 mm² and an inductance of 110 nH. The efficiency of the circuit structure shown in FIG. 43*b* is 86%, an inductor height is 0.8 mm, and each time a load current of 5 A passes, one capacitor in a 0402 size and one inductor in a 1210 size are required, with an occupied area of 1.7 mm² and an inductance of 60 nH. The efficiency of the circuit structure shown in FIG. 43*c* is 95%, an inductor height is 0.5 mm, and each time a load current of 5 A passes, three capacitors in a 0402 size and one inductor in a 0402 size are required, with an occupied area of 2 mm² and an inductance of 30 nH.

It can be learned from Table 2 that the efficiency of the circuit structure shown in FIG. 43*c* is much higher than that of other circuit structures, and the height is only 0.5 mm.

In the foregoing examples, in the conversion circuit 111, the input sides of the first branch circuit 1111 and the second branch circuit 1112 are connected in series, and the output sides of the first branch circuit 1111 and the second branch circuit 1112 are connected in parallel. Based on a same technical idea, the input sides of the first branch circuit 1111 and the second branch circuit 1112 may be connected in parallel, and the output sides of the first branch circuit 1111 and the second branch circuit 1112 may be connected in series.

Figure 44:
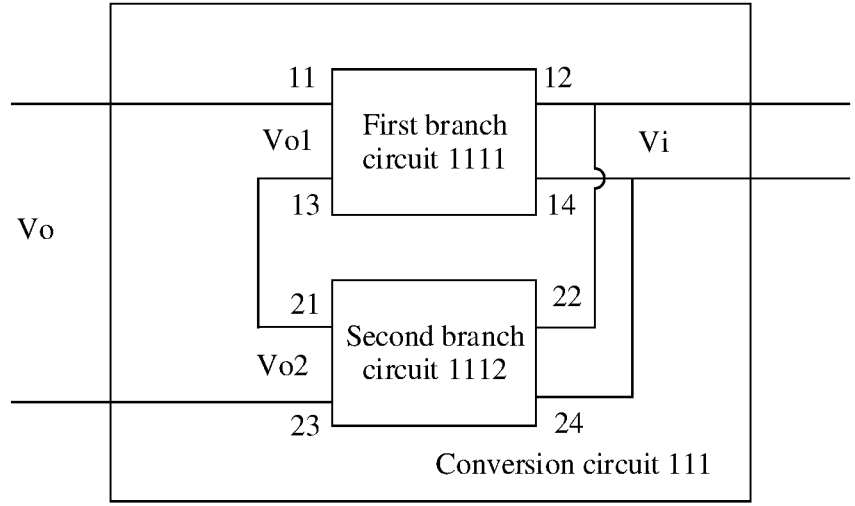
FIG. 44 is a schematic diagram of a structure of a conversion circuit according to an embodiment of this application.

In this case, as shown in FIG. 44, the input end 11 of the first branch circuit 1111 may be used as an output end 11, the output end 12 of the first branch circuit 1111 may be used as an input end 12, and the output end 14 of the first branch circuit 1111 may be used as an input end 14. Similarly, the input end 23 of the second branch circuit 1112 may be used as an output end 23, the output end 22 of the second branch circuit 1112 may be used as an input end 22, and the output end 24 of the second branch circuit 1112 may be used as an input end 24.

That is, an input side (the input end 12 and the input end 14) of the first branch circuit 1111 is connected in parallel to an input side (the input end 22 and the input end 24) of the second branch circuit 1112, and an output side (the output end 11 and the connection end 13) of the first branch circuit 1111 is connected in series to an output side (the connection end 21 and the output end 23) of the second branch circuit 1112.

The input end 12 and the input end 14 of the first branch circuit 1111 may receive the input voltage Vi, and the output end 11 and the connection end 13 of the first branch circuit 1111 may output an output voltage Vo1 of the first branch circuit 1111. The input end 22 and the input end 24 of the second branch circuit 1112 may receive the input voltage Vi of the conversion circuit 111, and the connection end 21 and the output end 23 of the second branch circuit 1112 may output an output voltage Vo2 of the second branch circuit 1112. A voltage between the output end 11 and the output end 23 is the output voltage Vo of the conversion circuit 111, and Vo=Vo1+Vo2.

It should be noted that when the input sides of the conversion circuit 111 are connected in parallel and the output sides of the conversion circuit 111 are connected in series, the conversion circuit 111 is a boost circuit. In this case, the first transformation ratio N1 may be understood as a ratio of the output voltage Vo1 to the input voltage Vi, that is, N1=Vo1/Vi. Similarly, the second transformation ratio N2 may be expressed as N2=Vo2/Vi.

It should be noted that, when the conversion circuit 111 provided in this embodiment of this application is the boost circuit, any one of the foregoing examples provided in this embodiment of this application may also be used for the first branch circuit 1111 and the second branch circuit 1112. Details are not described again.

To further improve efficiency of the conversion circuit, in a possible implementation, when efficiency of the first branch circuit 1111 is greater than efficiency of the second branch circuit 1112, a first output voltage Vo1 is greater than a second output voltage Vo2: or when efficiency of the first branch circuit 1111 is less than efficiency of the second branch circuit 1112, the first output voltage Vo1 is less than the second output voltage Vo2. Specific analysis is similar to that of the conversion circuit 111 shown in FIG. 4, and details are not described herein again.

The first branch circuit 1111 may also include a first adjustable inductor, so that the first transformation ratio N1 of the first branch circuit 1111 is continuously adjustable. The first adjustable inductor is connected to the first input end 12, and is configured to receive the input voltage Vi. The first adjustable inductor is disposed, so that the first branch circuit 1111 can implement a continuous transformation ratio. When the second branch circuit 1112 includes a second adjustable inductor, the second adjustable inductor may be electromagnetically coupled to the first adjustable inductor.

In this embodiment of this application, the conversion circuit 111 may further include a first output capacitor and a second output capacitor. One end of the first output capacitor is connected to a first output end, and the other end of the first output capacitor is connected to a first connection end; and one end of the second output capacitor is connected to a second connection end, and the other end of the second output capacitor is connected to a second output end. The first output capacitor may filter the first output voltage, and the second output capacitor may filter the second output voltage.

The conversion circuit 111 may further include an input capacitor, one end of the input capacitor is connected to a first input end, and the other end of the input capacitor is connected to a second input end. The input capacitor may filter the input voltage of the conversion circuit 111.

Specifically; the controller 112 may set the first transformation ratio N1 and the second transformation ratio N2 through the following steps:

Step 1: The controller 112 determines a value range of the first transformation ratio N1 based on the target transformation ratio Na and the maximum transformation ratio of the first branch circuit 1111, where the first transformation ratio N1 is less than the target transformation ratio Na and less than or equal to the maximum transformation ratio Nmax of the first branch circuit 1111, and the target transformation ratio Na is a ratio of the target output voltage Va to the input voltage Vi, that is, Na=Va/Vi.

Step 2: The controller 112 sets the first transformation ratio N1 within the value range of the first transformation ratio N1.

Step 3: The controller adjusts the second transformation ratio N2 based on the target output voltage Va and the set first transformation ratio N1, so that the second branch circuit 1112 converts the input voltage Vi of the conversion circuit 111 into an adjusted second output voltage Vo2, where the adjusted second output voltage Vo2 is a difference obtained by subtracting an adjusted first output voltage Vo1 from the target output voltage Va, that is, Vo2=Va31 Vo1. The adjusted first output voltage Vo1 is a product of the set first transformation ratio N1 and the input voltage Vi, and may be expressed as Vo1=N1×Vi.

In a possible implementation, the first branch circuit 1111 has a plurality of adjustable transformation ratios, efficiency of the first branch circuit 1111 is greater than efficiency of the second branch circuit 1112, and the controller 112 may set the first transformation ratio N1 to an adjustable transformation ratio that is in the plurality of adjustable transformation ratios and that is less than the target transformation ratio and closest to the target transformation ratio. In another possible implementation, the controller 112 may calculate a reference transformation ratio of a first voltage difference to the input voltage Vi, where the first voltage difference is a voltage difference obtained by subtracting a reference voltage Vb from the target output voltage Va, and the reference voltage Vb is less than the target output voltage Va and is greater than or equal to the input voltage Vi. The reference transformation ratio may be expressed as (Va−Vb)/Vi. When the reference transformation ratio is less than or equal to the maximum transformation ratio Nmax of the first branch circuit 1111, the controller 112 may set the first transformation ratio N1 as the reference transformation ratio: or when the reference transformation ratio is greater than the maximum transformation ratio Nmax of the first branch circuit 1111, the controller 112 may set the first transformation ratio N1 as the maximum transformation ratio Nmax of the first branch circuit 1111.

For example, the reference voltage Vb may be less than or equal to a voltage obtained after the target output voltage Va is divided by 2. Therefore, in most cases, the first branch circuit can transmit large power, which further helps improve the efficiency of the conversion circuit.

Based on a same technical concept, an embodiment of this application further provides an electronic device. The electronic device may be a smartphone, a tablet computer, an intelligent wearable device, or the like. The electronic device mainly includes a battery, a load, and the switch-mode power supply provided in any one of the foregoing embodiments, and the switch-mode power supply is separately connected to the battery and the load. The switch-mode power supply may receive a battery voltage provided by the battery, convert the battery voltage into an operating voltage of the load, and output the operating voltage to the load.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A conversion circuit, comprising a first branch circuit and a second branch circuit, wherein the first branch circuit comprises a first connection end, a first input end, a first output end, and a second output end, the second branch circuit comprises a second connection end, a second input end, a third output end, and a fourth output end, and the first connection end of the first branch circuit is connected to the second connection end of the second branch circuit;

the first branch circuit is configured to: convert a first input voltage received through the first input end and the first connection end into an output voltage of the conversion circuit, and output the output voltage of the conversion circuit through the first output end and the second output end; and the second branch circuit is configured to: convert a second input voltage received through the second input end and the second connection end into the output voltage of the conversion circuit, and output the output voltage of the conversion circuit through the third output end and the fourth output end, and a total input voltage of the conversion circuit comprises the first input voltage and the second input voltage, wherein the first branch circuit comprises an isolation unit and a conversion unit, a high potential input end of the conversion unit is connected to a high potential output end of the isolation unit, a low potential input end of the conversion unit and a low potential output end of the isolation unit are grounded, a high potential input end of the isolation unit is connected to the first input end, and a low potential input end of the isolation unit is connected to the second connection end as the first connection end;

the isolation unit is configured to receive the first input voltage, and provide a voltage based on the first input voltage for the conversion unit;

the conversion unit is configured to convert the voltage based on the first input voltage into the output voltage of the conversion circuit;

the isolation unit comprises a first isolation switching transistor, a second isolation switching transistor, a third isolation switching transistor, a fourth isolation switching transistor, and an isolation capacitor;

a first electrode of the first isolation switching transistor is connected to the first input end, and a second electrode of the first isolation switching transistor is separately connected to a first electrode of the second isolation switching transistor and one end of the isolation capacitor, a second electrode of the second isolation switching transistor is connected to the high potential input end of the conversion unit;

the other end of the isolation capacitor is separately connected to a second electrode of the third isolation switching transistor and a first electrode of the fourth isolation switching transistor;

a first electrode of the third isolation switching transistor is connected to the second connection end as the first connection end; and a second electrode of the fourth isolation switching transistor is grounded.

2. The conversion circuit according to claim 1, wherein the conversion unit comprises K conversion capacitors, K first conversion switching transistors, K−1 second conversion switching transistors, and K−1 third conversion switching transistors, and K is an integer greater than +2;

first to $(K-1)^{th}$ conversion capacitors of the K conversion capacitors are sequentially alternately connected to the K first conversion switching transistors, a first electrode of a first conversion switching transistor of the K first conversion switching transistors is connected to the high potential output end of the isolation unit, one end of a $j^{th}$ conversion capacitor of the K conversion capacitors is connected to a second electrode of a $j^{th}$ first conversion switching transistor of the K first conversion switching transistors, the other end of the $j^{th}$ conversion capacitor is connected to a first electrode of a $(j+1)^{th}$ first conversion switching transistor of the K first conversion switching transistors, and j is an integer greater than or equal to 1 and less than K;

the first to $(K-1)^{th}$ conversion capacitors are further respectively connected to the K−1 second conversion switching transistors and the K−1 third conversion switching transistors in a one-to-one correspondence, the one end of the $j^{th}$ conversion capacitor is connected to a second electrode of a second conversion switching transistor corresponding to the $j^{th}$ conversion capacitor, and the other end of the $j^{th}$ conversion capacitor is connected to a first electrode of a third conversion switching transistor corresponding to the $j^{th}$ conversion capacitor; and first electrodes of the K−1 second conversion switching transistors are connected to the first output end, and second electrodes of the K−1 third conversion switching transistors are grounded.

3. The conversion circuit according to claim 1, wherein the conversion unit comprises K first conversion capacitors, K second conversion capacitors, K first conversion switching transistors, K second conversion switching transistors, K third conversion switching transistors, and K fourth conversion switching transistors, and K is an integer greater than 1;

first ends of the K first conversion capacitors are respectively connected to second electrodes of the K first conversion switching transistors and first electrodes of the K second conversion switching transistors in a one-to-one correspondence, and second ends of the K first conversion capacitors are respectively connected to second electrodes of the K third conversion switching transistors and first electrodes of the K fourth conversion switching transistors in a one-to-one correspondence;

first ends of the K second conversion capacitors are respectively connected to second electrodes of the K second conversion switching transistors and first electrodes of the K third conversion switching transistors in a one-to-one correspondence, and second ends of the K second conversion capacitors are respectively connected to second electrodes of the K fourth conversion switching transistors in a one-to-one correspondence; and second electrodes of first to $(K-1)^{th}$ fourth conversion switching transistors of the K fourth conversion switching transistors are respectively connected to first electrodes of second to $K^{th}$ first conversion switching transistors of the K first conversion switching transistors in a one-to-one correspondence, a second electrode of a $K^{th}$ fourth conversion switching transistor of the K fourth conversion switching transistors is grounded, and a first electrode of a first conversion switching transistor of the K first conversion switching transistors is connected to the high potential output end of the isolation unit.

4. The conversion circuit according to claim 1, wherein the conversion unit comprises K first conversion capacitors, K second conversion capacitors, K first conversion switching transistors, K second conversion switching transistors, K third conversion switching transistors, and K fourth conversion switching transistors, and K is an integer greater than 1;

first ends of the K first conversion capacitors are respectively connected to second electrodes of the K first conversion switching transistors and first electrodes of the K second conversion switching transistors in a one-to-one correspondence, and second ends of the K first conversion capacitors are respectively connected to second electrodes of the K third conversion switching transistors and first electrodes of the K fourth conversion switching transistors in a one-to-one correspondence;

first ends of the K second conversion capacitors are respectively connected to second electrodes of the K second conversion switching transistors and first electrodes of the K third conversion switching transistors in a one-to-one correspondence, and second ends of the K second conversion capacitors are respectively connected to second electrodes of the K fourth conversion switching transistors in a one-to-one correspondence; and the second electrodes of the K fourth conversion switching transistors are grounded, second electrodes of first to $(K-1)^{th}$ second conversion switching transistors of the K second conversion switching transistors are respectively connected to first electrodes of second to $K^{th}$ first conversion switching transistors of the K first conversion switching transistors in a one-to-one correspondence, a second electrode of a $K^{th}$ second conversion switching transistor of the K second conversion switching transistors is connected to the first output end, and a first electrode of a first conversion switching transistor of the K first conversion switching transistors is connected to the high potential output end of the isolation unit.

5. The conversion circuit according to claim 1, wherein the isolation unit further comprises an input capacitor, wherein one end of the input capacitor is connected to the first input end, and the other end of the input capacitor is connected to the first electrode of the third isolation switching transistor.

6. A conversion circuit, comprising a first branch circuit and a second branch circuit, wherein the first branch circuit comprises a first connection end, a first input end, a first output end, and a second output end, the second branch circuit comprises a second connection end, a second input end, a third output end, and a fourth output end, and the first connection end of the first branch circuit is connected to the second connection end of the second branch circuit;

the first branch circuit is configured to: convert a first input voltage received through the first input end and the first connection end into an output voltage of the conversion circuit, and output the output voltage of the conversion circuit through the first output end and the second output end, and the second branch circuit is configured to: convert a second input voltage received through the second input end and the second connection end into the output voltage of the conversion circuit, and output the output voltage of the conversion circuit through the third output end and the fourth output end, and a total input voltage of the conversion circuit comprises the first input voltage and the second input voltage, wherein the first branch circuit comprises the first input voltage and the second input voltage, wherein the fist branch circuit comprises and insolation unit and a conversion unit, a high potential input end of the conversion unit is connected to a high potential output end of the isolation unit, a low potential input end of the conversion unit and a low potential output end of the isolation unit are grounded, a high potential input end of the isolation unit is connected to the first input end, and a low potential input end of the isolation unit is connected to the second connection end as the first connection end;

the isolation unit is configured to receive the first input voltage, and provide a voltage based on the first input voltage for the conversion unit;

the conversion unit is configured to convert the voltage based on the fist input voltage into the output voltage of the conversion circuit, wherein the conversion unit comprises K first conversion capacitors, K second conversion capacitors, K first conversion switching transistors, K second conversion switching transistors, K third conversion switching transistors and K fourth conversion switching transistors, and K is an integer greater than 1;

first ends of the K first conversion capacitors are respectively connected to second electrodes of the K first conversion switching transistors and first electrodes of the K second conversion switching transistors in a on-to-one correspondence, and second ends of the K first conversion capacitors are respectively connected to second electrodes of the K third conversion switching transistors and first electrodes of the K fourth conversion switching transistors in a one-to-one correspondence;

first ends of K second conversion capacitors are respectively connected to second electrodes of the K second conversion switching transistors and first electrodes of the K third conversion switching transistors in a one-to-tone correspondence, and a second ends of the K second conversion capacitors are respectively connected to second electrodes of the K fourth conversion switching transistors in a one-to-one correspondence; and second electrodes of first to $(K-1)^{th}$ fourth conversion switching transistors of the K fourth conversion switching transistors are respectively connected to first electrodes of second to $K^{th}$ first conversion switching transistors of the K first conversion switching transistors in a one-to-one correspondence, a second electrode of a $K^{th}$ fourth conversion switching transistor of the K fourth conversion switching transistors is grounded, and a first electrode of a first conversion switching transistor of the K first conversion switching transistors is connected to the high potential output end of the isolation unit.

7. A conversion circuit, comprising a first branch circuit and a second branch circuit wherein the first branch circuit comprises a first connection end, a first input end, a first output end, and a second output end, the second branch circuit comprises a second connection end, a second input end, a third output end, and a fourth output end, and the first connection end of the first branch circuit is connected to the second connection end of the second branch circuit;

the first branch circuit is configured to: convert a first input voltage received through the first input end and the first connection end into an output voltage of the conversion circuit, and output the output voltage of the conversion circuit through the first output end and the second output end; and the second branch circuit is configured to: convert a second input voltage received through the second input end and the second connection end into the output voltage of the conversion circuit, and output the output voltage of the conversion circuit through the third output end and the fourth output end, and total input voltage of the conversion circuit comprises the first input voltage and the second input voltage, wherein the first branch circuit comprises an isolation unit and a conversion unit, a high potential input end of the conversion unit is connected to the high potential output end of the isolation unit, a low potential input end of the conversion unit and a low potential output end of the isolation unit are grounded, a high potential input end of the isolation unit is connected to the fist input end, and a low potential input end of the isolation unit is connected to the second connection end as the first connection end;

the isolation unit is configured to receive the first input voltage, and provide a voltage based on the first input voltage for the conversion unit, the conversion unit is configured to convert the voltage based on the first input voltage into the output voltage of the conversion circuit;

wherein the conversion unit comprises K first conversion capacitors, K second conversion capacitors, K first conversion switching transistors, K second conversion switching transistors, K third conversion switching transistors, and K fourth conversion switching transistors and K is an integer greater than 1, first ends of the K first conversion capacitors are respectively connected to second electrodes of the K first conversion switching transistors and first electrodes of the K second conversion switching transistors in a one-to-one correspondence, and second ends of the K first conversion capacitors are respectively connected to second electrodes of the K third conversion switching transistors and first electrodes of the K fourth conversion switching transistors in a one-to-one correspondence:

first ends of the K second conversion capacitors are respectively connected to second electrodes of the K second conversion switching transistors and first electrodes of the K third conversion switching transistors in a one-to-one correspondence, and second ends of the K second conversion capacitors are respectively connected to second electrodes of the K fourth conversion switching transistors in a one-to-on correspondence, and the second electrodes of the K fourth conversion switching transistors are grounded, second electrodes of first to $(K-1)^{th}$ second conversion switching transistors of the K second conversion switching transistors are respectively connected to first electrodes of second to $K^{th}$ first conversion switching transistors of the K first conversion e transistors in a one-to-one correspon-dence, a second electrode of a $K^{th}$ second conversion switching transistor of the K second conversion switch-ing transistors is connected to the first output end, and a first electrode of a first conversion switching transis-tor of the K first conversion switching transistors is connected to the high potential output end of the isolation unit.

* * * * *